(12) United States Patent
Koga

(10) Patent No.: US 11,287,620 B2
(45) Date of Patent: Mar. 29, 2022

(54) ZOOM LENS SYSTEM, LENS BARREL, AND IMAGING DEVICE

(71) Applicant: Ricoh Company, Ltd., Tokyo (JP)

(72) Inventor: Tomoya Koga, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 99 days.

(21) Appl. No.: 16/811,074

(22) Filed: Mar. 6, 2020

(65) Prior Publication Data

US 2020/0301117 A1 Sep. 24, 2020

(30) Foreign Application Priority Data

Mar. 18, 2019 (JP) .............................. JP2019-050032
Jan. 15, 2020 (JP) .............................. JP2020-004480

(51) Int. Cl.
*G02B 15/14* (2006.01)
*G02B 15/20* (2006.01)

(52) U.S. Cl.
CPC ..... *G02B 15/1431* (2019.08); *G02B 15/1441* (2019.08); *G02B 15/1451* (2019.08); *G02B 15/1461* (2019.08); *G02B 15/20* (2013.01); *G02B 15/143101* (2019.08); *G02B 15/143105* (2019.08)

(58) Field of Classification Search
CPC ............ G02B 15/1431; G02B 15/1451; G02B 15/1461; G02B 15/1441; G02B 15/20; G02B 15/143101; G02B 15/143105
USPC ........................................................ 359/676
See application file for complete search history.

(56) References Cited

U.S. PATENT DOCUMENTS

| 2015/0043087 | A1  | 2/2015 | Sudoh    |             |
|--------------|-----|--------|----------|-------------|
| 2015/0241674 | A1* | 8/2015 | Nagatoshi | G02B 15/16 |
|              |     |        |          | 359/683     |
| 2019/0041607 | A1* | 2/2019 | Bito     | G02B 27/646 |

FOREIGN PATENT DOCUMENTS

| JP | 2008-046319 | 2/2008 |
| JP | 2010-217838 | 9/2010 |
| JP | 2011-158630 | 8/2011 |
| JP | 2015-036691 | 2/2015 |
| JP | 2017-015930 | 1/2017 |

* cited by examiner

Primary Examiner — Kristina M Deherrera
(74) Attorney, Agent, or Firm — Xsensus LLP

(57) ABSTRACT

A zoom lens system includes a first lens group; a second lens group; and a subsequent lens group arranged in that order from the object side. The second lens group consists of a second lens group-a, a second lens group-b, and a second lens group-c arranged in that order from the object side. A distance between the first lens group and the second lens group increases and a distance between the second lens group and the subsequent lens group decreases during a change in magnification from a short focal length end to a long focal length end. During a change in focus from infinity to a short distance, the second lens group-b is movable to the image side, and a distance between the second lens group-a and the second lens group-b and a distance between the second lens group-b and the second lens group-c are changeable.

19 Claims, 80 Drawing Sheets

ZOOM LENS SYSTEM, LENS BARREL, AND IMAGING DEVICE

CROSS-REFERENCE TO RELATED APPLICATIONS

This patent application is based on and claims priority pursuant to 35 U.S.C. § 119(a) to Japanese Patent Application No. 2019-050032, filed on Mar. 18, 2019 and Japanese Patent Application No. 2020-004480, filed on Jan. 15, 2020, in the Japan Patent Office, the entire disclosure of which is hereby incorporated by reference herein.

BACKGROUND

Technical Field

Embodiments of the present disclosure relate to a zoom lens, a lens barrel, and an imaging device.

Related Art

Conventionally, various types of zoom lenses are mounted on digital cameras, such as digital camera single-lens reflex cameras, which is an example of an imaging device. In particular, a positive-lead zoom lens that includes, sequentially from the object side, a positive group, a negative group, and a rear group is used as a zoom lens system, whose focal length on the telephoto side (long focal length end side) is extended. Such a zoom lens system needs to be a compact-sized optical system having higher optical performance over the entire zoom and shooting-distance range. In addition, in order to achieve a high-speed automatic focusing operation (autofocus) and reduce the weight of the focusing lens group, the inner focus method is typically known that moves a lens group at the inner side relative to a heavier front lens.

SUMMARY

In one aspect of this disclosure, there is provided zoom lens system including a first lens group having positive refractive power; a second lens group has negative refractive power; and a subsequent lens group. The second lens group consists of a second lens group-a having positive refractive power, a second lens group-b having negative refractive power, and a second lens group-c having negative refractive power arranged in that order from the object side. The first lens group, the second lens group, and the subsequent lens group are disposed in that order from the object side. A distance between the first lens group and the second lens group increasing and a distance between the second lens group and the subsequent lens group decreases during a change in magnification from a short focal length end to a long focal length end. During a change in focus from infinity to a short distance, the second lens group-b is movable to the image side, and a distance between the second lens group-a and the second lens group-b and a distance between the second lens group-b and the second lens group-c are changeable.

In another aspect of this disclosure, there is provided an improved lens barrel including the above-described zoom lens system.

In still another aspect of this disclosure, there is provided an improved imaging device including the above-described zoom lens system.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 119 is a collection of lateral aberration diagrams of the zoom lens system according to Numerical Example 10 focused on infinity at the long focal length end;

FIG. 120 is a collection of lateral aberration diagrams of the zoom lens system according to Numerical Example 10 focused on 1.2 m at the long focal length end;

FIG. 121 is a collection of lateral aberration diagrams of the zoom lens system in the state illustrated in FIG. 119 during the drive of vibration isolation of ±0.3°;

FIG. 122 is a diagram of a configuration of the zoom lens system according to Numerical Example 11 focused on infinity at the short focal length end;

FIG. 123 is a collection of longitudinal aberration diagrams of the zoom lens system according to Numerical Example 11 focused on infinity at the short focal length end;

FIG. 124 is a collection of longitudinal aberration diagrams of the zoom lens system according to Numerical Example 11 focused on 1.2 m at the short focal length end;

FIG. 125 is a collection of longitudinal aberration diagrams of the zoom lens system according to Numerical Example 11 focused on 0.9 m at the short focal length end;

FIG. 126 is a collection of lateral aberration diagrams of the zoom lens system according to Numerical Example 11 focused on infinity at the short focal length end;

FIG. 127 is a collection of lateral aberration diagrams of the zoom lens system according to Numerical Example 11 focused on 1.2 m at the short focal length end;

FIG. 128 is a collection of lateral aberration diagrams of the zoom lens system according to Numerical Example 11 focused on 0.9 m at the short focal length end;

FIG. 129 is a collection of lateral aberration diagrams of the zoom lens system in the state illustrated in FIG. 126 during the drive of vibration isolation;

FIG. 130 is a collection of longitudinal aberration diagrams of the zoom lens system according to Numerical Example 11 focused on infinity at the long focal length end;

Figure 131:
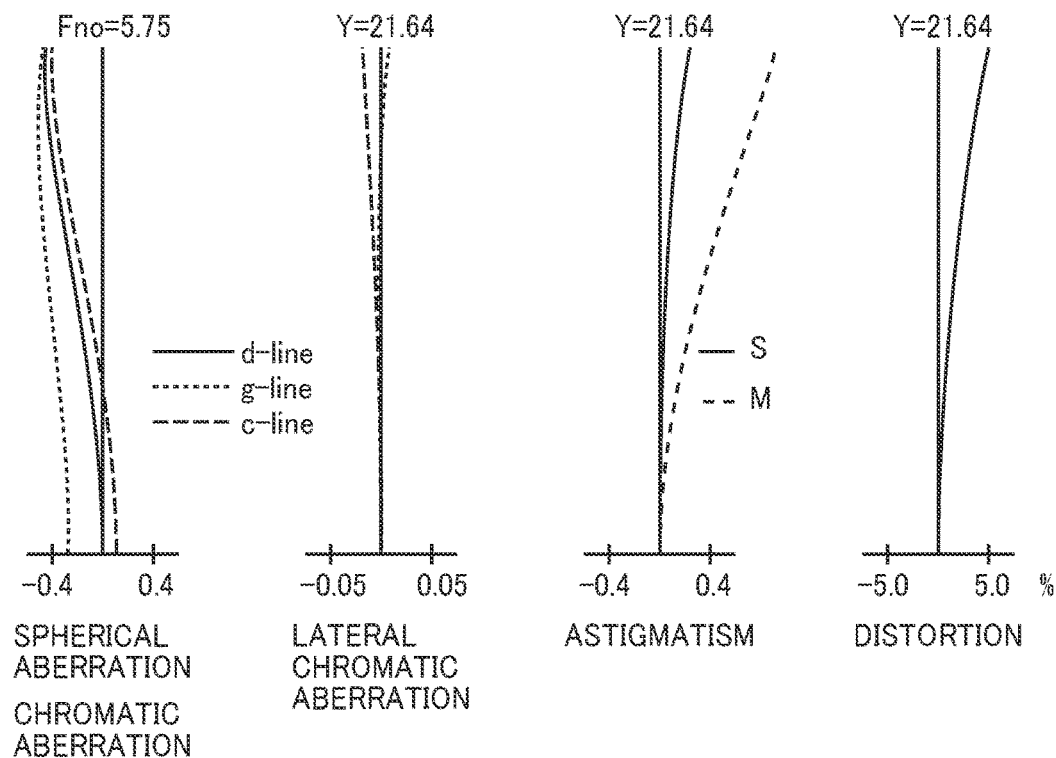
Figure 132:
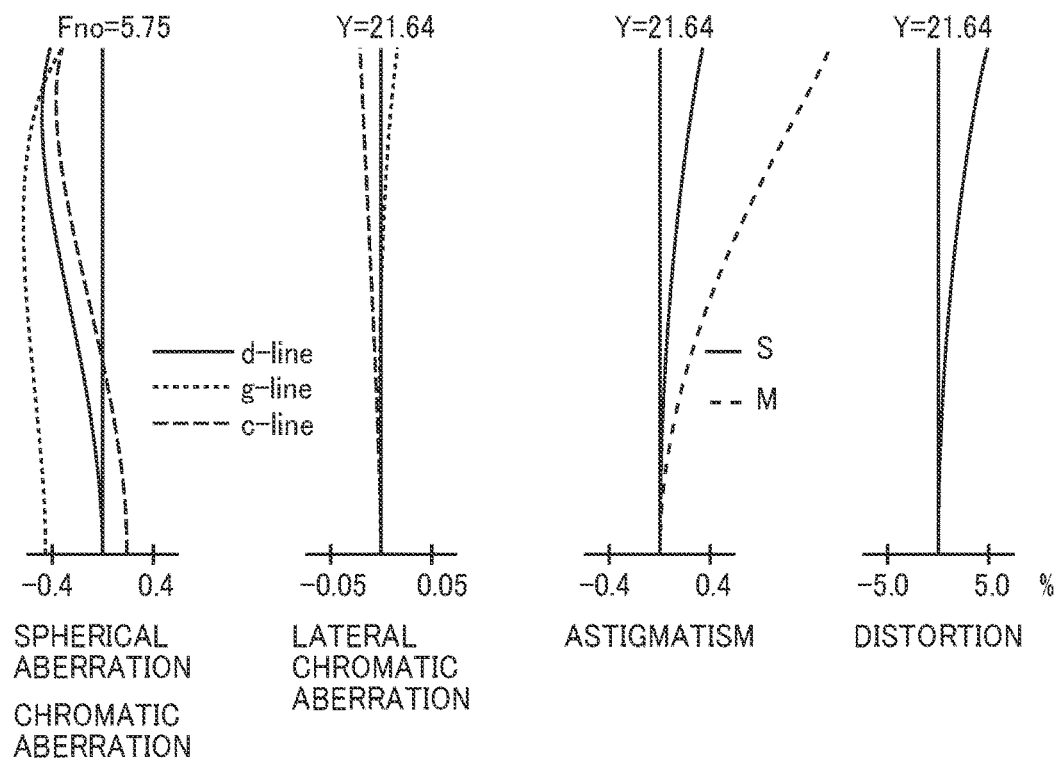
Figure 133:
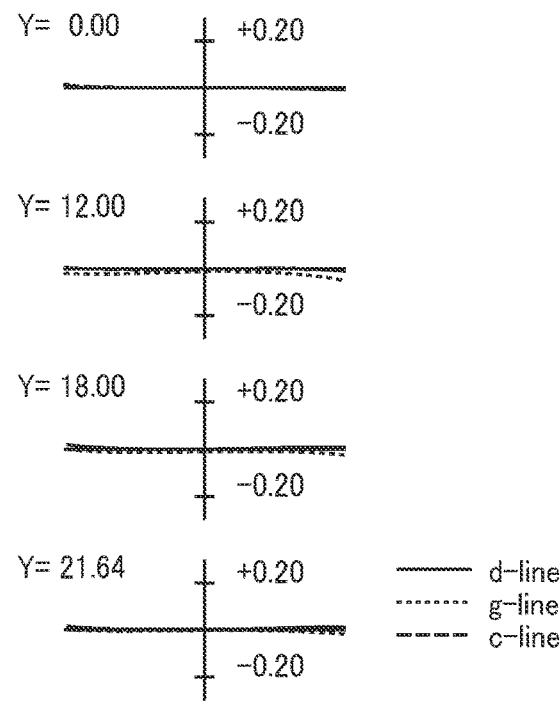
Figure 134:
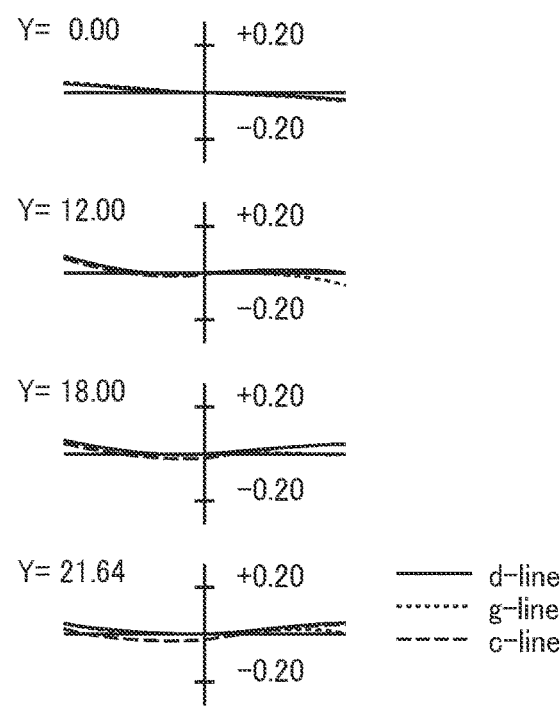
Figure 135:
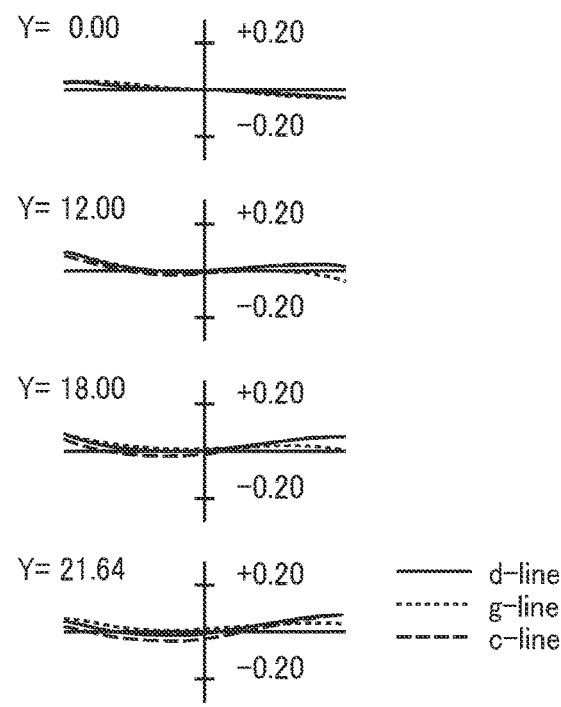
Figure 136:
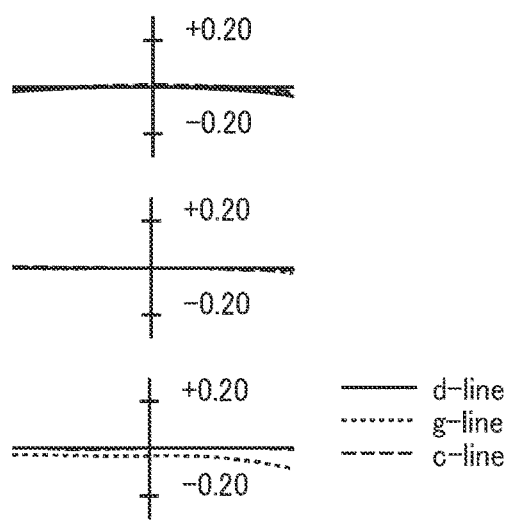
Figure 137:
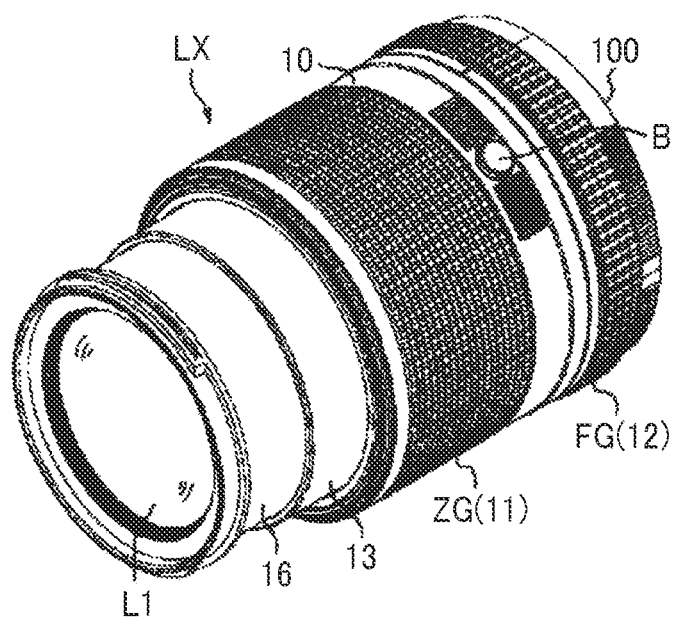

FIG. 131 is a collection of longitudinal aberration diagrams of the zoom lens system according to Numerical Example 11 focused on 1.2 m at the long focal length end;

FIG. 132 is a collection of longitudinal aberration diagrams of the zoom lens system according to Numerical Example 11 focused on 0.9 m at the long focal length end;

FIG. 133 is a collection of lateral aberration diagrams of the zoom lens system according to Numerical Example 11 focused on infinity at the long focal length end;

FIG. 134 is a collection of lateral aberration diagrams of the zoom lens system according to Numerical Example 11 focused on 1.2 m at the long focal length end;

FIG. 135 is a collection of lateral aberration diagrams of the zoom lens system according to Numerical Example 11 focused on 0.9 m at the long focal length end;

FIG. 136 is a collection of lateral aberration diagrams of the zoom lens system in the state illustrated in FIG. 133 during the drive of vibration isolation of ±0.6°; and FIG. 137 is an illustration of an external appearance of a lens barrel (the imaging device) according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

A zoom lens system according to an embodiment includes, sequentially from the object side, a first lens group G1 having positive refractive power, a second lens group G2 having negative refractive power, and a subsequent (rear) lens group GR. During a change in magnification from the short focal length end to the long focal length end, the distance between the first lens group G1 and the second lens group G2 increases, and the distance between the second lens group G2 and the subsequent lens group GR decreases. Further, the second lens group G2 consists of, sequentially from the object side, a second lens group-a G2a having positive refractive power, a second lens group-b G2b having negative refractive power, and a second lens group-c G2c having negative refractive power. During the focusing from the infinity to the short distance, the second lens group-b 2Gb moves to the image side while the distance between the second lens group-a 2Ga and the second lens group-b 2Gb and the distance between the second lens group-b 2Gb and the second lens group-c 2Gc change.

When the combined optical system of the second lens group-a G2a and the second lens group-b G2b is defined as a second lens group-ab, and the combined optical system of the second lens group-b G2b and the second lens group-c G2c is defined as a second lens group-bc, the zoom lens system according to the present embodiments preferably satisfies at least one of conditional expressions (1), (2), (3), (4), (5), and (6) below:

$$0.3 < D2bc/(-f2) < 1.0 \tag{1}$$

$$0.3 < D2bc/D2 < 1.0 \tag{2}$$

$$0.3 < H2\_2bc/(-f2bc) \tag{3}$$

$$0.2 < HH\_2bc/(-f2bc) \tag{4}$$

$$0 < H1\_2/D2 < 0.9 \tag{5}$$

$$0 < H1\_2ab/D2 < 1.0 \tag{6}$$

where

D2bc denotes the distance between the second lens group-b G2b and the second lens group-c G2c when the zoom lens system is focused on infinity, f2 denotes the focal length of the second lens group G2, D2 denotes the thickness of the second lens group G2 along the optical axis, H2_2bc denotes the distance between the surface closest to the image side within the second lens group-bc to the position of the rear principal point of the second lens group-bc along the optical axis, f2bc denotes the focal length of the second lens group-bc when the zoom lens system is focused on infinity, HH_2bc denotes the distance between the principal points of the second lens group-bc, that is, the distance from the position of the front principal point to the position of the rear principal point along the optical axis, H1_2 denotes the distance from the surface closest to the object side within the second lens group G2 to the position of the front principal point of the second lens group G2 along the optical axis, and H1_2ab denotes the distance between the surface closest to the object side within the second lens group-ab and the position of the front principal point of the second lens group-ab along the optical axis.

The following describes conditional expressions (1), (2), (3), (4), (5), and (6).

Preferably, the zoom lens system according to the present embodiments satisfies the conditional expression (1) below:

$$0.3 < D2bc/(-f2) < 1.0 \tag{1}$$

where

D2bc denotes the distance between the second lens group-b G2b and the second lens group-c G2c when the zoom lens system is focused on infinity, that is, the distance between the vertex of the surface closest to the image side of the second lens group-b G2b and the vertex of the surface closest to the object side of the second lens group-c G2c, and f2 denotes the focal length of the second lens group G2.

Within the range of conditional expression (1), conditional expressions (1') is more preferably satisfied:

$$0.4 < D2bc/(-f2) < 1.0 \tag{1'}$$

Preferably, the zoom lens system according to the present embodiments satisfies the conditional expression (2) below:

$$0.3 < D2bc/D2 < 1.0 \tag{2}$$

where

D2bc denotes the distance between the second lens group-b G2b and the second lens group-c G2c when the zoom lens system is focused on infinity, that is, the distance between the vertex of the surface closest to the image side of the second lens group-b G2b and the vertex of the surface closest to the object side of the second lens group-c G2c, and D2 denotes the thickness of the second lens group G2 along the optical axis.

When the combined optical system of the second lens group-b G2b and the second lens group-c G2c is defined as a second lens group-bc, the zoom lens system according to the present embodiments preferably satisfies conditional expression (3) below:

$$0.3 < H2\_2bc/(-f2bc) \tag{3}$$

where

H2_2bc denotes the distance between the surface closest to the image side within the second lens group-bc and the position of the rear principal point of the second lens group-bc along the optical axis, and f2bc denotes the focal length of the second lens group-bc when the zoom lens system is focused on infinity.

Within the conditional-expression range of Conditional Expression (3), Conditional Expression (3') is desirably satisfied as follows:

$$0.4 < H2\_2bc/(-f2bc) < 1.0 \tag{3'}$$

When the combined optical system of the second lens group-b G2b and the second lens group-c G2c is defined as the second lens group-bc, the zoom lens system according to the present embodiments preferably satisfies conditional expression (4) below:

$$0.2 < HH\_2bc/(-f2bc) \tag{4}$$

where

HH_2bc denotes the distance between the principal points of the second lens group-bc, that is, the distance from the position of the front principal point to the position of the rear principal point along the optical axis, and f2bc denotes the focal length of the second lens group-bc when the zoom lens system is focused on infinity.

Within the range of conditional expression (4), conditional expressions (4) is more preferably satisfied:

$$0.3 < HH\_2bc/(-f2bc) < 1.0 \tag{4'}$$

Preferably, the zoom lens system according to the present embodiments satisfies the conditional expression (5) below:

$$0 < H1\_2/D2 < 0.9 \tag{5}$$

where

H1_2 denotes the distance from the surface closest to the object side within the second lens group G2 to the position of the front principal point of the second lens group G2 along the optical axis, and D2 denotes the thickness of the second lens group G2 along the optical axis.

Within the range of conditional expression (5), conditional expressions (5') is more preferably satisfied:

$$0.4 < H1\_2/D2 < 0.9 \qquad (5')$$

When the combined optical system of the second lens group-a G2a and the second lens group-b G2b is defined as a second lens group-ab, the zoom lens system according to the present embodiments preferably satisfies conditional expression (6) below:

$$0 < H1\_2ab/D2 < 1.0 \qquad (6)$$

where

H1_2ab denotes the distance between the surface closest to the object side within the second lens group-ab and the position of the front principal point of the second lens group-ab along the optical axis, and D2 denotes the thickness of the second lens group G2 along the optical axis.

Within the conditional-expression range of Conditional Expression (6), Conditional Expression (6') is desirably satisfied as follows:

$$0.2 < H1\_2ab/D2 < 0.8 \qquad (6')$$

The second lens group-c G2c may include at least two negative lenses and at least one positive lens.

Preferably, the zoom lens system according to the present embodiments satisfies the conditional expression (7) below:

$$1.5 < f2a/(-f2b) < 6.5 \qquad (7)$$

where f2a denotes the focal length of the second lens group-a G2a, and f2b denotes the focal length of the second lens group-b G2b.

Within the conditional-expression range of Conditional Expression (7), Conditional Expression (7') is desirably satisfied as follows:

$$2.0 < f2a/(-f2b) < 6.0 \qquad (7')$$

Preferably, the zoom lens system according to the present embodiments satisfies the conditional expression (8) below:

$$0.5 < f2b/f2c < 2.5 \qquad (8)$$

where f2b denotes the focal length of the second lens group-b G2b, and f2c denotes the focal length of the second lens group-c G2c.

Within the conditional-expression range of Conditional Expression (8), Conditional Expression (8') is desirably satisfied as follows:

$$0.8 < f2b/f2c < 2.0 \qquad (8')$$

When the combined optical system of the second lens group-b G2b and the second lens group-c G2c is defined as the second lens group-bc, the zoom lens system according to the present embodiments preferably satisfies conditional expression (9) below:

$$4 < f2a/(-f2bc) < 20 \qquad (9)$$

where f2a denotes the focal length of the second lens group-a G2a; and f2bc denotes the focal length of the second lens group-bc when the zoom lens system is focused on infinity.

Within the conditional-expression range of Conditional Expression (9), Conditional Expression (9') is desirably satisfied as follows:

$$5 < f2a/(-f2bc) < 18 \qquad (9')$$

Preferably, the zoom lens system according to the present embodiments satisfies the conditional expression (10) below:

$$0.4 < (R2\_2a - R1\_2a)/(R2\_2a + R1\_2a) < 3.0 \qquad (10)$$

where

R1_2a denotes the paraxial radius of curvature of the surface closest to the object side within the second lens group-a G2a, and R2_2a denotes the paraxial radius of curvature of the surface closest to the image side within the second lens group-a G2a.

Within the range of conditional expression (10), conditional expressions (10') is more preferably satisfied:

$$0.4 < (R2\_2a - R1\_2a)/(R2\_2a + R1\_2a) < 2.5 \qquad (10')$$

Preferably, the zoom lens system according to the present embodiments satisfies the conditional expression (11) below:

$$0.40 < |R2\_2a|/f2a \qquad (11)$$

where

R2_2a denotes the paraxial radius of curvature of the surface closest to the image side within the second lens group-a G2a, and f2a denotes the focal length of the second lens group-a G2a.

Within the range of conditional expression (11), conditional expressions (11') is more preferably satisfied, and conditional expressions (11") is even more preferably satisfied:

$$1.0 < |R2\_2a|/f2a < 3.0 \qquad (11')$$

$$1.2 < |R2\_2a|/f2a < 3.0 \qquad (11'')$$

The second lens group-a G2a includes at least one positive lens, and conditional expressions (12) below is preferably satisfied:

$$45 < 2ap\ MAX\_vd \qquad (12)$$

where

2apMAX_vd denotes the Abbe number of a positive lens having the largest Abbe number among the positive lenses in the second lens group-a G2a.

Within the range of conditional expression (12), conditional expressions (12') is more preferably satisfied, and conditional expressions (12") is even more preferably satisfied:

$$50 < 2ap\ MAX\_vd \qquad (12')$$

$$55 < 2ap\ MAX\_vd \qquad (12'')$$

The second lens group-a G2a may include at least one negative lens.

The second lens group-a G2a includes at least one negative lens, and conditional expressions (13) below is preferably satisfied:

$$0.2 < (-f2an\text{MAX})/f2a \qquad (13)$$

where f2anMAX denotes the focal length of a negative lens having the largest refractive power among the negative lenses in the second lens group-a G2a, and f2a denotes the focal length of the second lens group-a G2a.

Within the range of conditional expression (13), conditional expressions (13') is more preferably satisfied, and conditional expressions (13") is even more preferably satisfied:

$$0.5<(-f2anMAX)/f2a<2.8 \quad (13')$$

$$0.7<(-f2anMAX)/f2a<2.5 \quad (13'')$$

Preferably, the zoom lens system according to the present embodiments satisfies the conditional expression (14) below:

$$0.4<(R1\_2b-R2\_2b)/(R1\_2b+R2\_2b)<2.5 \quad (14)$$

where

R1_2b denotes the paraxial radius of curvature of the surface closest to the object side of the second lens group-b G2b, and R2_2b denotes the paraxial radius of curvature of the surface closest to the image side within the second lens group-b G2b.

Within the range of conditional expression (14), conditional expressions (14') is more preferably satisfied, and conditional expressions (14") is even more preferably satisfied:

$$0.5<(R1\_2b-R2\_2b)/(R1\_2b+R2\_2b)<2.0 \quad (14')$$

$$0.6<(R1\_2b-R2\_2b)/(R1\_2b+R2\_2b)<1.6 \quad (14'')$$

The second lens group-b G2b includes a negative lens located closest to the object side, and conditional expression (15) below is preferably satisfied:

$$30<2bn\_vd \quad (15)$$

where

2bn_vd denotes the Abbe number of the negative lens disposed closest to the object side within the second lens group-b G2b.

Within the range of conditional expression (15), conditional expressions (15') is more preferably satisfied, and conditional expressions (15") is even more preferably satisfied:

$$40<2bn\_vd \quad (15')$$

$$45<2bn\_vd \quad (15'')$$

The second lens group-b may consist of one negative lens and one positive lens arranged in that order from the object side.

Preferably, the zoom lens system according to the present embodiments satisfies the conditional expression (16) below:

$$0.1<(-f2bn)/f2bp<0.7 \quad (16)$$

where f2bn denotes the focal length of the negative lens of the second lens group-b G2b, and f2bp denotes the focal length of the positive lens of the second lens group-b G2b.

Within the range of conditional expression (16), conditional expressions (16') is more preferably satisfied, and conditional expressions (16") is even more preferably satisfied:

$$0.4<(-f2bn)/f2bp<0.7 \quad (16')$$

$$0.4<(-f2bn)/f2bp<0.5 \quad (16'')$$

Preferably, the zoom lens system according to the present embodiments satisfies the conditional expression (17) below:

$$20<2bn\_vd-2bp\_vd \quad (17)$$

where

2bn_vd denotes the Abbe number of the negative lens of the second lens group-b G2b, and 2 bp_vd denotes the Abbe number of the positive lens of the second lens group-b G2b.

Within the range of conditional expression (17), conditional expressions (17') is more preferably satisfied:

$$24<2bn\_vd-2bp\_vd \quad (17')$$

Preferably, the zoom lens system according to the present embodiments satisfies the conditional expression (18) below:

$$fW/|f1-2bW|<0.5 \quad (18)$$

where fW denotes the focal length of the zoom lens system as a whole when the zoom lens system is focused on infinity at the short focal length end, and f1-2bW denotes the combined focal length of the first lens group G1, the second lens group-a G2a, and the second lens group-b G2b when the zoom lens system is focused on infinity at the short focal length end.

Within the range of conditional expression (18), conditional expressions (18') is more preferably satisfied, and conditional expressions (18") is even more preferably satisfied:

$$fW/|f1-2bW|<0.4 \quad (18')$$

$$fW/|f1-2bW|<0.3 \quad (18'')$$

Preferably, the zoom lens system according to the present embodiments satisfies the conditional expression (19) below:

$$(1-M\_2bt^2) \cdot M\_2bRt^2 < -3.0 \quad (19)$$

where

M_2bt denotes lateral magnification of the second lens group-b G2b when the zoom lens system is focused on infinity at the long focal length end, and M_2bRt denotes a combined lateral magnification of all the lens groups G2c and GR disposed on the image side relative to the second lens group-b G2b when the zoom lens system is focused on infinity at the long focal length end.

Within the range of conditional expression (19), conditional expressions (19') is more preferably satisfied, and conditional expressions (19") is even more preferably satisfied:

$$(1-M\_2bt^2) \cdot M\_2bRt^2 < -5.0 \quad (19')$$

$$(1-M\_2bt^2) \cdot M\_2bRt^2 < -8.0 \quad (19'')$$

A vibration-isolating lens group that moves in a direction including a component of the direction perpendicular to the optical axis may be disposed on the image side relative to the second lens group-b G2b.

Preferably, the zoom lens system according to the present embodiments satisfies the conditional expression (20) below:

$$0.9<|(1-M\_SRt) \cdot M\_SRRt|<3.5 \quad (20)$$

where

M_SRt denotes lateral magnification of the vibration-isolating lens group when the zoom lens system is focused on infinity at the long focal length end, and M_SRRt denotes a combined lateral magnification of all the lens groups disposed on the image side relative to the vibration-isolating lens group when the zoom lens system is focused on infinity at the long focal length end.

Within the range of conditional expression (20), conditional expressions (20') is more preferably satisfied, and conditional expressions (20") is even more preferably satisfied:

$$1.1 < |(1-M\_SRt) \cdot M\_SRRt| < 3.0 \qquad (20')$$

$$1.2 < |(1-M\_SRt) \cdot M\_SRRt| < 2.5 \qquad (20'')$$

Preferably, the zoom lens system according to the present embodiments satisfies the conditional expression (21) below:

$$0.4 < f2b/fSR < 2.5 \qquad (21)$$

where f2b denotes the focal length of the second lens group-b G2b.

fSR denotes the focal length of the vibration-isolating lens group.

Within the range of conditional expression (21), conditional expressions (21') is more preferably satisfied, and conditional expressions (21") is even more preferably satisfied:

$$0.6 < f2b/fSR < 2.3 \qquad (21')$$

$$0.8 < f2b/fSR < 2.0 \qquad (21'')$$

The lens group including the vibration-isolating lens group may not moved along the direction of the optical axis with a change in the magnification (during the zooming) from the short focal length end to the long focal length end.

The second lens group G2 may not be moved along the direction of the optical axis with a change in the magnification from the short focal length end to the long focal length end.

The first lens group G1 may not be moved along the direction of the optical axis with a change in the magnification from the short focal length end to the long focal length end.

Preferably, the zoom lens system according to the present embodiments satisfies the conditional expression (22) below:

$$0.8 < (fT/fW)/(M2T/M2W) < 3.5 \qquad (22)$$

where fT denotes the focal length of the zoom lens system as a whole when the zoom lens system is focused on infinity at the long focal length end, fW denotes the focal length of the zoom lens system as a whole when the zoom lens system is focused on infinity at the short focal length end, M2T denotes lateral magnification of the second lens group G2 when the zoom lens system is focused on infinity at the long focal length end, and M2W denotes lateral magnification of the second lens group G2 when the zoom lens system is focused on infinity at the short focal length end.

Preferably, the zoom lens system according to the present embodiments satisfies the conditional expression (23) below:

$$0.2 < (-f2)/fW < 0.8 \qquad (23)$$

where f2 denotes the focal length of the second lens group G2, and fW denotes the focal length of the zoom lens system as a whole when the zoom lens system is focused on infinity at the short focal length end.

Preferably, the zoom lens system according to the present embodiments satisfies the conditional expression (24) below:

$$0.3 < f1/fT < 1.1 \qquad (24)$$

where f1 denotes the focal length of the first lens group; and fT denotes the focal length of the zoom lens system as a whole when the zoom lens system is focused on infinity at the long focal length end.

Preferably, the zoom lens system according to the present embodiments satisfies the conditional expression (25) below:

$$0.3 < f1/(fW \cdot fT)^{1/2} < 3.0 \qquad (25)$$

where f1 denotes the focal length of the first lens group; and fW denotes the focal length of the zoom lens system as a whole when the zoom lens system is focused on infinity at the short focal length end, and fT denotes the focal length of the zoom lens system as a whole when the zoom lens system is focused on infinity at the long focal length end.

Preferably, the zoom lens system according to the present embodiments satisfies the conditional expression (26) below:

$$0.1 < (D12T - D12W)/(-f2) < 10.0 \qquad (26)$$

where

D12T denotes the distance between the first lens group G1 and the second lens group G2 when the zoom lens system is focused on infinity at the long focal length end, that is, the distance between a refractive surface closest to the image side within the first lens group G1 and a refractive surface closest to the object side within the second lens group G2 along the optical axis when the zoom lens system is focused on infinity at the long focal length end, D12W denotes the distance between the first lens group G1 and the second lens group G2 when the zoom lens system is focused on infinity at the short focal length end, that is, the distance between a refractive surface closest to the image side within the first lens group G1 and a refractive surface closest to the object side within the second lens group G2 along the optical axis when the zoom lens system is focused on infinity at the short focal length end, and f2 denotes the focal length of the second lens group G2.

Preferably, the zoom lens system according to the present embodiments satisfies the conditional expression (27) below:

$$0.1 < (D2RW - D2RT)/(-f2) < 10.0 \qquad (27)$$

where

D2RW denotes the distance between the second lens group G2 and the subsequent lens group GR when the zoom lens system is focused on infinity at the short focal length end, that is, the distance between a refractive surface closest to the image side within the second lens group G2 and a refractive surface closest to the object side within the subsequent lens group GR along the optical axis when the zoom lens system is focused on infinity at the short focal length end, D2RT denotes the distance between the second lens group G2 and the subsequent lens group GR when the zoom lens system is focused on infinity at the long focal length end, that is, the distance between the refractive surface closest to the image side within the second lens group G2 and the refractive surface closest to the object side within the subsequent lens group GR along the optical axis when the zoom lens system is focused on infinity at the long focal length end, and f2 denotes the focal length of the second lens group G2.

Preferably, the zoom lens system according to the present embodiments satisfies the conditional expression (28) below:

$$0.5<(R1\_2a)/(R2\_2b)<10.0 \quad (28)$$

where

R1_2a denotes the paraxial radius of curvature of the surface closest to the object side within the second lens group-a G2a, and R2_2b denotes the paraxial radius of curvature of the surface closest to the image side within the second lens group-b G2b.

Within the range of conditional expression (28), conditional expressions (28') is more preferably satisfied, and conditional expressions (28") is even more preferably satisfied:

$$0.7<(R1\_2a)/(R2\_2b)<8.0 \quad (28')$$

$$0.9<(R1\_2a)/(R2\_2b)<5.0 \quad (28'')$$

A lens barrel (LX) according to an embodiment includes a zoom lens system that includes, sequentially from the object side, a first lens group G1 having positive refractive power, a second lens group G2 having negative refractive power, and a subsequent (rear) lens group GR. During a change in magnification from the short focal length end to the long focal length end, the distance between the first lens group G1 and the second lens group G2 increases, and the distance between the second lens group G2 and the subsequent lens group GR decreases. Further, the second lens group G2 consists of, sequentially from the object side, a second lens group-a G2a having positive refractive power, a second lens group-b G2b having negative refractive power, and a second lens group-c G2c having negative refractive power. During the focusing from the infinity to the short distance, the second lens group-b 2Gb moves to the image side while the distance between the second lens group-a 2Ga and the second lens group-b 2Gb and the distance between the second lens group-b 2Gb and the second lens group-c 2Gc change.

An imaging device according to an embodiment includes a zoom lens system that includes, sequentially from the object side, a first lens group G1 having positive refractive power, a second lens group G2 having negative refractive power, and a subsequent (rear) lens group GR. During a change in magnification from the short focal length end to the long focal length end, the distance between the first lens group G1 and the second lens group G2 increases, and the distance between the second lens group G2 and the subsequent lens group GR decreases. Further, the second lens group G2 consists of, sequentially from the object side, a second lens group-a G2a having positive refractive power, a second lens group-b G2b having negative refractive power, and a second lens group-c G2c having negative refractive power. During the focusing from the infinity to the short distance, the second lens group-b 2Gb moves to the image side while the distance between the second lens group-a 2Ga and the second lens group-b 2Gb and the distance between the second lens group-b 2Gb and the second lens group-c 2Gc change.

FIGS. 1 to 8 and FIGS. 97 to 99 are illustrations of the trajectories during zooming, the trajectories focusing, and the trajectories during the vibration-isolation drive. In the configurations of FIGS. 1 to 8 and FIGS. 97 to 99, the zoom lens system is focused at infinity with the short focal length end.

The zoom lens system according to the first to eighth Numerical Examples of an embodiment includes a first lens group G1 having positive refractive power, a second lens group G2 having negative refractive power, and a subsequent lens group GR, which are arranged in that order from the object side.

During a change in the focus from the short focal length end to the long focal length end to change the magnification power, the distance between the first lens group G1 and the second lens group G2 increases, and the distance between the second lens group G2 and the subsequent lens group GR decreases.

The second lens group G2 consists of a second lens group-a G2a having positive refractive power, a second lens group-b G2b having negative refractive power, and a second lens group-c G2c having negative refractive power, which are arranged in that order from the object side.

During focusing from infinity to a short distance, the second lens group-b G2b moves to the image side while the distance between the second-a lens group G2a and the second lens group-b G2b and the distance between the second lens group-b G2b and the second lens group-c G2c change (the second lens group-b G2b constitutes a focusing lens group). More specifically, the distance between the second lens group-a G2a and the second lens group-b G2b increases, and the distance between the second lens group-b G2b and the second lens group-c G2c decreases.

A plane-parallel plate CG is disposed in front of the image plane of an image sensor on the image side of the subsequent lens group GR. The plane-parallel plate CG may be capable of protecting a low pass filter, an infrared cut-off filter, and an image plane of an image sensor, for example, same as a cover glass.

The above-described lens configurations are common between Numerical Examples 1 to 8. Hereinafter, the lens configuration for each of Numerical Examples 1 to 8 is described.

Figure 1:
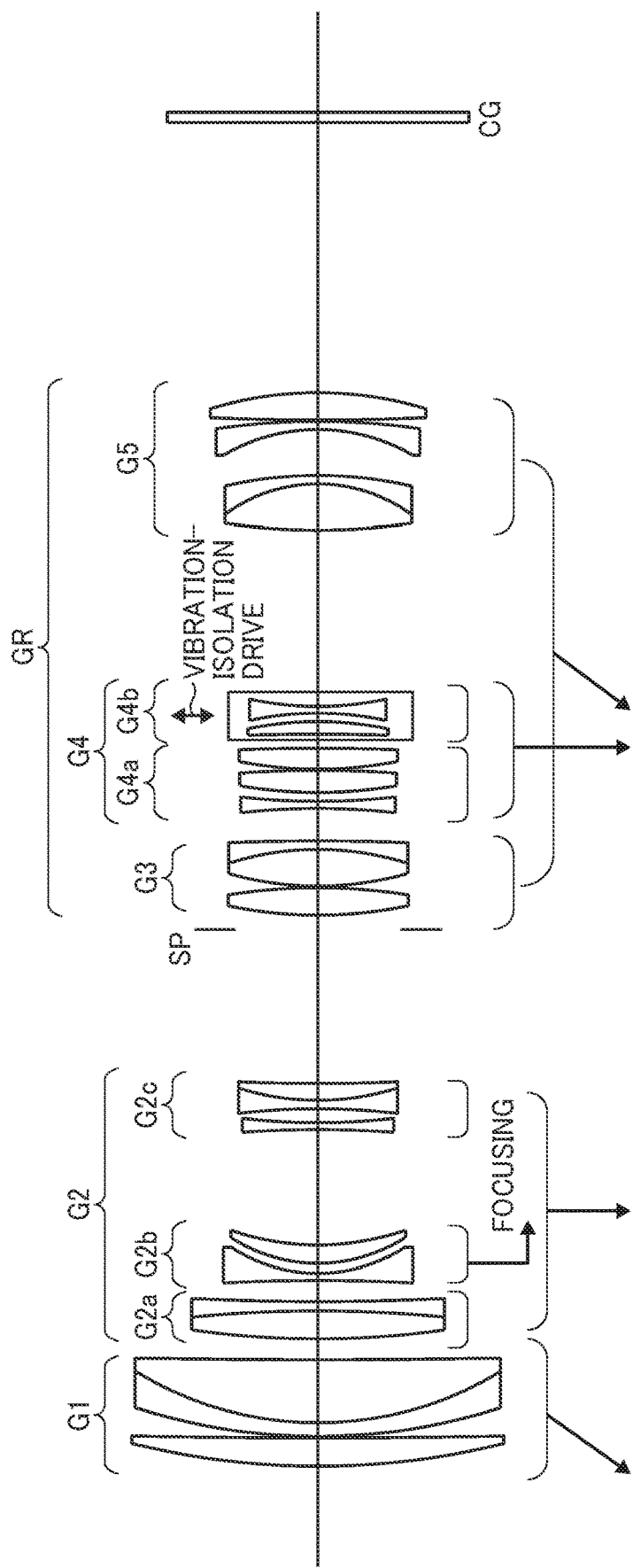
FIG. 1 is a schematic view of a trajectory during the zooming, a trajectory during the focusing, and a trajectory during the drive of vibration isolation of a zoom lens system according to Numerical Example 1.

In Numerical Example 1 in FIG. 1, the subsequent lens group GR includes, in order from the object side, a third lens group G3 having positive refractive power, a fourth lens group G4 having negative refractive power, and a fifth lens group G5 having positive refractive power. That is, the zoom lens system has a configuration of a five-group zoom lens having positive, negative, positive, negative, and positive refractive power arranged in that order from the object side.

During a change in magnification from the short focal length end to the long focal length end, the distance between the first lens group G1 and the second lens group G2 increases, and the distance between the second lens group G2 and third lens group G3 decreases. In addition, the distance between the third lens group G3 and the fourth lens group G4 increases, and the distance between the fourth lens group G4 and the fifth lens group G5 decreases. In such a manner, the distance between the adjacent lens groups changes with a change in magnification from the short focal length end to the long focal length end.

During the change in magnification from the short focal length end to the long focal length end, the first lens group G1, the third lens group G3, the fifth lens group G5 are moved (extended) to the object side, and the second lens group G2 and the fourth lens group G4 are stationary with respect to the image plane. The third lens group G3 and the fifth lens group G5 are moved (extended) toward the object side along the same trajectory. Accordingly, a simple zooming mechanism is provided.

The fourth lens group G4 includes a fourth lens group-a G4a having positive refractive power and a fourth lens group-b G4b having negative refractive power, which are arranged in that order from the object side. The fourth lens group-b G4b is a vibration-isolating lens group that moves in a direction including a component of the direction orthogonal to the optical axis and shifts the imaging position so as to correct image blur.

Between the second lens group G2 and the third lens group G3 (immediately in front of the third lens group G3), a stop SP for adjusting the intensity of light is disposed.

Figure 2:
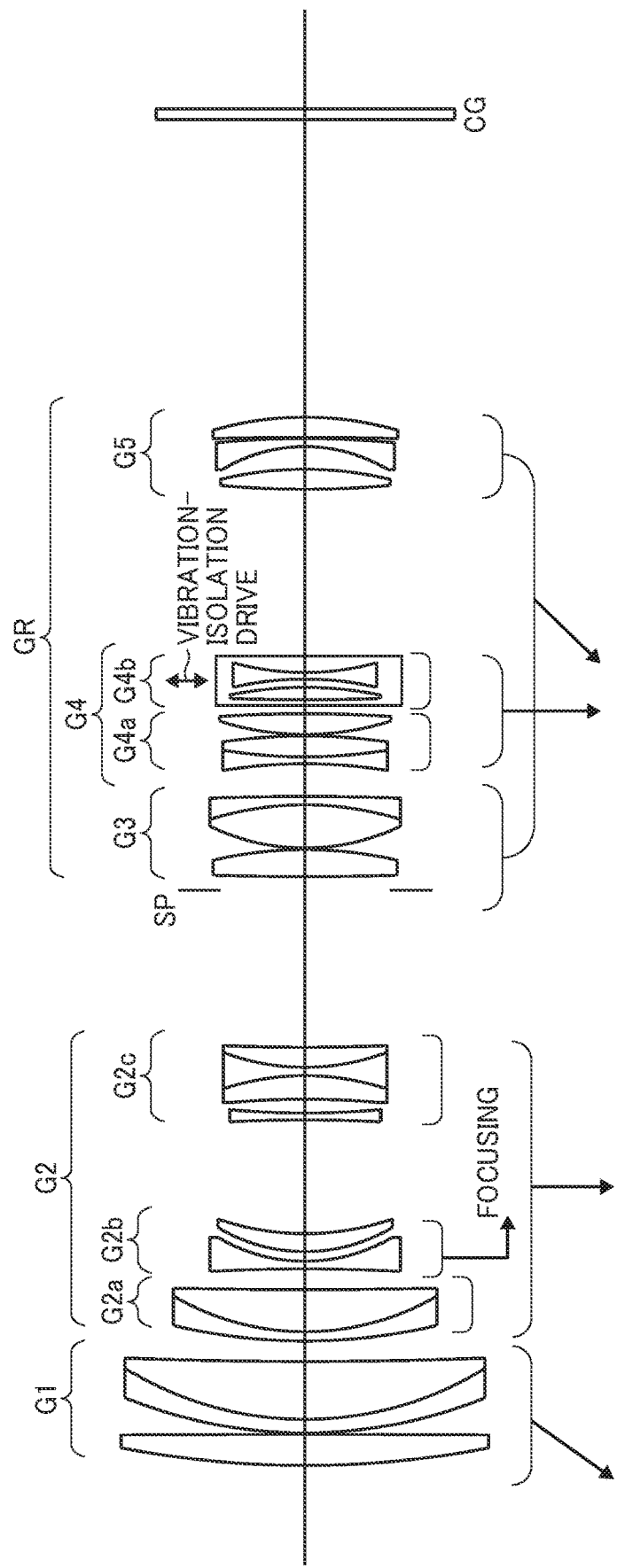
FIG. 2 is a schematic view of a trajectory during the zooming, a trajectory during the focusing, and a trajectory during the drive of vibration isolation of a zoom lens system according to Numerical Example 2.
Figure 3:
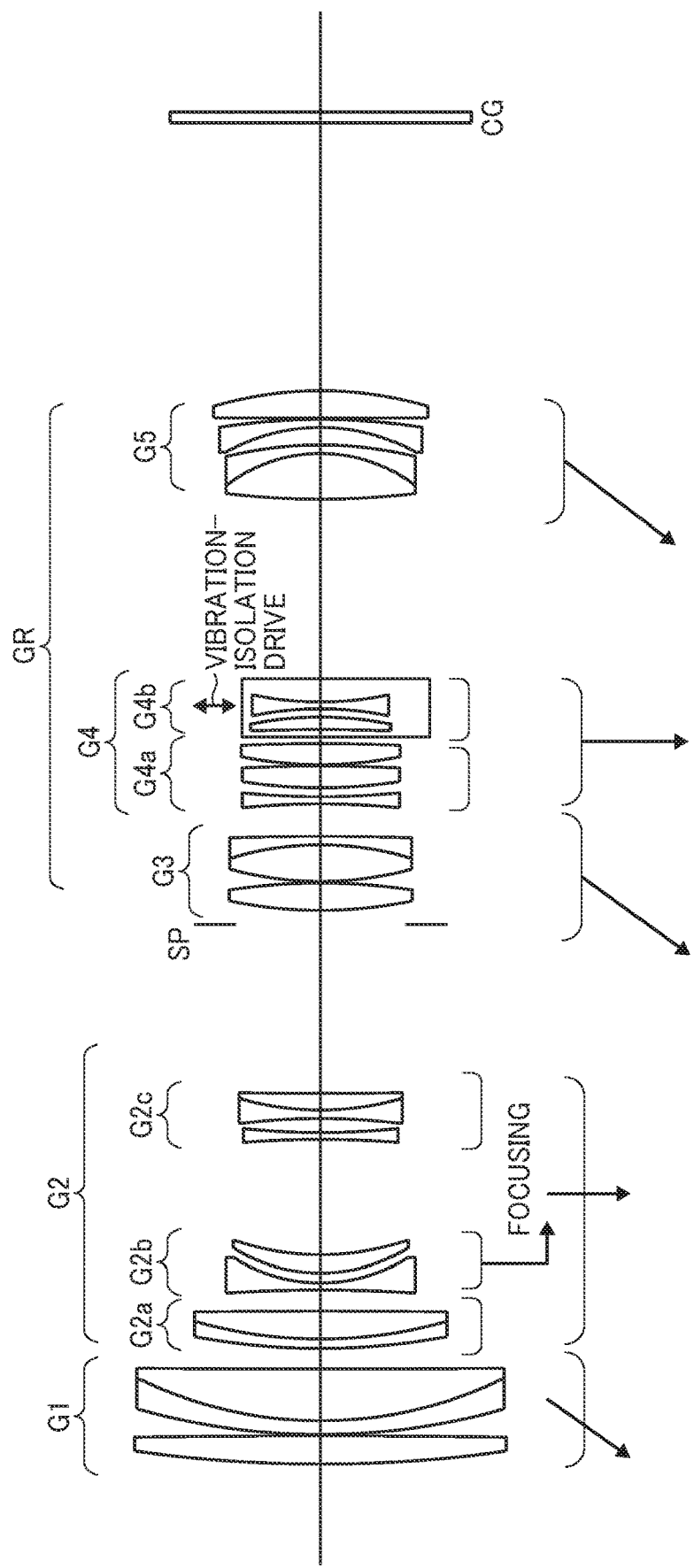
FIG. 3 is a schematic view of a trajectory during the zooming, a trajectory during the focusing, and a trajectory during the drive of vibration isolation of a zoom lens system according to Numerical Example 3.

In Numerical Examples 2 and 3 in FIGS. 2 and 3, the subsequent lens group GR includes, in order from the object side, a third lens group G3 having positive refractive power, a fourth lens group G4 having negative refractive power, and a fifth lens G5 having negative refractive power. That is, the zoom lens system has a zoom lens configuration including the five groups of positive, negative, positive, negative, and negative refractive power.

During a change in magnification from the short focal length end to the long focal length end, the distance between the first lens group G1 and the second lens group G2 increases, and the distance between the second lens group G2 and third lens group G3 decreases. In addition, the distance between the third lens group G3 and the fourth lens group G4 increases, and the distance between the fourth lens group G4 and the fifth lens group G5 decreases. In such a manner, the distance between the adjacent lens groups changes with a change in magnification from the short focal length end to the long focal length end.

During the change in magnification from the short focal length end to the long focal length end, the first lens group G1, the third lens group G3, the fifth lens group G5 are moved (extended) to the object side with respect to the image plane, and the second lens group G2 and the fourth lens group G4 are stationary with respect to the image plane. The third lens group G3 and the fifth lens group G5 are moved (extended) toward the object side along the same trajectory. Accordingly, a simple zooming mechanism is provided.

The fourth lens group G4 includes a fourth lens group-a G4a having positive refractive power and a fourth lens group-b G4b having negative refractive power, which are arranged in that order from the object side. The fourth lens group-b G4b is a vibration-isolating lens group that moves in a direction including a component of the direction orthogonal to the optical axis and shifts the imaging position so as to correct image blur.

Between the second lens group G2 and the third lens group G3 (immediately in front of the third lens group G3), a stop SP for adjusting the intensity of light is disposed.

Figure 4:
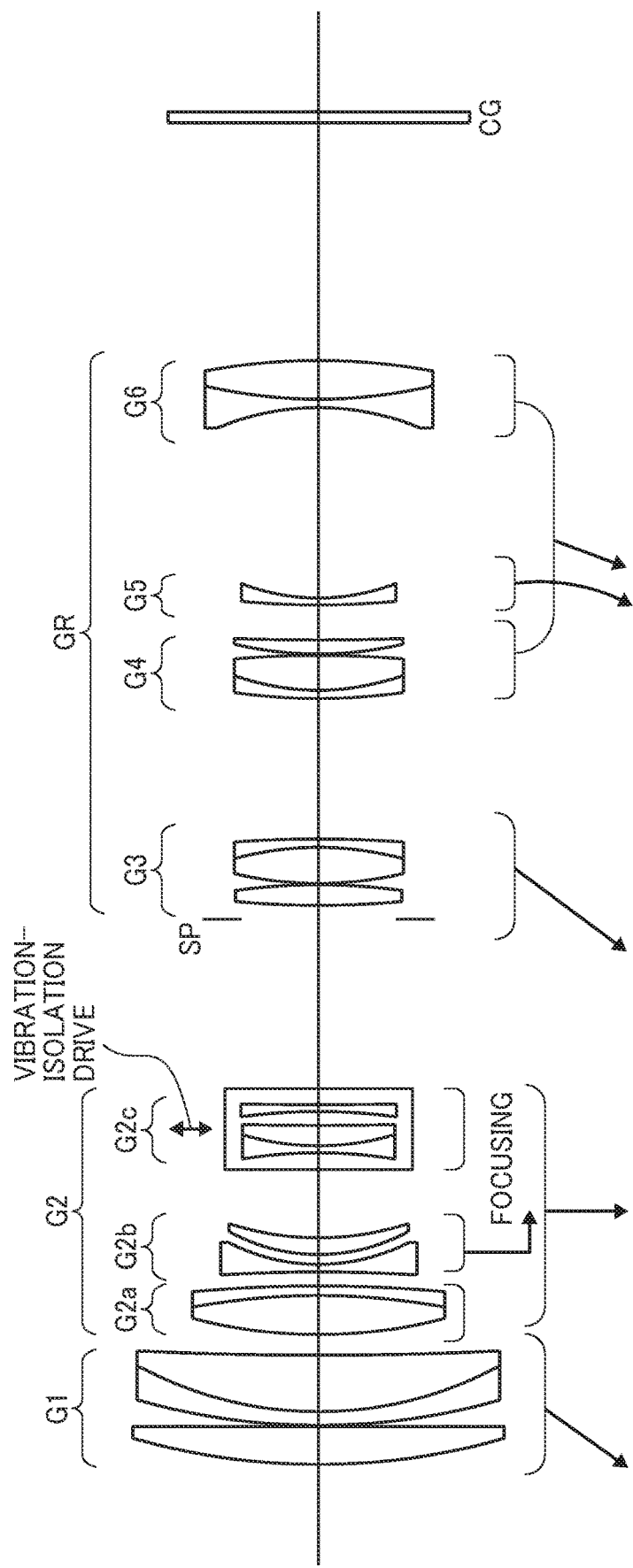
FIG. 4 is a schematic view of a trajectory during the zooming, a trajectory during the focusing, and a trajectory during the drive of vibration isolation of a zoom lens system according to Numerical Example 4.

In Numerical Example 4 in FIG. 4, the subsequent lens group GR includes, in order from the object side, a third lens group G3 having positive refractive power, a fourth lens group G4 having positive refractive power, a fifth lens G5 having negative refractive power, and a sixth lens group G6 having negative refractive power. That is, the zoom lens system has a zoom lens configuration including the six groups of positive, negative, positive, positive, negative, and negative refractive power.

During the change in magnification from the short focal length end to the long focal length end, the distance between the first lens group G1 and the second lens group G2 increases, and the distance between the second lens group G2 and third lens group G3 decreases. In addition, the distance between the third lens group G3 and the fourth lens group G4 changes (increases or decreases), and the distance between the fourth lens group G4 and the fifth lens group G5 changes (increases or decreases). Still further, the distance between the fifth lens group G5 and the sixth lens group G6 changes (increases or decreases). In such a manner, the distance between the adjacent lens groups changes with the magnification from the short focal length end to the long focal length end.

During the change in magnification from the short focal length end to the long focal length end, the first lens group G1, the third lens group G3, the fourth lens group G4, the fifth lens group G5, and the sixth lens group G6 are moved (extended) to the object side, and the second lens group G2 is stationary with respect to the image plane. The fourth lens group G4 and the sixth lens group G6 are moved (extended) toward the object side along the same trajectory. Accordingly, a simple zooming mechanism is provided.

The second lens group-c G2c is a vibration-isolating lens group that moves in a direction including a component of the direction orthogonal to the optical axis and shifts the imaging position so as to correct image blur.

Between the second lens group G2 and the third lens group G3 (immediately in front of the third lens group G3), a stop SP for adjusting the intensity of light is disposed.

Figure 5:
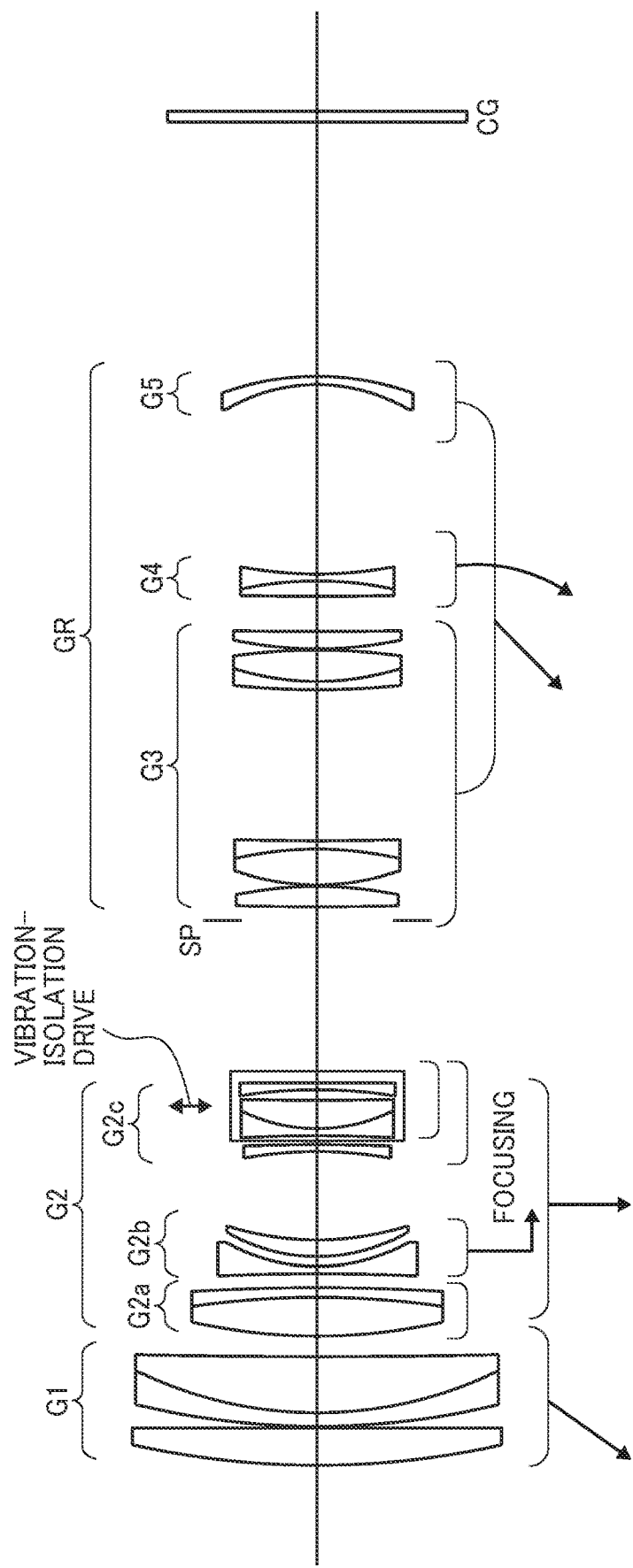
FIG. 5 is a schematic view of a trajectory during the zooming, a trajectory during the focusing, and a trajectory during the drive of vibration isolation of a zoom lens system according to Numerical Example 5.

In Numerical Example 5 in FIG. 5, the subsequent lens group GR includes, in order from the object side, a third lens group G3 having positive refractive power, a fourth lens group G4 having negative refractive power, and a fifth lens G5 having negative refractive power. That is, the zoom lens system has a zoom lens configuration including the five groups of positive, negative, positive, negative, and negative refractive power.

During a change in magnification from the short focal length end to the long focal length end, the distance between the first lens group G1 and the second lens group G2 increases, and the distance between the second lens group G2 and third lens group G3 decreases. In addition, the distance between the third lens group G3 and the fourth lens group G4 changes (increases or decreases), and the distance between the fourth lens group G4 and the fifth lens group G5 changes (increases or decreases). In such a manner, the distance between the adjacent lens groups changes with a change in magnification from the short focal length end to the long focal length end.

During the change in magnification from the short focal length end to the long focal length end, the first lens group G1, the third lens group G3, the fourth lens group G4, the fifth lens group G5, and the sixth lens group G6 are moved (extended) to the object side, and the second lens group G2 is stationary with respect to the image plane. The third lens group G3 and the fifth lens group G5 are moved (extended) toward the object side along the same trajectory. Accordingly, a simple zooming mechanism is provided.

A part of the second lens group-c G2c is a vibration-isolating lens group that moves in a direction including a component of the direction orthogonal to the optical axis and shifts the imaging position so as to correct image blur.

Between the second lens group G2 and the third lens group G3 (immediately in front of the third lens group G3), a stop SP for adjusting the intensity of light is disposed.

Figure 6:
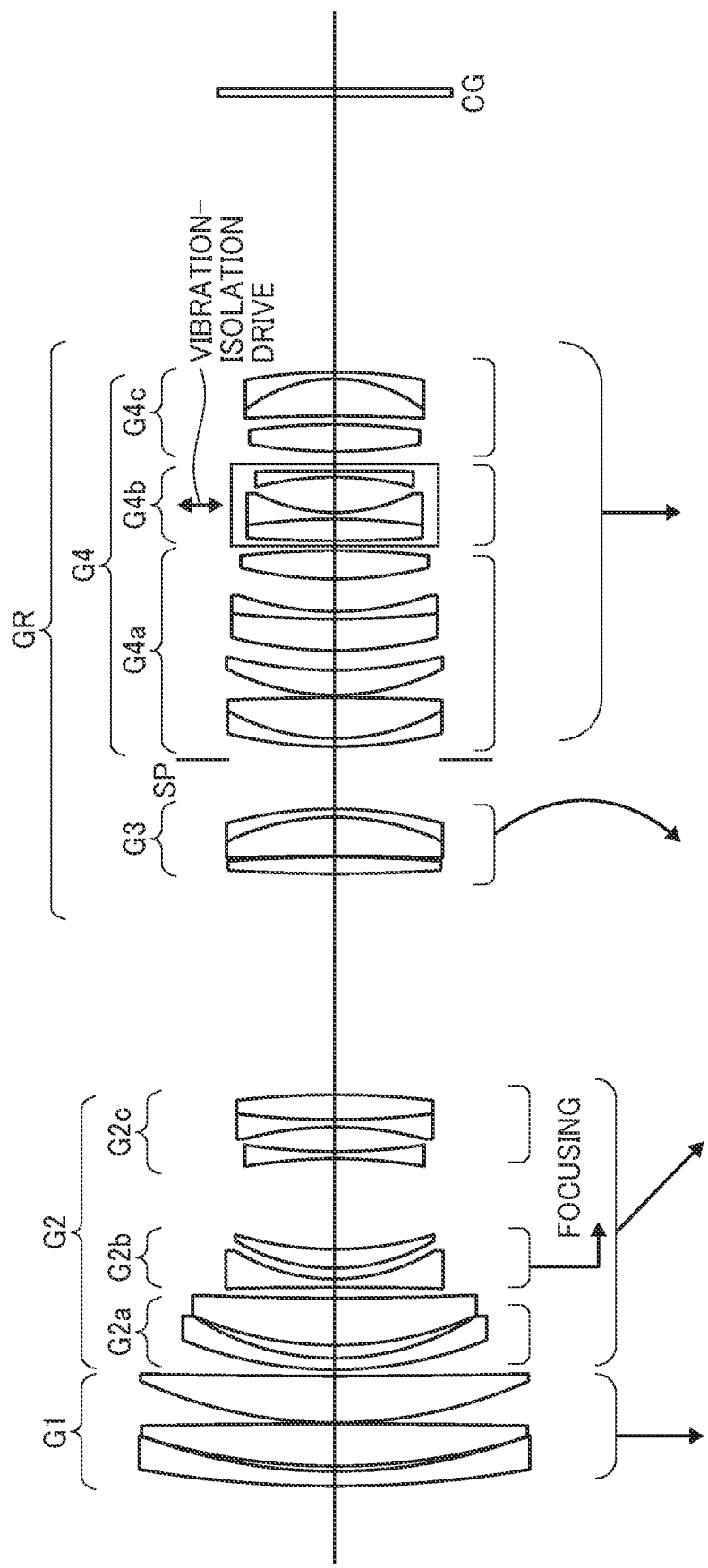
FIG. 6 is a schematic view of a trajectory during the zooming, a trajectory during the focusing, and a trajectory during the drive of vibration isolation of a zoom lens system according to Numerical Example 6.

In Numerical Example 6 in FIG. 6, the subsequent lens group GR includes, in order from the object side, a third lens group G3 having positive refractive power and a fourth lens group G4 having positive refractive power. That is, the zoom lens system has a zoom lens configuration that includes four groups of positive, negative, positive, and positive refractive power.

During a change in magnification from the short focal length end to the long focal length end, the distance between the first lens group G1 and the second lens group G2 increases, and the distance between the second lens group G2 and third lens group G3 decreases. In addition, the distance between the third lens group G3 and the fourth lens group G4 changes (increases or decreases). In such a manner, the distance between the adjacent lens groups changes with a change in magnification from the short focal length end to the long focal length end.

During the change in magnification from the short focal length end to the long focal length end, the first lens group G1 and the fourth lens group G4 are stationary with respect to the image plane, and the second lens group G2 is moved to the image side. In addition, the third lens group G3 moves to the image side once, and then returns to the object side (the third lens group G3 makes a U-turn).

The fourth lens group G4 includes a fourth lens group-a G4a having positive refractive power, a fourth lens group-b G4b having negative refractive power, and a fourth lens group-c G4c having positive refractive power, which are arranged in that order from the object side. The fourth lens group-b G4b is a vibration-isolating lens group that moves in a direction including a component of the direction orthogonal to the optical axis and shifts the imaging position so as to correct image blur.

Between the third lens group G3 and the fourth lens group G4 (immediately in front of the fourth lens group G4), a stop SP for adjusting the intensity of light is disposed.

Figure 7:
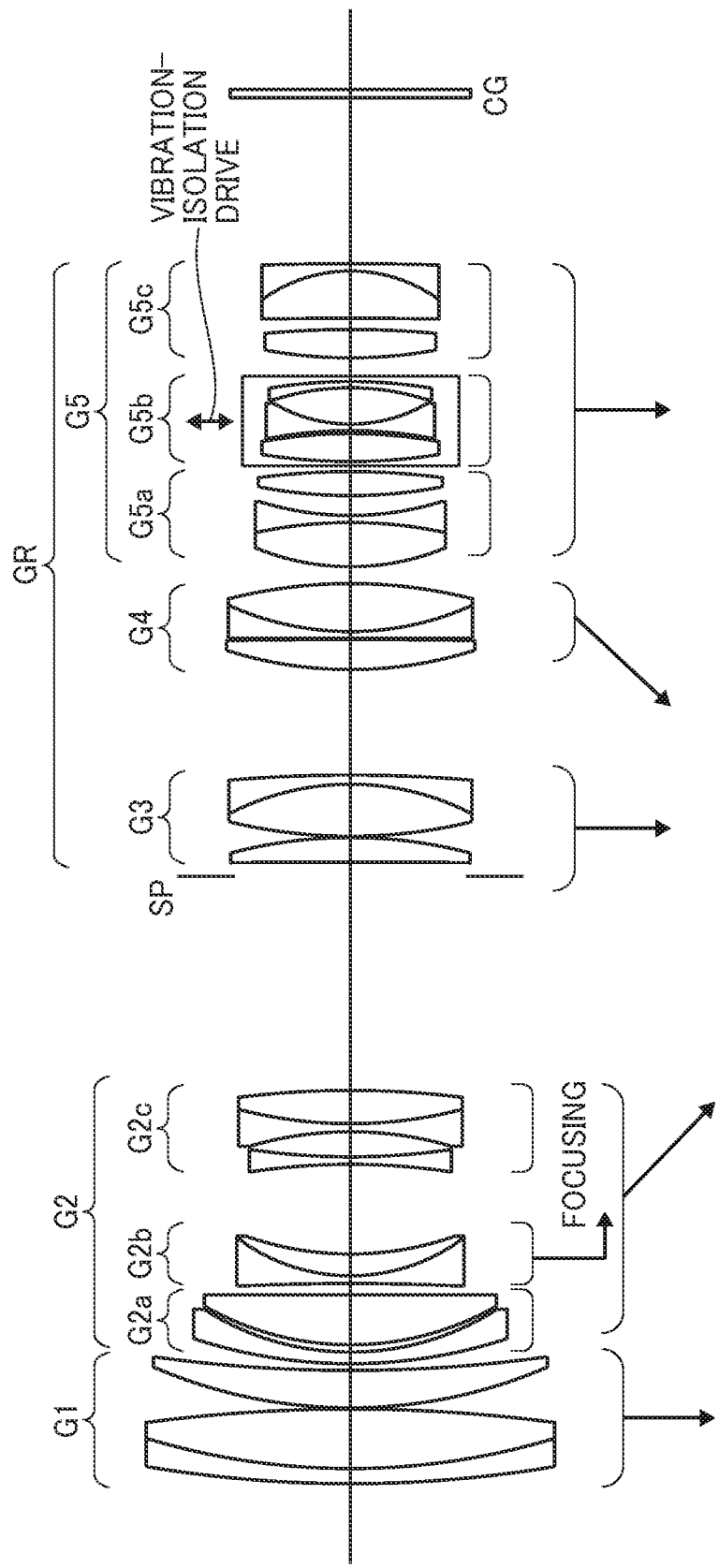
FIG. 7 is a schematic view of a trajectory during the zooming, a trajectory during the focusing, and a trajectory during the drive of vibration isolation of a zoom lens system according to Numerical Example 7.
Figure 8:
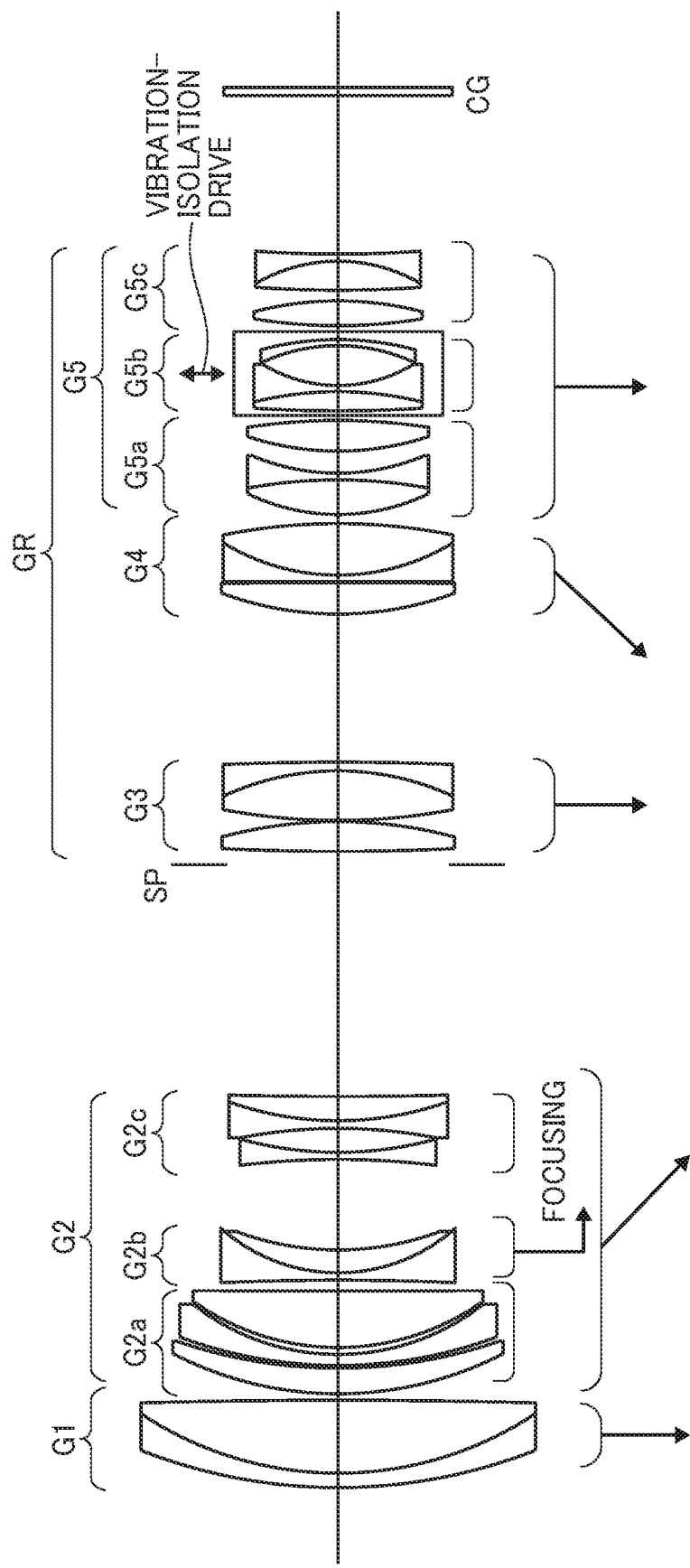
FIG. 8 is a schematic view of a trajectory during the zooming, a trajectory during the focusing, and a trajectory during the drive of vibration isolation of a zoom lens system according to Numerical Example 8.

In Numerical Examples 7 and 8 in FIGS. 7 and 8, the subsequent lens group GR includes, in order from the object side, a third lens group G3 having positive refractive power, a fourth lens group G4 having positive refractive power, and a fifth lens G5 having negative refractive power. That is, the zoom lens system has a zoom lens configuration including the five groups of positive, negative, positive, positive, and negative refractive power.

During a change in magnification from the short focal length end to the long focal length end, the distance between the first lens group G1 and the second lens group G2 increases, and the distance between the second lens group G2 and third lens group G3 decreases. In addition, the distance between the third lens group G3 and the fourth lens group G4 decreases, and the distance between the fourth lens group G4 and the fifth lens group G5 increases. In such a manner, the distance between the adjacent lens groups changes with a change in magnification from the short focal length end to the long focal length end.

During the change in magnification from the short focal length end to the long focal length end, the first lens group G1, the third lens group G3, and the fifth lens group G5 are stationary with respect to the image plane, and the second lens group G2 are moved to the image side. In addition, the fourth lens group G4 is moved (extended) to the object side.

The fifth lens group G5 includes a fifth lens group-a G5a having positive refractive power, a fifth lens group-b G5b having negative refractive power, and a fifth lens group-c G5c having positive refractive power, which are arranged in that order from the object side. The fifth lens group-b G5b is a vibration-isolating lens group that moves in a direction including a component of the direction orthogonal to the optical axis and shifts the imaging position so as to correct image blur.

Between the second lens group G2 and the third lens group G3 (immediately in front of the third lens group G3), a stop SP for adjusting the intensity of light is disposed.

Figure 97:
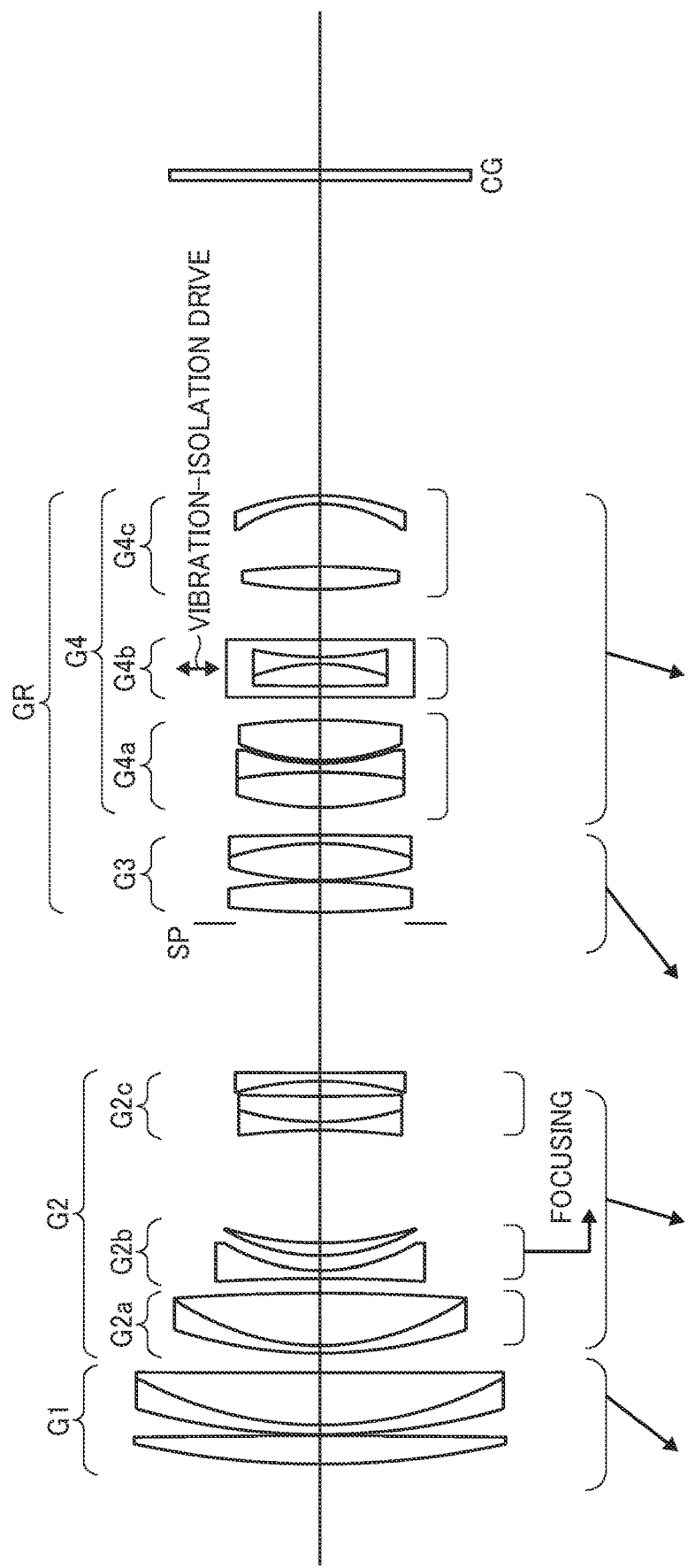
FIG. 97 is a schematic view of a trajectory during the zooming, a trajectory during the focusing, and a trajectory during the drive of vibration isolation of a zoom lens system according to Numerical Example 9.

In Numerical Example 9 in FIG. 97, the subsequent lens group GR includes, in order from the object side, a third lens group G3 having positive refractive power and a fourth lens group G4 having negative refractive power. That is, the zoom lens system has a zoom lens configuration that includes four groups of positive, negative, positive, and negative refractive power.

During a change in magnification from the short focal length end to the long focal length end, the distance between the first lens group G1 and the second lens group G2 increases, and the distance between the second lens group G2 and third lens group G3 decreases. In addition, the distance between the third lens group G3 and the fourth lens group G4 changes (increases in the example of FIG. 97, but may decrease). In such a manner, the distance between the adjacent lens groups changes with a change in magnification from the short focal length end to the long focal length end.

During the change in magnification from the short focal length end to the long focal length end, the first lens group G1, the second lens group G2, the third lens group G3, and the fourth lens group G4 are moved (extended) from the image plane to the object side.

The fourth lens group G4 includes a fourth lens group-a G4a having positive refractive power, a fourth lens group-b G4b having negative refractive power, and a fourth lens group-c G4c having positive refractive power, which are arranged in that order from the object side. The fourth lens group-b G4b is a vibration-isolating lens group that moves in a direction including a component of the direction orthogonal to the optical axis and shifts the imaging position so as to correct image blur.

Between the second lens group G2 and the third lens group G3 (immediately in front of the third lens group G3), a stop SP for adjusting the intensity of light is disposed.

Figure 98:
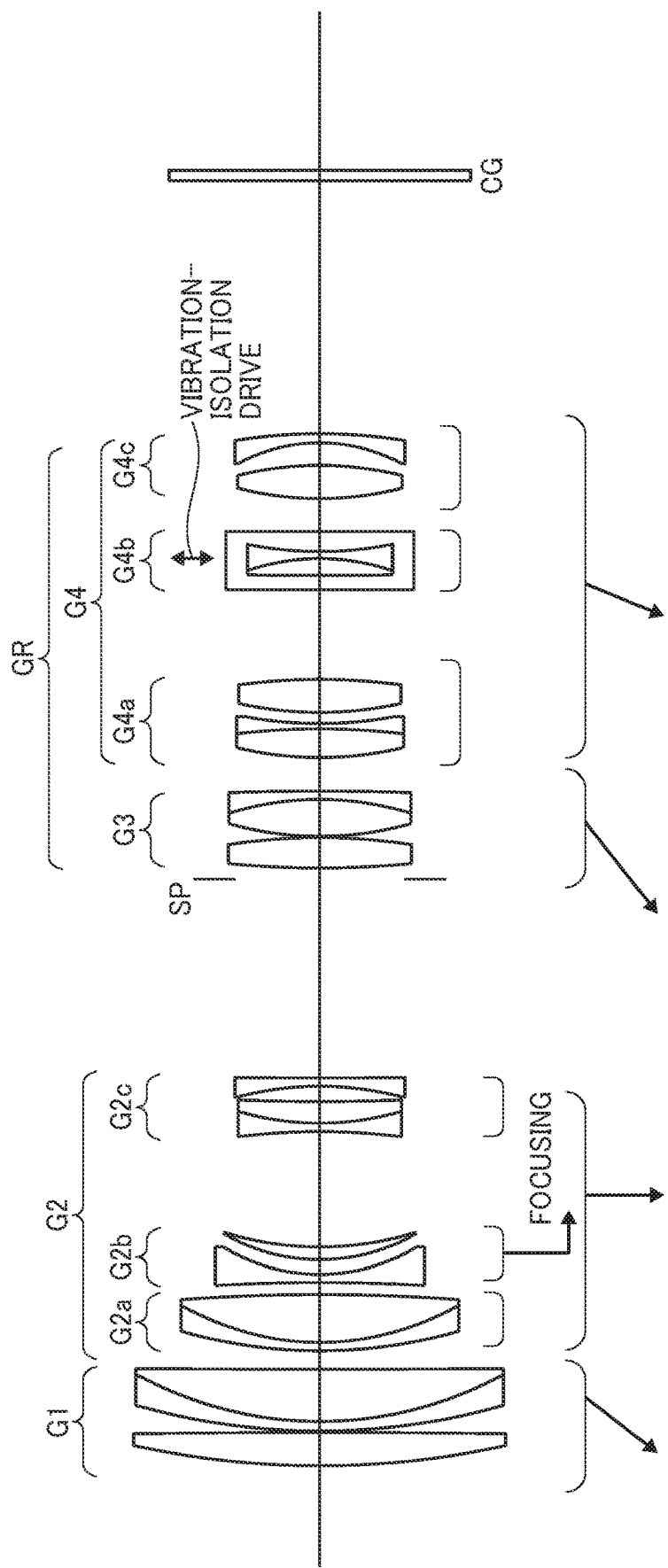
FIG. 98 is a schematic view of a trajectory during the zooming, a trajectory during the focusing, and a trajectory during the drive of vibration isolation of a zoom lens system according to Numerical Example 10.

In Numerical Example 10 in FIG. 98, the subsequent lens group GR includes, in order from the object side, a third lens group G3 having positive refractive power and a fourth lens group G4 having positive refractive power. That is, the zoom lens system has a zoom lens configuration that includes four groups of positive, negative, positive, and positive refractive power.

During a change in magnification from the short focal length end to the long focal length end, the distance between the first lens group G1 and the second lens group G2 increases, and the distance between the second lens group G2 and third lens group G3 decreases. In addition, the distance between the third lens group G3 and the fourth lens group G4 changes (increases in the example of FIG. 98, but may decrease). In such a manner, the distance between the adjacent lens groups changes with a change in magnification from the short focal length end to the long focal length end.

During the change in magnification from the short focal length end to the long focal length end, the first lens group G1, the third lens group G3, and the fourth lens group G4 are moved (extended) from the image plane side to the object side, and the second lens group G2 is stationary with respect to the image plane.

The fourth lens group G4 includes a fourth lens group-a G4a having positive refractive power, a fourth lens group-b G4b having negative refractive power, and a fourth lens group-c G4c having positive refractive power, which are arranged in that order from the object side. The fourth lens group-b G4b is a vibration-isolating lens group that moves in a direction including a component of the direction orthogonal to the optical axis and shifts the imaging position so as to correct image blur.

Between the second lens group G2 and the third lens group G3 (immediately in front of the third lens group G3), a stop SP for adjusting the intensity of light is disposed.

Figure 99:
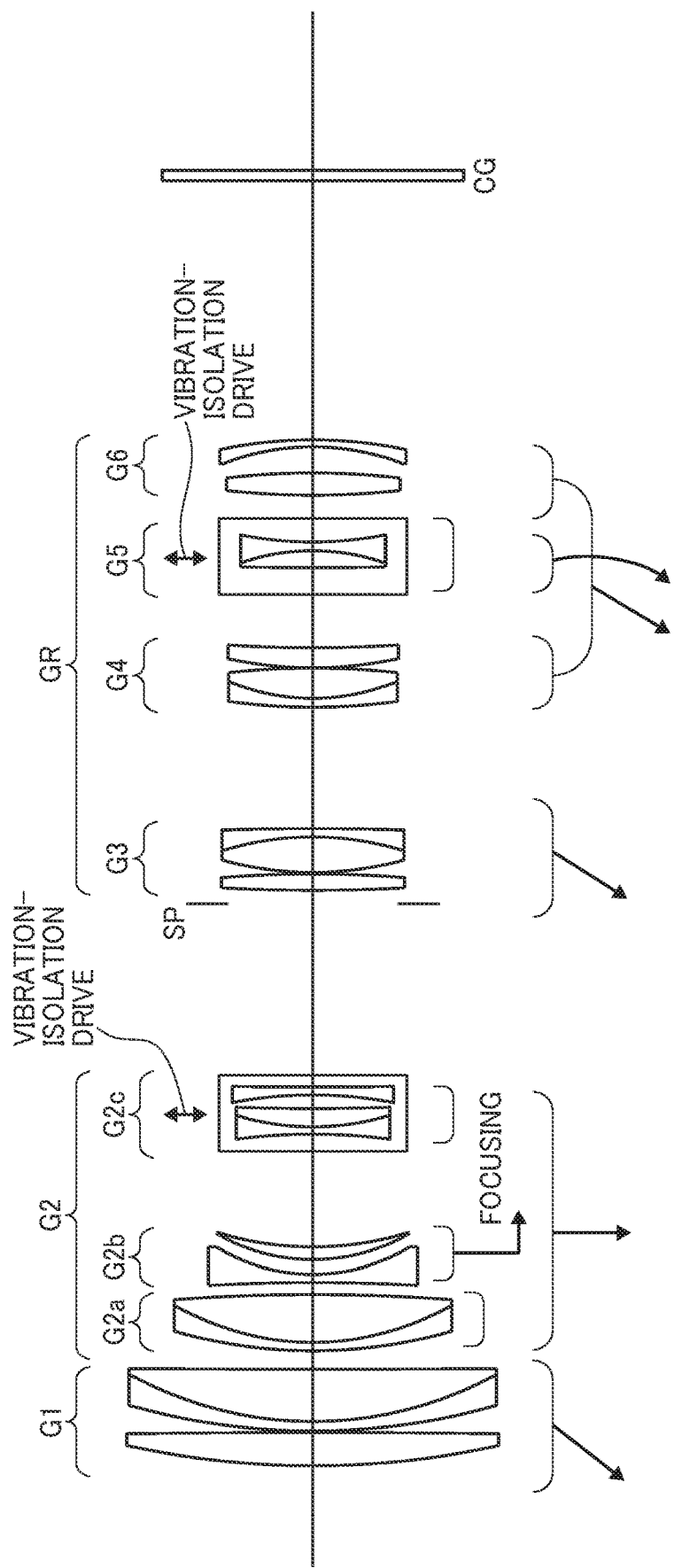
FIG. 99 is a schematic view of a trajectory during the zooming, a trajectory during the focusing, and a trajectory during the drive of vibration isolation of a zoom lens system according to Numerical Example 11.

In Numerical Example 11 in FIG. 99, the subsequent lens group GR includes, in order from the object side, a third lens group G3 having positive refractive power, a fourth lens group G4 having positive refractive power, a fifth lens G5 having negative refractive power, and a sixth lens group G6 having positive refractive power. That is, the zoom lens system has a zoom lens configuration including the six groups of positive, negative, positive, positive, negative, and positive refractive power.

During the change in magnification from the short focal length end to the long focal length end, the distance between the first lens group G1 and the second lens group G2. In addition, the distance between the third lens group G3 and the fourth lens group G4 changes, and the distance between the fourth lens group G4 and the fifth lens group G5 changes. Still further, the distance between the fifth lens group G5 and the sixth lens group G6 changes. In such a manner, the distance between the adjacent lens groups changes with the magnification from the short focal length end to the long focal length end.

During the change in magnification from the short focal length end to the long focal length end, the first lens group G1, the third lens group G3, the fourth lens group G4, the fifth lens group G5, and the sixth lens group G6 are moved (extended) from the image plane side to the object side, and the second lens group G2 is stationary with respect to the image plane. The fourth lens group G4 and the sixth lens group G6 are moved (extended) toward the object side along the same trajectory. Accordingly, a simple zooming mechanism is provided.

The second lens group-c G2c is a vibration-isolating lens group (a first vibration-isolating lens group) that moves in a direction including a component of the direction orthogonal to the optical axis and shifts the imaging position so as to correct image blur. The fifth lens group G5 is a vibration-isolating lens group (a second vibration-isolating lens group) that moves in a direction including a component of the direction orthogonal to the optical axis and shifts the imaging position so as to correct image blur. The second lens group-c G2c (the first vibration-isolating lens group) and the fifth lens group G5 (the second vibration-isolating lens group) each may independently serve as a vibration-isolating lens group, or may serve as the vibration-isolating lens group in cooperation with each other. With these two vibration-isolating lens groups driven in cooperation with each other, the fluctuations in aberration during the correction of image blur are reduced or eliminated while achieving a large vibration-isolation angle. When a plurality of vibration-isolating lens groups is disposed in the zoom lens system, it is desired that the above-described conditional expressions (20) (21) are satisfied.

It is to be noted that the zoom lens system according to the embodiments includes the four-group zoom configuration, the five-group zoom configuration, and the six-group illustrated in FIGS. 1 to 8 of Numerical Examples 1 to 8 and FIGS. 97 to 99 of Numerical Examples 9 to 11. Any lens of the zoom lens system may have an spherical surface or a diffractive surface. Examples of aspherical surfaces include glass mold aspherical surfaces and ground aspherical surfaces directly formed on the lens surface, composite aspherical surfaces (hybrid aspherical surfaces) in which a resin layer is applied on the lens surface, and plastic aspherical surfaces whose lens is made of resin material.

The zoom lens system according to the embodiments is a positive-lead zoom lens with, in particular, the focal lens on the telephoto side extended. The second lens group G2 consists of a second lens group-a G2a having positive refractive power, a second lens group-b G2b having negative refractive power, and a second lens group-c G2c having negative refractive power, which are arranged in that order from the object side. Further, during focusing from infinity to a short distance, the second lens group-b G2b moves to the image side while the distance between the second-a lens group G2a and the second lens group-b G2b and the distance between the second lens group-b G2b and the second lens group-c G2c change (the second lens group-b G2b constitutes a focusing lens group). More specifically, the distance between the second lens group-a G2a and the second lens group-b G2b increases, and the distance between the second lens group-b G2b and the second lens group-c G2c decreases.

In the zoom lens system according to the embodiments, the second lens group-a G2a disposed adjacent to the object side of the second lens group-b G2b serving as the focusing lens group has refractive power of the opposite sign of that of the second lens group-b G2b (the second lens group-b G2b has negative refractive power whereas the second lens group-a G2a has positive refractive power). Further, the second-a lens group G2a has a relatively weak refractive power. This configuration substantially prevents the zooming action due to the focusing operation, and also substantially prevents a decrease in the shooting magnification for the short-distance shooting.

By arranging the positive second lens group-a G2a on the object side of the negative second lens group-b G2b, the bundle of light rays incident on the second lens group-b G2b is converged. Accordingly, the lens diameter of the second lens group-b G2b can be reduced, and the weight of the focusing lens group can be reduced.

In general, the distance between the first lens group and the second lens group increases particularly at the telephoto end (the long focal length end) during the zooming so that the diameter of the bundle of the axial light rays incident on the second lens group is reduced, and the sensitivity of focusing might be lost.

By contrast, in the zoom lens system according to the present embodiments, the positive second lens group-a G2a is disposed immediately in front of the negative second lens group-b G2b, and the distance between the second lens group-a G2a and the second lens group-b G2b is maintained constant during the zooming. Further, the second lens group-a G2a is disposed close to the second lens group-b G2b at the telephoto end (the long focal length end). Accordingly, the sensitivity of the focusing lens group can be maintained. The configuration of the present embodiments substantially prevents an increase an autofocus (AF) time due to a undesired increase in the amount of movement of the second lens group-b G2b during the focusing.

Further, a lens group (for example, a first lens group G1) having positive refractive power, which is disposed on the object side relative to the second lens group G2, has relatively weak positive refractive power. Accordingly, the zooming action can be made relatively small even with the second lens group-a G2a apart from the second lens group-b G2b during the focusing, and a decrease in the shooting magnification at the short-distance shooting is substantially prevented. It is to be noted that although the second lens group-a G2a can be used as the focusing lens group, the second lens group-a G2a is not suitable for used in the high-speed AF because the lens diameter of the second lens group-a G2a is relatively large.

The second lens group-c G2c is disposed on the image side of the second lens group-b G2b. By disposing the second lens group-c G2c having refractive power of the same sign (negative refractive power) on the image side of the second lens group-b G2b serving as the focusing lens group, the sensitivity of focusing is obtained without exerting a strong refractive power to the second lens group-b G2b, and relatively fewer lenses are sufficient to be included in the second lens group-b G2b because the second lens group-b G2b does not need to have the strong refractive power. Further, by disposing the second lens group-c G2c, the fluctuations in aberration caused by the change in the shooting distance during the focusing can be reduced or eliminated, and the weight of the focusing lens group can be reduced.

In addition, the arrangement of the second lens group-c G2c exerts strong refractive power to the second lens group G2 as a whole, and also provides refractive power sufficient to change the magnification from the wide angle to the telephoto. The second lens group-c G2c serves to provide a sufficient amount of back focus (the length from the lens surface closest to the image plane within the lens system to the image plane) needed for the camera system, and also serve to correct spherical aberration and chromatic aberration.

It is to be noted that the second lens group-c G2c is not suitable as focusing lens group because using the second lens group-c G2c as the focusing lens group increases the distance between the second lens group-c G2c and the third lens group G3 having a relatively strong positive refractive power that is the opposite sign of that of the second lens group-c G2c during the focusing from infinity to the short distance. That is, the second lens group-c G2c acting as the focusing lens group might provide a strong zooming action and significantly reduce the shooting magnification at the short distance.

In the zoom lens system according to the present embodiments, the lens groups (for example, the first lens group G1 to the sixth lens group G6) are a single unit in which the relative positions of the adjacent lens groups in the direction of the optical axis change and the distance between adjacent lens groups along the front-to-back direction (the direction of the optical axis) changes during the zooming. Further, sub-lens groups (for example, the second lens group-a G2a to the second lens group-c G2c, the fourth lens group-a G4a to the fourth lens group-c G4c, and the fifth lens group-a G5a to the fifth lens group-c G5c) are a unit in which the relative positions of the adjacent lens groups along the direction of the optical axis does not change during the zooming.

In order to drive the second lens group G2b as the focusing lens group such that the distance between the second lens group-a G2a and the second lens group-c G2c adjacent thereto changes during the zooming, two types of configurations are conceivable: a configuration that employs a cam for the drive, and a configuration that employs a motor for the drive. For example, the configuration that includes a cam used to drive the second lens group-b G2b complicates the mechanism and increases the size of the entire lens system. Therefore, the configuration with the cam is not suitable for the drive of the focusing lens group. In the configuration with a motor, driving the second lens group G2b with the motor in synchronization with the zooming operation might cause difficulty synchronizing with the zooming successfully due to a delay in the electrical control and the speed limit of the motor, and thus might cause a shift in focus during the zooming operation. Therefore, the configuration with the motor is not suitable for the drive of the focusing lens group, either. In view of such situations, the distance between the second lens group-a G2a to the second lens group-c G2c is constant during the zooming in the present embodiments.

In the zoom lens system according to the present embodiments, the vibration-isolating lens group is a unit that moves in a direction perpendicular to the direction of the optical axis during the correction of image blur. Note that there is no limitation on whether the distance between adjacent lens groups changes along the direction of the optical axis during the zooming or focusing. In other words, the entire lens group or the entire sub-lens group may constitute the vibration-isolating lens group. Alternatively, a part of the lens group or the sub-lens group may constitute the vibration-isolating lens group.

Conditional expressions (1) and (1') each defines the relation of the distance between the second lens group-b G2b and the second lens group-c G2c, and the focal length of the second lens group G2 when the zoom lens system focused at infinity. In this case, the distance between the second lens group-b G2b and the second lens group-c G2c refers to the distance from the vertex of the second lens group-b G2b, the vertex closest to the image side to the vertex of the second lens group-c G2c, the vertex closest to the object side along the optical axis. By satisfying the conditional expression (1), the size of the second lens group G2, i.e., the zoom lens system as a whole is reduced, and various aberrations are successfully corrected. Such advantageous effects are enhanced by satisfying conditional expression (1').

When the value exceeds the upper limit of conditional expression (1) and (1'), the total thickness of the second lens group G2 increases, and thus the total lens length increases while the front lens diameter increases to obtain the off-axis light rays.

When the value falls below the lower limit of conditional expression (1), the distance between the principal points of the combined optical system of the second lens group-b G2b and the second lens group-c G2c decreases. Accordingly, the refractive power of at least one of the second lens group-b G2b and the second lens group-c G2c has to be increased so as to obtain a desired amount of movement of focusing. For this reason, the fluctuations in aberrations such as spherical aberration, coma, and astigmatism might increase during zooming or focusing, and correction becomes difficult.

Conditional expression (2) defines the relation of the distance between the second lens group-b G2b and the second lens group-c G2c, and the thickness of the second lens group G2 along the optical axis when the zoom lens system is focused at infinity. In this case, the distance between the second lens group-b G2b and the second lens group-c G2c refers to the distance from the vertex of the second lens group-b G2b, the vertex closest to the image side to the vertex of the second lens group-c G2c, the vertex closest to the object side along the optical axis. By satisfying conditional expression (2), the size of the second lens group G2 and thus the lens system as a whole can be reduced, and various aberration can be successfully corrected.

When the value exceeds the upper limit of conditional expression (2), the total thickness of the second lens group G2 increases, and thus the total lens length increases while the diameter of the front lens increases to obtain the off-axis light rays.

When the value falls below the lower limit of conditional expression (2), the distance between the principal points of the combined optical system of the second lens group-b G2b and the second lens group-c G2c decreases. Accordingly, the refractive power of at least one of the second lens group-b G2b and the second lens group-c G2c is increased so as to obtain a desired amount of movement of focusing. For this reason, the fluctuations in aberrations such as spherical aberration, coma, and astigmatism might increase during zooming or focusing, and correction becomes difficult.

When the combined optical system of the second lens group-b G2b and the second lens group-c G2c is defined as the second lens group-bc, conditional expressions (3) and (3') define the relation of the distance from the surface closest to the image side within the second lens group-bc to the position of the rear principal point of the second lens group-bc along the optical axis, and the focal length of the second lens group-bc when focused on infinity. By disposing the position of the rear principal point of the second lens group-bc relatively close to the object side, the space and the amount of movement of the second lens group-b G2b as the focusing lens group can be favorably obtained between the second lens group-b G2b and the second lens group-a G2a whose pupil diameter is smallest among the second lens group G2. Such advantageous effects are enhanced by satisfying conditional expression (3').

When the value exceeds the upper limit of conditional expression (3'), the total thickness of the second lens group G2 increases, and thus the total lens length increases while the diameter of the front lens increases to obtain the off-axis light rays.

When the value falls below the lower limit of conditional expression (3), the position of the rear principal point of the second lens group-bc shifts to the image side too much, and thus it becomes difficult to obtain the amount of movement of focusing. If the amount of focusing movement is forcedly obtained, the refractive power of the second lens group-b G2b has to be increased. Accordingly, the fluctuations in aberration during the focusing might increase.

When the combined optical system of the second lens group-b G2b and the second lens group-c G2c is defined as the second lens group-bc, conditional expressions (4) and (4') define the relation of the distance between the principal points, that is, the distance from the position of the front principal point to the position of the rear principal point along the optical axis, and the focal length of the second lens group-bc when focused on infinity. By satisfying conditional expression (4), the sensitivity of focusing is appropriately obtained without extremely increasing the refractive power of the second lens group-b G2b and the second lens group-c G2c. Such an advantageous effect is enhanced by satisfying conditional expression (4'). By satisfying the conditional expression (4'), the size of the second lens group G2, i.e., the zoom lens system as a whole is reduced.

When the value exceeds the upper limit of conditional expression (4'), the total thickness of the second lens group G2 increases, and thus the total lens length increases while the diameter of the front lens increases to obtain the off-axis light rays.

When the value falls below the lower limit of conditional expression (4), the distance between the principal points of the second lens group-bc excessively decreases. Accordingly, the refractive power of at least one of the second lens group-b G2b and the second lens group-c G2c has to be increased so as to obtain a desired amount of movement of focusing. For this reason, the fluctuations in aberrations such as spherical aberration, coma, and astigmatism might increase during zooming or focusing, and correction becomes difficult.

Conditional expression (5) and (5') defines the relation of the distance between the surface closest to the object side in the second lens group G2 and the position of the front principal point along the optical, and the thickness of the second lens group G2 along the optical axis. By satisfying conditional expression (5), the size and the weight of the lens system as a whole can be reduced, and the fluctuations in spherical aberration due to the shooting distance at the long focal length end can be reduced or eliminated. Such an advantageous effect is enhanced by satisfying conditional expression (5').

When the value exceeds the upper limits of conditional expressions (5) and (5'), the thickness of the second lens group G2 increases, and the lens outer diameters of the first lens group G1 and the second lens group G2a increase. This leads to an increase in the size of the zoom lens system as a whole.

When the value falls below the lower limit of conditional expression (5), the second lens group-b G2b shifts closer to the object side, and thus the lens system as a whole upsizes. This leads to an increase in the weight of the lens system as a whole. In particular, the fluctuations in spherical aberration due to the shooting distance might increase at the focal length end.

When the combined optical system of the second lens group-a G2a and the second lens group-b G2b is defined as the second lens group-ab, conditional expressions (6) and (6') define the relation of the distance from the surface closest to the object side in the second lens group-ab to the position of the front principal point along the optical axis, and the thickness of the second lens group G2 along the optical axis. By satisfying conditional expression (6), the size and the weight of the lens system as a whole can be reduced, and the fluctuations in spherical aberration due to the shooting distance at the long focal length end can be reduced or eliminated. Such an advantageous effect is enhanced by satisfying conditional expression (6').

When the value exceeds the upper limits of conditional expressions (6) and (6'), the thickness of the second lens group G2 increases, and the lens outer diameters of the first lens group G1 and the second lens group-a G2a increase. This leads to an increase in the size of the zoom lens system as a whole.

When the value falls below the lower limit of conditional expression (6), the second lens group-b G2b shifts closer to the object side, and thus the lens system as a whole upsizes. This leads to an increase in the weight of the lens system as a whole. In particular, the fluctuations in spherical aberration due to the shooting distance might increase at the focal length end.

The second lens group-c G2c may include at least two negative lenses and at least one positive lens. Accordingly, the axial chromatic aberration, the lateral chromatic aberration, the spherical aberration, and coma aberration that fluctuate during zooming and focusing can be successfully corrected while maintaining a certain degree of zoom ratio without an increase in the size of the lens. The positive lens and the negative lens in the second lens group-c G2c may be in full contact with each other, cemented to each other, or disposed with air gap therebetween.

Conditional expressions (7) and (7') define the relation between the focal length of the second lens group-a G2a and the focal length of the second lens group-b G2b. By satisfying the conditional expression (7), the size of the second lens group-b G2b, i.e., the zoom lens system as a whole is reduced. In addition, the AF speed can be increased by reducing the weight of the second lens group-b G2b as the focusing lens group. In addition, the fluctuations in aberration such as spherical aberration, coma, astigmatism, axial chromatic aberration, and lateral chromatic aberration during focusing can be successfully corrected. Further, positive distortion (pincushion distortion) at the telephoto end can be corrected well. Further, by appropriately setting the focusing sensitivity, the amount of movement during focusing can be reduced, and the AF speed can be increased. Such an advantageous effect is enhanced by satisfying conditional expression (7').

When the value exceeds the upper limit of the conditional expression (7), the refractive power of the second lens group-a G2a becomes too weak, and the diameter of a flux of light rays incident on the second lens group-b G2b increases. Accordingly, the lens outer diameter of the second lens group-b G2b might increase. In addition, the weight of the second lens group-b G2b as the focusing lens group increases, and the AF speed decreases.

When the value falls below the lower limit of conditional expression (7), the refractive power of the second lens group-a G2a excessively increases, and the fluctuations in aberrations, such as spherical aberration, coma aberration, astigmatism, axial chromatic aberration, and lateral chromatic aberration, during focusing increase. Further, positive distortion (pincushion distortion) at the telephoto end increases. Further, the refractive power of the second lens group-b G2b relatively decreases. Accordingly, it becomes difficult to increase the focusing sensitivity, and the amount of movement during focusing increases. Thus, the AF speed decreases.

Conditional expressions (8) and (8') define the relation between the focal length of the second lens group-b G2b and the focal length of the second lens group-c G2c. By satisfying conditional expression (8), the total length of the lens is reduced, and the amount of movement of focusing of the second lens group-b G2b is reduced as well. Accordingly, the AF speed increases, and the fluctuations in aberration during focusing is eliminated or reduced. Such an advantageous effect is enhanced by satisfying conditional expression (8').

When the value exceeds the upper limit of the conditional expressions (8) and (8'), the refractive power of the second-b lens group G2b becomes too weak, and the amount of movement of focusing of the second lens group-b G2b increases. Accordingly, the AF speed decreases. Moreover, the lens total length increases.

When the value falls below the lower limit of the conditional expressions (8), the refractive power of the second lens group-b G2b becomes too weak, and the fluctuations in aberrations during focusing increases.

When the combined optical system of the second lens group-b G2b and the second lens group-c G2c is defined as the second lens group-bc, conditional expressions (9) and (9') define the relation of the focal length of the second lens group-a G2a and the focal length of the second lens group-bc when the zoom lens system is focused on infinity. By satisfying conditional expression (9), the focusing sensitivity of the second lens group-b G2b is appropriately set so that the amount of focusing movement is reduced or eliminated, and the fluctuations in aberrations such as spherical aberration, coma aberration, and astigmatism during focusing can be reduced particularly at the long focal length end. Such an advantageous effect is enhanced by satisfying conditional expression (9').

When the value exceeds the upper limit of the conditional expression (9), the refractive power of the second-a lens group G2a becomes too weak, and the focusing sensitivity of the second lens group-b G2b decreases. Thus, the amount of focusing movement increases.

When the value falls below the lower limit of the conditional expressions (9), the refractive power of the second lens group-a G2a becomes too strong, and the fluctuations in aberrations such as spherical aberration, coma aberration, and astigmatism during focusing increases particularly at the long focal length end side.

Conditional expressions (10) and (10') define the relation of the paraxial radius of curvature of the surface closest to the object side in the second lens group-a G2a and the paraxial radius of curvature of the surface closest to the image side in the second lens group-a G2a. When focusing is performed by the second lens group-b G2b, the position (the height from the optical axis) of the principal ray passing through the second lens group-a G2a significantly changes with the shooting distance.

In view of this, the second lens group-a G2a preferably has a shape in which the object-side surface is convex and the image-side surface is substantially plane, so as to reduce the fluctuations in aberration that occurs depending on the position of the principal ray. When the paraxial radius of curvature of the surface closest to the image side in the second lens group-a G2a is positive (convex toward the object side), the image plane is over corrected with a change from infinity to the short distance.

When the paraxial radius of curvature of the surface closest to the image side in the second lens group-a G2a is negative (convex toward the image side), the image plane is under corrected. By satisfying conditional expression (10), the fluctuations in spherical aberration during the focusing is substantially prevented.

Such an advantageous effect is enhanced by satisfying conditional expression (10').

When the value exceeds the upper limit of conditional expression (10), the curvature of the surface closest to the image side of the second lens group-a G2a becomes too convex and strong on the image side, and the fluctuations in spherical aberration during focusing becomes remarkable.

When the value falls below the lower limit of conditional expression (10) and (10'), the curvature of the surface closest to the image side of the second lens group-a G2a becomes too strong on the image side, and the fluctuations in aberration due to the change in the image plane during focusing becomes remarkable.

Conditional expressions (11), (11'), and (11") define the relation of the paraxial radius of curvature of the surface closest to the object side in the second lens group-a G2a and the focal length of the second lens group-a G2a. When focusing is performed by the second lens group-b G2b, the position (the height from the optical axis) of the principal ray passing through the second lens group-a G2a significantly changes with the shooting distance. In view of this, the second lens group-a G2a preferably has a shape in which the object-side surface is convex and the image-side surface is substantially plane, so as to reduce the fluctuations in aberration that occurs depending on the position of the principal ray. When the paraxial radius of curvature of the surface closest to the image side in the second lens group-a G2a is positive (convex toward the object side), the image plane is over corrected with a change from infinity to the short distance. When the paraxial radius of curvature of the surface closest to the image side in the second lens group-a G2a is negative (convex toward the image side), the image plane is under corrected. By satisfying conditional expression (11), the fluctuations in spherical aberration during the focusing is substantially prevented. Such an advantageous effect is enhanced by satisfying conditional expressions (11') and (11").

When the value exceeds the upper limit of conditional expression (11'), the curvature of the surface closest to the image side of the second lens group-a G2a becomes too convex and strong on the image side, and the fluctuations in spherical aberration during focusing becomes remarkable.

When the value falls below the lower limit of conditional expression (11), the curvature of the surface closest to the image side of the second lens group-a G2a becomes too strong on the image side, and the fluctuations in aberration with the change in the image plane during the focusing becomes remarkable.

The second lens group-a G2a may include at least one positive lenses and at least one negative lens. Accordingly, aberration such as the axial chromatic aberration, the lateral chromatic aberration, and the spherical aberration that occur during focusing can be successfully corrected. The positive lens and the negative lens in the second lens group-a G2a may be in full contact with each other or cemented to each other. Alternatively, the positive and negative lenses may be disposed with air gap therebetween.

The conditional expressions (12), (12'), and (12") define the greatest Abbe number of a positive lens among those of the positive lenses within the second lens group-a G2a. By satisfying conditional expression (12), the fluctuations in axial chromatic aberration and lateral chromatic aberration, particularly during the focusing, is substantially prevented. Such an advantageous effect is enhanced by satisfying conditional expressions (12') and (12").

When the value falls below the lower limit of conditional expression (12), the fluctuations in aberrations such as axial chromatic aberration and lateral chromatic aberration, particularly during focusing, increase.

Conditional expressions (13) and (13') define the relation between the focal length of a negative lens having the greatest refractive power among the negative lenses of the second lens group-a G2a and the focal length of the second lens group-a G2a. By satisfying conditional expression (13), the fluctuations in spherical aberration, coma aberration, axial chromatic aberration and lateral chromatic aberration, particularly during the focusing, is substantially prevented. Such an advantageous effect is enhanced by satisfying conditional expressions (13') and (13").

When the value falls below the lower limit of conditional expression (13'), the refractive power of the negative lens of the second lens group-a G2a become weak, and spherical aberration, coma aberration, astigmatism, and axial chromatic aberration, particularly at the telephoto side increase.

When the value falls below the lower limit of conditional expression (13), the refractive power of the negative lens of the second lens group-a G2a excessively increases, and the fluctuations in aberrations such as spherical aberration, coma aberration, astigmatism axial chromatic aberration, and lateral chromatic aberration, particularly during the focusing, increase.

Conditional expressions (14) and (14') define the relation of the paraxial radius of curvature of the surface closest to the object side in the second lens group-b G2b and the paraxial radius of curvature of the surface closest to the image side in the second lens group-b G2b.

When focusing is performed by the second lens group-b G2b, the position of the principal ray passing through the second lens group-b G2b and the pupil diameter significantly change with the shooting distance. In view of this, the second lens group-b G2b is preferably configured to have a weak curvature on the object side and have a strong curvature on the image side, so as to reduce the fluctuations in aberration that occurs depending on the position of the principal ray.

By satisfying conditional expression (14), the fluctuations in curvature of field, spherical aberration, and coma aberration during the focusing is substantially prevented. Such an advantageous effect is enhanced by satisfying conditional expression (14').

When the value exceeds the upper limit of conditional expression (14), the curvature of the surface closest to the object side of the second lens group-b G2b becomes too strong with a concave shape on the object side, and the fluctuations in curvature of field increase at the wide-angle side while the fluctuations in spherical aberration and coma aberration increase at the telephoto side during the focusing.

When the value falls below the lower limit of the conditional expressions (14), the curvature of the surface closest to the image side of the second lens group-b G2b becomes too convex and strong on the image side, and the curvature of field is over corrected in the entire range of the zoom lens system. Alternatively, the focusing sensitivity becomes weak, and the amount of movement of focusing increases.

The second lens group-b G2b includes a negative lens disposed closest to the object side. Conditional expressions (15) and (15') define the Abbe number of the negative lens closest to the object side within the second lens group-b G2b. By satisfying conditional expression (15), lateral chromatic aberration can be favorably corrected particularly at the long focal length end. Such an advantageous effect is enhanced by satisfying conditional expression (15').

When the value falls below the lower limit of conditional expression (15), the lateral chromatic aberration is undercorrected, particularly at the long focal length end.

The second lens group-b G2b consists of one negative lens and one positive lens arranged in that order from the object side. Accordingly, the weight of the second lens group-b G2b as the focusing lens group is reduced, and aberrations such as the axial chromatic aberration, the lateral chromatic aberration, and the spherical aberration that occur during focusing are successfully corrected. The positive lens and the negative lens in the second lens group-b G2b may be in full contact with each other or cemented to each other. Alternatively, the positive and negative lenses may be disposed with air gap therebetween.

Conditional expressions (16), (16'), and (16") define the relation between the focal length of the negative lens of the second lens group-b G2b and the focal length of the positive lens of the second lens group-b G2b. By satisfying conditional expression (16), the total length of the lens is reduced, and the AF speed increases. Further, the fluctuations in spherical aberration and curvature of field during the focusing or the zooming are eliminated or reduced. Such an advantageous effect is enhanced by satisfying conditional expressions (16') and (16").

When the value exceeds the upper limit of the conditional expressions (16) and (16'), the refractive power of the negative lens of the second lens group-b G2b becomes too weak, and the amount of movement of focusing of the second lens group-b G2b increases. Accordingly, the AF speed decreases. As a result, the amount of focusing movement increases, and the AF speed decreases. Moreover, the lens total length increases.

When the value falls below the lower limit of the conditional expressions (16), the refractive power of the second lens group-b G2b becomes too strong, and the fluctuations in spherical aberration and curvature of field during zooming or focusing increase.

Conditional expressions (17) and (17') define the relation between the Abbe number of the negative lens of the second lens group-b G2b and the Abbe number of the positive lens of the second lens group-b G2b. By satisfying conditional expression (17), the axial chromatic aberration during the focusing is successfully corrected. Such an advantageous effect is enhanced by satisfying conditional expression (17').

When the value falls below the lower limit of conditional expression (17), the axial chromatic aberration during focusing is under-corrected.

Conditional expressions (18), (18'), and (18") define the ratio of the focal length of the zoom lens system as a whole when the zoom lens system is focused on infinity at the short focal length end with respect to the combined focal length of the first lens group G1 and the second lens group-b G2b when focused on infinity at the short focal length end.

Considering the fluctuations in spherical aberration during the focusing, the axial light rays passing between the second lens group-b G2b and the second lens group-c 2Gc are preferably parallel (afocal) to the optical axis.

By satisfying conditional expression (18), aberration in the subsequent lens group GR is successfully corrected, and the fluctuations in spherical aberration during the focusing is reduced.

When the value exceeds the upper limit of conditional expressions (18), (18'), and (18"), the parallelism of the light rays between the second lens group-b G2b and the second lens group-c G2c becomes difficult to maintain, and the second lens group-b G2b produces strongly diverging light rays in a direction to the image side at the wide-angle end. As a result, it becomes difficult to correct the aberration in the subsequent lens group GR, and the fluctuations in the spherical aberration particularly during the focusing increase.

Conditional expressions (19), (19'), and (19") define the relation (the sensitivity of focusing) between the lateral magnification of the second lens group-b G2b when the zoom lens system is focused on infinity at the long focal length end and the combined lateral magnification of all the lens groups on the image side relative to the second lens group-b G2b when the zoom lens system is focused on infinity at the long focal length end. By satisfying conditional expression (19), the sensitivity of focusing is appropriately set, and a longer minimum shooting distance and a higher maximum shooting magnification are obtained. In addition, the amount of movement of focusing is reduced, and the AF speed is increased. Moreover, the total lens length can be reduced. Such an advantageous effect is enhanced by satisfying conditional expressions (19') and (19").

When the value falls below the lower limit of the conditional expressions (19), the sensitivity of focusing becomes too weak, and the minimum shooting distance increases. Thus, the maximum shooting magnification decreases. In addition, the amount of movement of focusing increases, and the AF speed is reduced. Moreover, the lens total length increases.

The zoom lens system according to the present embodiments includes a vibration-isolating lens group that moves in a direction including a component of the direction perpendicular to the optical axis to shift the imaging position, on the image side relative to the second lens group-b G2b. This vibration-isolating lens group corrects image blur that occurs in captured images due to, for example, camera shake. When a camera shake at the same angle occurs, the degree of image blur increases as the focal length increases, so it is more desirable to correct image blur in a lens with a long focal length on the long focal length side.

However, when the weight of the vibration-isolating lens group increases, the size of a vibration-isolating lens drive unit for driving the vibration-isolating lens group increases. For this reason, it is desired that the vibration-isolating lens group is compact and lightweight. In order to capture the brightness (Fno) of the axial light and off-axis light, the lenses on the object side relative to the second lens group-b G2b tends to have a larger outer diameter and heavier weight. In view of this, the vibration-isolating lens group is disposed on the image side relative to the second lens group-b G2b so as to reduce the weight of the vibration-isolating lens group.

The above-described vibration-isolating lens group includes at least one negative lens and at least one positive lens. With this configuration, aberrations due to the eccentricity, such as the eccentric coma aberration, the inclination of the image plane, and the lateral chromatic aberration, during the driving of the vibration isolation can be successfully corrected.

Conditional expression (20) defines the relation (the sensitivity of vibration isolation) between the lateral magnification of the vibration-isolating lens group when the zoom lens system is focused on infinity at the long focal length end and the combined lateral magnification of all the lens groups on the image side relative to the vibration-isolating lens group when the zoom lens system is focused on infinity at the long focal length end. By satisfying conditional expression (20), the lens system as a whole including the vibration-isolating lens group becomes easy to produce (assemble), and desired vibration isolation capability is provided. Further, the lens outer diameter (the outer diameter of the lens frame) can be reduced.

When the value exceeds the upper limit of conditional expression (20), the sensitivity of vibration isolation becomes too strong, and the vibration-isolation becomes difficult to control. In addition, the eccentric coma aberration and the inclination of the image plane during the driving of the vibration isolation increases, and the optical performance becomes difficult to maintain.

When the value falls below the lower limit of conditional expression (20), the sensitivity of vibration isolation becomes too weak, and desired vibration-isolating capability cannot be obtained. Further, since the number of movable frames in the direction perpendicular to the optical axis of the vibration-isolating lens group increases, the lens outer diameter (the outer diameter of the lens frame) increases.

Conditional expressions (21), (21'), and (21") define the relation between the focal length of the second lens group-b G2b and the focal length of the vibration-isolating lens group. By satisfying conditional expression (21), the eccentric aberration during the driving of the vibration isolation is successfully corrected, and the fluctuations in aberrations during the focusing is reduced. Such an advantageous effect is enhanced by satisfying conditional expressions (21') and (21").

When the value exceeds the upper limit of conditional expression (21), the refractive power of the vibration-isolating lens group becomes strong, and accordingly, the eccentric aberration generated during the driving of the vibration isolation deteriorates.

When the value falls below the lower limit of the conditional expressions (21), the refractive power of the second lens group-b G2b becomes too weak, and the fluctuations in aberrations during focusing increases.

The lens group including the vibration-isolating lens group may not move along the direction of the optical axis with a change in the magnification (during the zooming) from the short focal length end to the long focal length end. In other words, the lens group including the vibration-isolating lens group may be stationary with respect to the image plane. The vibration-isolating lens drive unit is typically provided with a magnet, a coil, a base, and the like in a radial direction (a direction perpendicular to the optical axis), so the vibration-isolating lens drive unit itself upsizes. When the vibration-isolating lens group serves as a group that is movable during the zooming, a component such as a zoom cam barrel has to be provided on the outer periphery of the unit, and the outer diameter increases. By configuring the vibration-isolating lens group as a stationary group, the lens outer diameter can be reduced without a movable frame used during the zooming outside the vibration-isolating lens unit.

The second lens group G2 does not have to move in the direction of the optical axis (may be stationary with respect to the image plane) with a change in magnification from the short focal length end to the long focal length end. The movement of the second lens group G2 during the change in magnification might cause the eccentricity errors during the zooming, and further cause aberration such as eccentric coma aberration. By configuring the second lens group G2 as a stationary group that does not move during the change in magnification, the eccentricity errors can be easily reduced or eliminated.

The first lens group G1 does not have to move in the direction of the optical axis (may be stationary with respect to the image plane) with a change in magnification from the short focal length end to the long focal length end. The movement of the first lens group G1 during the change in magnification might cause the eccentricity errors during the zooming, and further cause aberration such as eccentric coma aberration. By configuring the first lens group G1 as a stationary group that does not move during the change in magnification, the eccentricity errors can be easily reduced or eliminated.

Conditional expression (20) defines the relation between the focal length of the lens system as a whole when the zoom lens system is focused on infinity at the long focal length end, the focal length of the lens system as a whole when the zoom lens system is focused on infinity at the short focal length end, the lateral magnification of the second lens group G2 when the zoom lens system is focused on infinity at the long focal length end, and the lateral magnification of the second lens group G2 when the zoom lens system is focused on infinity at the short focal length end. Conditional expression (22) defines a ratio of the load of changing magnification on the second lens group G2 with respect to the zoom ratio. By satisfying conditional expression (22), the fluctuations in spherical aberration, coma aberration, and astigmatism during the focusing are successfully corrected.

When the value exceeds the upper limit of conditional expression (22), the load of changing magnification on the second lens group G2 increases, and accordingly, the refractive power of the other lens groups has to be increased to obtain a desired magnification ratio. However, such an increase in refractive power makes it difficult to correct the spherical aberration, the coma aberration, and the astigmatism generated during the zooming.

When the value falls below the lower limit of conditional expression (22), the load of changing magnification on the second lens group G2 increases, and the fluctuations in spherical aberration, coma aberration, and astigmatism becomes difficult to correct.

Conditional expression (23) defines the relation between the focal length of the second lens group G2 with respect to the focal length of the zoom lens system as a whole when the zoom lens system is focused on infinity at the short focal length end. By satisfying conditional expression (23), the size of the lens system as a whole is reduced, and the fluctuations in spherical aberration, coma aberration, and astigmatism during the zooming are successfully corrected while maintaining an appropriate magnification ratio.

When the value exceeds the upper limit of conditional expressions (23), the refractive power of the second group G2 becomes too weak, and the magnification ratio decreases and/or the lens system as a whole upsizes.

When the value falls below the lower limit of conditional expression (23), the refractive power of the second lens group G2 becomes too strong, and spherical aberration, coma aberration, and astigmatism during zooming becomes difficult to correct.

Conditional expression (24) defines the relationship between the focal length of the first lens group G1 and the focal length of the zoom lens system as a whole when the zoom lens system is focused on infinity at the long focal length end. By satisfying conditional expression (24), the size of the lens system as a whole is reduced, and the spherical aberration, coma aberration, astigmatism, axial chromatic aberration, and lateral chromatic aberration are successfully corrected particularly at the telephoto side while maintaining an appropriate magnification ratio.

When the value exceeds the upper limit of conditional expressions (24), the refractive power of the first lens group G1 becomes too weak, and the magnification ratio decreases and/or the lens system as a whole upsizes.

When the value falls below the lower limit of conditional expression (24), the refractive power of the second lens group G2 becomes too strong, and spherical aberration, coma aberration, astigmatism, axial chromatic aberration, and lateral chromatic aberration during zooming becomes difficult to correct, particularly at the telephoto side.

Conditional expression (25) defines the ratio between the focal length of the first lens group G1, the focal length of the zoom lens system as a whole when the zoom lens system is focused on infinity at the short focal length end, and the focal length of the zoom lens system as a whole when the zoom lens system is focused on infinity at the long focal length end. By satisfying conditional expression (25), the size of the lens system as a whole is reduced, and the spherical aberration, coma aberration, astigmatism, axial chromatic aberration, and lateral chromatic aberration are successfully corrected particularly at the telephoto side while maintaining an appropriate magnification ratio.

When the value exceeds the upper limit of conditional expressions (25), the refractive power of the first lens group G1 becomes too weak, and the magnification ratio decreases and/or the lens system as a whole upsizes.

When the value falls below the lower limit of conditional expression (25), the refractive power of the second lens group G2 becomes too strong, and spherical aberration, coma aberration, astigmatism, axial chromatic aberration, and lateral chromatic aberration during zooming becomes difficult to correct, particularly at the telephoto side.

Conditional Expression (26) defines the ratio between the distance (the distance from the refractive surface closest to the image side in the first lens group G1 to the refractive surface closest to the object side in the second lens group G2 along the optical axis) between the first lens group G1 and the second lens group G2 when the zoom lens system is focused on infinity at the long focal length end and the distance (the distance between the refractive surface closest to the image side in the first lens group G1 to the refractive surface closest to the object side in the second lens group G2 along the optical axis) between the first lens group G1 and the second lens group G2 when the zoom lens system is focused on infinity at the short focal length end. Conditional Expression (26) defines the ratio of the focal length of the second lens group G2 with respect to the amount of change in the distance between the first lens group G1 and the second lens group G2 during the zooming. By satisfying conditional expression (26), the size of the lens system as a whole can be reduced, and the fluctuations in various aberrations during the zooming are reduced or eliminated.

When the value exceeds the upper limit of conditional expressions (26), the distance between the first lens group G1 and the second lens group G2 at the telephoto side (the long focal length end side) increases. This leads to an increase in the size of the zoom lens system as a whole.

When the value falls below the lower limit of conditional expression (26), the refractive power of at least one of the first lens group G1 and the second lens group G2 has to be increased. However, such an increase adversely increases the fluctuations in various aberrations during the zooming.

Conditional Expression (27) defines the ratio between the distance (the distance from the refractive surface closest to the image side in the second lens group G2 to the refractive surface closest to the object side in the subsequent lens group GR along the optical axis) between the second lens group G2 and the subsequent lens group GR when the zoom lens system is focused on infinity at the short focal length end and the distance (the distance between the refractive surface closest to the image side in the second lens group G2 to the refractive surface closest to the object side in the subsequent lens group GR along the optical axis) between the second lens group G2 and the subsequent lens group GR when the zoom lens system is focused on infinity at the long focal length end. Conditional Expression (27) defines the ratio of the focal length of the second lens group G2 with respect to the amount of change in the distance between the first lens group G1 and the second lens group G2 during the zooming. By satisfying conditional expression (27), the size of the lens system as a whole can be reduced, and the fluctuations in various aberrations during the zooming are reduced or eliminated.

When the value exceeds the upper limit of conditional expressions (27), the distance between the second lens group G2 and the subsequent lens group GR at the telephoto side (the long focal length end side) increases. This leads to an increase in the size of the zoom lens system as a whole.

When the value falls below the lower limit of conditional expression (27), the refractive power of at least one of the second lens group G2 and the subsequent lens group GR has to be increased so as to obtain a desired magnification ratio. However, such an increase adversely increases the fluctuations in various aberrations during the zooming.

Conditional expressions (28), (28'), and (28") define the ratio between the paraxial radius of curvature of the surface closest to the object side in the second lens group-a G2a and the paraxial radius of curvature of the surface closest to the image side in the second lens group-b G2b. By satisfying conditional expression (28), the center of curvature of the surface closest to the object side in the second lens group-a G2a is made close to the center of curvature of the surface closest to the image side in the second lens group-b G2b, and the fluctuations in spherical aberration during the focusing is successfully reduced particularly at the long focal length end. Such an advantageous effect is enhanced by satisfying conditional expressions (28') and (28").

When the value exceeds the upper limit of conditional expression (28), the curvature of the surface closest to the image side of the second lens group-b G2b becomes too strong, and the fluctuations in spherical aberration during the focusing becomes remarkable.

When the value falls below the lower limit of conditional expression (28), the curvature of the surface closest to the image side of the second lens group-a G2a becomes too strong, and the fluctuations in spherical aberration during the focusing becomes remarkable.

Next, Numerical Examples 1 to 8 are described in detail. In each of the longitudinal aberration diagrams, lateral aberration diagrams, and Tables, the d-line, g-line, and C-line indicate aberrations for the respective wavelengths, S indicates aberration for a sagittal ray, M indicates aberration for a meridional ray, FNO. indicates an F-number, Y indicates am image height, R indicates a radius of curvature, D indicates the thickness of each lens or the distance between lenses, N(d) indicates a refractive index with respect to the d-line, and ν(d) indicates the Abbe number for the d-line. The back focus refers to the distance from the surface closest to the image side to a design image plane within the lens system as a whole. The total lens length and the back focus each refers to an air conversion length that does not include the length of, for example, a cover glass, between the surface closest to the image side to the design image plane in the lens system as a whole.

In Tables, the followings are indicated in the order of the short focal length end, the mid-focal length (the intermediate focal length), and the long focal length end: the F-number, focal length, object-image distance, magnification, half angle of view, image height, back focus, total lens length, and distance between lenses D (lens interval) that changes with the zooming and the focusing. The unit of length is millimeter (mm).

A rotationally symmetric aspherical surface is defined by the following equation:

$$x = cy^2/[1+[1-(1+K)c^2y^2]^{1/2}] + A4y^4 + A6y^6 + A8y^8 + A10y^{10} + A12y^{12} \ldots,$$

(where c is a curvature (1/r), y is a height from the optical axis, K is a conical constant, and A4, A6, A8, . . . are aspherical coefficients of the respective orders).

Figure 9:
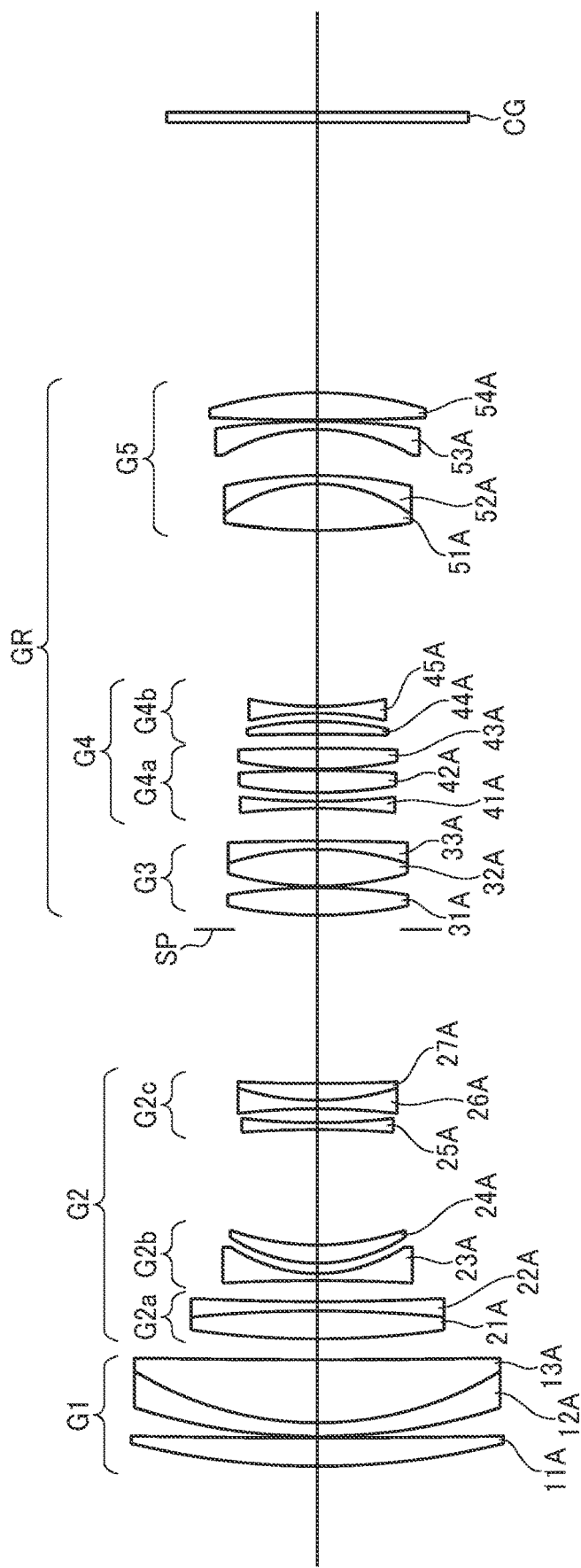
FIG. 9 is a diagram of a configuration of the zoom lens system according to Numerical Example 1 focused on infinity at the short focal length end.

FIGS. 9 to 19 and Tables 1 to 4 pertain to the zoom lens system according to Numerical Example 1. FIG. 9 is an illustration of the configuration of the zoom lens system focused on infinity at the short focal length end.

Figure 10:
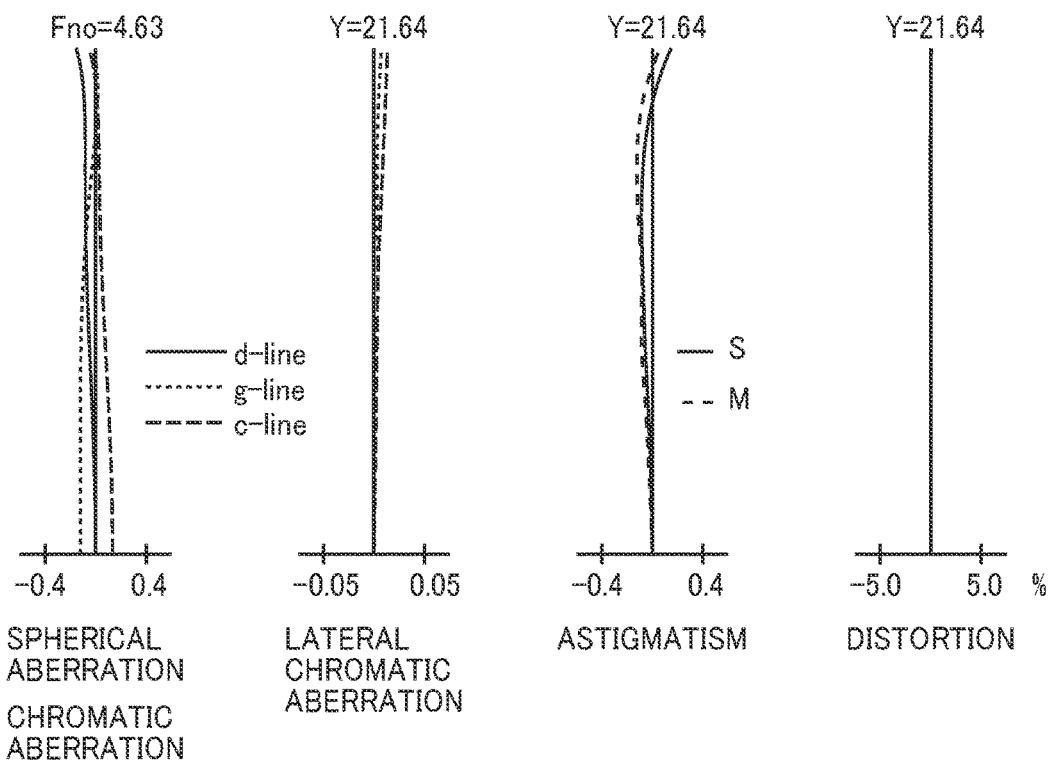
FIG. 10 is a collection of longitudinal aberration diagrams of the zoom lens system according to Numerical Example 1 focused on infinity at the short focal length end.
Figure 11:
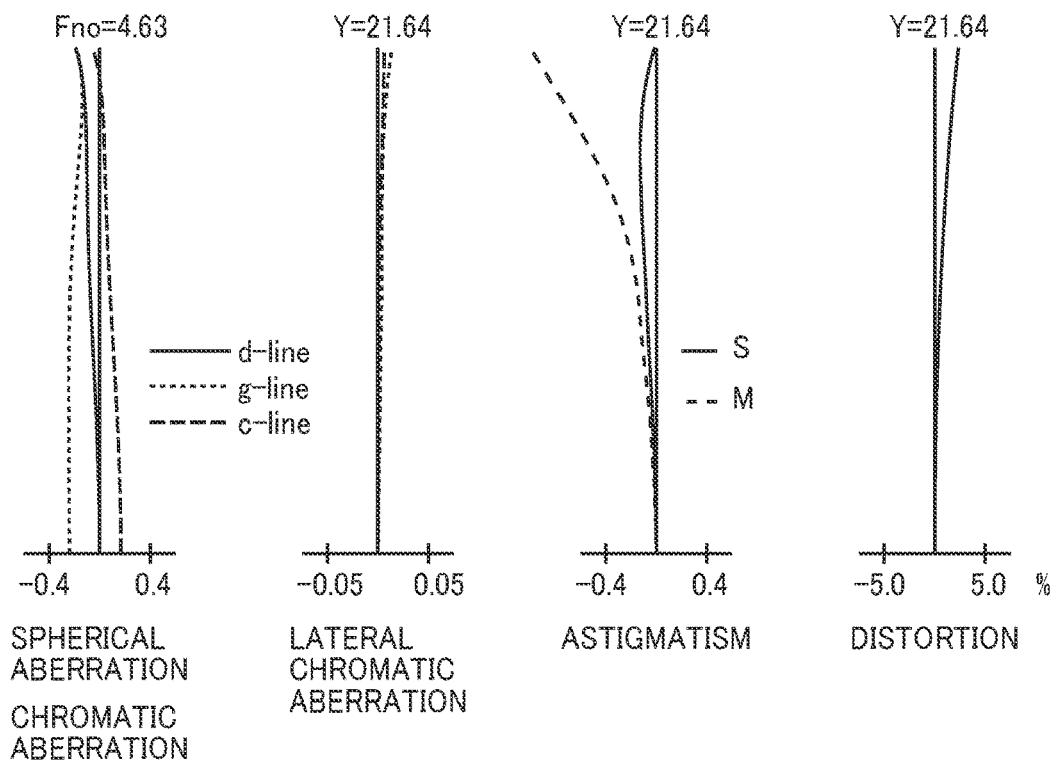
FIG. 11 is a collection of longitudinal aberration diagrams of the zoom lens system according to Numerical Example 1 focused on 1.2 in at the short focal length end.

FIGS. 10 and 11 are longitudinal aberration diagrams of the zoom lens system focused on infinity and 1.2 m at the short focal length end, respectively.

Figure 12:
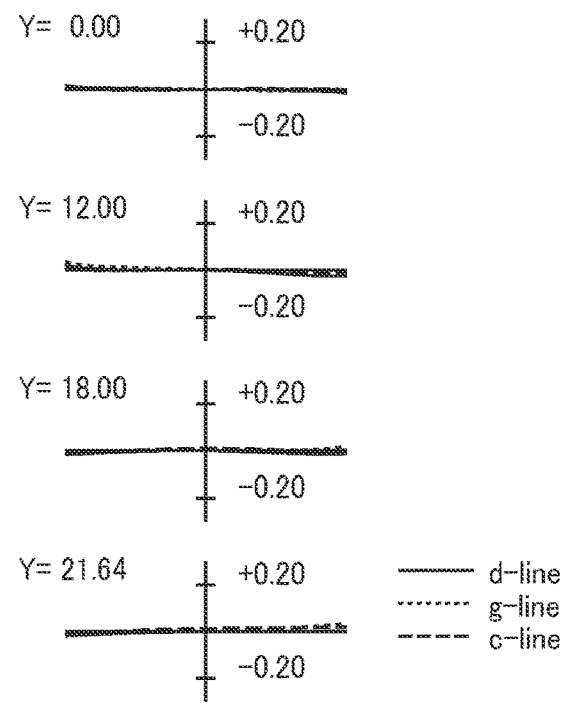
FIG. 12 is a collection of lateral aberration diagrams of the zoom lens system according to Numerical Example 1 focused on infinity at the short focal length end.
Figure 13:
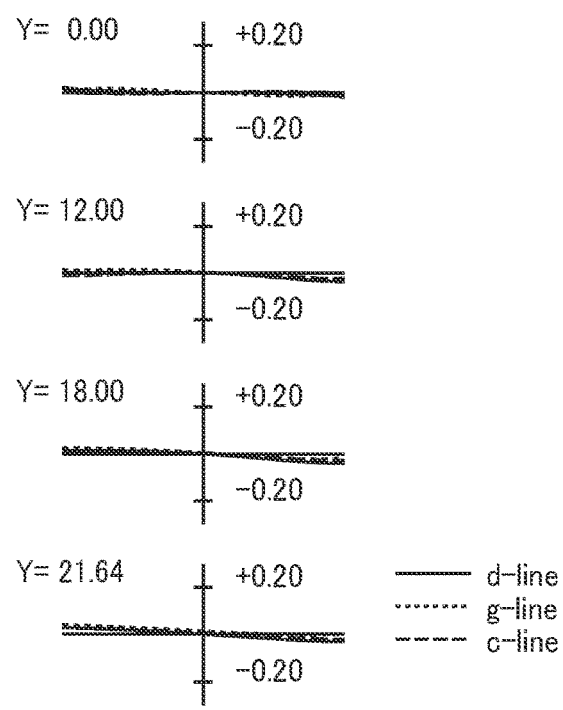
FIG. 13 is a collection of lateral aberration diagrams of the zoom lens system according to Numerical Example 1 focused on 1.2 m at the short focal length end.

FIGS. 12 and 13 are lateral aberration diagrams of the zoom lens system focused on infinity and 1.2 m at the short focal length end, respectively.

Figure 14:
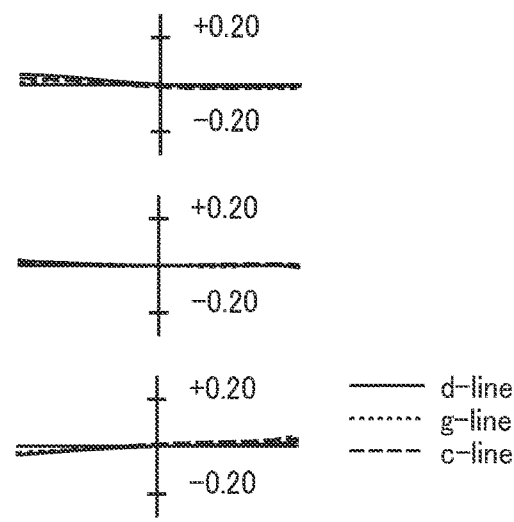
FIG. 14 is a collection of lateral aberration diagrams of the zoom lens system in the state illustrated in FIG. 12 during the drive of vibration isolation.

FIG. 14 is a collection of lateral aberration diagrams of the zoom lens system in the state of FIG. 12 during the drive of vibration isolation.

Figure 15:
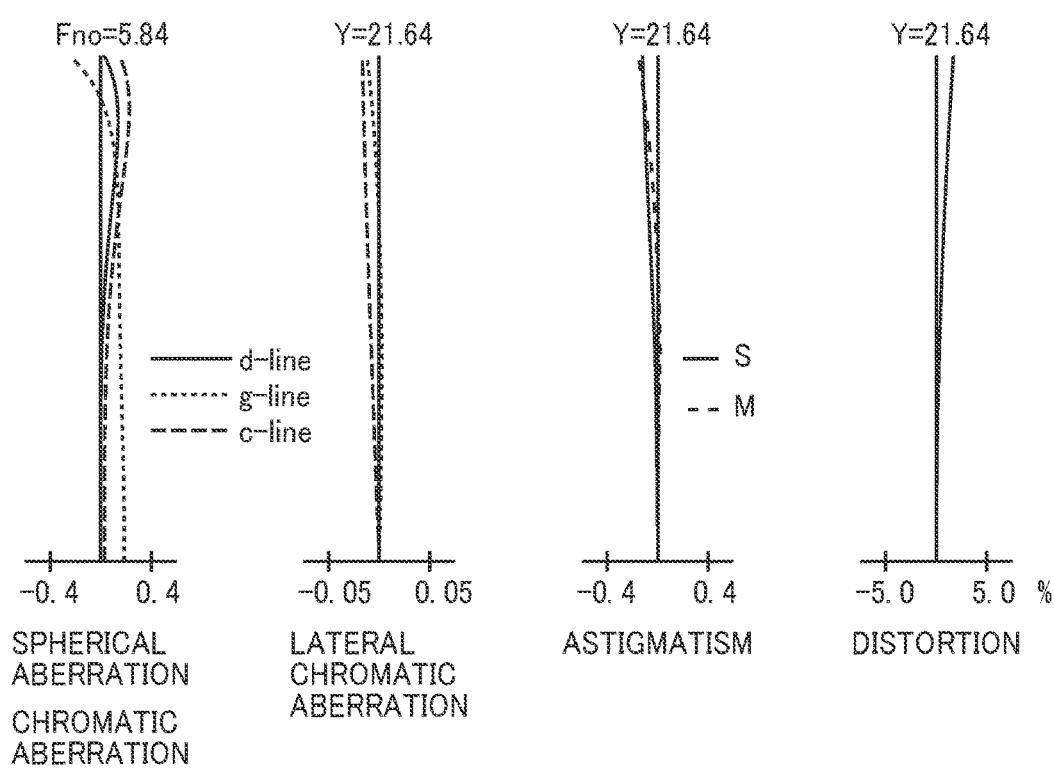
FIG. 15 is a collection of longitudinal aberration diagrams of the zoom lens system according to Numerical Example 1 focused on infinity at the long focal length end.
Figure 16:
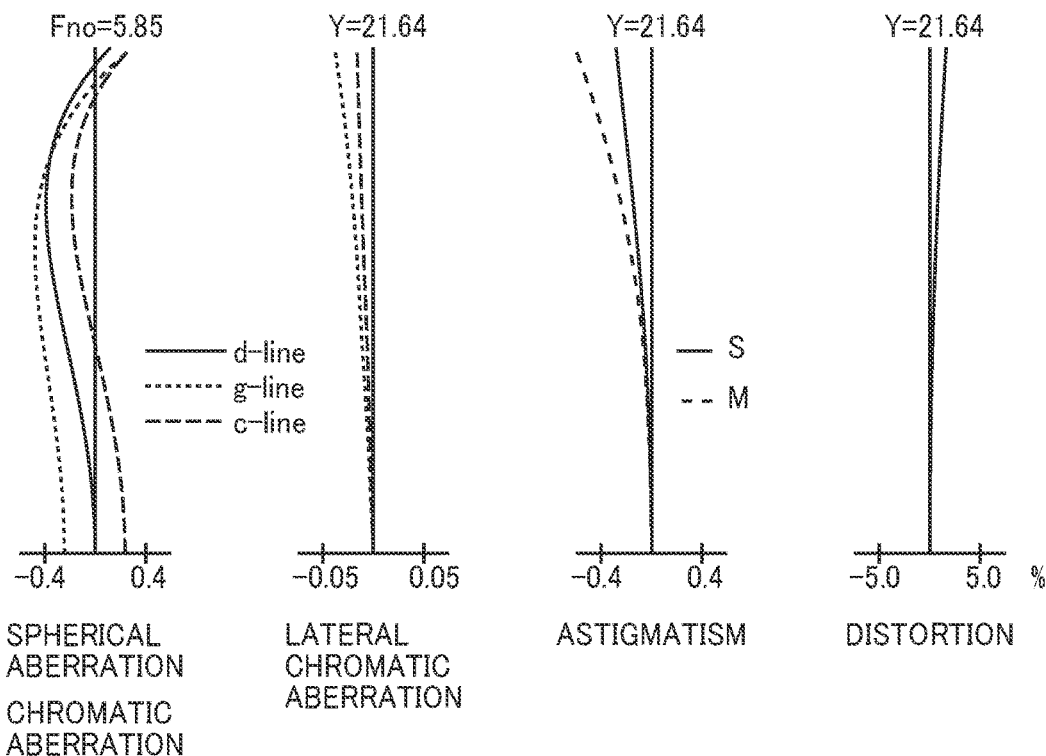
FIG. 16 is a collection of longitudinal aberration diagrams of the zoom lens system according to Numerical Example 1 focused on 1.2 m at the long focal length end.

FIGS. 15 and 16 are longitudinal aberration diagrams of the zoom lens system focused on infinity and 1.2 m at the long focal length end, respectively.

Figure 17:
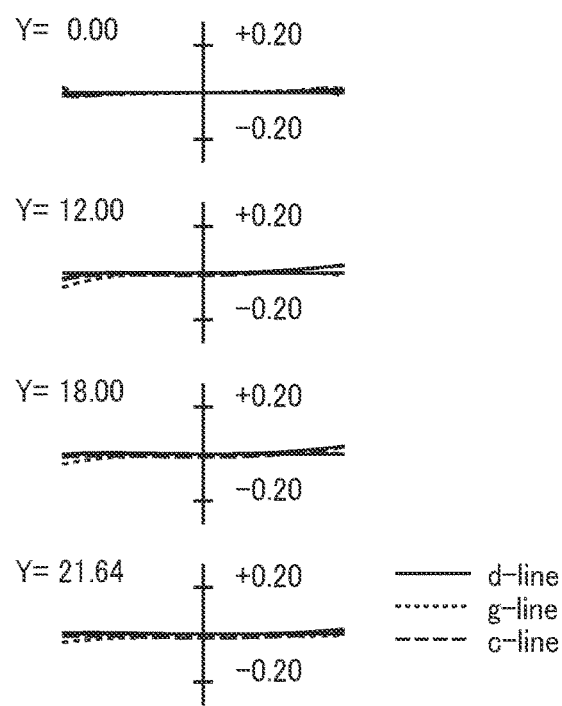
FIG. 17 is a collection of lateral aberration diagrams of the zoom lens system according to Numerical Example 1 focused on infinity at the long focal length end.
Figure 18:
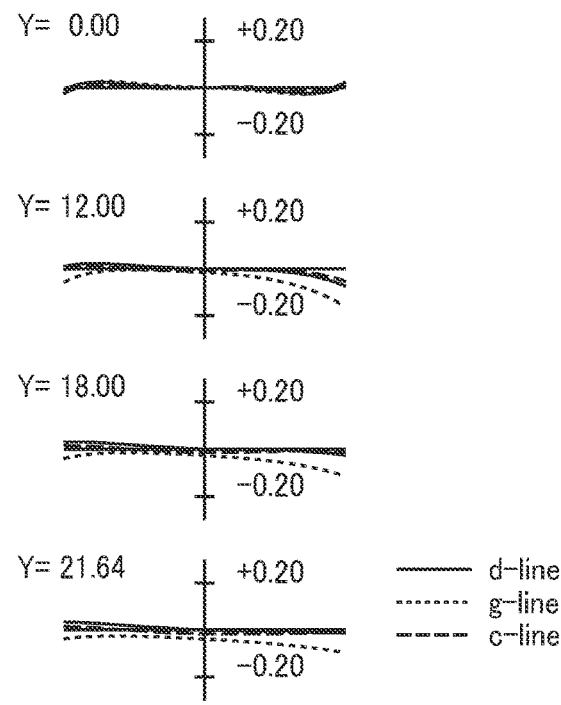
FIG. 18 is a collection of lateral aberration diagrams of the zoom lens system according to Numerical Example 1 focused on 1.2 m at the long focal length end.

FIGS. 17 and 18 are lateral aberration diagrams of the zoom lens system focused on infinity and 1.2 m at the long focal length end, respectively.

Figure 19:
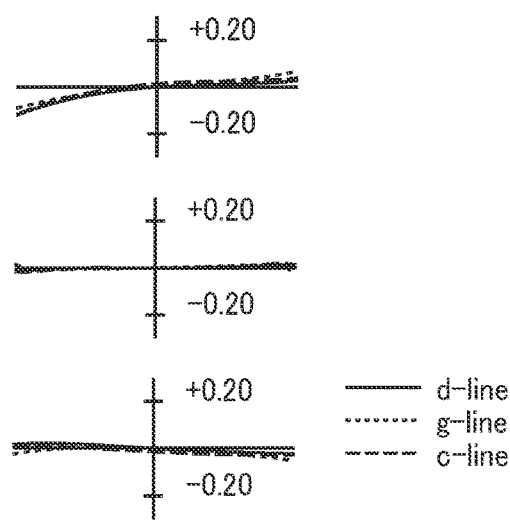
FIG. 19 is a collection of lateral aberration diagrams of the zoom lens system in the state illustrated in FIG. 17 during the drive of vibration isolation of ±0.3°.

FIG. 19 is a collection of lateral aberration diagrams of the zoom lens system in the state illustrated in FIG. 17 during the drive of vibration isolation of ±0.3°. Tables 1, 2, 3, and 4 represent surface data, various data, zoom lens group data, and principal point position data. In Table 4, the term "P.P." stands for principal point, and the term "P.P. interval" refers to the distance between the principal points. Further, the terms "Initial" and "Final" refer to the "initial lens surface" and "final lens surface", respectively.

The zoom lens system according to Numerical Example 1 includes a first lens group G1 having positive refractive power, a second lens group G2 having negative refractive power, and a rear lens group (subsequent lens group) GR, which are arranged in that order from the object side. The subsequent lens group GR includes, in order from the object side, a third lens group G3 having positive refractive power, a fourth lens group G4 having negative refractive power, and a fifth lens G5 having positive refractive power. That is, the zoom lens system has a zoom lens configuration including the five groups of positive, negative, positive, negative, and positive refractive power.

The first lens G1 includes a positive meniscus lens 11A with a convex surface facing the object side, a negative meniscus lens 12A with a convex surface facing the object side, and a positive meniscus lens 13A with a convex surface facing the object side arranged in that order from the object side. The negative meniscus lens 12A and the positive meniscus lens 13A are cemented to each other.

The second lens group G2 consists of a second lens group-a G2a having positive refractive power, a second lens group-b G2b having negative refractive power, and a second lens group-c G2c having negative refractive power, which are arranged in that order from the object side.

The second lens group-a G2a includes a biconvex positive lens 21A and a biconcave negative lens 22A arranged in that order from the object side. The positive biconvex lens 21A and the negative biconcave lens 22A are bonded together.

The second lens group-b G2b includes a negative biconcave lens 23A, and a positive meniscus lens 24A with a convex surface facing the object side arranged in that order from the object side.

The second lens group-c G2c includes a negative biconcave lens 25A, a negative biconcave lens 26A, and a positive biconvex lens 27A arranged in that order from the object side. The negative biconcave lens 26A and the positive biconvex lens 27A are cemented to each other.

The third lens group G3 includes a positive biconvex lens 31A, a positive biconvex lens 32A, and a negative meniscus lens 33A having a convex surface facing the image side, which are arranged in that order from the object side. The positive biconvex lens 32A and the negative meniscus lens 33A are cemented to each other.

The fourth lens group G4 includes a fourth lens group-a G4a having positive refractive power and a fourth lens group-b G4b having negative refractive power, which are arranged in that order from the object side.

The fourth lens group-a G4a includes a negative biconcave lens 41A, a positive biconvex lens 42A, and a positive biconvex lens 43A arranged in that order from the object side.

The fourth lens group-b G4b includes a positive meniscus lens 44A with a convex surface facing the image side and a negative concave lens 45A arranged in that order from the object side.

The fifth lens group G5 includes a positive biconvex lens 51A, a negative meniscus lens 52A with a convex surface facing the image side, a negative meniscus lens 53A with a convex surface facing the image side, and a positive biconvex lens 54A arranged in that order from the object side. The positive biconvex lens 51A and the negative meniscus lens 52A are cemented to each other.

TABLE 1

Surface Data

| Surface No. | r | D | N(d) | v(d) |
|---|---|---|---|---|
| 1 | 109.489 | 4.050 | 1.48749 | 70.2 |
| 2 | 1346.163 | 0.200 | | |
| 3 | 84.450 | 1.950 | 1.73800 | 32.3 |
| 4 | 49.769 | 9.020 | 1.49700 | 81.6 |
| 5 | 1342.515 | D5 | | |
| 6 | 124.201 | 4.000 | 1.65160 | 58.5 |
| 7 | −186.275 | 1.340 | 1.53775 | 74.7 |
| 8 | 362.228 | D8 | | |
| 9 | −257.022 | 1.000 | 1.65160 | 58.5 |
| 10 | 22.616 | 1.400 | | |
| 11 | 22.808 | 2.600 | 1.80518 | 25.4 |
| 12 | 37.531 | D12 | | |
| 13 | −154.978 | 1.000 | 1.95375 | 32.3 |
| 14 | 96.030 | 2.000 | | |
| 15 | −95.527 | 1.200 | 1.80400 | 46.5 |
| 16 | 37.706 | 2.400 | 1.80810 | 22.8 |
| 17 | 251.929 | D17 | | |
| 18 Stop | INFINITY | 2.000 | | |
| 19 | 62.420 | 3.930 | 1.80400 | 46.5 |
| 20 | −78.827 | 0.200 | | |
| 21 | 45.402 | 5.260 | 1.59522 | 67.7 |
| 22 | −41.935 | 1.200 | 2.00069 | 25.5 |
| 23 | −321.928 | D23 | | |
| 24 | −93.217 | 1.000 | 1.90366 | 31.3 |
| 25 | 99.821 | 1.280 | | |
| 26 | 66.813 | 3.040 | 1.59410 | 60.5 |
| 27 | −177.060 | 0.200 | | |
| 28 | 58.506 | 3.000 | 1.80400 | 46.5 |
| 29 | −271.111 | 2.000 | | |
| 30 | −315.044 | 1.800 | 1.80518 | 25.4 |
| 31 | −48.174 | 1.200 | | |
| 32 | −45.134 | 0.950 | 1.77250 | 49.6 |
| 33 | 45.832 | D33 | | |
| 34 | 92.685 | 6.560 | 1.60342 | 38.0 |
| 35 | −22.387 | 1.200 | 1.91082 | 35.2 |
| 36 | −58.706 | 6.561 | | |
| 37 | −26.520 | 1.150 | 1.83481 | 42.7 |
| 38 | −100.411 | 0.200 | | |
| 39 | 346.562 | 3.900 | 1.64769 | 33.8 |
| 40 | −52.470 | D40 | | |
| 41 | INFINITY | 1.500 | 1.51633 | 64.1 |
| 42 | INFINITY | — | | |

TABLE 2

Various Data
Zoom Ratio (Magnification Ratio) 4.04

| | Short Focal Length End | Mid-Focal Length | Long Focal Length End |
|---|---|---|---|
| | Focus at infinity | | |
| F-Number | 4.6 | 5.1 | 5.8 |
| Focal Length | 72.08 | 135.00 | 291.30 |
| Object-Image Distance | INFINITY | INFINITY | INFINITY |
| Magnification | 0.000 | 0.000 | 0.000 |
| Half Angle of View | 16.7 | 8.9 | 4.2 |
| Image Height | 21.64 | 21.64 | 21.64 |
| Back Focus | 40.44 | 48.63 | 60.38 |
| Total Lens Length | 193.39 | 219.82 | 240.00 |

TABLE 2-continued

Various Data
Zoom Ratio (Magnification Ratio) 4.04

|  | Short Focal Length End | Mid-Focal Length | Long Focal Length End |
|---|---|---|---|
| D5 | 2.950 | 29.380 | 49.564 |
| D8 | 3.000 | 3.000 | 3.000 |
| D12 | 16.460 | 16.460 | 16.460 |
| D17 | 21.941 | 13.751 | 2.000 |
| D23 | 4.659 | 12.849 | 24.598 |
| D33 | 25.146 | 16.957 | 5.208 |
| D40 | 38.453 | 46.644 | 58.394 |
| Focused on 1.2 m | | | |
| F-NUMBER | 4.6 | 5.1 | 5.8 |
| Focal Length | 81.55 | 139.07 | 187.68 |
| Object-Image Distance | 1200.00 | 1200.00 | 1200.00 |
| Magnification | −0.080 | −0.148 | −0.313 |
| Half Angle of View | 13.7 | 7.0 | 3.2 |
| Image Height | 21.64 | 21.64 | 21.64 |
| Back Focus | 40.44 | 48.63 | 60.38 |
| Total Lens Length | 193.39 | 219.82 | 240.00 |
| D5 | 2.950 | 29.380 | 49.564 |
| D8 | 11.183 | 12.567 | 14.750 |
| D12 | 8.277 | 5.893 | 3.710 |
| D17 | 21.941 | 13.751 | 2.000 |
| D23 | 4.659 | 12.849 | 24.598 |
| D33 | 25.146 | 16.957 | 5.208 |
| D40 | 38.453 | 46.644 | 58.394 |

TABLE 3

Zoom Lens Group Data

| Group | Initial Surface | Focal Length |
|---|---|---|
| 1 | 1 | 130.42 |
| 2 | 6 | −21.93 |
| 3 | 19 | 33.51 |
| 4 | 24 | −134.61 |
| 5 | 34 | 1414.94 |
| 2a | 6 | 227.71 |
| 2b | 9 | −59.73 |
| 2c | 13 | −35.47 |
| Vibration-Isolating | 30 | −62.40 |

TABLE 4

Principal Point Position Data

| Initial | Final | Focal Length | Front P.P. | P.P. Interval | Rear P.P. | |
|---|---|---|---|---|---|---|
| Zoom Lens Group | | | | | | |
| 1 | 5 | 130.419 | 0.182 | 5.194 | 9.844 | First Group |
| 6 | 17 | −21.926 | 21.421 | 7.572 | 7.407 | Second Group |
| 18 | 23 | 33.505 | 2.642 | 4.388 | 5.560 | Third Group |
| 24 | 33 | −134.606 | 14.365 | 4.397 | −4.292 | Fourth Group |
| 34 | 40 | 1414.938 | −35.242 | 5.643 | 49.170 | Fifth Group |
| Sub-lens group | | | | | | |
| 6 | 8 | 227.705 | −0.776 | 2.062 | 4.054 | 2a Sub-lens group |
| 9 | 12 | −59.732 | 1.108 | 1.649 | 2.242 | 2b Sub-lens group |
| 13 | 17 | −35.465 | 1.440 | 2.155 | 3.004 | 2c Sub-lens group |
| 6 | 12 | −85.109 | 10.854 | 3.294 | −0.809 | 2ab Sub-lens group |
| 9 | 17 | −18.367 | 11.540 | 7.322 | 9.198 | 2bc Sub-lens group |

FIGS. 20 to 30 and Tables 5 to 8 pertain to the zoom lens system according to Numerical Example 2.

Figure 20:
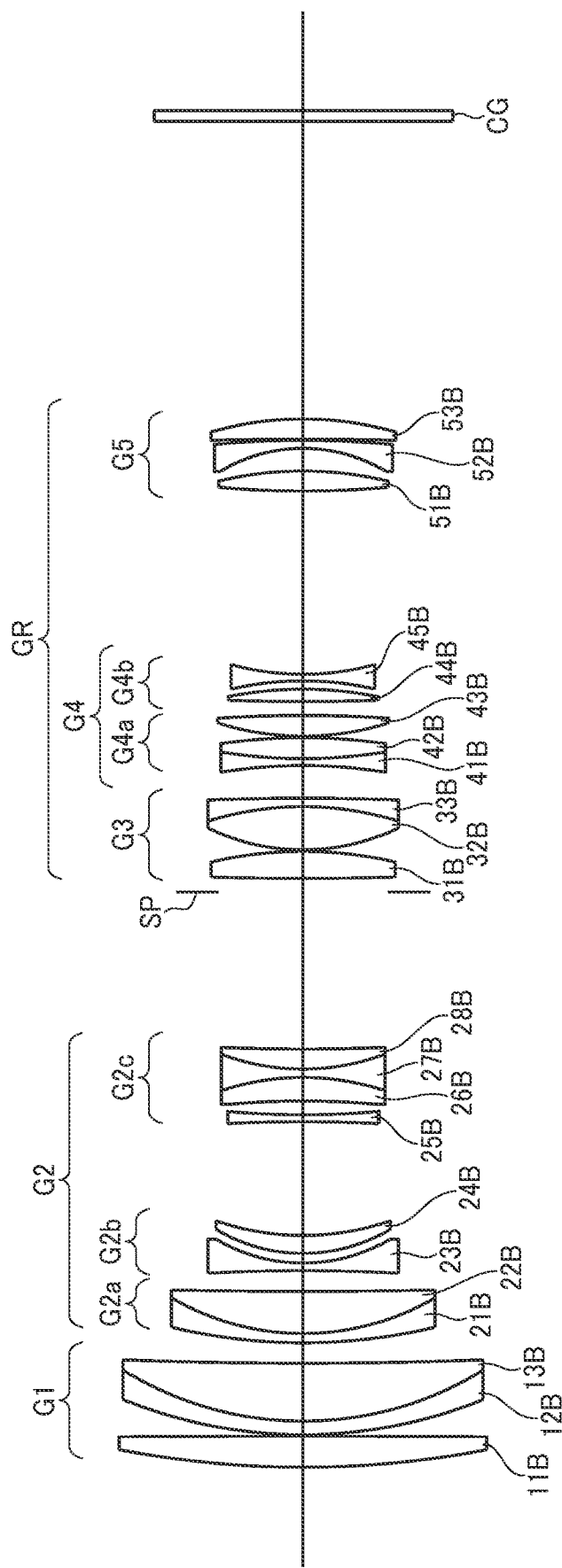
FIG. 20 is a diagram of a configuration of the zoom lens system according to Numerical Example 2 focused on infinity at the short focal length end.

FIG. 20 is an illustration of the configuration of the zoom lens system focused on infinity at the short focal length end.

Figure 21:
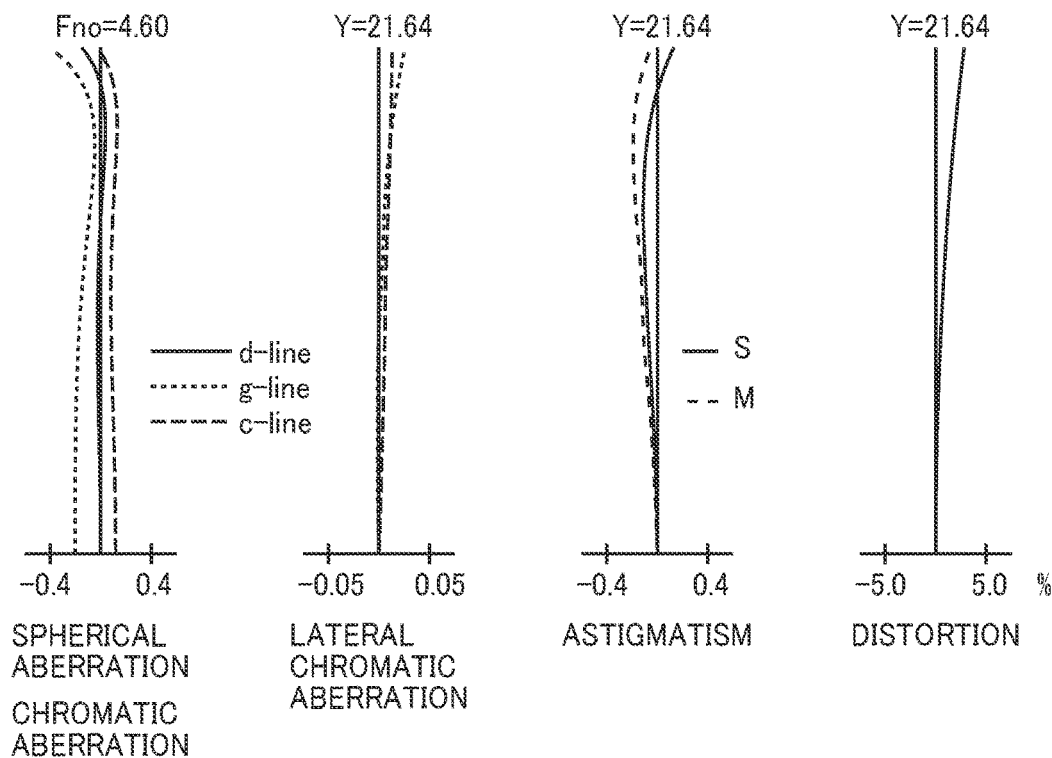
FIG. 21 is a collection of longitudinal aberration diagrams of the zoom lens system according to Numerical Example 2 focused on infinity at the short focal length end.
Figure 22:
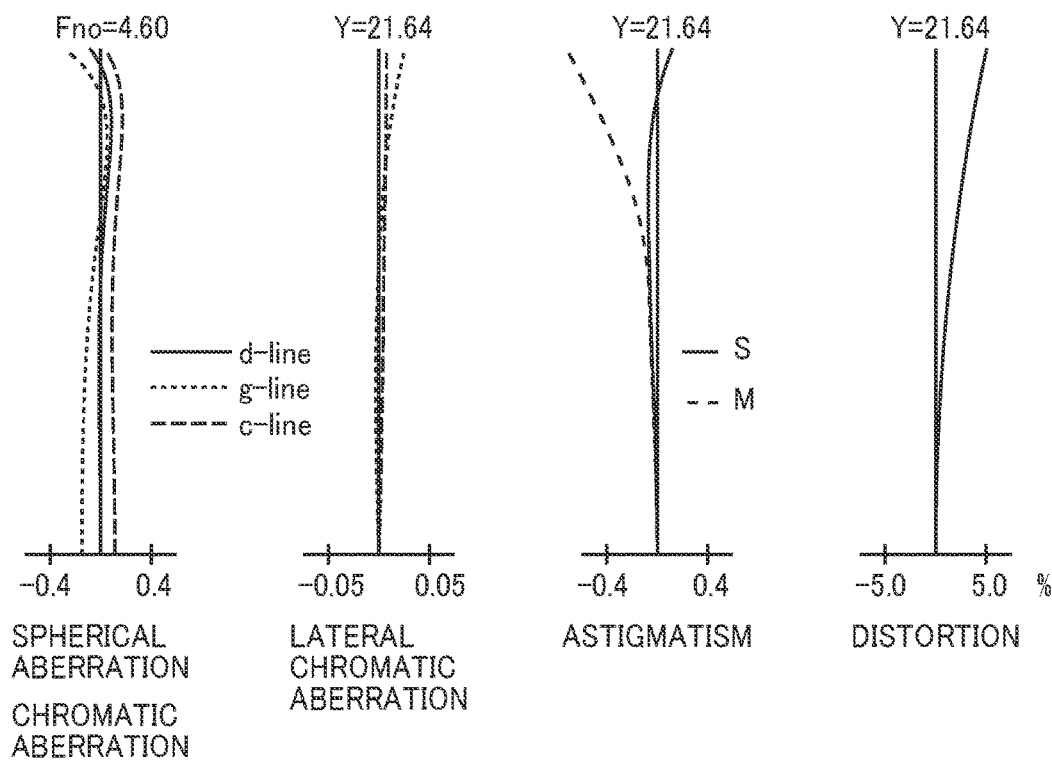
FIG. 22 is a collection of longitudinal aberration diagrams of the zoom lens system according to Numerical Example 2 focused on 1.2 m at the short focal length end.

FIGS. 21 and 22 are longitudinal aberration diagrams of the zoom lens system focused on infinity and 1.2 in at the short focal length end, respectively.

Figure 23:
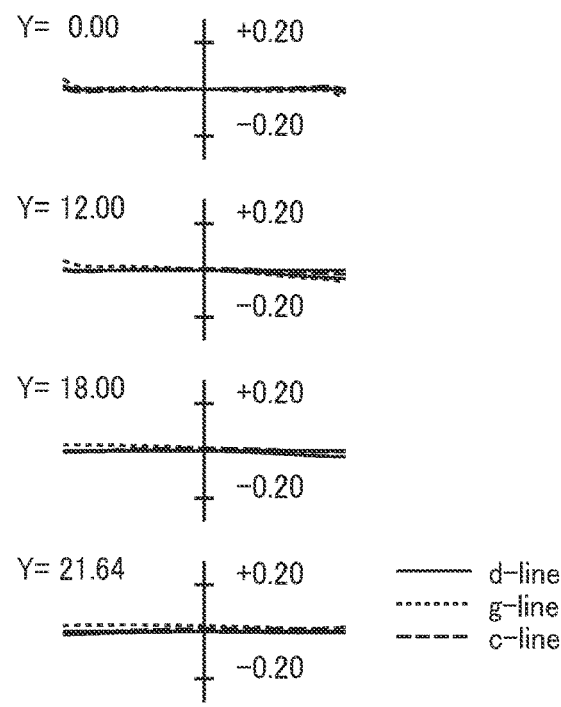
FIG. 23 is a collection of lateral aberration diagrams of the zoom lens system according to Numerical Example 2 focused on infinity at the short focal length end.
Figure 24:
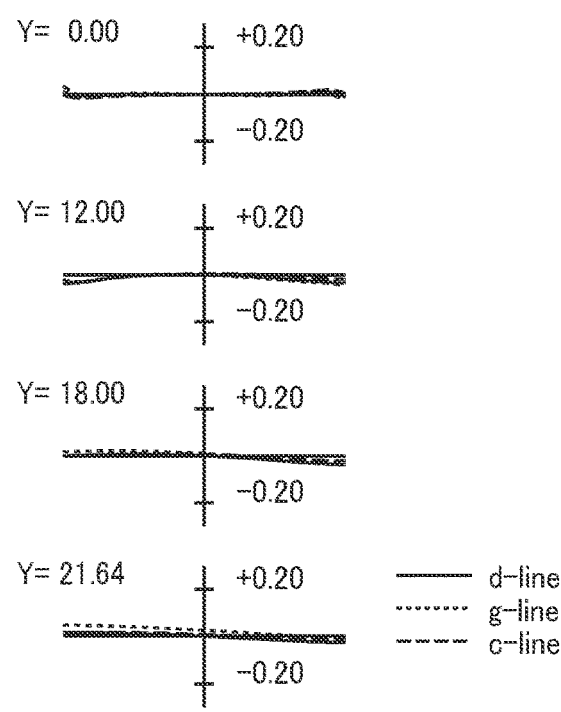
FIG. 24 is a collection of lateral aberration diagrams of the zoom lens system according to Numerical Example 2 focused on 1.2 m at the short focal length end.

FIGS. 23 and 24 are lateral aberration diagrams of the zoom lens system focused on infinity and 1.2 m at the short focal length end, respectively.

Figure 25:
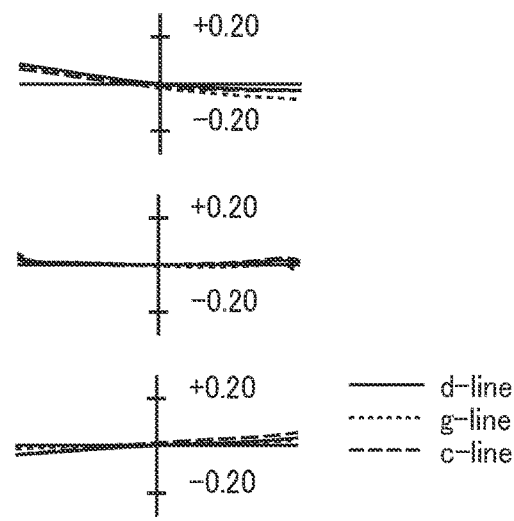
FIG. 25 is a collection of lateral aberration diagrams of the zoom lens system in the state illustrated in FIG. 23 during the drive of vibration isolation.

FIG. 25 is a collection of lateral aberration diagrams of the zoom lens system in the state of FIG. 23 during the drive of vibration isolation.

Figure 26:
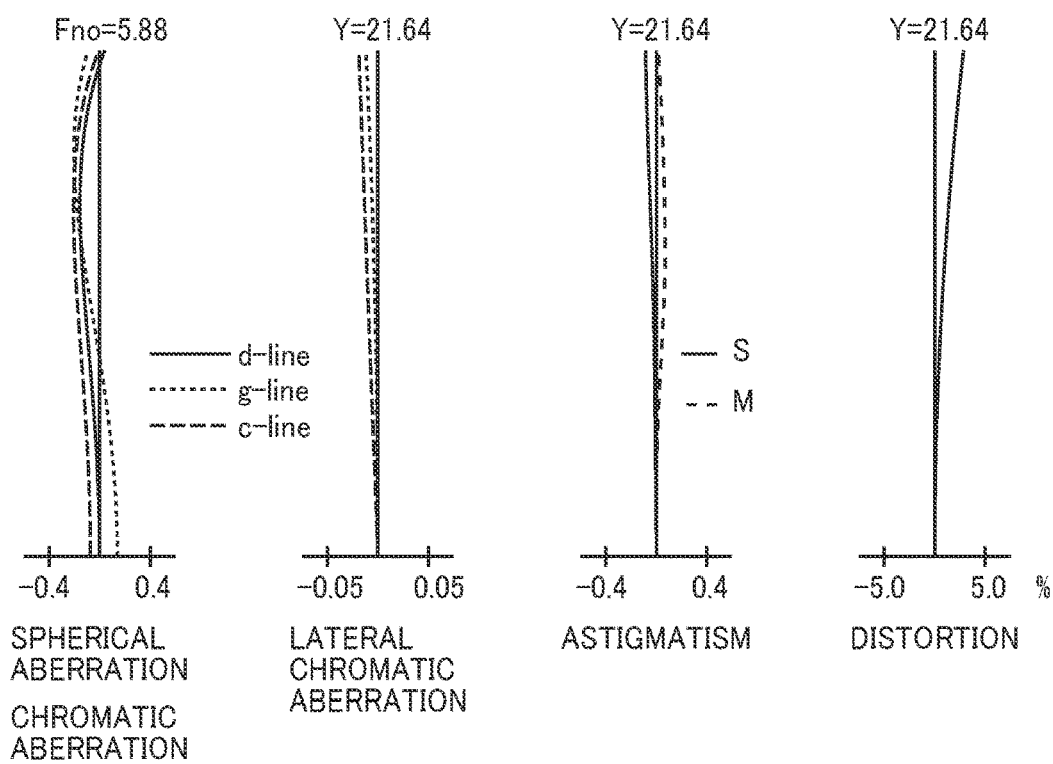
FIG. 26 is a collection of longitudinal aberration diagrams of the zoom lens system according to Numerical Example 2 focused on infinity at the long focal length end.
Figure 27:
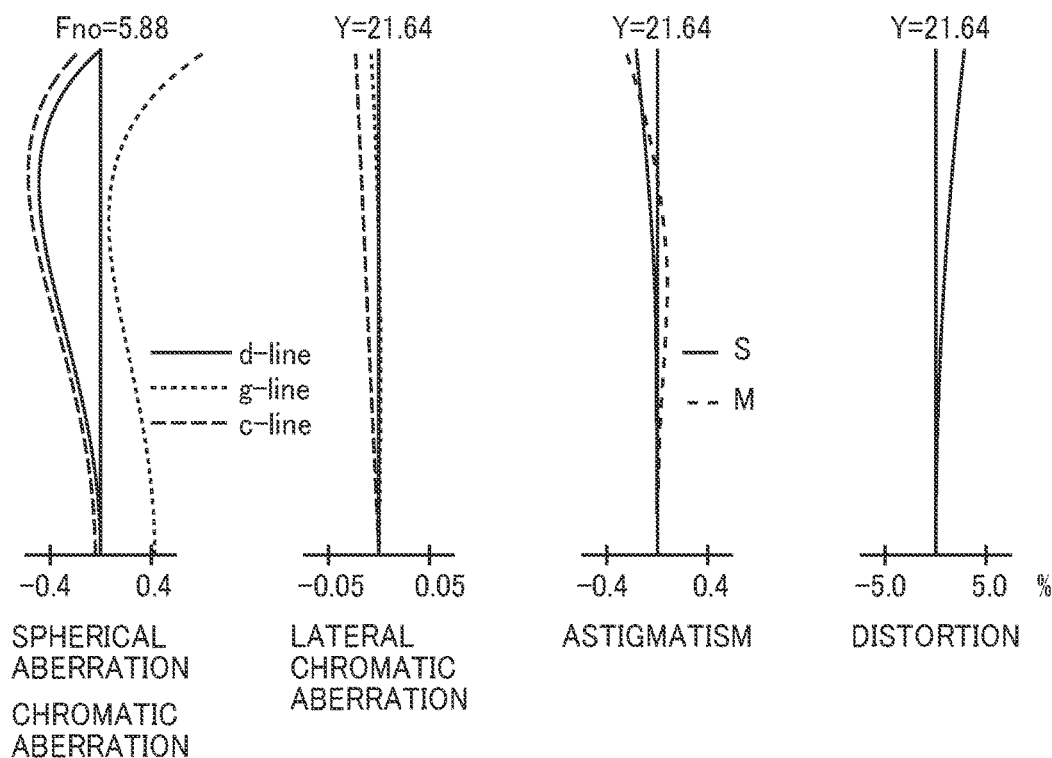
FIG. 27 is a collection of longitudinal aberration diagrams of the zoom lens system according to Numerical Example 2 focused on 1.2 m at the long focal length end.

FIGS. 26 and 27 are longitudinal aberration diagrams of the zoom lens system focused on infinity and 1.2 m at the long focal length end, respectively.

Figure 28:
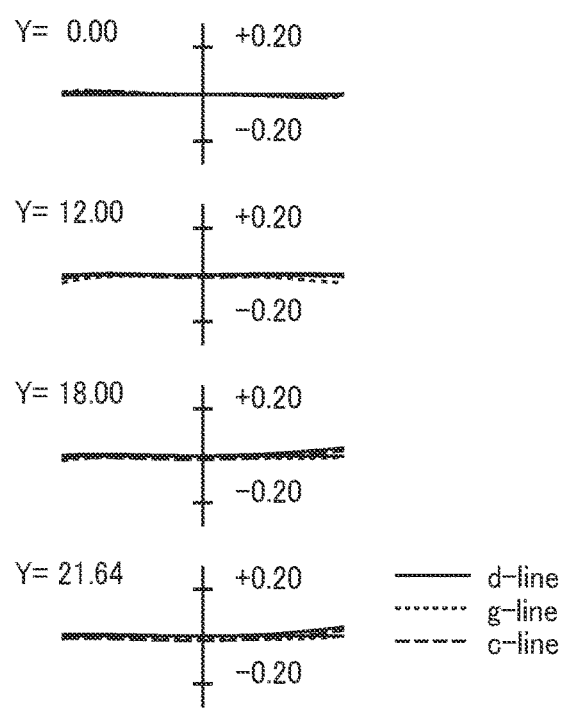
FIG. 28 is a collection of lateral aberration diagrams of the zoom lens system according to Numerical Example 2 focused on infinity at the long focal length end.
Figure 29:
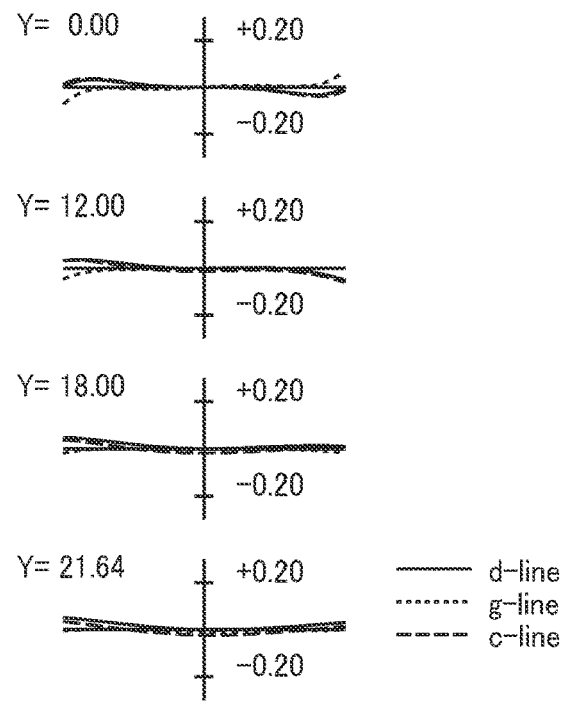
FIG. 29 is a collection of lateral aberration diagrams of the zoom lens system according to Numerical Example 2 focused on 1.2 m at the long focal length end.

FIGS. 28 and 29 are lateral aberration diagrams of the zoom lens system focused on infinity and 1.2 m at the long focal length end, respectively.

Figure 30:
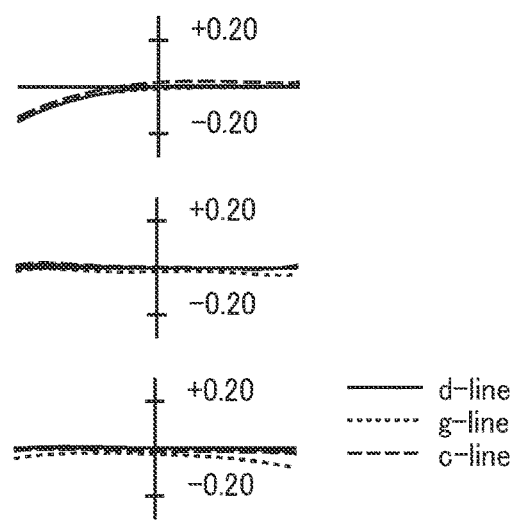
FIG. 30 is a collection of lateral aberration diagrams of the zoom lens system in the state illustrated in FIG. 28 during the drive of vibration isolation of ±0.3°.

FIG. 30 is a collection of lateral aberration diagrams of the zoom lens system in the state illustrated in FIG. 28 during the drive of vibration isolation of ±0.3°.

Tables 5, 6, 7, and 8 represent surface data, various data, zoom lens group data, and principal point position data. In Table 4, the term "P.P." stands for principal point, and the term "P.P. interval" refers to the distance between the principal points. Further, the terms "Initial" and "Final" refer to the "initial lens surface" and "final lens surface", respectively.

The zoom lens system according to Numerical Example 2 includes a first lens group G1 having positive refractive power, a second lens group G2 having negative refractive power, and a rear lens group (subsequent lens group) GR, which are arranged in that order from the object side. The subsequent lens group GR includes, in order from the object side, a third lens group G3 having positive refractive power, a fourth lens group G4 having negative refractive power, and a fifth lens G5 having negative refractive power. That is, the zoom lens system has a zoom lens configuration including the five groups of positive, negative, positive, negative, and negative refractive power.

The first lens group G1 includes a positive biconvex lens 11B, a negative meniscus lens 12B with a convex surface facing the object side, and a positive meniscus lens 13B with a convex surface facing the object side, which are arranged in that order from the object side. The negative meniscus lens 12B and the positive meniscus lens 13B are cemented to each other.

The second lens group G2 consists of a second lens group-a G2a having positive refractive power, a second lens group-b G2b having negative refractive power, and a second lens group-c G2c having negative refractive power, which are arranged in that order from the object side.

The second lens group-a G2a includes a negative meniscus lens 21B with a convex surface facing the object side and a positive meniscus lens 22B with a convex surface facing the object side, which are arranged in that order from the object side. The negative meniscus lens 21B and the positive meniscus lens 21B are cemented to each other.

The second lens group-b G2b includes a negative biconcave lens 23B, and a positive meniscus lens 24B with a convex surface facing the object side arranged in that order from the object side.

The second lens group-c G2c includes a negative biconcave lens 25B, a positive meniscus lens 26B with a convex surface facing the image side, a negative biconcave lens 27B, and a positive meniscus lens 28B with a convex surface facing the object side arranged in that order from the object side. The positive meniscus lens 26B and the negative, a negative biconcave lens 27B, and a positive meniscus lens 28B are cemented to each other.

The third lens group G3 includes a positive biconvex lens 31B, a positive biconvex lens 32B, and a negative meniscus lens 33B having a convex surface facing the image side, which are arranged in that order from the object side. The positive biconvex lens 32B and the negative meniscus lens 33B are cemented to each other.

The fourth lens group G4 includes a fourth lens group-a G4a having positive refractive power and a fourth lens group-b G4b having negative refractive power, which are arranged in that order from the object side.

The fourth lens group-a G4a includes a negative biconcave lens 41B, a positive biconvex lens 42B, and a positive biconvex lens 43B arranged in that order from the object side. The negative biconcave lens 41B and the positive biconvex lens 42B are cemented to each other.

The fourth lens group-b G4b includes a positive biconvex lens 44B and a negative biconcave lens 45B, which are arranged in that order from the object side.

The fifth lens group G5 includes a positive biconvex lens 51B, a negative meniscus lens 52B with a convex surface facing the image side, and a positive meniscus lens 53B with a convex surface facing the image side, which are arranged in that order from the object side.

TABLE 5

Surface Data

| Surface Number | r | D | N(d) | ν(d) |
|---|---|---|---|---|
| 1 | 139.763 | 4.500 | 1.48749 | 70.2 |
| 2 | −4443.525 | 0.200 | | |
| 3 | 68.823 | 1.950 | 1.85883 | 30.0 |
| 4 | 49.243 | 8.400 | 1.49700 | 81.6 |
| 5 | 688.357 | D5 | | |
| 6 | 81.370 | 1.340 | 1.83481 | 42.7 |
| 7 | 37.593 | 6.100 | 1.59410 | 60.5 |
| 8 | 858.649 | D8 | | |
| 9 | −236.261 | 1.000 | 1.65160 | 58.5 |
| 10 | 24.526 | 1.400 | | |
| 11 | 24.395 | 2.600 | 1.75520 | 27.5 |
| 12 | 38.249 | D12 | | |
| 13 | −221.191 | 1.000 | 1.91082 | 35.2 |
| 14 | 122.370 | 2.000 | | |
| 15 | −118.823 | 3.400 | 1.62004 | 36.3 |
| 16 | −37.301 | 1.200 | 1.87070 | 40.7 |
| 17 | 33.219 | 2.900 | 1.89286 | 20.4 |
| 18 | 288.780 | D18 | | |
| 19 Stop | INFINITY | 2.000 | | |
| 20 | 438.709 | 3.930 | 1.80400 | 46.5 |
| 21 | −56.933 | 0.200 | | |
| 22 | 31.295 | 6.260 | 1.53775 | 74.7 |
| 23 | −45.961 | 1.200 | 1.80810 | 22.8 |
| 24 | −390.140 | D24 | | |
| 25 | −73.691 | 1.000 | 2.05090 | 26.9 |
| 26 | 74.990 | 3.040 | 1.49700 | 81.6 |
| 27 | −81.076 | 0.200 | | |
| 28 | 40.313 | 3.000 | 1.80610 | 33.3 |
| 29 | −193.599 | 2.000 | | |
| 30 | 276.350 | 1.800 | 1.84666 | 23.8 |
| 31 | −54.629 | 1.200 | | |
| 32 | −46.398 | 0.950 | 1.77250 | 49.6 |
| 33 | 38.565 | D33 | | |
| 34 | 134.664 | 2.900 | 1.68893 | 31.1 |
| 35 | −51.606 | 3.280 | | |
| 36 | −23.022 | 1.150 | 1.95375 | 32.3 |
| 37 | −135.545 | 0.200 | | |
| 38 | −460.628 | 2.900 | 1.56732 | 42.8 |
| 39 | −47.532 | D39 | | |
| 40 | INFINITY | 1.500 | 1.51633 | 64.1 |
| 41 | INFINITY | — | | |

TABLE 6

Various Data
Zoom Ratio 4.04

| | Short Focal Length End | Mid-Focal Length | Long Focal Length End |
|---|---|---|---|
| Focused on Infinity | | | |
| F-NUMBER | 4.6 | 5.1 | 5.9 |
| Focal Length | 72.08 | 135.00 | 291.30 |
| Object-Image Distance | INFINITY | INFINITY | INFINITY |
| Magnification | 0.000 | 0.000 | 0.000 |
| Half Angle of View | 16.3 | 8.8 | 4.1 |
| Image Height | 21.64 | 21.64 | 21.64 |
| Back Focus | 45.01 | 53.61 | 65.62 |
| Total Lens Length | 196.27 | 219.60 | 237.97 |
| D5 | 2.950 | 26.251 | 44.619 |
| D9 | 3.000 | 3.000 | 3.000 |
| D12 | 16.460 | 16.460 | 16.460 |
| D18 | 22.612 | 14.011 | 2.000 |
| D24 | 4.607 | 13.208 | 25.219 |
| D33 | 26.459 | 17.858 | 5.847 |
| D39 | 43.018 | 51.619 | 63.631 |
| Focused on 1.2 m | | | |
| F-NUMBER | 4.6 | 5.1 | 5.9 |
| Focal Length | 83.46 | 139.33 | 182.55 |
| Object-Image Distance | 1200.00 | 1200.00 | 1200.00 |
| Magnification | −0.082 | −0.152 | −0.320 |
| Half Angle of View | 12.9 | 6.8 | 3.1 |
| Image Height | 21.64 | 21.64 | 21.64 |
| Back Focus | 45.01 | 53.61 | 65.62 |
| Total Lens Length | 196.27 | 219.60 | 237.97 |
| D5 | 2.950 | 26.251 | 44.619 |
| D9 | 12.486 | 13.175 | 14.760 |
| D12 | 6.975 | 6.285 | 4.701 |
| D18 | 22.612 | 14.011 | 2.000 |
| D24 | 4.607 | 13.208 | 25.219 |
| D33 | 26.459 | 17.858 | 5.847 |
| D39 | 43.018 | 51.619 | 63.631 |

TABLE 7

Zoom Lens Group Data

| Group | Initial Surface | Focal Length |
|---|---|---|
| 1 | 1 | 123.06 |
| 2 | 6 | −21.14 |
| 3 | 20 | 33.73 |
| 4 | 25 | −149.32 |
| 5 | 34 | −318.57 |
| 2a | 6 | 309.79 |
| 2b | 9 | −56.84 |
| 2c | 13 | −37.35 |
| Vibration-Isolating | 30 | −58.09 |

TABLE 8

Principal Point Position Data

| Initial | Final | Focal Length | Front P.P. | P.P. Interval | Rear P.P. | |
|---|---|---|---|---|---|---|
| Zoom Lens Group | | | | | | |
| 1 | 5 | 123.058 | 0.297 | 5.237 | 9.515 | First Group |
| 6 | 18 | −21.137 | 22.336 | 10.510 | 9.553 | Second Group |
| 19 | 24 | 33.729 | 3.667 | 4.531 | 5.392 | Third Group |

TABLE 8-continued

Principal Point Position Data

| Initial | Final | Focal Length | Front P.P. | P.P. Interval | Rear P.P. | |
|---|---|---|---|---|---|---|
| 25 | 33 | −149.315 | 13.384 | 4.361 | −4.555 | Fourth Group |
| 34 | 39 | −318.572 | 17.050 | 1.998 | −8.618 | Fifth Group |

Sub-lens group

| | | | | | | |
|---|---|---|---|---|---|---|
| 6 | 9 | 309.788 | −2.429 | 2.920 | 6.950 | 2a Sub-lens group |
| 9 | 12 | −56.843 | 1.207 | 1.606 | 2.187 | 2b Sub-lens group |
| 13 | 18 | −37.346 | 2.478 | 3.838 | 4.184 | 2c Sub-lens group |
| 6 | 12 | −72.829 | 11.865 | 4.011 | −0.436 | 2ab Sub-lens group |
| 9 | 18 | −18.409 | 11.620 | 9.315 | 11.025 | 2bc Sub-lens group |

FIGS. 31 to 41 and Tables 9 to 12 pertain to the zoom lens system according to Numerical Example 3.

Figure 31:
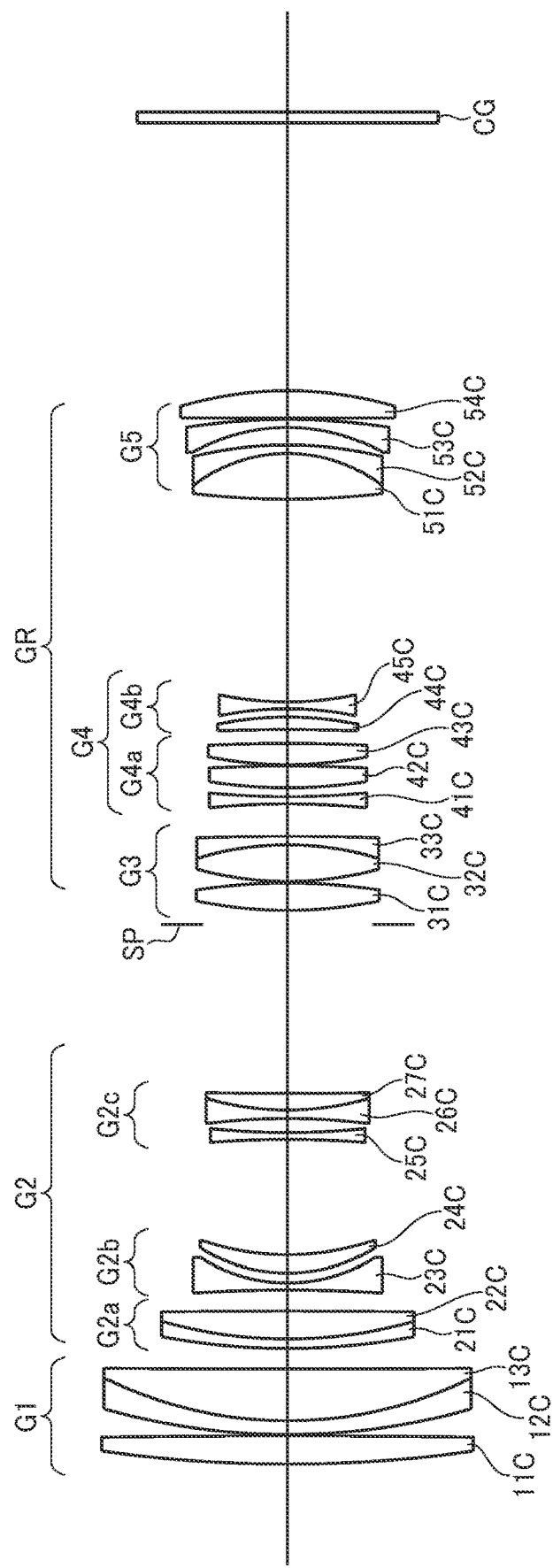
FIG. 31 is a diagram of a configuration of the zoom lens system according to Numerical Example 3 focused on infinity at the short focal length end.

FIG. 31 is an illustration of the configuration of the zoom lens system focused on infinity at the short focal length end.

Figure 32:
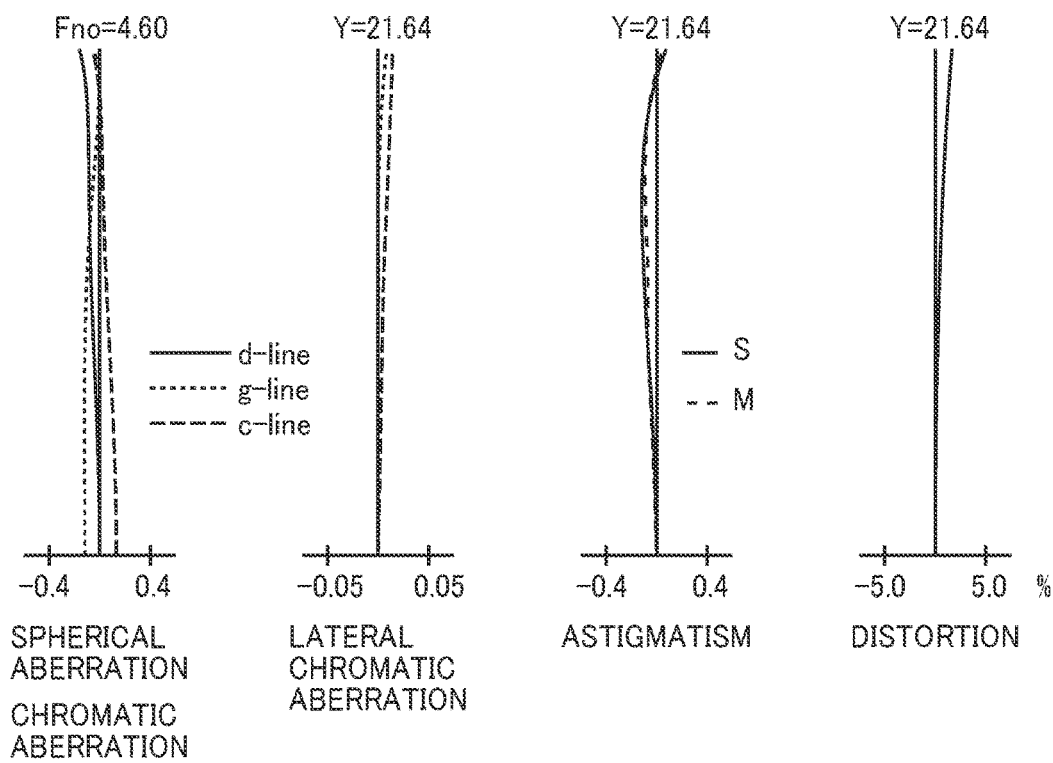
FIG. 32 is a collection of longitudinal aberration diagrams of the zoom lens system according to Numerical Example 3 focused on infinity at the short focal length end.
Figure 33:
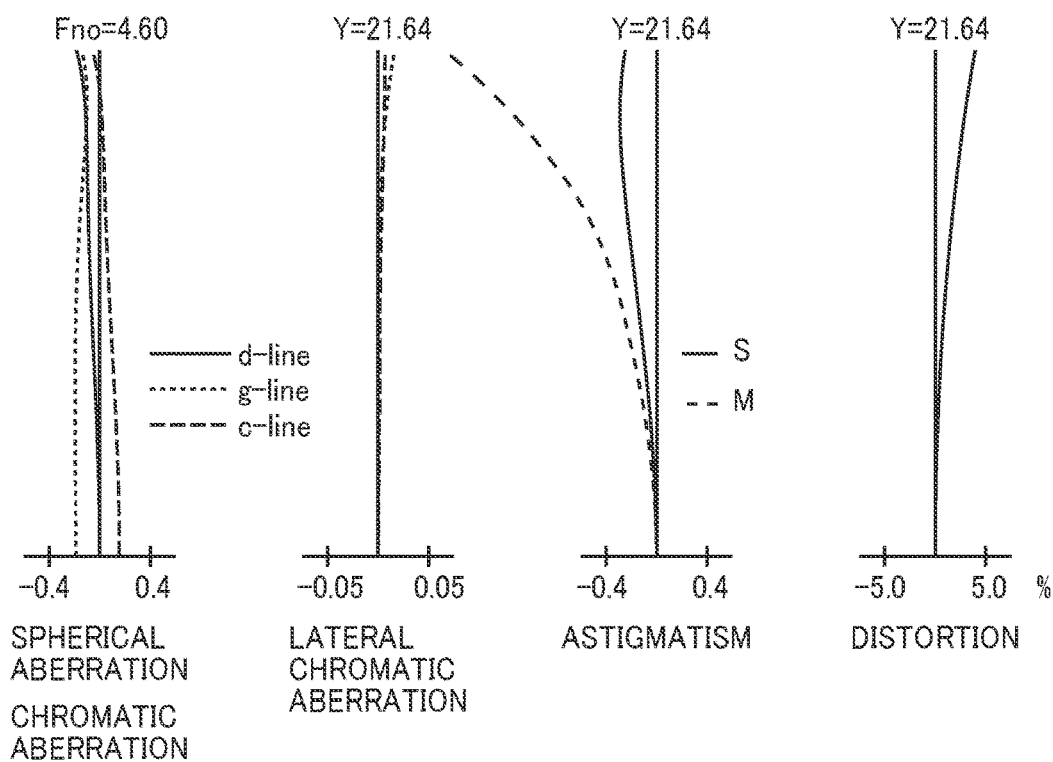
FIG. 33 is a collection of longitudinal aberration diagrams of the zoom lens system according to Numerical Example 3 focused on 1.2 m at the short focal length end.

FIGS. 32 and 33 are longitudinal aberration diagrams of the zoom lens system focused on infinity and 1.2 m at the short focal length end, respectively.

Figure 34:
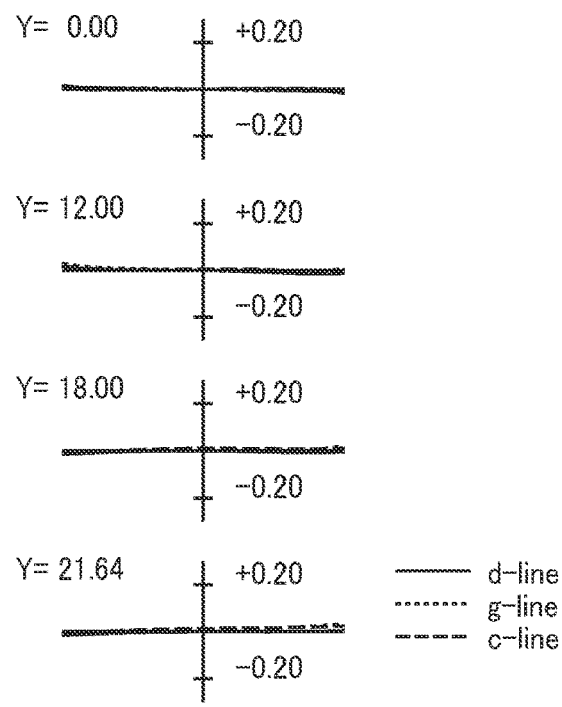
FIG. 34 is a collection of lateral aberration diagrams of the zoom lens system according to Numerical Example 3 focused on infinity at the short focal length end.
Figure 35:
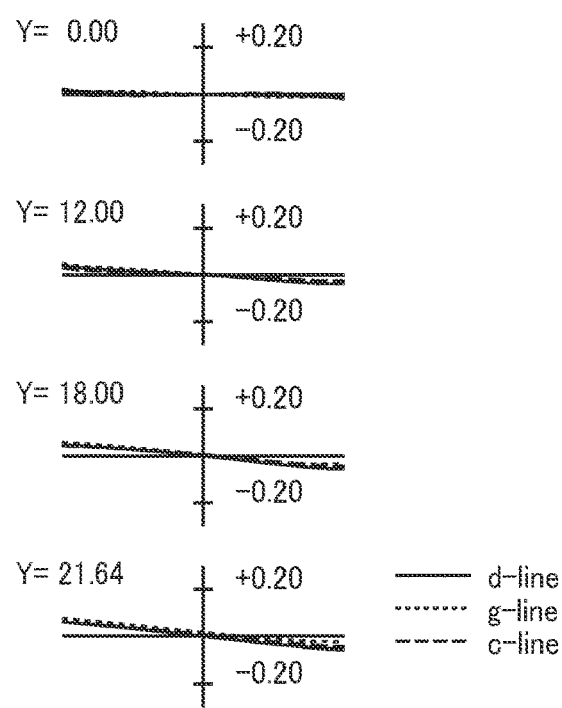
FIG. 35 is a collection of lateral aberration diagrams of the zoom lens system according to Numerical Example 3 focused on 1.2 m at the short focal length end.

FIGS. 34 and 35 are lateral aberration diagrams of the zoom lens system focused on infinity and 1.2 m at the short focal length end, respectively.

Figure 36:
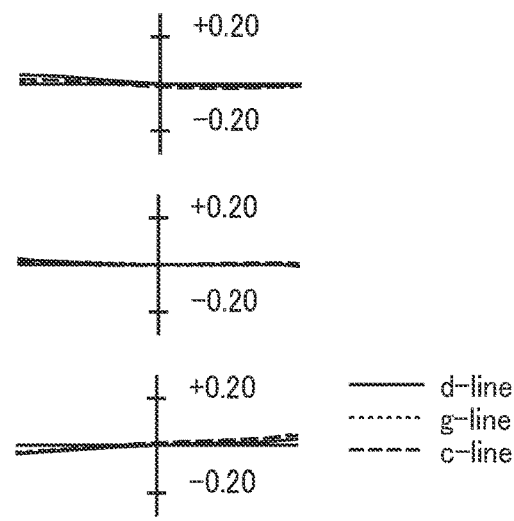
FIG. 36 is a collection of lateral aberration diagrams of the zoom lens system in the state illustrated in FIG. 34 during the drive of vibration isolation.

FIG. 36 is a collection of lateral aberration diagrams of the zoom lens system in the state of FIG. 34 during the drive of vibration isolation.

Figure 37:
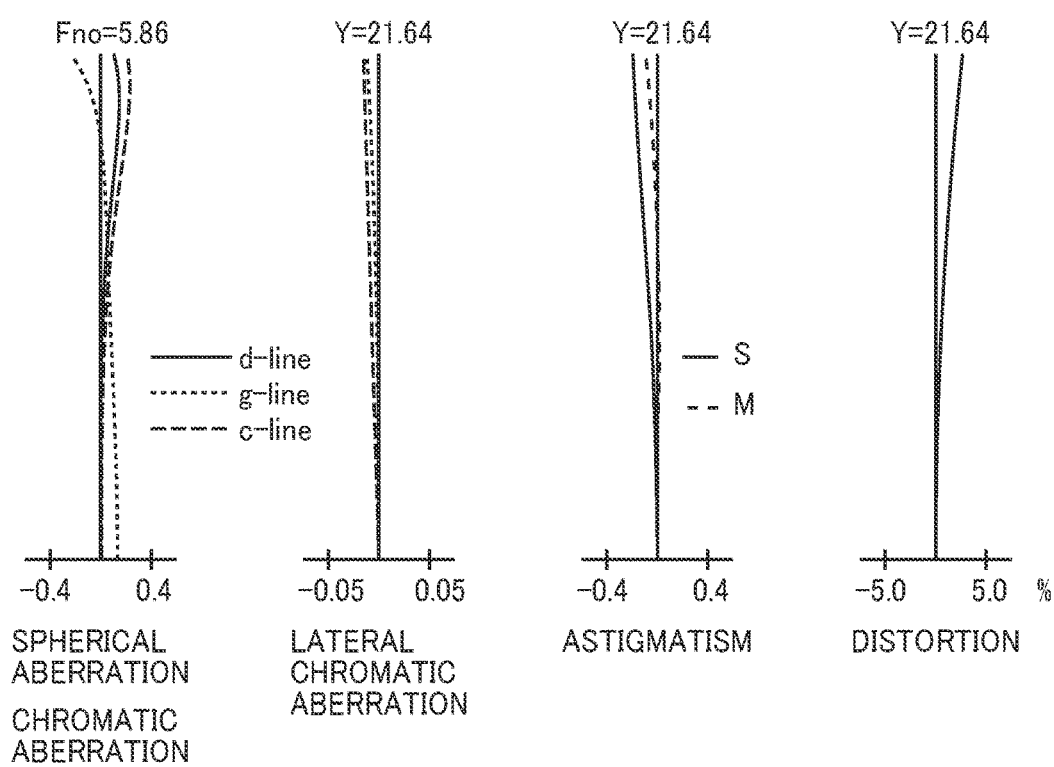
FIG. 37 is a collection of longitudinal aberration diagrams of the zoom lens system according to Numerical Example 3 focused on infinity at the long focal length end.
Figure 38:
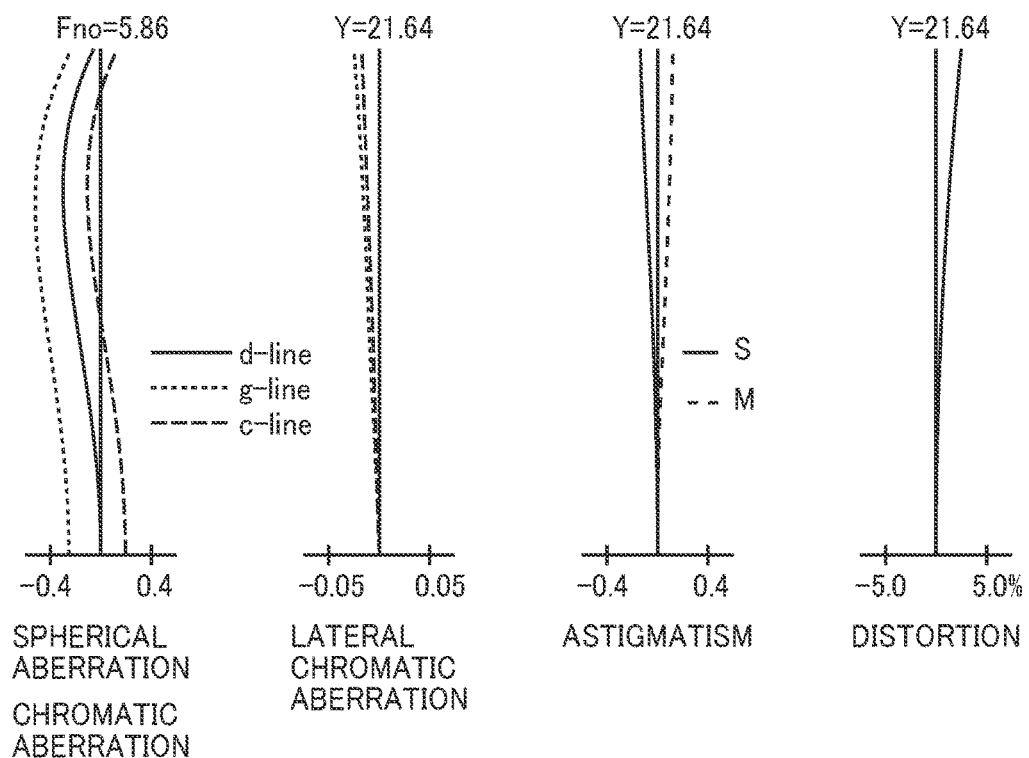
FIG. 38 is a collection of longitudinal aberration diagrams of the zoom lens system according to Numerical Example 3 focused on 1.2 m at the long focal length end.

FIGS. 37 and 38 are longitudinal aberration diagrams of the zoom lens system focused on infinity and 1.2 m at the long focal length end, respectively.

Figure 39:
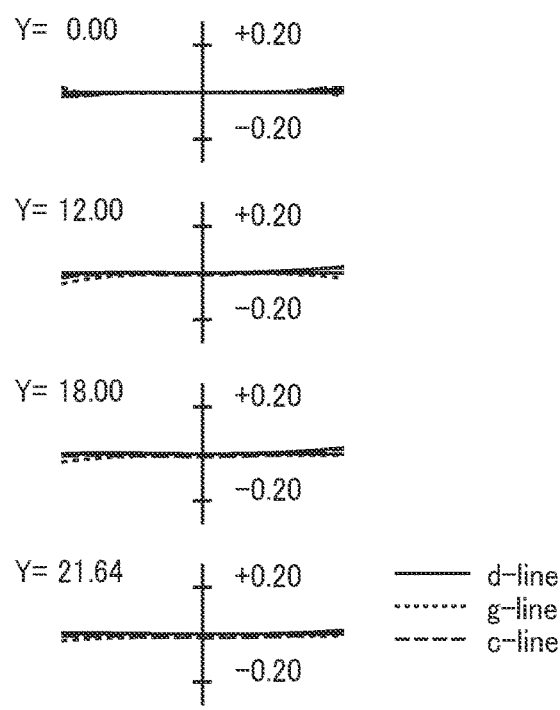
FIG. 39 is a collection of lateral aberration diagrams of the zoom lens system according to Numerical Example 3 focused on infinity at the long focal length end.
Figure 40:
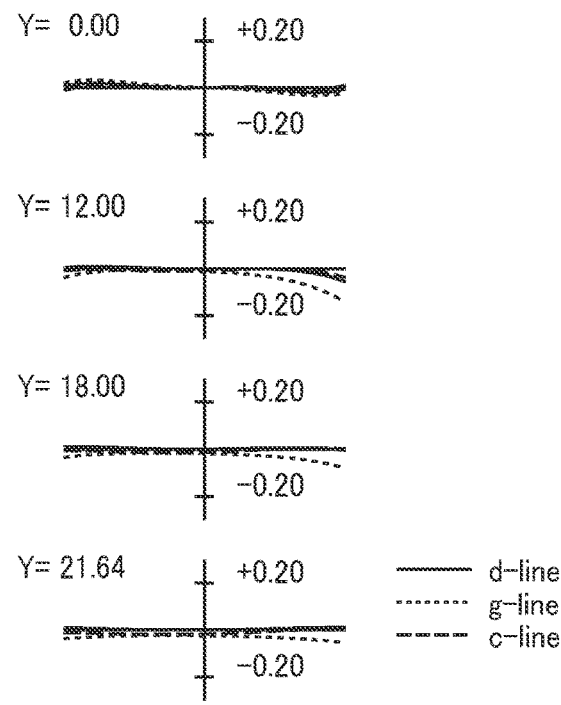
FIG. 40 is a collection of lateral aberration diagrams of the zoom lens system according to Numerical Example 3 focused on 1.2 m at the long focal length end.

FIGS. 39 and 40 are lateral aberration diagrams of the zoom lens system focused on infinity and 1.2 m at the long focal length end, respectively.

Figure 41:
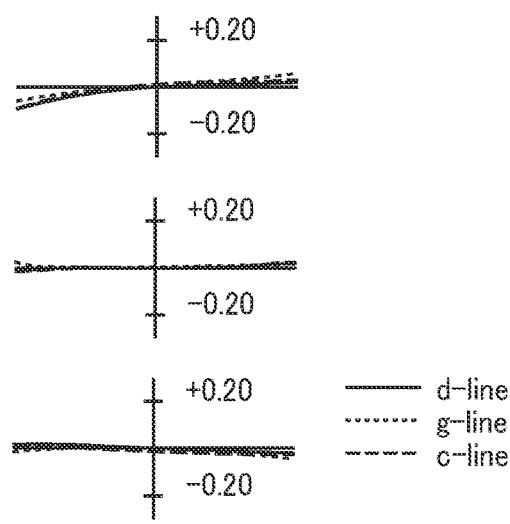
FIG. 41 is a collection of lateral aberration diagrams of the zoom lens system in the state illustrated in FIG. 40 during the drive of vibration isolation of ±0.3°.

FIG. 41 is a collection of lateral aberration diagrams of the zoom lens system in the state illustrated in FIG. 39 during the drive of vibration isolation of ±0.3°.

Tables 9, 10, 11, and 12 represent surface data, various data, zoom lens group data, and principal point position data. In Table 12, the term "P.P." stands for principal point, and the term "P.P. interval" refers to the distance between the principal points. Further, the terms "Initial" and "Final" refer to the "initial lens surface" and "final lens surface", respectively.

The zoom lens system according to Numerical Example 3 includes a first lens group G1 having positive refractive power, a second lens group G2 having negative refractive power, and a rear lens group (subsequent lens group) GR, which are arranged in that order from the object side. The subsequent lens group GR includes, in order from the object side, a third lens group G3 having positive refractive power, a fourth lens group G4 having negative refractive power, and a fifth lens G5 having negative refractive power. That is, the zoom lens system has a zoom lens configuration including the five groups of positive, negative, positive, negative, and negative refractive power.

The first lens group G1 includes a positive biconvex lens 11C, a negative meniscus lens 12C with a convex surface facing the object side, and a positive meniscus lens 13C with a convex surface facing the object side, which are arranged in that order from the object side. The negative meniscus lens 12C and the positive meniscus lens 13C are cemented to each other.

The second lens group G2 consists of a second lens group-a G2a having positive refractive power, a second lens group-b G2b having negative refractive power, and a second lens group-c G2c having negative refractive power, which are arranged in that order from the object side.

The second lens group-a G2a includes a negative meniscus lens 21C with a convex surface facing the object side and a positive biconvex lens 22C, which are arranged in that order from the object side. The negative meniscus lens 21C and the positive biconvex lens 22C are cemented to each other.

The second lens group-b G2b includes a negative biconcave lens 23C, and a positive meniscus lens 24C with a convex surface facing the object side arranged in that order from the object side.

The second lens group-c G2c includes a negative biconcave lens 25C, a negative biconcave lens 26C, and a positive meniscus lens 27C with a convex surface facing the object side, which are arranged in that order from the object side. The negative biconcave lens 26C and the positive meniscus lens 27C are cemented to each other.

The third lens group G3 includes a positive biconvex lens 31C, a positive biconvex lens 32C, and a negative meniscus lens 33C having a convex surface facing the image side, which are arranged in that order from the object side. The positive biconvex lens 32C and the negative meniscus lens 33C are cemented to each other.

The fourth lens group G4 includes a fourth lens group-a G4a having positive refractive power and a fourth lens group-b G4b having negative refractive power, which are arranged in that order from the object side.

The fourth lens group-a G4a includes a negative biconcave lens 41C, a positive biconvex lens 42C, and a positive biconvex lens 43C, which are arranged in that order from the object side.

The fourth lens group-b G4b includes a positive meniscus lens 44C with a convex surface facing the image side and a negative biconcave lens 45C, which are arranged in that order from the object side.

The fifth lens group G5 includes a positive biconvex lens 51C, a negative meniscus lens 52C with a convex surface facing the image side, a negative meniscus lens 53C with a convex surface facing the image side, and a positive biconvex lens 54C, which are arranged in that order from the object side. The positive biconvex lens 51C and the negative meniscus lens 52C are cemented to each other.

TABLE 9

Surface Data

| Surface Number | r | D | N(d) | ν(d) |
|---|---|---|---|---|
| 1 | 186.417 | 4.050 | 1.48749 | 70.2 |
| 2 | −1822.306 | 0.200 | | |
| 3 | 95.344 | 1.950 | 1.73800 | 32.3 |
| 4 | 59.003 | 7.420 | 1.49700 | 81.6 |
| 5 | 4141.382 | D5 | | |
| 6 | 98.011 | 1.340 | 1.73800 | 32.3 |
| 7 | 65.395 | 4.000 | 1.65160 | 58.5 |
| 8 | −1355.397 | D8 | | |
| 9 | −209.666 | 1.000 | 1.65160 | 58.5 |
| 10 | 23.388 | 1.400 | | |
| 11 | 23.552 | 2.600 | 1.80518 | 25.4 |
| 12 | 37.887 | D12 | | |
| 13 | −149.496 | 1.000 | 1.95375 | 32.3 |
| 14 | 108.565 | 2.000 | | |
| 15 | −90.953 | 1.200 | 1.80400 | 46.5 |
| 16 | 40.982 | 2.400 | 1.80810 | 22.8 |
| 17 | 853.949 | D17 | | |
| 18 Stop | INFINITY | 2.000 | | |
| 19 | 63.174 | 3.930 | 1.80400 | 46.5 |
| 20 | −84.994 | 0.200 | | |

TABLE 9-continued

Surface Data

| Surface Number | r | D | N(d) | v(d) |
|---|---|---|---|---|
| 21 | 48.043 | 5.260 | 1.59522 | 67.7 |
| 22 | -43.499 | 1.200 | 2.00069 | 25.5 |
| 23 | -376.671 | D23 | | |
| 24 | -110.331 | 1.000 | 1.90366 | 31.3 |
| 25 | 110.962 | 1.280 | | |
| 26 | 71.711 | 3.040 | 1.59410 | 60.5 |
| 27 | -224.850 | 0.200 | | |
| 28 | 58.111 | 3.000 | 1.80400 | 46.5 |
| 29 | -261.671 | 2.000 | | |
| 30 | -279.636 | 1.800 | 1.80518 | 25.4 |
| 31 | -50.194 | 1.200 | | |
| 32 | -46.652 | 0.950 | 1.77250 | 49.6 |
| 33 | 45.680 | D33 | | |
| 34 | 109.803 | 6.560 | 1.60342 | 38.0 |
| 35 | -22.102 | 1.200 | 1.91082 | 35.2 |
| 36 | -56.098 | 2.515 | | |
| 37 | -27.654 | 1.150 | 1.83481 | 42.7 |
| 38 | -93.015 | 0.200 | | |
| 39 | 5565.113 | 3.900 | 1.64769 | 33.8 |
| 40 | -53.577 | D40 | | |
| 41 | INFINITY | 1.500 | 1.51633 | 64.1 |
| 42 | INFINITY | — | | |

TABLE 10

Various Data

Zoom Ratio 4.04

| | Short Focal Length End | Mid-Focal Length | Long Focal Length End |
|---|---|---|---|
| Focused on Infinity | | | |
| F-NUMBER | 4.6 | 5.1 | 5.8 |
| Focal Length | 72.08 | 135.00 | 291.30 |
| Object-Image Distance | INFINITY | INFINITY | INFINITY |
| Magnification | 0.000 | 0.000 | 0.000 |
| Half Angle of View | 16.5 | 8.8 | 4.1 |
| Image Height | 21.64 | 21.64 | 21.64 |
| Back Focus | 40.25 | 49.59 | 62.32 |
| Total Lens Length | 193.46 | 226.53 | 252.89 |
| D5 | 2.950 | 36.022 | 62.381 |
| D8 | 3.000 | 3.000 | 3.000 |
| D12 | 16.460 | 16.460 | 16.460 |
| D17 | 24.079 | 14.732 | 2.000 |
| D23 | 4.659 | 14.007 | 26.737 |
| D33 | 28.918 | 19.570 | 6.840 |
| D40 | 38.256 | 47.605 | 60.335 |
| Focused on 1.2 m | | | |
| F-NUMBER | 4.6 | 5.1 | 5.8 |
| Focal Length | 80.18 | 138.28 | 189.66 |
| Object-Image Distance | 1200.00 | 1200.00 | 1200.00 |
| Magnification | -0.079 | -0.148 | -0.312 |
| Half Angle of View | 13.7 | 7.0 | 3.2 |
| Image Height | 21.64 | 21.64 | 21.64 |
| Back Focus | 40.25 | 49.59 | 62.32 |
| Total Lens Length | 193.46 | 226.53 | 252.89 |
| D5 | 2.950 | 36.022 | 62.381 |
| D8 | 9.840 | 11.703 | 14.414 |
| D12 | 9.622 | 6.758 | 4.046 |
| D17 | 24.079 | 14.732 | 2.000 |
| D23 | 4.659 | 14.007 | 26.737 |
| D33 | 28.918 | 19.570 | 6.840 |
| D40 | 38.256 | 47.605 | 60.335 |

TABLE 11

Zoom Lens Group Data

| Group | Initial Surface | Focal Length |
|---|---|---|
| 1 | 1 | 155.21 |
| 2 | 6 | -25.78 |
| 3 | 19 | 35.50 |
| 4 | 24 | -151.03 |
| 5 | 34 | -6472.48 |
| 2a | 6 | 149.55 |
| 2b | 9 | -57.62 |
| 2c | 13 | -39.60 |
| Vibration-Isolating | 30 | -50.36 |

TABLE 12

Principal Point Position Data

| Initial | Final | Focal Length | Front P.P. | P.P. Interval | Rear P.P. | |
|---|---|---|---|---|---|---|
| Zoom Lens Group | | | | | | |
| 1 | 5 | 155.206 | 0.910 | 4.632 | 8.078 | First Group |
| 6 | 17 | -25.779 | 22.623 | 6.738 | 7.039 | Second Group |
| 18 | 23 | 35.500 | 2.530 | 4.398 | 5.662 | Third Group |
| 24 | 33 | -151.031 | 17.072 | 4.071 | -6.673 | Fourth Group |
| 34 | 40 | -6472.478 | -39.590 | 4.357 | 50.758 | Fifth Group |
| Sub-lens group | | | | | | |
| 6 | 8 | 149.545 | 0.077 | 2.143 | 3.120 | 2a sub-lens group |
| 9 | 12 | -57.617 | 1.131 | 1.650 | 2.219 | 2b Sub-lens group |
| 13 | 17 | -39.604 | 1.219 | 2.134 | 3.247 | 2c Sub-lens group |
| 6 | 12 | -101.756 | 12.882 | 3.172 | -2.714 | 2ab Sub-lens group |
| 9 | 17 | -19.483 | 10.920 | 7.164 | 9.976 | 2bc Sub-lens group |

FIGS. 42 to 52 and Tables 13 to 16 pertain to the zoom lens system according to Numerical Example 4.

Figure 42:
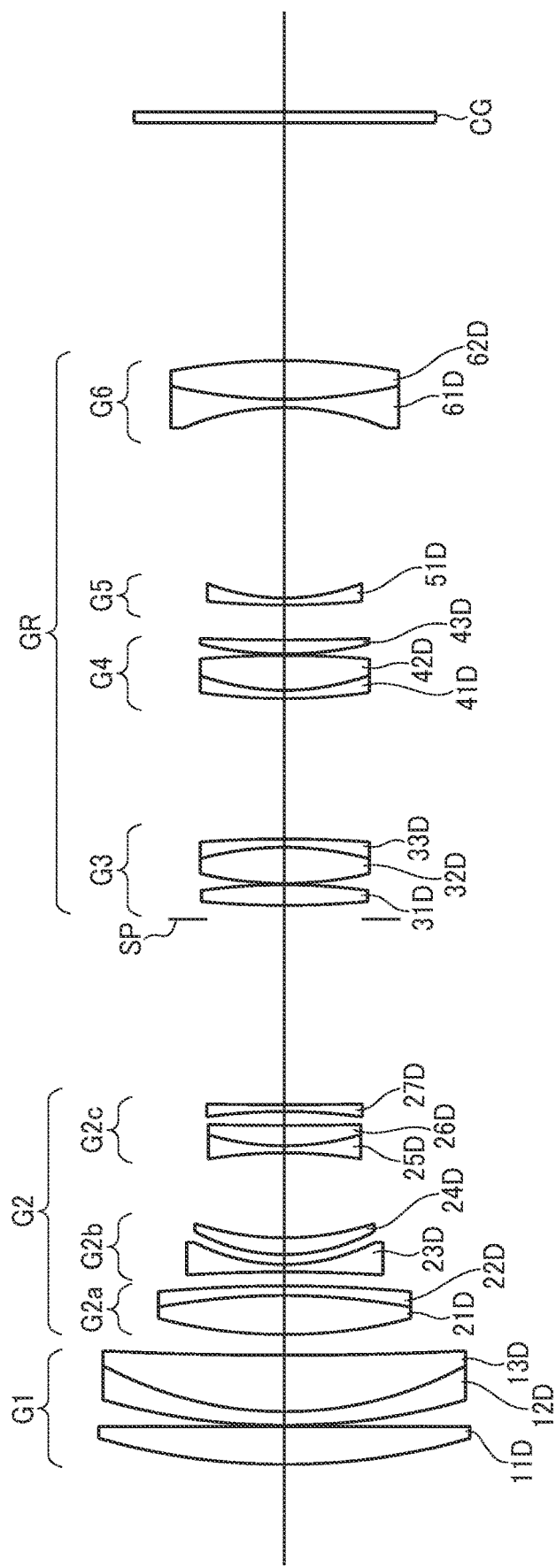
FIG. 42 is a diagram of a configuration of the zoom lens system according to Numerical Example 4 focused on infinity at the short focal length end.

FIG. 42 is an illustration of the configuration of the zoom lens system focused on infinity at the short focal length end.

Figure 43:
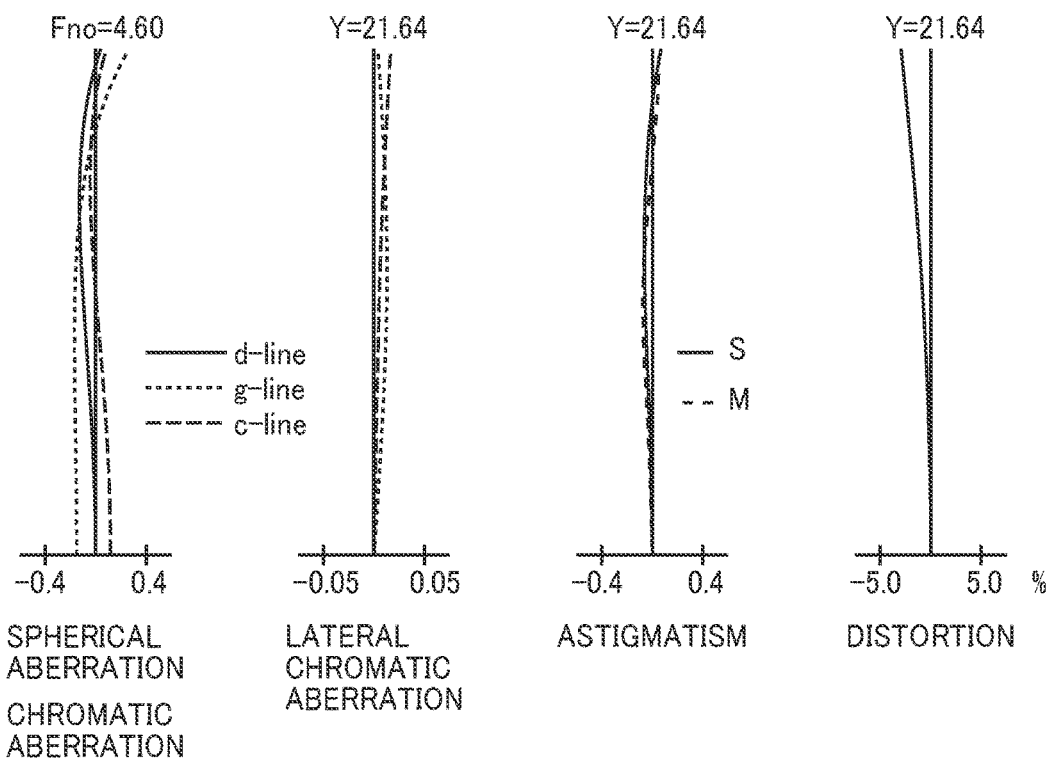
FIG. 43 is a collection of longitudinal aberration diagrams of the zoom lens system according to Numerical Example 4 focused on infinity at the short focal length end.
Figure 44:
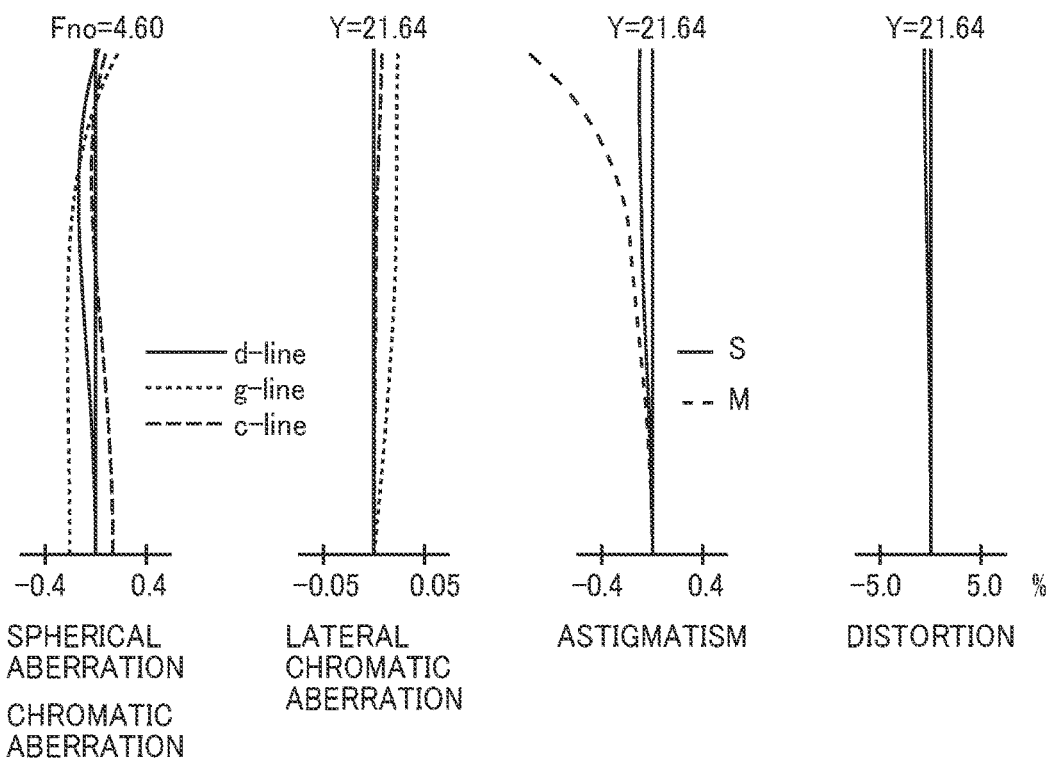
FIG. 44 is a collection of longitudinal aberration diagrams of the zoom lens system according to Numerical Example 4 focused on 1.2 m at the short focal length end.

FIGS. 43 and 44 are longitudinal aberration diagrams of the zoom lens system focused on infinity and 1.2 m at the short focal length end, respectively.

Figure 45:
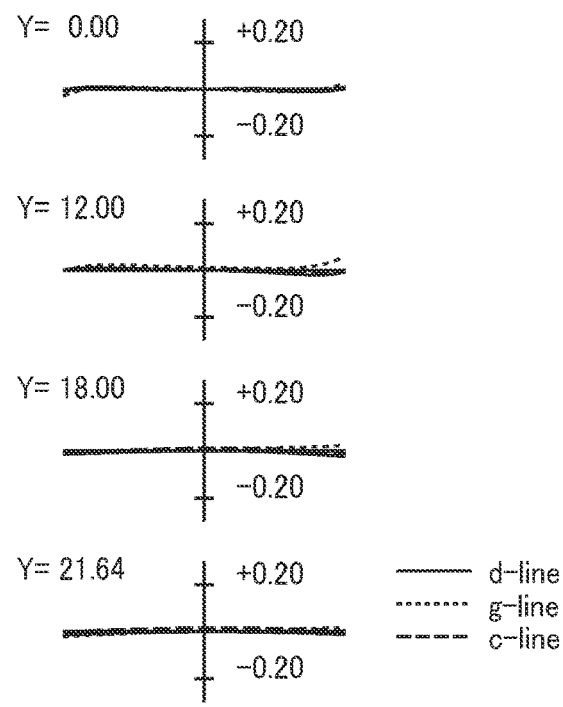
FIG. 45 is a collection of lateral aberration diagrams of the zoom lens system according to Numerical Example 4 focused on infinity at the short focal length end.
Figure 46:
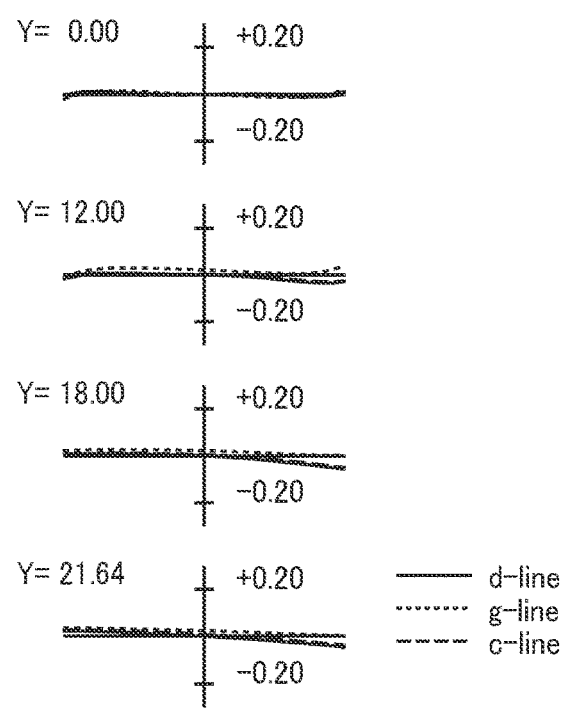
FIG. 46 is a collection of lateral aberration diagrams of the zoom lens system according to Numerical Example 4 focused on 1.2 m at the short focal length end.

FIGS. 45 and 46 are lateral aberration diagrams of the zoom lens system focused on infinity and 1.2 m at the short focal length end, respectively.

Figure 47:
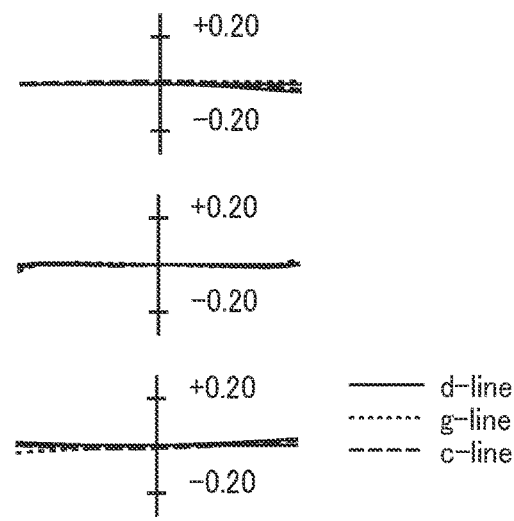
FIG. 47 is a collection of lateral aberration diagrams of the zoom lens system in the state illustrated in FIG. 45 during the drive of vibration isolation.

FIG. 47 is a collection of lateral aberration diagrams of the zoom lens system in the state of FIG. 45 during the drive of vibration isolation.

Figure 48:
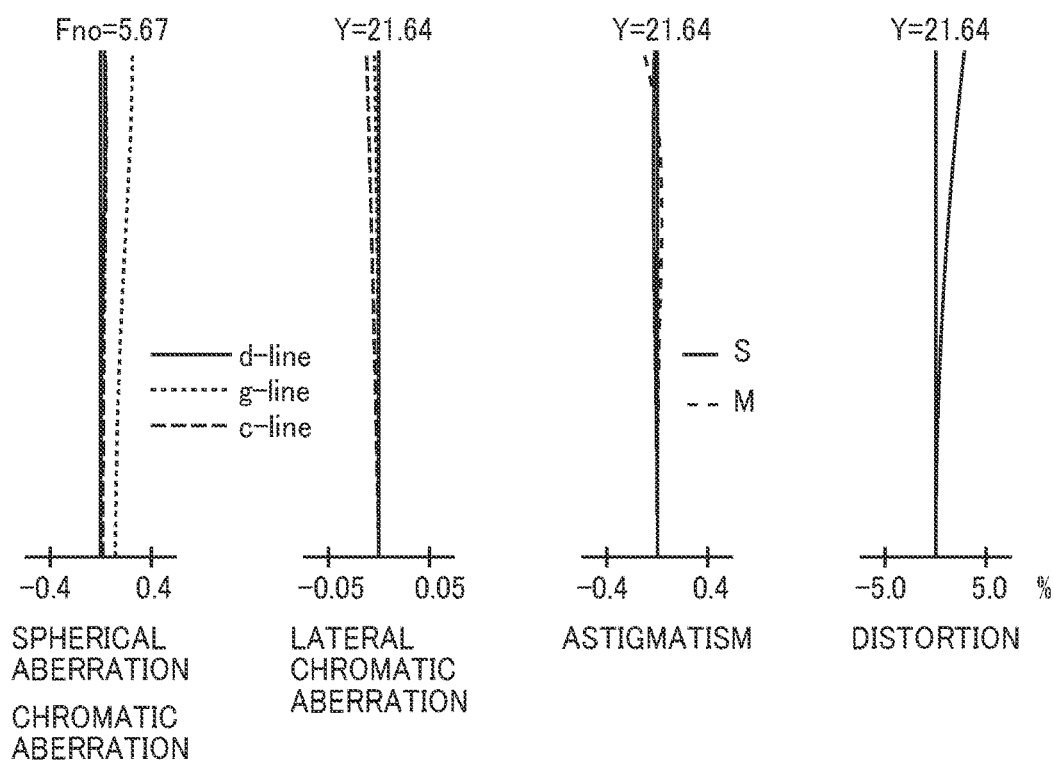
FIG. 48 is a collection of longitudinal aberration diagrams of the zoom lens system according to Numerical Example 4 focused on infinity at the long focal length end.
Figure 49:
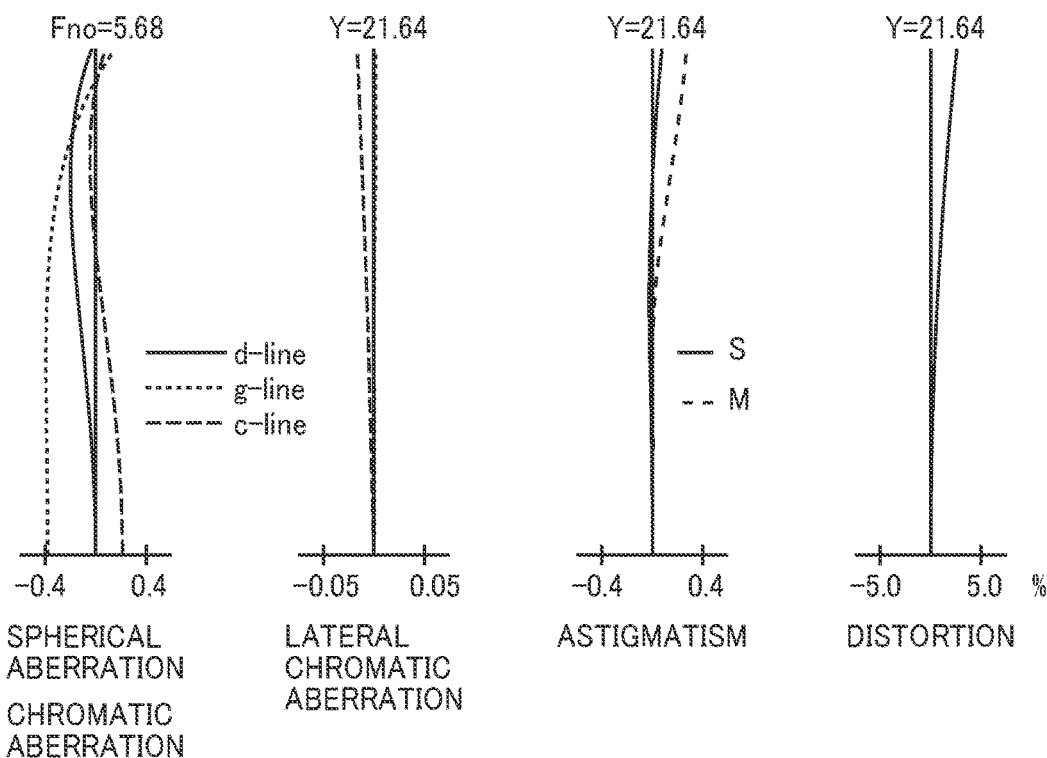
FIG. 49 is a collection of longitudinal aberration diagrams of the zoom lens system according to Numerical Example 4 focused on 1.2 m at the long focal length end.

FIGS. 48 and 49 are longitudinal aberration diagrams of the zoom lens system focused on infinity and 1.2 m at the long focal length end, respectively.

Figure 50:
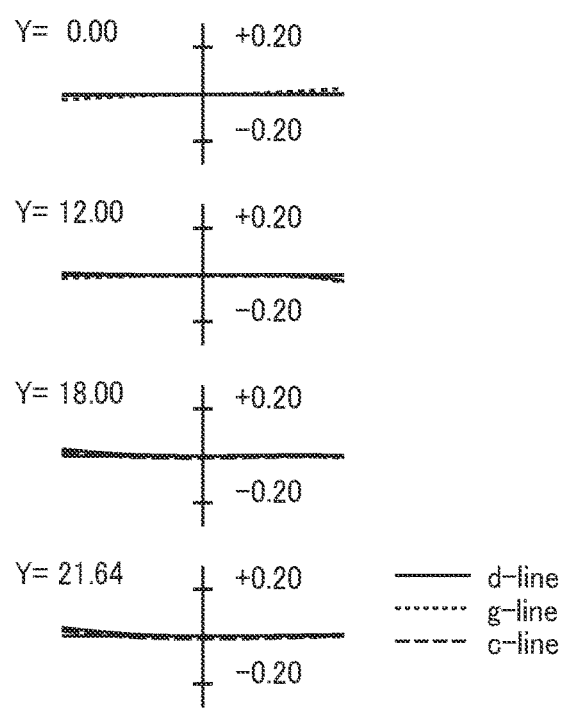
FIG. 50 is a collection of lateral aberration diagrams of the zoom lens system according to Numerical Example 4 focused on infinity at the long focal length end.
Figure 51:
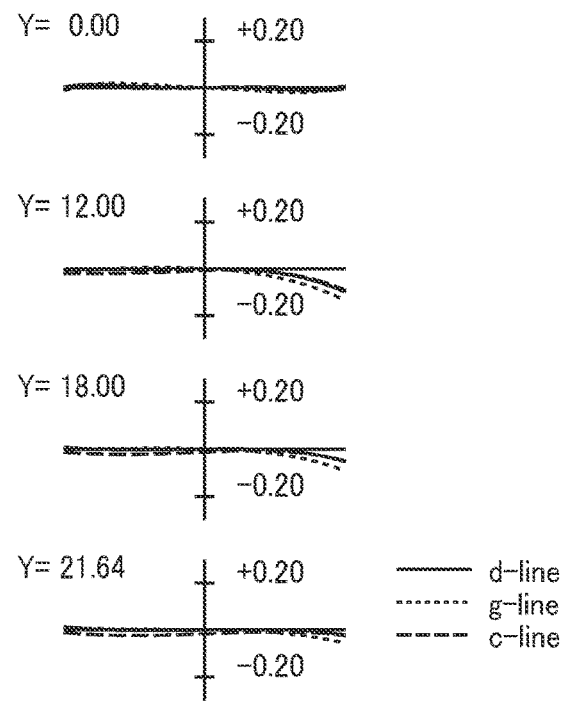
FIG. 51 is a collection of lateral aberration diagrams of the zoom lens system according to Numerical Example 4 focused on 1.2 m at the long focal length end.

FIGS. 50 and 51 are lateral aberration diagrams of the zoom lens system focused on infinity and 1.2 m at the long focal length end, respectively.

Figure 52:
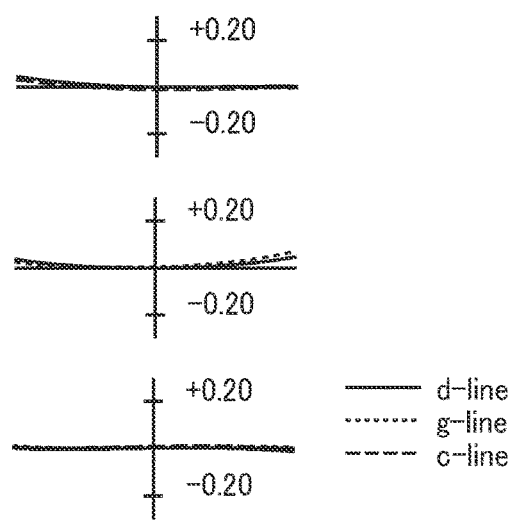
FIG. 52 is a collection of lateral aberration diagrams of the zoom lens system in the state illustrated in FIG. 50 during the drive of vibration isolation of ±0.3°.

FIG. 52 is a collection of lateral aberration diagrams of the zoom lens system in the state illustrated in FIG. 50 during the drive of vibration isolation of ±0.3°.

Tables 13, 14, 15, and 16 represent surface data, various data, zoom lens group data, and principal point position data. In Table 16, the term "P.P." stands for principal point, and the term "P.P. interval" refers to the distance between the principal points. Further, the terms "Initial" and "Final" refer to the "initial lens surface" and "final lens surface", respectively.

The zoom lens system according to Numerical Example 4 includes a first lens group G1 having positive refractive power, a second lens group G2 having negative refractive power, and a rear lens group (subsequent lens group) GR, which are arranged in that order from the object side. The subsequent lens group GR includes, in order from the object side, the third lens group G3 having positive refractive power, the fourth lens group G4 having positive refractive power, the fifth lens G5 having negative refractive power, and the sixth lens group G6 having negative refractive power. That is, the zoom lens system has a zoom lens configuration including the five groups of positive, negative, positive, positive, negative, and negative refractive power.

The first lens group G1 includes a positive plano-convex lens 11D with a convex surface facing the object side, a negative meniscus lens 12D with a convex surface facing the object side, and a positive meniscus lens 13D with a convex surface facing the object side, which are arranged in that order from the object side. The negative meniscus lens 12D and the positive meniscus lens 13D are cemented to each other.

The second lens group G2 consists of a second lens group-a G2a having positive refractive power, a second lens group-b G2b having negative refractive power, and a second lens group-c G2c having negative refractive power, which are arranged in that order from the object side.

The second lens group-a G2a includes a positive biconvex lens 21D and a negative meniscus lens 22D with a convex surface facing the image side, which are arranged in that order from the object side. The positive biconvex lens 21C and the negative meniscus lens 22C are cemented to each other.

The second lens group-b G2b includes a negative biconcave lens 23D, and a positive meniscus lens 24D with a convex surface facing the object side arranged in that order from the object side.

The second lens group-c G2c includes a negative biconcave lens 25D, a positive meniscus lens 26D with a convex surface facing the object side, and a negative biconcave lens 27D, which are arranged in that order from the object side. The negative biconcave lens 25D and the positive meniscus lens 26D are cemented to each other.

The third lens group G3 includes a positive biconvex lens 31D, a positive biconvex lens 32D, and a negative meniscus lens 33D having a convex surface facing the image side, which are arranged in that order from the object side. The positive biconvex lens 32D and the negative meniscus lens 33D are cemented to each other.

The fourth lens group G4 includes a negative meniscus lens 41D with a convex surface facing the object side, a positive biconvex lens 42D, and a positive meniscus lens 43D with a convex surface facing the object side, which are arranged in that order from the object side. The negative meniscus lens 41D and the positive biconvex lens 42D are cemented to each other.

The fifth lens group G5 includes a negative meniscus lens 51D with a convex surface facing the object side.

The sixth lens group G6 includes a negative biconcave lens 61D and a positive biconvex lens 62D, which are arranged in that order from the object side. The negative biconcave lens 61D and the positive biconvex lens 62D are cemented to each other.

TABLE 13

Surface Data

| Surface Number | r | D | N(d) | v(d) |
|---|---|---|---|---|
| 1 | 95.549 | 5.400 | 1.48749 | 70.2 |
| 2 | INFINITY | 0.200 | | |
| 3 | 93.980 | 1.950 | 1.83400 | 37.2 |

TABLE 13-continued

Surface Data

| Surface Number | r | D | N(d) | v(d) |
|---|---|---|---|---|
| 4 | 54.009 | 8.100 | 1.49700 | 81.6 |
| 5 | 538.374 | D5 | | |
| 6 | 71.512 | 5.590 | 1.51823 | 59.0 |
| 7 | −98.080 | 1.380 | 1.95375 | 32.3 |
| 8 | −194.492 | D8 | | |
| 9 | −230.444 | 1.000 | 1.75500 | 52.3 |
| 10 | 27.962 | 1.400 | | |
| 11 | 26.420 | 2.400 | 1.84666 | 23.8 |
| 12 | 41.166 | D12 | | |
| 13 | −67.460 | 1.000 | 1.78800 | 47.4 |
| 14 | 38.494 | 2.900 | 1.85478 | 24.8 |
| 15 | 427.561 | 2.000 | | |
| 16 | −83.084 | 1.000 | 1.83481 | 42.7 |
| 17 | 873.197 | D17 | | |
| 18 Stop | INFINITY | 2.000 | | |
| 19 | 127.859 | 2.930 | 1.80400 | 46.5 |
| 20 | −88.194 | 0.200 | | |
| 21 | 51.974 | 5.170 | 1.49700 | 81.6 |
| 22 | −44.897 | 1.200 | 1.90366 | 31.3 |
| 23 | −162.261 | D23 | | |
| 24 | 81.995 | 1.200 | 2.00100 | 29.1 |
| 25 | 35.316 | 5.000 | 1.48749 | 70.2 |
| 26 | −133.881 | 0.200 | | |
| 27 | 52.803 | 2.000 | 1.90043 | 37.4 |
| 28 | 336.536 | D28 | | |
| 29 | 111.476 | 1.000 | 1.66672 | 48.3 |
| 30 | 30.261 | D30 | | |
| 31 | −37.239 | 1.200 | 1.48749 | 70.2 |
| 32 | 70.193 | 5.550 | 1.76200 | 40.1 |
| 33 | −87.277 | D33 | | |
| 34 | INFINITY | 1.500 | 1.51633 | 64.1 |
| 35 | INFINITY | — | | |

TABLE 14

Various Data

Zoom Ratio 4.04

| | Short Focal Length End | Mid-Focal Length | Long Focal Length End |
|---|---|---|---|
| | Focused on Infinity | | |
| F-NUMBER | 4.6 | 5.2 | 5.7 |
| Focal Length | 72.08 | 135.00 | 291.30 |
| Object-Image Distance | INFINITY | INFINITY | INFINITY |
| Magnification | 0.000 | 0.000 | 0.000 |
| Half Angle of View | 17.2 | 9.0 | 4.1 |
| Image Height | 21.64 | 21.64 | 21.64 |
| Back Focus | 35.96 | 52.45 | 60.50 |
| Total Lens Length | 193.71 | 219.79 | 248.87 |
| D5 | 2.950 | 29.033 | 58.110 |
| D8 | 2.000 | 2.000 | 2.000 |
| D12 | 12.183 | 12.183 | 12.183 |
| D17 | 26.445 | 14.029 | 2.000 |
| D23 | 20.007 | 15.936 | 19.919 |
| D28 | 5.000 | 6.860 | 2.074 |
| D30 | 27.189 | 25.329 | 30.115 |
| D33 | 33.975 | 50.463 | 58.510 |
| | Focused on 1.2 m | | |
| F-NUMBER | 4.6 | 5.2 | 5.7 |
| Focal Length | 79.46 | 137.92 | 206.36 |
| Object-Image Distance | 1200.00 | 1200.00 | 1200.00 |
| Magnification | −0.077 | −0.145 | −0.306 |
| Half Angle of View | 14.5 | 7.4 | 3.3 |
| Image Height | 21.64 | 21.64 | 21.64 |

TABLE 14-continued

| | | | |
|---|---|---|---|
| Back Focus | 35.96 | 52.45 | 60.50 |
| Total Lens Length | 193.71 | 219.79 | 248.87 |
| D5 | 2.950 | 29.033 | 58.110 |
| D8 | 7.578 | 9.026 | 11.976 |
| D12 | 6.605 | 5.157 | 2.207 |
| D17 | 26.445 | 14.029 | 2.000 |
| D23 | 20.007 | 15.936 | 19.919 |
| D28 | 5.000 | 6.860 | 2.074 |
| D30 | 27.189 | 25.329 | 30.115 |
| D33 | 33.975 | 50.463 | 58.510 |

TABLE 15

Zoom Lens Group Data

| Group | Initial Surface | Focal Length |
|---|---|---|
| 1 | 1 | 144.43 |
| 2 | 6 | −28.06 |
| 3 | 19 | 46.42 |
| 4 | 24 | 63.12 |
| 5 | 29 | −62.61 |
| 6 | 31 | −15551.99 |
| 2a | 6 | 130.08 |
| 2b | 9 | −54.78 |
| 2c | 13 | −42.55 |
| Vibration-Isolating | 13 | −42.55 |

TABLE 16

Principal Point Position Data

| Initial | Final | Focal Length | Front P.P. | P.P. Interval | Rear P.P. | |
|---|---|---|---|---|---|---|
| Zoom Lens Group | | | | | | |
| 1 | 5 | 144.428 | −0.835 | 5.465 | 11.019 | First Group |
| 6 | 17 | −28.060 | 20.760 | 6.612 | 5.481 | Second Group |
| 18 | 23 | 46.415 | 2.825 | 3.607 | 5.068 | Third Group |
| 24 | 28 | 63.118 | 4.004 | 3.161 | 1.234 | Fourth Group |
| 29 | 30 | −62.608 | 0.828 | 0.397 | −0.225 | Fifth Group |
| 31 | 33 | −15551.988 | −584.947 | −20.212 | 611.909 | Sixth Group |
| Sub-lens group | | | | | | |
| 6 | 8 | 130.079 | 0.680 | 2.551 | 3.739 | 2a Sub-lens group |
| 9 | 12 | −54.776 | 0.984 | 1.612 | 2.205 | 2b Sub-lens group |
| 13 | 17 | −42.553 | 2.095 | 2.325 | 2.480 | 2c Sub-lens group |
| 6 | 12 | −103.898 | 13.433 | 3.503 | −3.166 | 2ab Sub-lens group |
| 9 | 17 | −20.480 | 8.917 | 6.323 | 8.643 | 2bc Sub-lens group |

TABLE 17

Surface Data

| Surface Number | r | D | N(d) | ν(d) |
|---|---|---|---|---|
| 1 | 120.884 | 5.400 | 1.48749 | 70.2 |
| 2 | INFINITY | 0.200 | | |
| 3 | 109.398 | 1.950 | 1.73800 | 32.3 |
| 4 | 58.845 | 8.100 | 1.53775 | 74.7 |
| 5 | 1249.592 | D5 | | |
| 6 | 81.455 | 5.590 | 1.59410 | 60.5 |
| 7 | −121.229 | 1.380 | 1.90366 | 31.3 |
| 8 | −288.457 | D8 | | |
| 9 | −322.128 | 1.000 | 1.75500 | 52.3 |

TABLE 17-continued

Surface Data

| Surface Number | r | D | N(d) | ν(d) |
|---|---|---|---|---|
| 10 | 26.652 | 1.400 | | |
| 11 | 25.806 | 2.400 | 1.84666 | 23.8 |
| 12 | 42.918 | D12 | | |
| 13 | −58.813 | 1.000 | 1.61997 | 63.9 |
| 14 | −296.883 | 1.300 | | |
| 15 | −187.864 | 1.000 | 1.80400 | 46.5 |
| 16 | 24.516 | 4.100 | 1.80000 | 29.9 |
| 17 | 540.867 | 1.500 | | |
| 18 | −70.350 | 1.000 | 1.88300 | 40.8 |
| 19 | −1156.493 | D19 | | |
| 20 Stop | INFINITY | 2.000 | | |
| 21 | 513.556 | 2.930 | 1.75500 | 52.3 |
| 22 | −57.197 | 0.200 | | |
| 23 | 34.940 | 5.170 | 1.49700 | 81.6 |
| 24 | −52.550 | 1.200 | 1.90366 | 31.3 |
| 25 | 421.282 | 21.661 | | |
| 26 | 118.288 | 1.200 | 2.00100 | 29.1 |
| 27 | 39.474 | 4.500 | 1.48749 | 70.2 |
| 28 | −86.850 | 0.200 | | |
| 29 | 58.198 | 2.500 | 1.85883 | 30.0 |
| 30 | 906.824 | D30 | | |
| 31 | 702.226 | 2.200 | 1.80810 | 22.8 |
| 32 | −52.353 | 1.000 | 1.67270 | 32.1 |
| 33 | 59.484 | D33 | | |
| 34 | −25.672 | 1.200 | 1.48749 | 70.2 |
| 35 | −39.726 | D35 | | |
| 36 | INFINITY | 1.500 | 1.51633 | 64.1 |
| 37 | INFINITY | — | | |

FIGS. 53 to 63 and Tables 17 to 20 pertain to the zoom lens system according to Numerical Example 5

Figure 53:
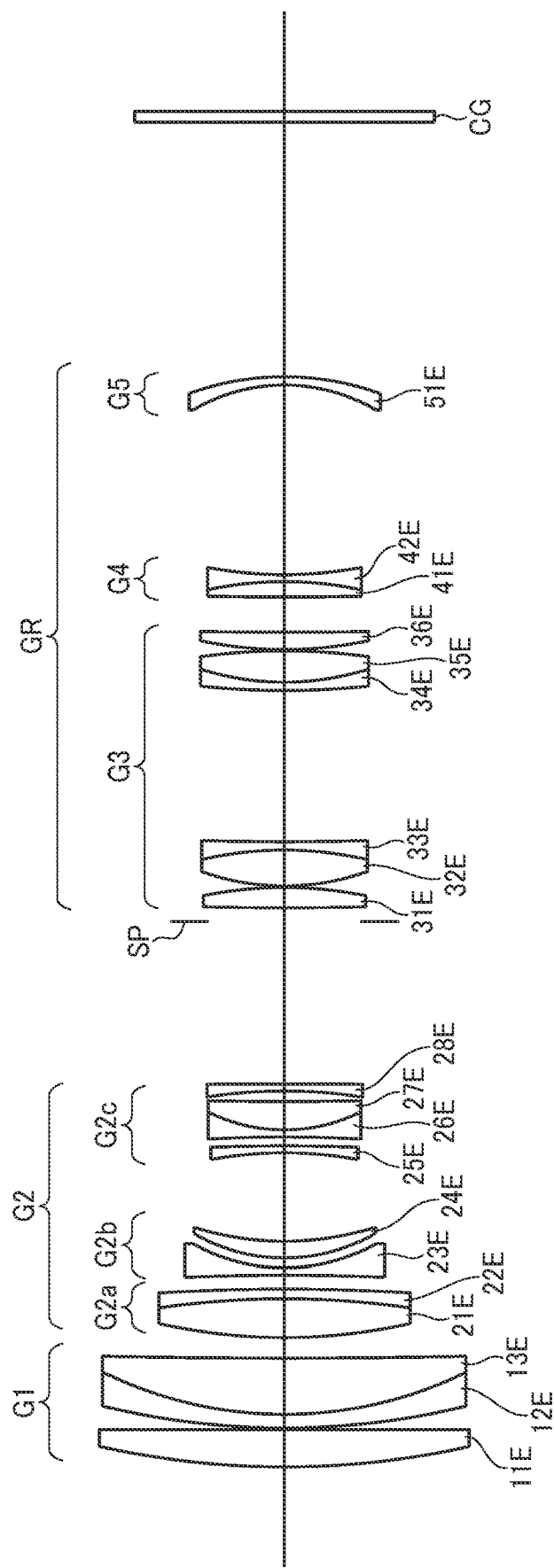
FIG. 53 is a diagram of a configuration of the zoom lens system according to Numerical Example 5 focused on infinity at the short focal length end.

FIG. 53 is an illustration of the configuration of the zoom lens system focused on infinity at the short focal length end.

Figure 54:
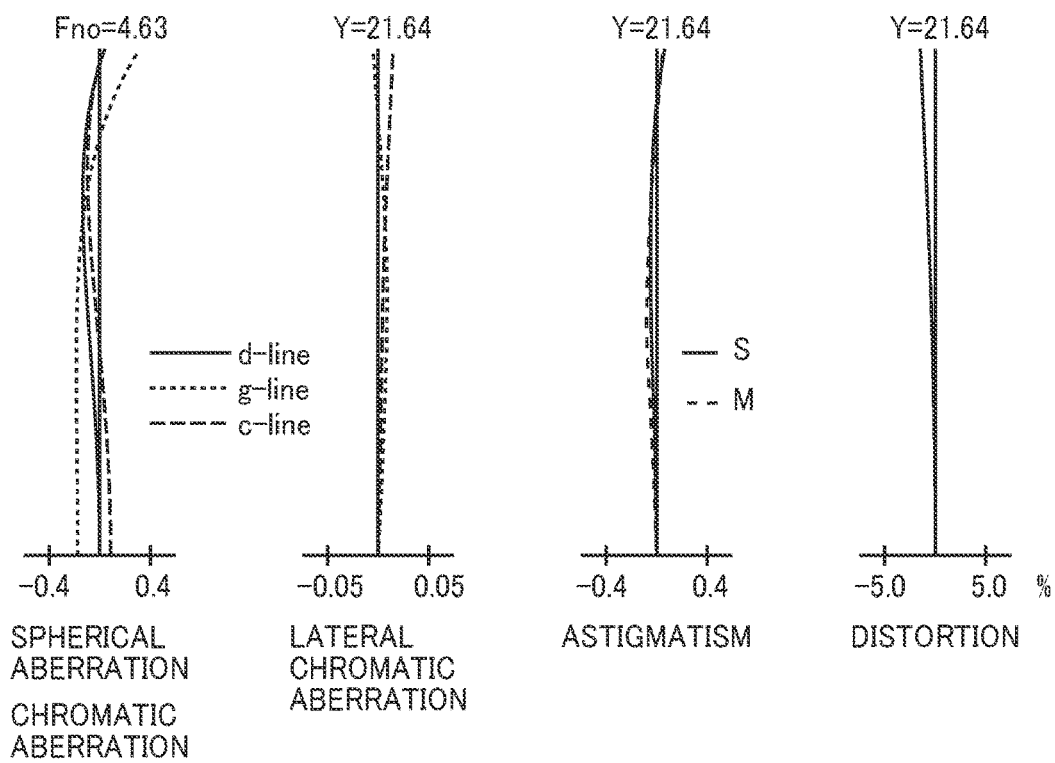
FIG. 54 is a collection of longitudinal aberration diagrams of the zoom lens system according to Numerical Example 5 focused on infinity at the short focal length end.
Figure 55:
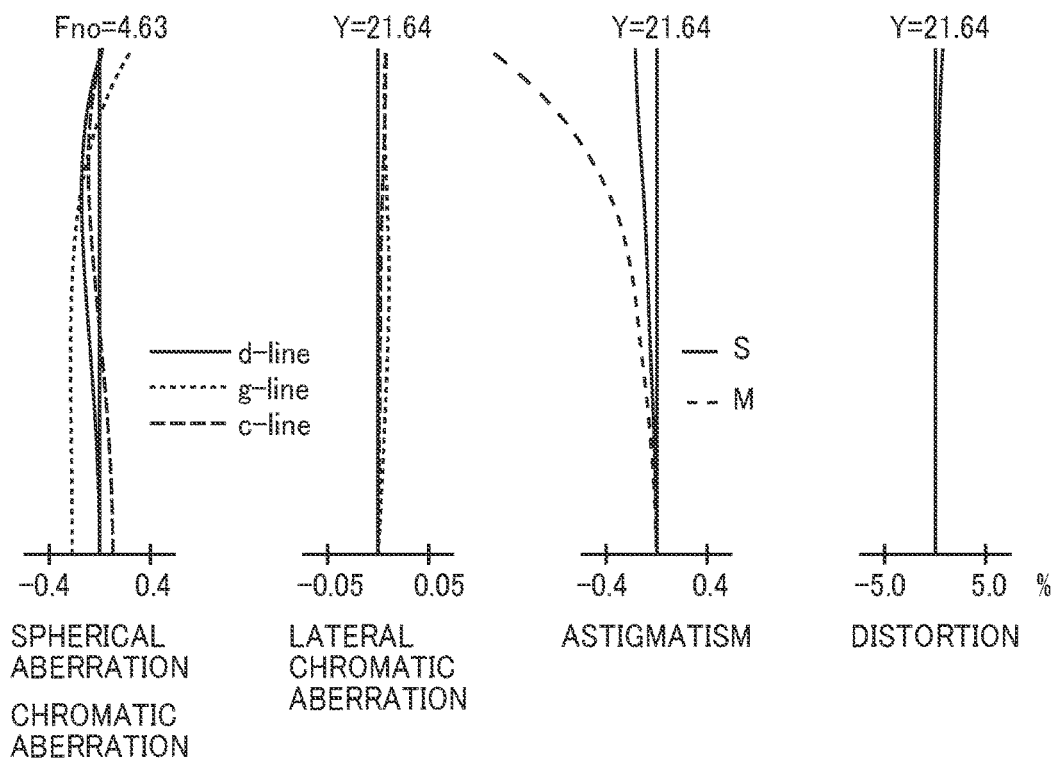
FIG. 55 is a collection of longitudinal aberration diagrams of the zoom lens system according to Numerical Example 5 focused on 1.2 m at the short focal length end.

FIGS. 54 and 55 are longitudinal aberration diagrams of the zoom lens system focused on infinity and 1.2 m at the short focal length end, respectively.

Figure 56:
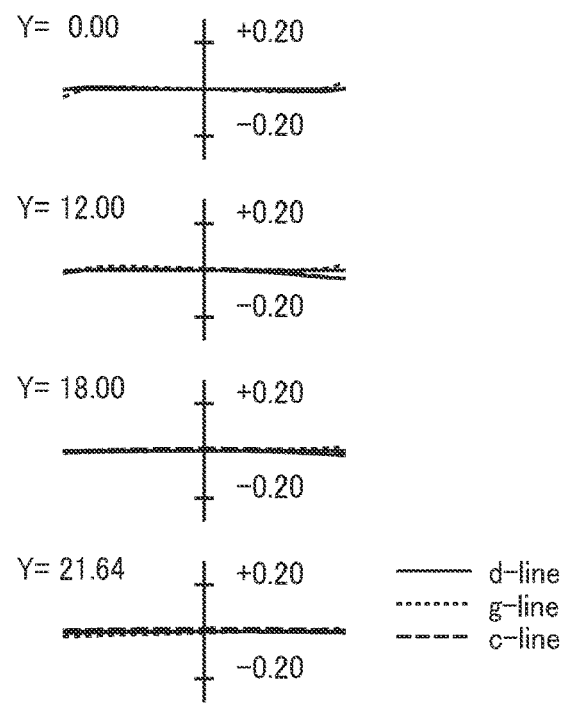
FIG. 56 is a collection of lateral aberration diagrams of the zoom lens system according to Numerical Example 5 focused on infinity at the short focal length end.
Figure 57:
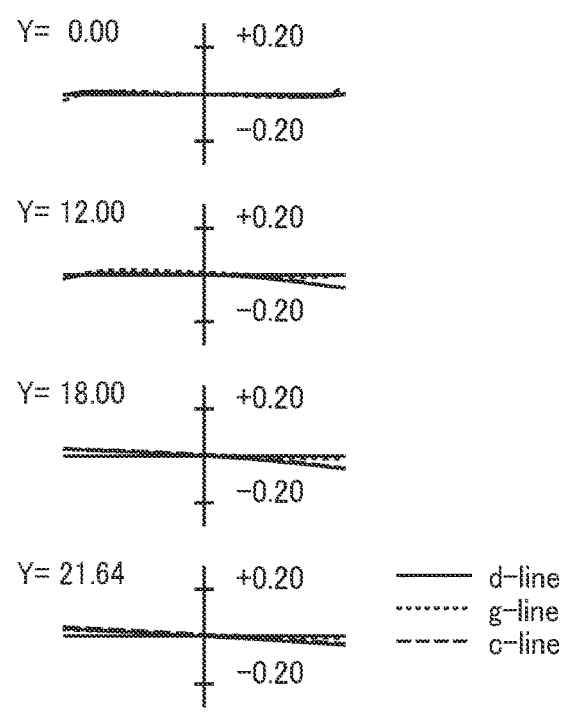
FIG. 57 is a collection of lateral aberration diagrams of the zoom lens system according to Numerical Example 5 focused on 1.2 m at the short focal length end.

FIGS. 56 and 57 are lateral aberration diagrams of the zoom lens system focused on infinity and 1.2 m at the short focal length end, respectively.

Figure 58:
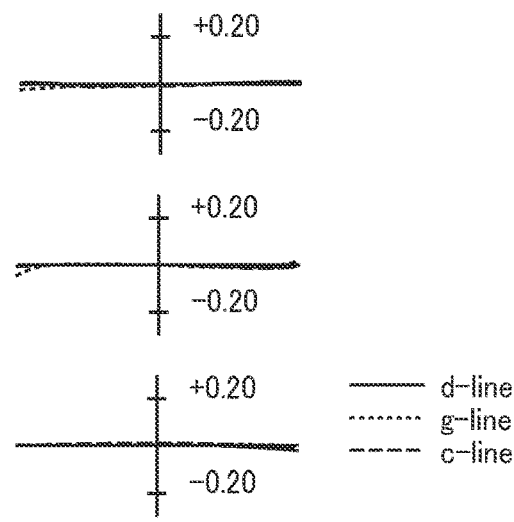
FIG. 58 is a collection of lateral aberration diagrams of the zoom lens system in the state illustrated in FIG. 56 during the drive of vibration isolation.

FIG. 58 is a collection of lateral aberration diagrams of the zoom lens system in the state of FIG. 56 during the drive of vibration isolation.

Figure 59:
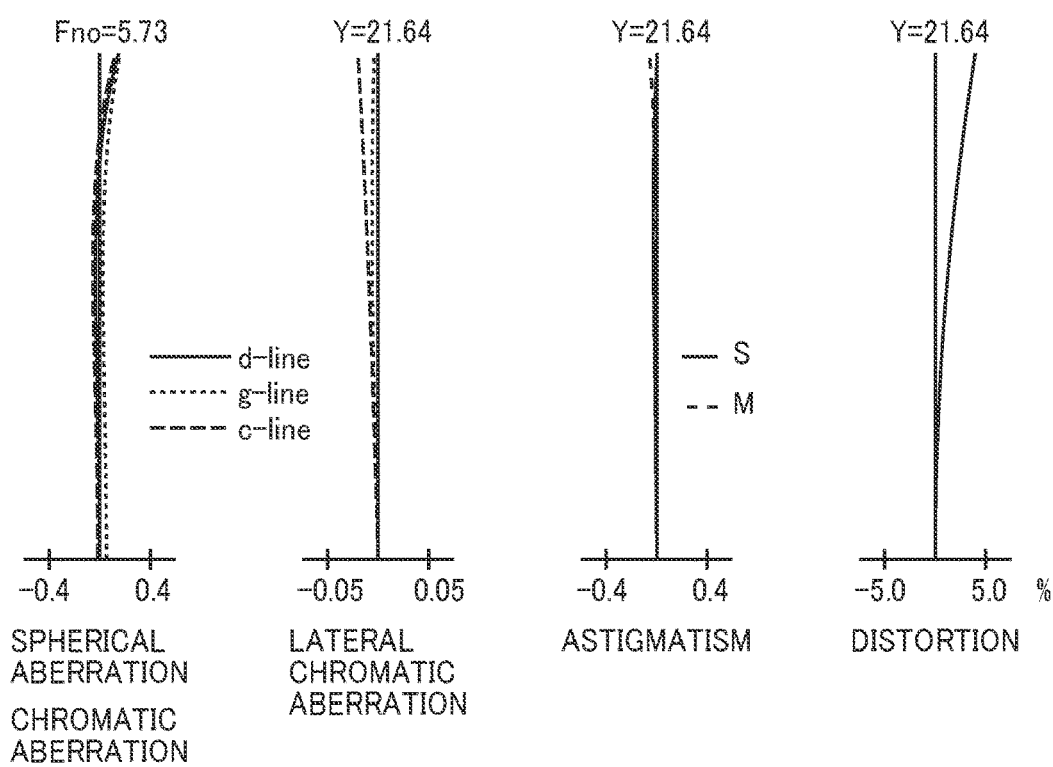
FIG. 59 is a collection of longitudinal aberration diagrams of the zoom lens system according to Numerical Example 5 focused on infinity at the long focal length end.
Figure 60:
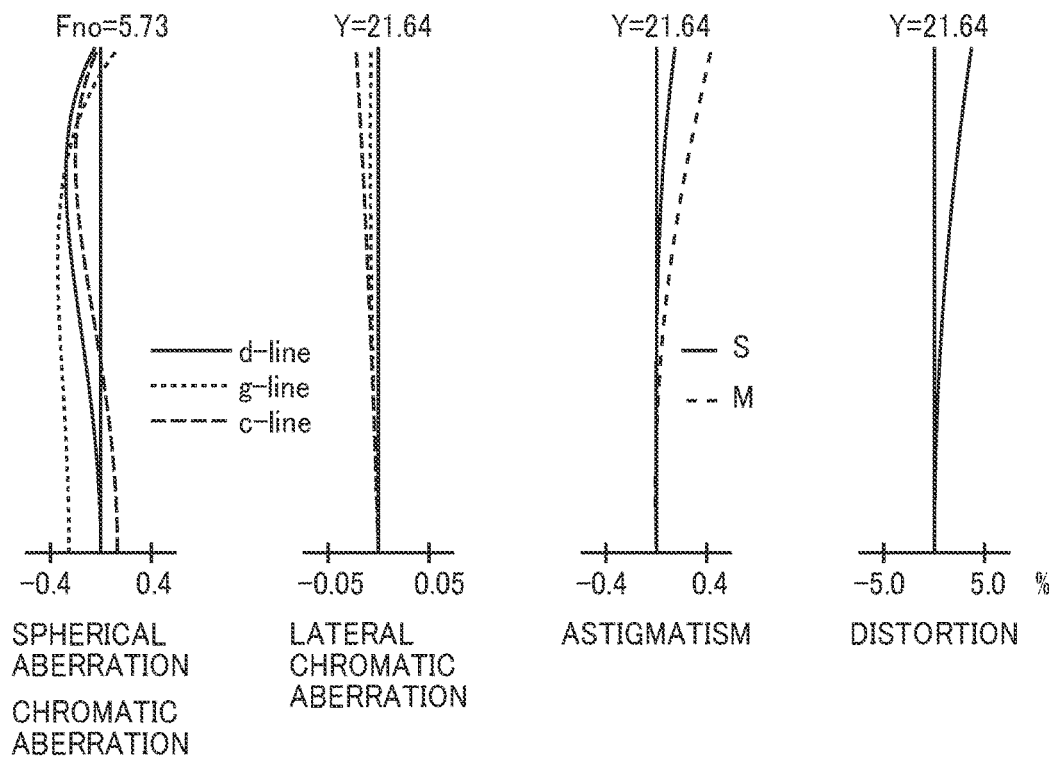
FIG. 60 is a collection of longitudinal aberration diagrams of the zoom lens system according to Numerical Example 5 focused on 1.2 m at the long focal length end.

FIGS. 59 and 60 are longitudinal aberration diagrams of the zoom lens system focused on infinity and 1.2 m at the long focal length end, respectively.

Figure 61:
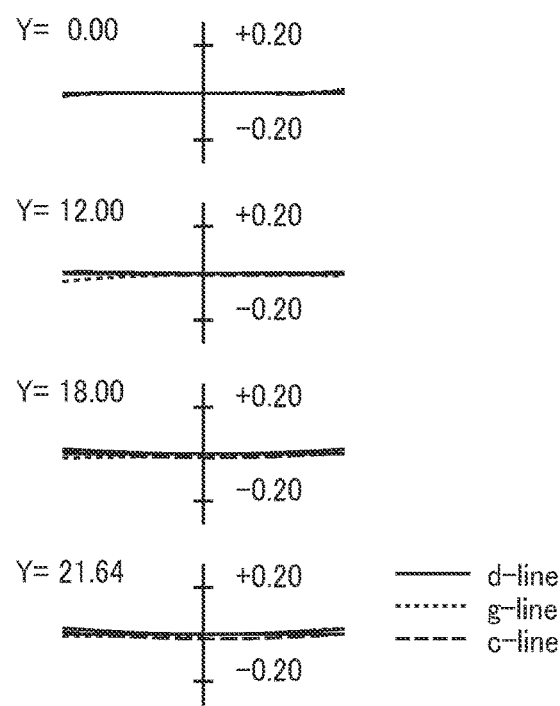
FIG. 61 is a collection of lateral aberration diagrams of the zoom lens system according to Numerical Example 5 focused on infinity at the long focal length end.
Figure 62:
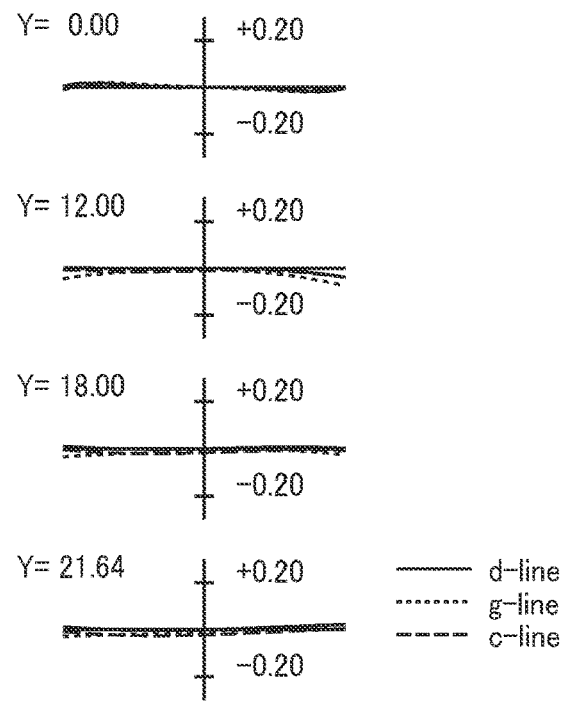
FIG. 62 is a collection of lateral aberration diagrams of the zoom lens system according to Numerical Example 5 focused on 1.2 m at the long focal length end.

FIGS. 61 and 62 are lateral aberration diagrams of the zoom lens system focused on infinity and 1.2 m at the long focal length end, respectively.

Figure 63:
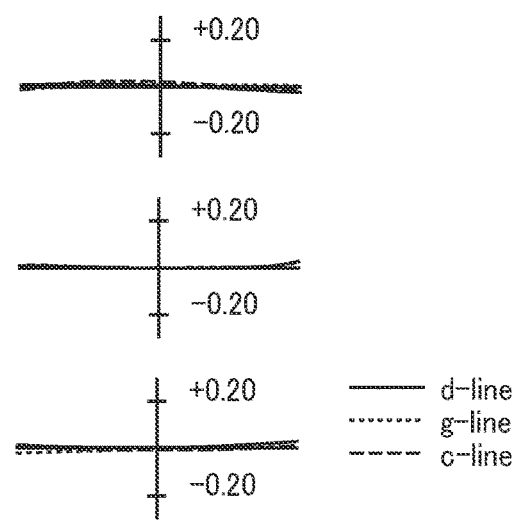
FIG. 63 is a collection of lateral aberration diagrams of the zoom lens system in the state illustrated in FIG. 61 during the drive of vibration isolation of ±0.3°.

FIG. 63 is a collection of lateral aberration diagrams of the zoom lens system in the state illustrated in FIG. 61 during the drive of vibration isolation of ±0.3°.

Tables 17, 18, 19, and 20 represent surface data, various data, zoom lens group data, and principal point position data. In Table 20, the term "P.P." stands for principal point, and the term "P.P. interval" refers to the distance between the principal points. Further, the terms "Initial" and "Final" refer to the "initial lens surface" and "final lens surface", respectively.

The zoom lens system according to Numerical Example 5 includes a first lens group G1 having positive refractive power, a second lens group G2 having negative refractive power, and a rear lens group (subsequent lens group) GR, which are arranged in that order from the object side. The subsequent lens group GR includes, in order from the object side, the third lens group G3 having positive refractive power, the fourth lens group G4 having negative refractive power, and the fifth lens G5 having negative refractive power. That is, the zoom lens system has a zoom lens configuration including the five groups of positive, negative, positive, negative, and negative refractive power.

The first lens group G1 includes a positive plano-convex lens 11E with a convex surface facing the object side, a negative meniscus lens 12E with a convex surface facing the object side, and a positive meniscus lens 13E with a convex surface facing the object side, which are arranged in that order from the object side. The negative meniscus lens 12E and the positive meniscus lens 13E are cemented to each other.

The second lens group G2 consists of a second lens group-a G2a having positive refractive power, a second lens group-b G2b having negative refractive power, and a second lens group-c G2c having negative refractive power, which are arranged in that order from the object side.

The second lens group-a G2a includes a positive biconvex lens 21E and a negative meniscus lens 22E with a convex surface facing the image side, which are arranged in that order from the object side. The positive biconvex lens 21E and the negative meniscus lens 22E are cemented to each other.

The second lens group-b G2b includes a negative biconcave lens 23E, and a positive meniscus lens 24E with a convex surface facing the object side arranged in that order from the object side.

The second lens group-a G2a includes a negative meniscus lens 25E with a convex surface facing the image side, a negative biconcave lens 26E, a positive meniscus lens 27E with a convex surface facing the object side, and a negative meniscus lens 28E with a convex surface facing the image side, which are arranged in that order from the object side. The negative biconcave lens 25E and the positive meniscus lens 27E are cemented to each other.

The third lens group G3 includes a positive biconvex lens 31E, a positive biconvex lens 32E, a negative biconcave lens 33E, a negative meniscus lens 34E with a convex surface facing the object side, a positive biconvex lens 35E, and a positive meniscus lens 36E with a convex surface facing the object side, which are arranged in that order from the object side. The positive biconvex lens 32E and the negative biconcave lens 33E are bonded together. The negative meniscus lens 34E and the positive biconvex lens 35E are cemented to each other.

The fourth lens group G4 includes a positive biconvex lens 41E and a negative biconcave lens 42E, which are arranged in that order from the object side. The positive biconvex lens 41E and the negative biconcave lens 42E are bonded together.

The fifth lens group G5 includes a negative meniscus lens 51E with a convex surface facing the image side.

TABLE 18

Various Data

| Zoom Ratio | 4.04 | | |
|---|---|---|---|
| | Short Focal Length End | Mid-Focal Length | Long Focal Length End |
| | Focused on Infinity | | |
| F-NUMBER | 4.6 | 5.2 | 5.7 |
| Focal Length | 72.08 | 135.00 | 291.29 |
| Object-Image Distance | INFINITY | INFINITY | INFINITY |
| Magnification | 0.000 | 0.000 | 0.000 |
| Half Angle of View | 16.9 | 8.9 | 4.1 |

TABLE 18-continued

| Image Height | 21.64 | 21.64 | 21.64 |
|---|---|---|---|
| Back Focus | 38.53 | 51.59 | 59.79 |
| Total Lens Length | 194.98 | 218.62 | 250.45 |
| D5 | 2.950 | 26.597 | 58.426 |
| D8 | 2.000 | 2.000 | 2.000 |
| D12 | 12.709 | 12.709 | 12.709 |
| D19 | 23.262 | 10.198 | 2.000 |
| D30 | 5.059 | 15.969 | 1.250 |
| D33 | 27.189 | 16.279 | 30.998 |
| D35 | 36.538 | 49.603 | 57.798 |
| | Focused on 1.2 m | | |
| F-NUMBER | 4.6 | 5.3 | 5.7 |
| Focal Length | 77.98 | 132.32 | 192.60 |
| Object-Image Distance | 1200.00 | 1200.00 | 1200.00 |
| Magnification | −0.076 | −0.144 | −0.304 |
| Half Angle of View | 14.4 | 7.3 | 3.2 |
| Image Height | 21.64 | 21.64 | 21.64 |
| Back Focus | 38.53 | 51.59 | 59.79 |
| Total Lens Length | 194.98 | 218.62 | 250.45 |
| D5 | 2.950 | 26.597 | 58.426 |
| D8 | 7.345 | 8.691 | 12.004 |
| D12 | 7.364 | 6.018 | 2.705 |
| D19 | 23.262 | 10.198 | 2.000 |
| D30 | 5.059 | 15.969 | 1.250 |
| D33 | 27.189 | 16.279 | 30.998 |
| D35 | 36.538 | 49.603 | 57.798 |

TABLE 19

Zoom Lens Group Data

| Group | Initial Surface | Focal Length |
|---|---|---|
| 1 | 1 | 143.62 |
| 2 | 6 | −26.23 |
| 3 | 21 | 39.27 |
| 4 | 31 | −132.72 |
| 5 | 34 | −153.14 |
| 2a | 6 | 127.44 |
| 2b | 9 | −58.97 |
| 2c | 13 | −36.77 |
| Vibration-Isolating | 15 | −55.64 |

TABLE 20

Principal Point Position Data

| Initial | Final | Focal Length | Front P.P. | P.P. Interval | Rear P.P. | |
|---|---|---|---|---|---|---|
| | | | Zoom Lens Group | | | |
| 1 | 5 | 143.616 | 0.678 | 5.462 | 9.510 | First Group |
| 6 | 9 | −26.228 | 22.635 | 7.803 | 5.940 | Second Group |
| 20 | 30 | 39.267 | 20.743 | −5.053 | 25.871 | Third Group |
| 31 | 33 | −132.722 | 2.303 | 1.379 | −0.482 | Fourth Group |
| 34 | 35 | −153.143 | −1.516 | 0.370 | 2.346 | Fifth Group |
| | | | Sub-lens group | | | |
| 6 | 8 | 127.435 | 0.551 | 2.716 | 3.703 | 2a Sub-lens group |
| 9 | 12 | −58.971 | 0.852 | 1.606 | 2.342 | 2b Sub-lens group |
| 13 | 19 | −36.777 | 3.239 | 3.324 | 3.338 | 2c Sub-lens group |
| 6 | 12 | −121.387 | 14.045 | 3.627 | −3.903 | 2ab Sub-lens group |
| 9 | 19 | −19.018 | 10.310 | 7.863 | 9.236 | 2bc Sub-lens group |

FIGS. 64 to 74 and Tables 21 to 24 pertain to the zoom lens system according to Numerical Example 6.

Figure 64:
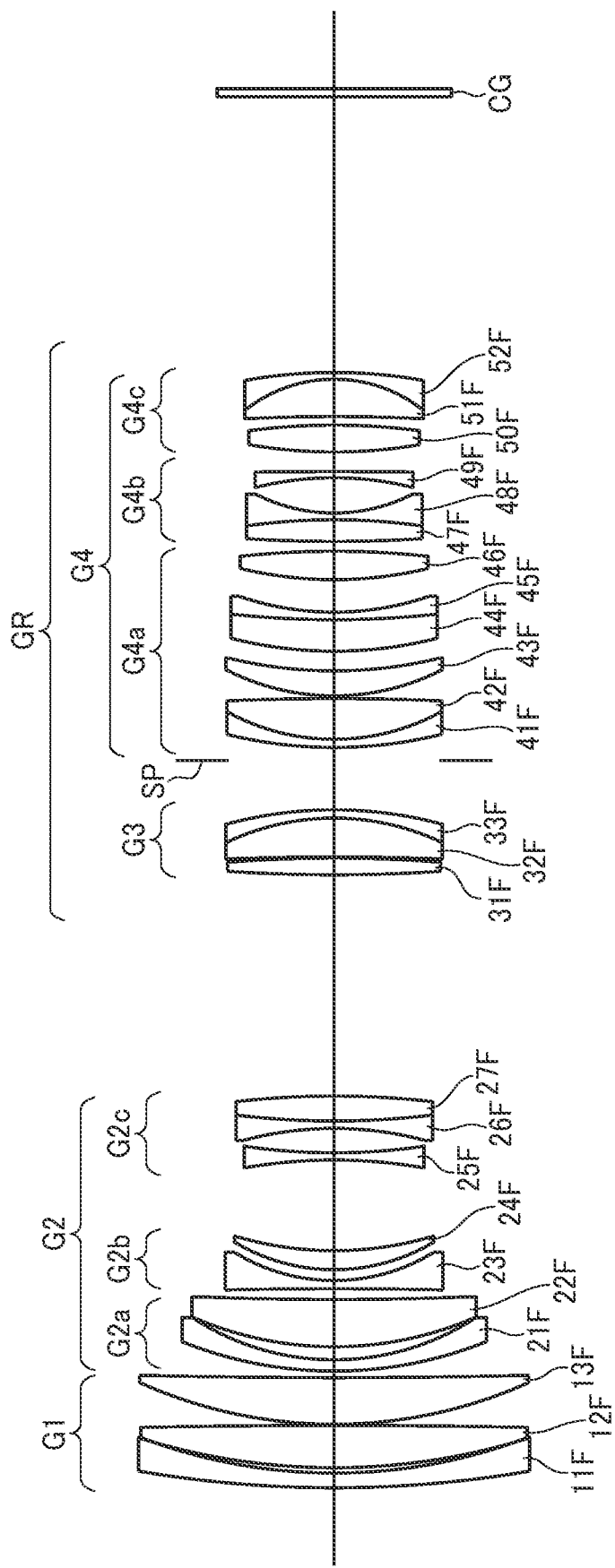
FIG. 64 is a diagram of a configuration of the zoom lens system according to Numerical Example 6 focused on infinity at the short focal length end.

FIG. 64 is an illustration of the configuration of the zoom lens system focused on infinity at the short focal length end.

Figure 65:
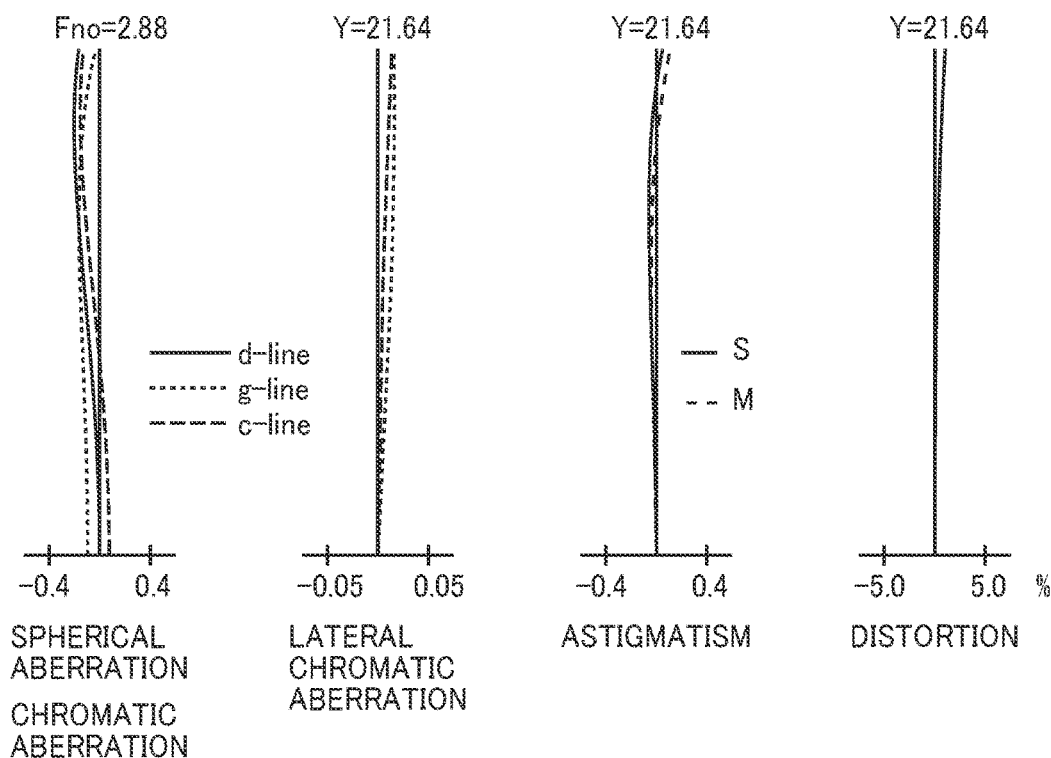
FIG. 65 is a collection of longitudinal aberration diagrams of the zoom lens system according to Numerical Example 6 focused on infinity at the short focal length end.
Figure 66:
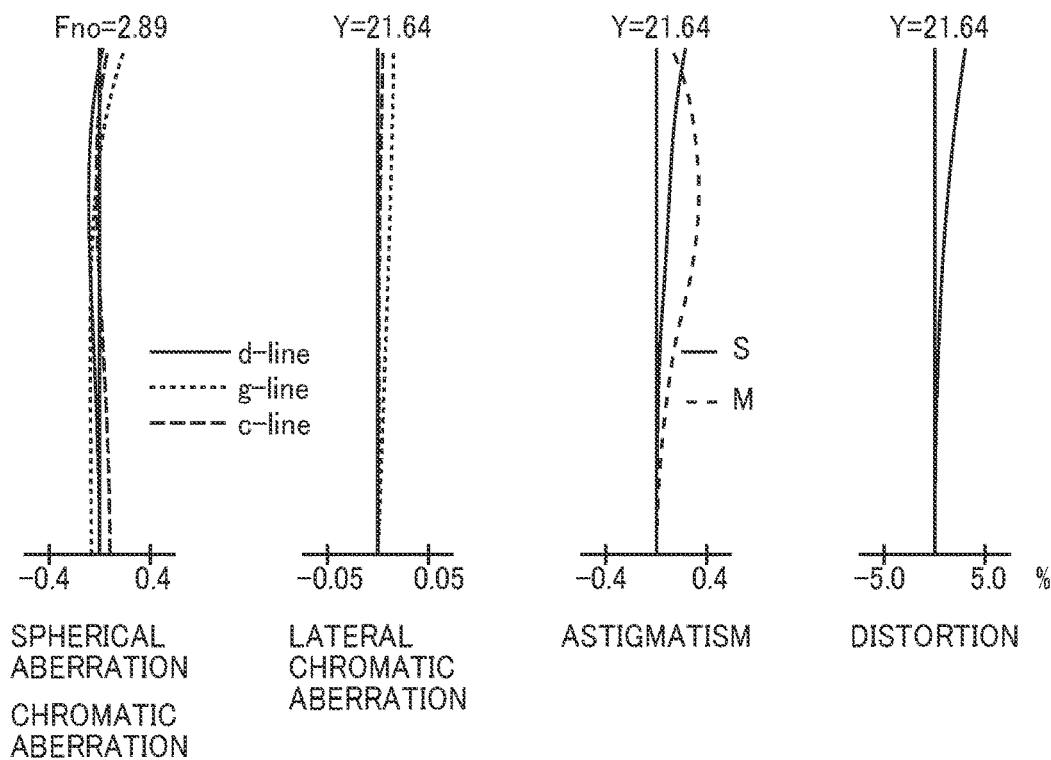
FIG. 66 is a collection of longitudinal aberration diagrams of the zoom lens system according to Numerical Example 6 focused on 1.2 m at the short focal length end.

FIGS. 65 and 66 are longitudinal aberration diagrams of the zoom lens system focused on infinity and 1.2 m at the short focal length end, respectively.

Figure 67:
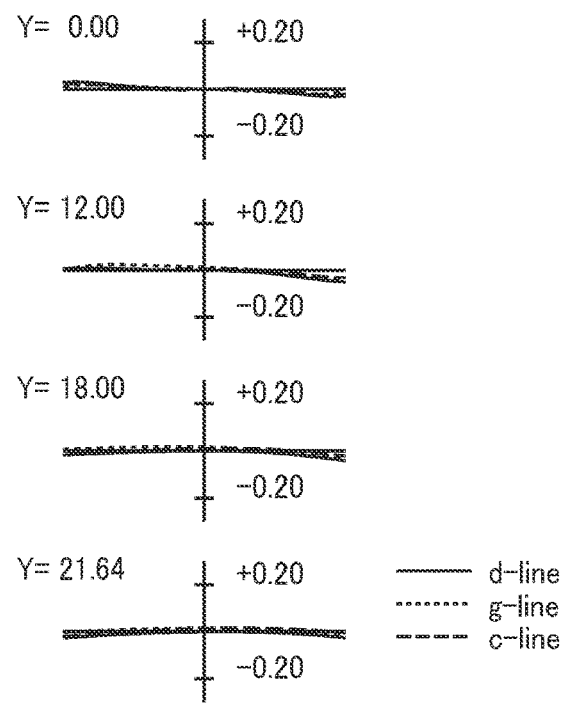
FIG. 67 is a collection of lateral aberration diagrams of the zoom lens system according to Numerical Example 6 focused on infinity at the short focal length end.
Figure 68:
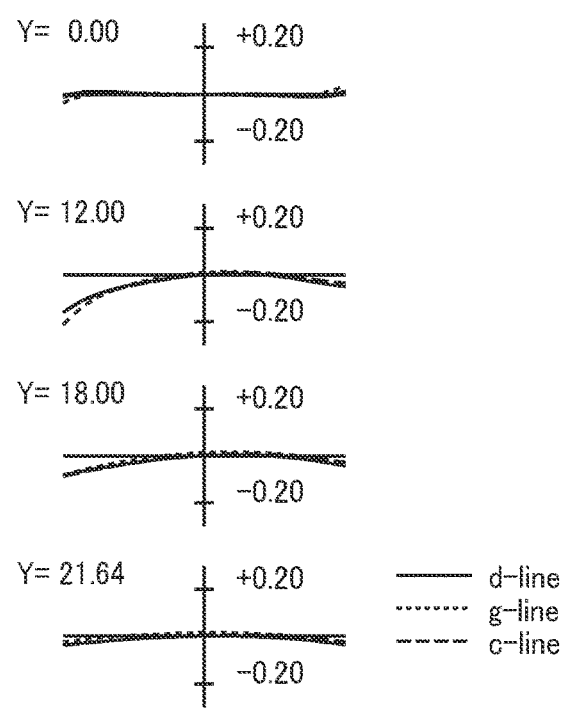
FIG. 68 is a collection of lateral aberration diagrams of the zoom lens system according to Numerical Example 6 focused on 1.2 m at the short focal length end.

FIGS. 67 and 68 are lateral aberration diagrams of the zoom lens system focused on infinity and 1.2 m at the short focal length end, respectively.

Figure 69:
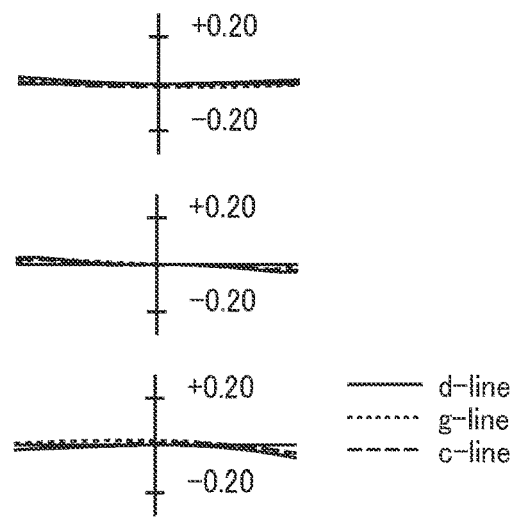
FIG. 69 is a collection of lateral aberration diagrams of the zoom lens system in the state illustrated in FIG. 67 during the drive of vibration isolation.

FIG. 69 is a collection of lateral aberration diagrams of the zoom lens system in the state of FIG. 67 during the drive of vibration isolation.

Figure 70:
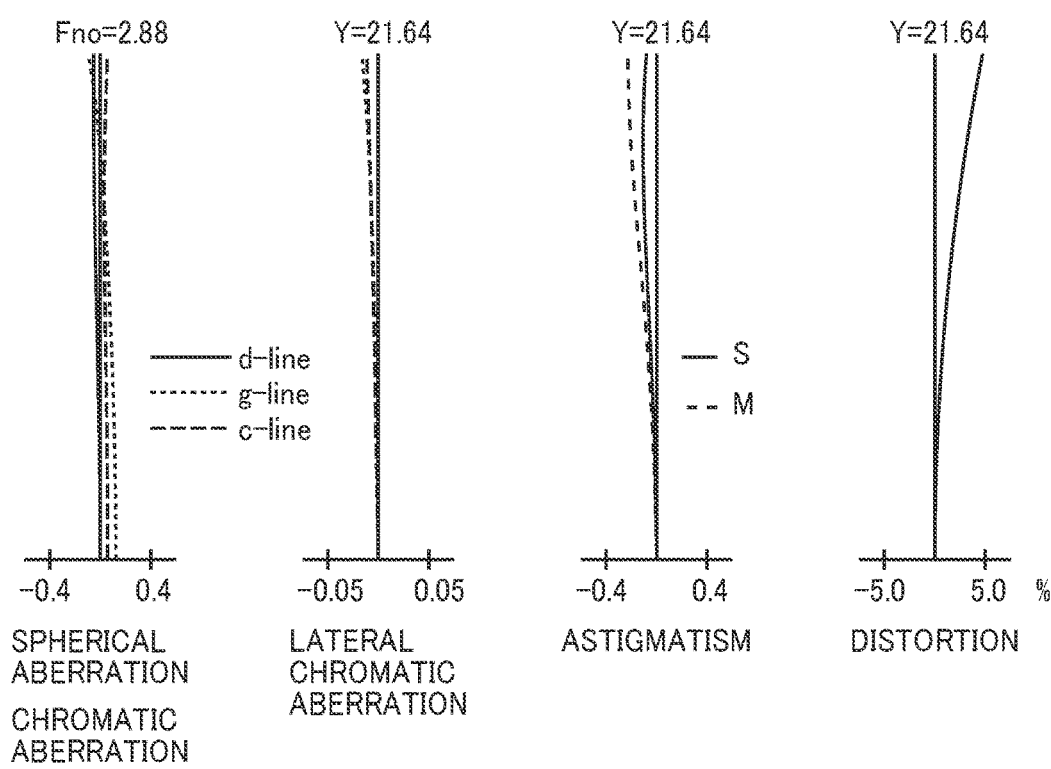
FIG. 70 is a collection of longitudinal aberration diagrams of the zoom lens system according to Numerical Example 6 focused on infinity at the long focal length end.
Figure 71:
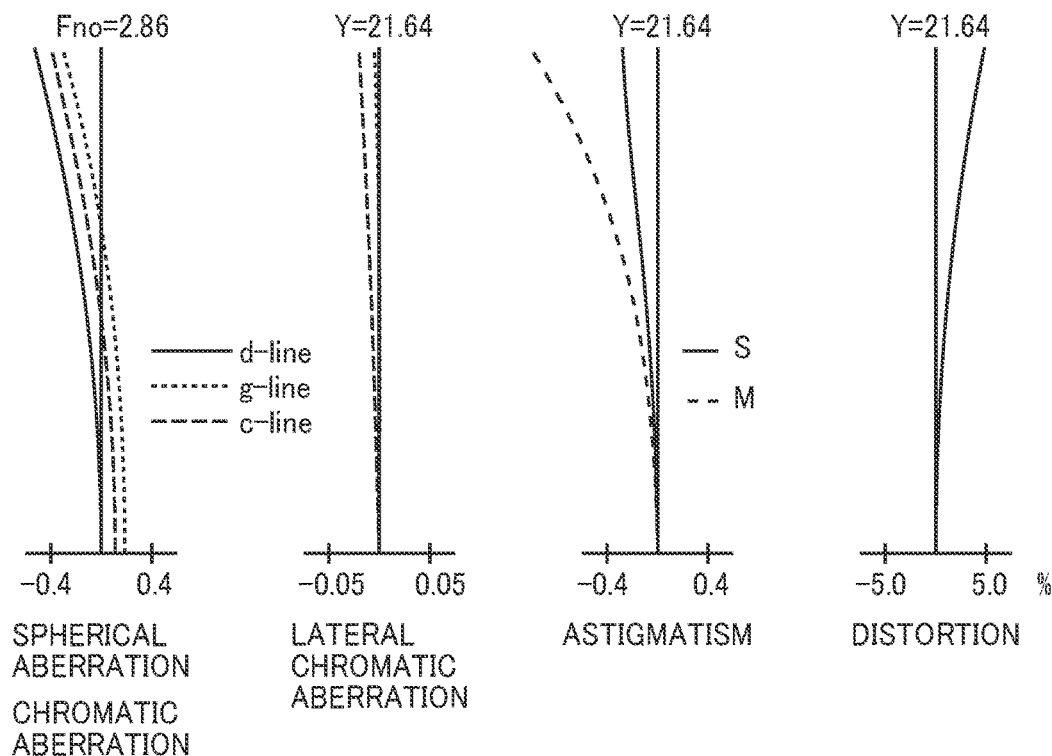
FIG. 71 is a collection of longitudinal aberration diagrams of the zoom lens system according to Numerical Example 6 focused on 1.2 m at the long focal length end.

FIGS. 70 and 71 are longitudinal aberration diagrams of the zoom lens system focused on infinity and 1.2 m at the long focal length end, respectively.

Figure 72:
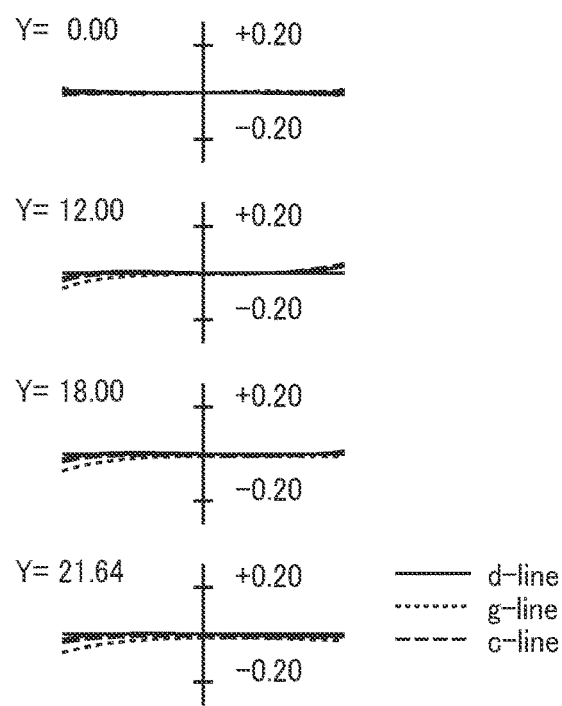
FIG. 72 is a collection of lateral aberration diagrams of the zoom lens system according to Numerical Example 6 focused on infinity at the long focal length end.
Figure 73:
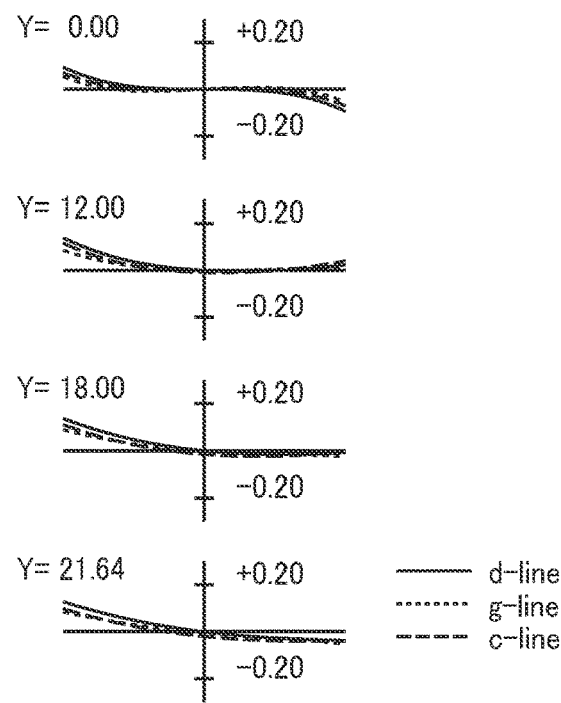
FIG. 73 is a collection of lateral aberration diagrams of the zoom lens system according to Numerical Example 6 focused on 1.2 m at the long focal length end.

FIGS. 72 and 73 are lateral aberration diagrams of the zoom lens system focused on infinity and 1.2 m at the long focal length end, respectively.

Figure 74:
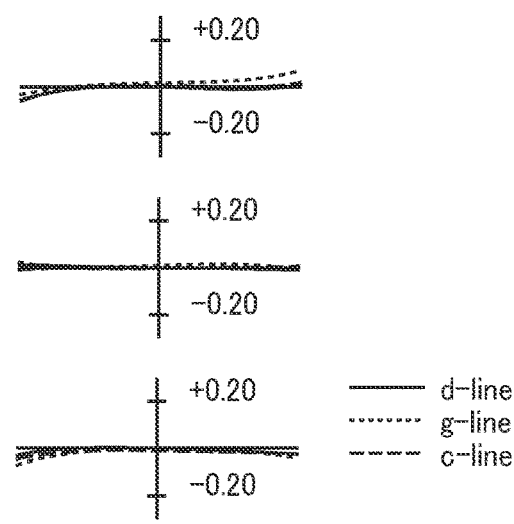
FIG. 74 is a collection of lateral aberration diagrams of the zoom lens system in the state illustrated in FIG. 72 during the drive of vibration isolation of ±0.3°.

FIG. 74 is a collection of lateral aberration diagrams of the zoom lens system in the state illustrated in FIG. 72 during the drive of vibration isolation of ±0.3°.

Tables 21, 22, 23, and 24 represent surface data, various data, zoom lens group data, and principal point position data. In Table 24, the term "P.P." stands for principal point, and the term "P.P. interval" refers to the distance between the principal points. Further, the terms "Initial" and "Final" refer to the "initial lens surface" and "final lens surface", respectively.

The zoom lens system according to Numerical Example 6 includes a first lens group G1 having positive refractive power, a second lens group G2 having negative refractive power, and a rear lens group (subsequent lens group) GR, which are arranged in that order from the object side. The subsequent lens group GR includes, in order from the object side, the third lens group G3 having positive refractive power, and the fourth lens group G4 having positive refractive power. That is, the zoom lens system has a zoom lens configuration including the five groups of positive, negative, positive, and positive refractive power.

The first lens group G1 includes a negative meniscus lens 11F with a convex surface facing the object side, a positive biconvex lens 12F, and a positive meniscus lens 13F with a convex surface facing the object side, which are arranged in that order from the object side.

The second lens group G2 consists of a second lens group-a G2a having positive refractive power, a second lens group-b G2b having negative refractive power, and a second lens group-c G2c having negative refractive power, which are arranged in that order from the object side.

The second lens group-a G2a includes a negative meniscus lens 21F with a convex surface facing the object side and a positive meniscus lens 22F with a convex surface facing the object side, which are arranged in that order from the object side.

The second lens group-b G2b includes a negative biconcave lens 23F, and a positive meniscus lens 24F with a convex surface facing the object side arranged in that order from the object side.

The second lens group-c G2c includes a negative biconcave lens 25F, a negative biconcave lens 26F, and a positive biconvex lens 27F arranged in that order from the object side. The negative biconcave lens 26F and the positive biconvex lens 27F are cemented to each other.

The third lens group G3 includes a positive biconvex lens 31F, a positive meniscus lens 32F with a convex surface facing the image side, and a negative meniscus lens 33F with a convex surface facing the image side, which are arranged in that order from the object side. The positive meniscus lens 32F and the negative meniscus lens 33F are cemented to each other.

The fourth lens group G4 includes a fourth lens group-a G4a having positive refractive power, a fourth lens group-b G4b having negative refractive power, and a fourth lens group-c G4c having positive refractive power, which are arranged in that order from the object side.

The fourth lens group-a G4a includes a negative meniscus lens 41F with a convex surface facing object side, a positive biconvex lens 42F, a positive meniscus lens 43F with a convex surface facing the object side, a positive meniscus lens 44F with a convex surface facing the object side, a negative meniscus lens 45F with a convex surface facing the object side, and a positive biconvex lens 46F, which are arranged in that order from the object side. The negative meniscus lens 41F and the positive biconvex lens 42F are cemented to each other. The positive meniscus lens 44F and the negative meniscus lens 45F are cemented to each other.

The fourth lens group-b G4b includes a positive biconvex lens 47F, a negative biconcave lens 48F, and a negative meniscus lens 49F having a convex surface facing the image side, which are arranged in that order from the object side. The positive biconvex lens 47F and the negative biconcave lens 48F are bonded together.

The fourth lens group-c G4c includes a positive biconvex lens 50F, a positive meniscus lens 51F with a convex surface facing the image side, and a negative meniscus lens 52F with a convex surface facing the image side, which are arranged in that order from the object side. The positive meniscus lens 51F and the negative meniscus lens 52F are cemented to each other.

TABLE 21

Surface Data

| Surface Number | r | D | N(d) | ν(d) |
|---|---|---|---|---|
| 1 | 211.989 | 2.710 | 1.85478 | 24.8 |
| 2 | 99.937 | 0.980 | | |
| 3 | 119.824 | 7.800 | 1.49700 | 81.6 |
| 4 | −1695.428 | 0.200 | | |
| 5 | 87.128 | 8.600 | 1.72916 | 54.1 |
| 6 | 1485.614 | D6 | | |
| 7 | 74.974 | 2.070 | 1.73800 | 32.3 |
| 8 | 47.595 | 2.410 | | |
| 9 | 64.981 | 8.700 | 1.61997 | 63.9 |
| 10 | 595.830 | D10 | | |
| 11 | −839.107 | 1.500 | 1.78800 | 47.4 |
| 12 | 34.909 | 2.000 | | |
| 13 | 35.588 | 3.500 | 1.80810 | 22.8 |
| 14 | 63.361 | D14 | | |
| 15 | −95.248 | 1.320 | 1.80400 | 46.6 |
| 16 | 111.987 | 4.500 | | |
| 17 | −64.408 | 1.370 | 1.61800 | 63.4 |
| 18 | 149.839 | 4.600 | 2.05090 | 26.9 |
| 19 | −157.190 | D19 | | |
| 20 | 301.713 | 3.080 | 1.90043 | 37.4 |
| 21 | −250.285 | 0.200 | | |
| 22 | −565.980 | 7.160 | 1.49700 | 81.6 |
| 23 | −46.079 | 1.530 | 2.00100 | 29.1 |
| 24 | −75.606 | D24 | | |
| 25 Stop | INFINITY | 2.400 | | |
| 26 | 81.830 | 1.510 | 1.90366 | 31.3 |
| 27 | 40.840 | 7.500 | 1.49700 | 81.6 |
| 28 | −459.366 | 0.500 | | |
| 29 | 43.465 | 4.600 | 1.85025 | 30.0 |
| 30 | 81.416 | 3.620 | | |
| 31 | 76.442 | 5.800 | 1.59410 | 60.5 |
| 32 | 173.707 | 1.390 | 1.90366 | 31.3 |
| 33 | 53.463 | 5.990 | | |
| 34 | 73.105 | 5.240 | 1.75500 | 52.3 |
| 35 | −158.062 | 1.800 | | |
| 36 | 258.881 | 4.000 | 1.84666 | 23.8 |
| 37 | −114.093 | 1.230 | 1.61405 | 55.0 |
| 38 | 31.643 | 6.500 | | |
| 39 | −59.612 | 1.140 | 1.50137 | 56.4 |
| 40 | −1064.653 | 3.600 | | |
| 41 | 91.538 | 4.960 | 1.67003 | 47.3 |

TABLE 21-continued

Surface Data

| Surface Number | r | D | N(d) | v(d) |
|---|---|---|---|---|
| 42 | −118.728 | 1.580 | | |
| 43 | −311.030 | 6.880 | 1.64850 | 53.0 |
| 44 | −26.359 | 1.240 | 2.00100 | 29.1 |
| 45 | −91.199 | 50.757 | | |
| 46 | INFINITY | 1.500 | 1.51680 | 64.2 |
| 47 | INFINITY | — | | |

TABLE 22

Various Data

Zoom Ratio  2.69

| | Short Focal Length End | Mid-Focal Length | Long Focal Length End |
|---|---|---|---|
| *Focused on Infinity* | | | |
| F-NUMBER | 2.9 | 2.9 | 2.9 |
| Focal Length | 72.08 | 100.00 | 194.00 |
| Object-Image Distance | INFINITY | INFINITY | INFINITY |
| Magnification | 0.000 | 0.000 | 0.000 |
| Half Angle of View | 16.5 | 11.9 | 6.1 |
| Image Height | 21.64 | 21.64 | 21.64 |
| Back Focus | 52.75 | 52.75 | 52.75 |
| Total Lens Length | 258.17 | 258.17 | 258.17 |
| D6 | 1.200 | 17.662 | 38.546 |
| D10 | 2.000 | 2.000 | 2.000 |
| D14 | 16.700 | 16.700 | 16.700 |
| D19 | 40.743 | 31.979 | 2.000 |
| D24 | 9.075 | 1.370 | 10.472 |
| *Focused on 1.2 m* | | | |
| F-NUMBER | 2.9 | 2.9 | 2.9 |
| Focal Length | 84.38 | 115.00 | 179.00 |
| Object-Image Distance | 1200.00 | 1200.00 | 1200.00 |
| Magnification | −0.084 | −0.115 | −0.215 |
| Half Angle of View | 13.1 | 9.2 | 4.6 |
| Image Height | 21.64 | 21.64 | 21.64 |
| Back Focus | 52.75 | 52.75 | 52.75 |
| Total Lens Length | 258.17 | 258.17 | 258.17 |
| D6 | 1.200 | 17.662 | 38.546 |
| D10 | 12.164 | 13.074 | 15.113 |
| D14 | 6.536 | 5.626 | 3.587 |
| D19 | 40.743 | 31.979 | 2.000 |
| D24 | 9.075 | 1.370 | 10.472 |

TABLE 23

Zoom Lens Group Data

| Group | Initial Surface | Focal Length |
|---|---|---|
| 1 | 1 | 127.16 |
| 2 | 7 | −36.87 |
| 3 | 20 | 125.53 |
| 4 | 26 | 105.38 |
| 2a | 6 | 327.33 |
| 2b | 9 | −76.37 |
| 2c | 13 | −66.08 |
| Vibration-Isolating | 15 | −41.25 |

TABLE 24

Principal Point Position Data

| Initial | Final | Focal Length | Front P.P. | P.P. Interval | Rear P.P. | |
|---|---|---|---|---|---|---|
| *Zoom Lens Group* | | | | | | |
| 1 | 6 | 127.160 | 7.591 | 7.455 | 5.244 | First Group |
| 7 | 19 | −36.874 | 24.433 | 10.644 | 15.594 | Second Group |
| 20 | 24 | 125.526 | 3.790 | 4.459 | 3.721 | Third Group |
| 25 | 45 | 105.382 | −7.708 | 22.230 | 56.958 | Fourth Group |
| *Sub-lens group* | | | | | | |
| 7 | 10 | 327.330 | 2.299 | 4.205 | 6.676 | 2a Sub-lens group |
| 11 | 14 | −76.371 | 1.057 | 2.327 | 3.615 | 2b Sub-lens group |
| 15 | 19 | −66.077 | −1.240 | 3.127 | 9.903 | 2c Sub-lens group |
| 7 | 14 | −103.631 | 15.507 | 6.139 | 0.534 | 2ab Sub-lens group |
| 11 | 19 | −31.242 | 10.077 | 7.707 | 17.706 | 2bc Sub-lens group |

Figure 75:
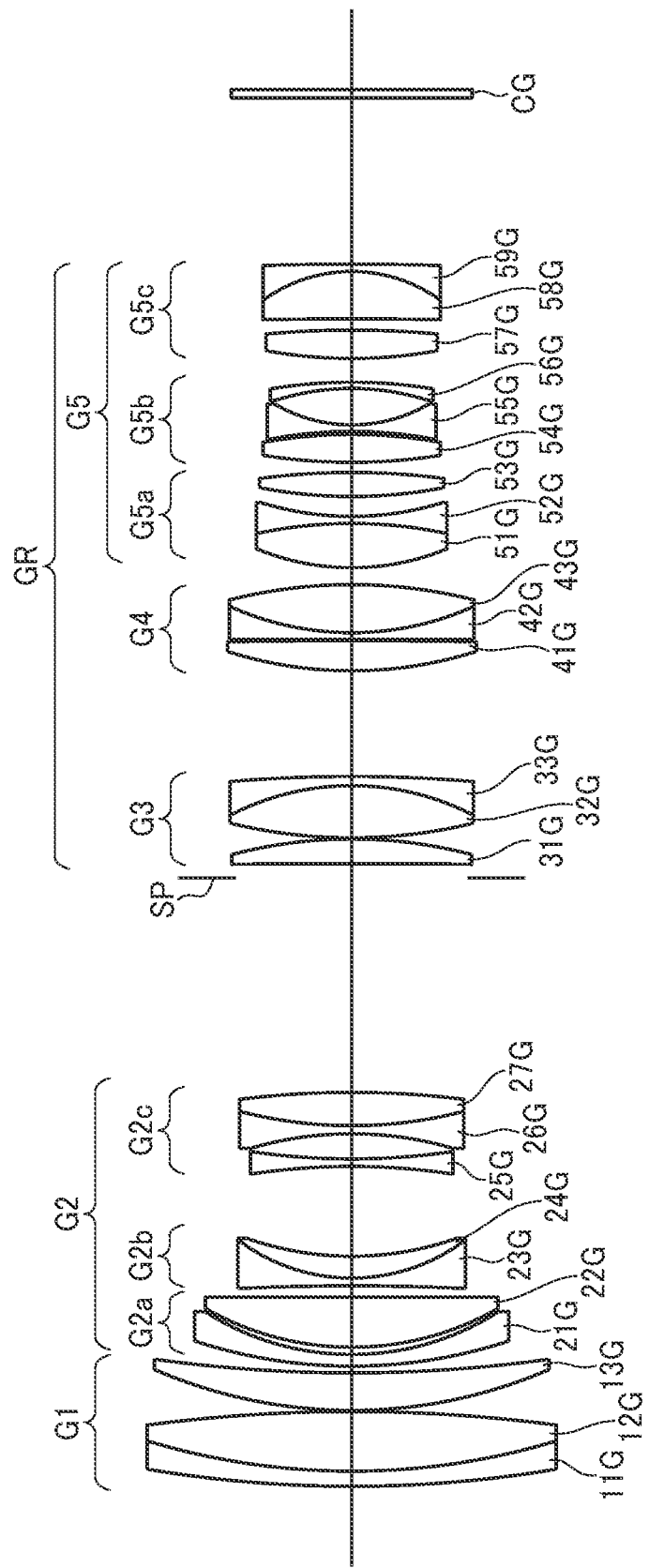
FIG. 75 is a diagram of a configuration of the zoom lens system according to Numerical Example 7 focused on infinity at the short focal length end.

FIGS. 75 to 85 and Tables 25 to 28 pertain to the zoom lens system according to Numerical Example 7. FIG. 75 is an illustration of the configuration of the zoom lens system focused on infinity at the short focal length end.

Figure 76:
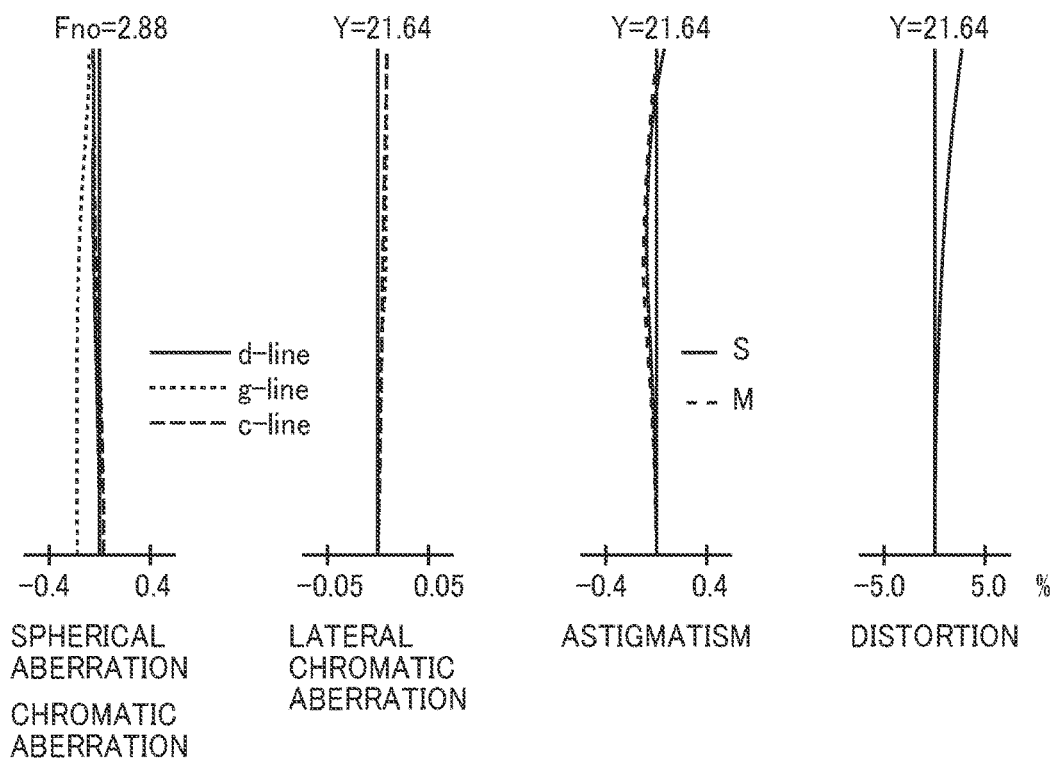
FIG. 76 is a collection of longitudinal aberration diagrams of the zoom lens system according to Numerical Example 7 focused on infinity at the short focal length end.
Figure 77:
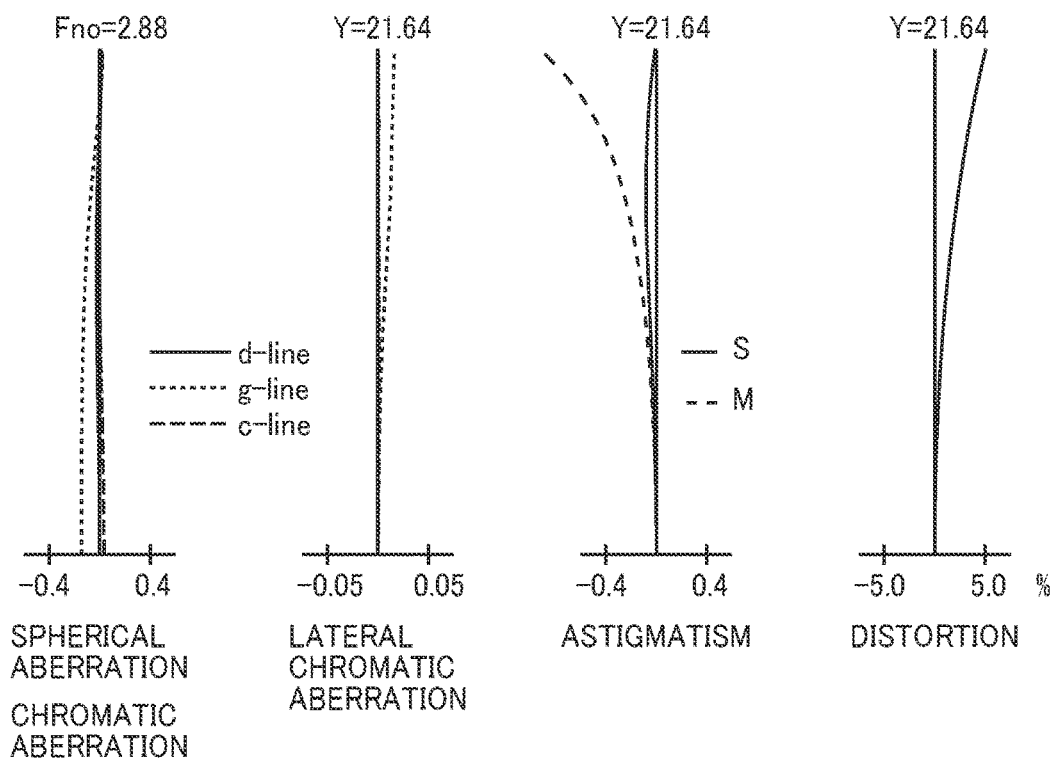
FIG. 77 is a collection of longitudinal aberration diagrams of the zoom lens system according to Numerical Example 7 focused on 1.2 m at the short focal length end.

FIGS. 76 and 77 are longitudinal aberration diagrams of the zoom lens system focused on infinity and 1.2 m at the short focal length end, respectively.

Figure 78:
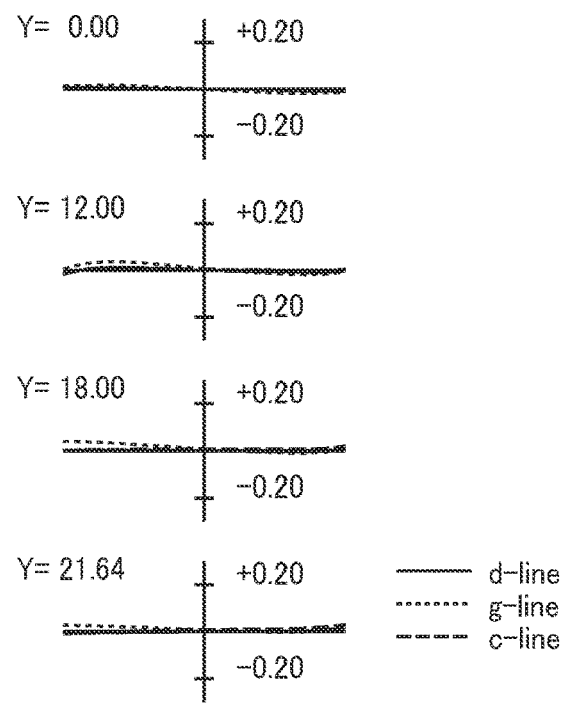
FIG. 78 is a collection of lateral aberration diagrams of the zoom lens system according to Numerical Example 7 focused on infinity at the short focal length end.
Figure 79:
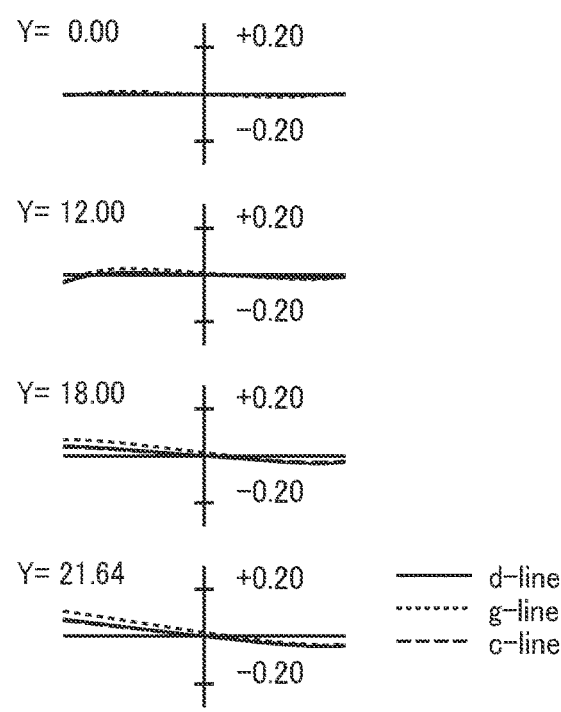
FIG. 79 is a collection of lateral aberration diagrams of the zoom lens system according to Numerical Example 7 focused on 1.2 m at the short focal length end.

FIGS. 78 and 79 are lateral aberration diagrams of the zoom lens system focused on infinity and 1.2 m at the short focal length end, respectively.

Figure 80:
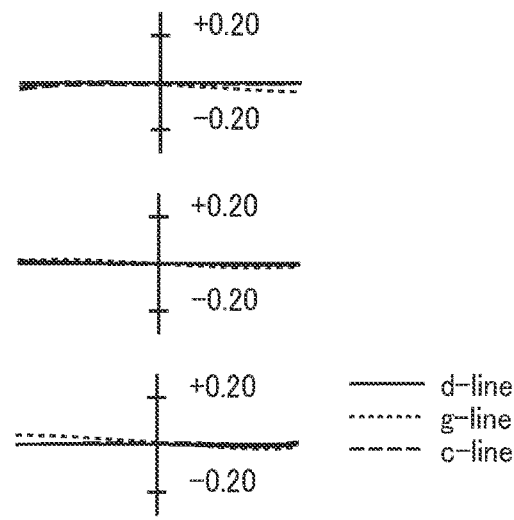
FIG. 80 is a collection of lateral aberration diagrams of the zoom lens system in the state illustrated in FIG. 78 during the drive of vibration isolation.

FIG. 80 is a collection of lateral aberration diagrams of the zoom lens system in the state of FIG. 78 during the drive of vibration isolation.

Figure 81:
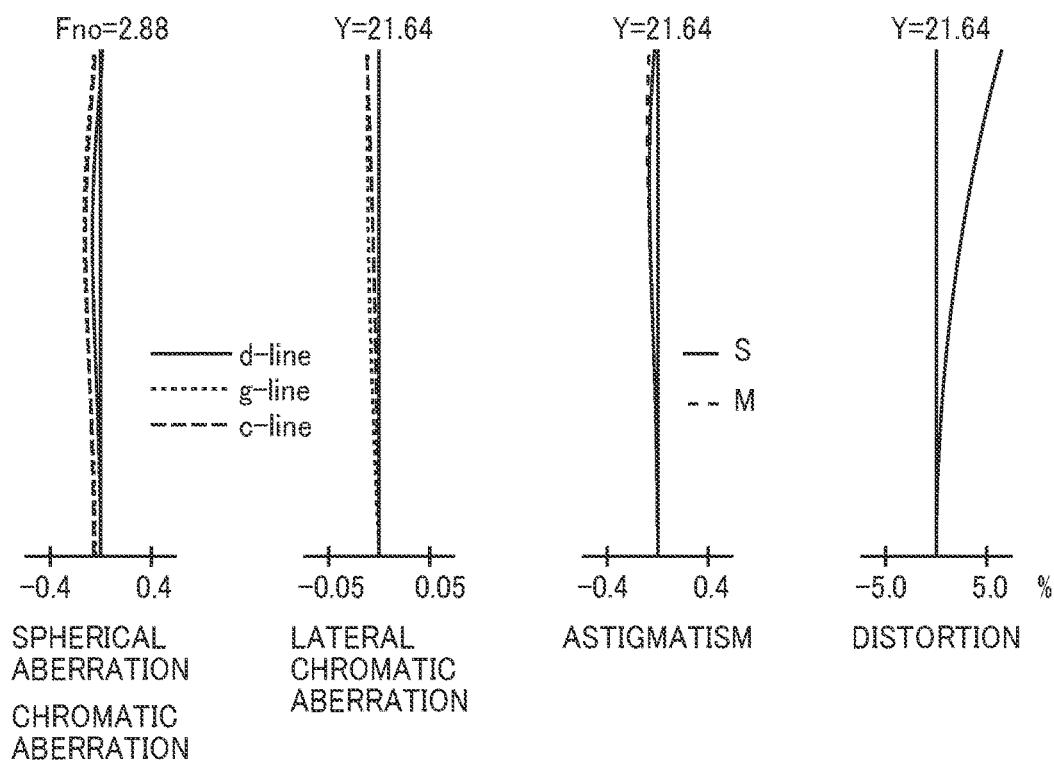
FIG. 81 is a collection of longitudinal aberration diagrams of the zoom lens system according to Numerical Example 7 focused on infinity at the long focal length end.
Figure 82:
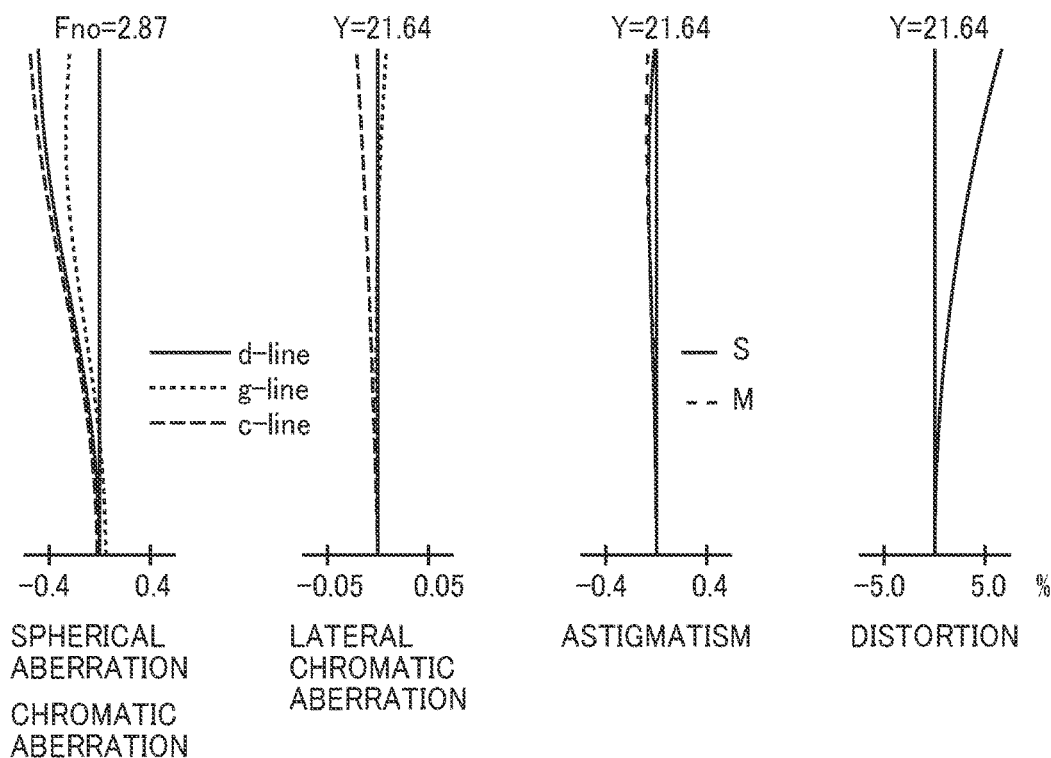
FIG. 82 is a collection of longitudinal aberration diagrams of the zoom lens system according to Numerical Example 7 focused on 1.2 m at the long focal length end.

FIGS. 81 and 82 are longitudinal aberration diagrams of the zoom lens system focused on infinity and 1.2 m at the long focal length end, respectively.

Figure 83:
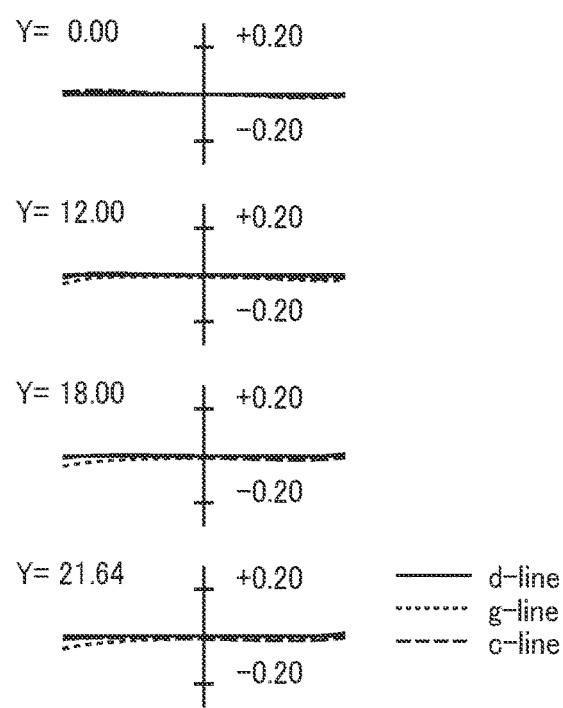
FIG. 83 is a collection of lateral aberration diagrams of the zoom lens system according to Numerical Example 7 focused on infinity at the long focal length end.
Figure 84:
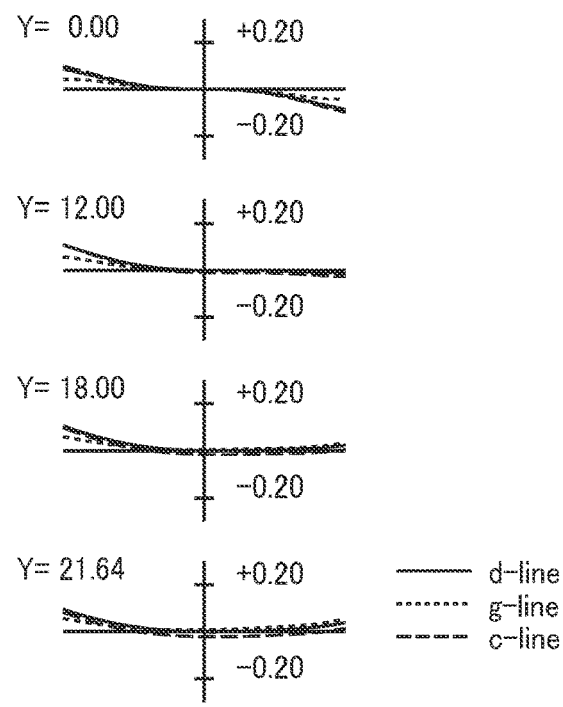
FIG. 84 is a collection of lateral aberration diagrams of the zoom lens system according to Numerical Example 7 focused on 1.2 m at the long focal length end.

FIGS. 83 and 84 are lateral aberration diagrams of the zoom lens system focused on infinity and 1.2 m at the long focal length end, respectively.

Figure 85:
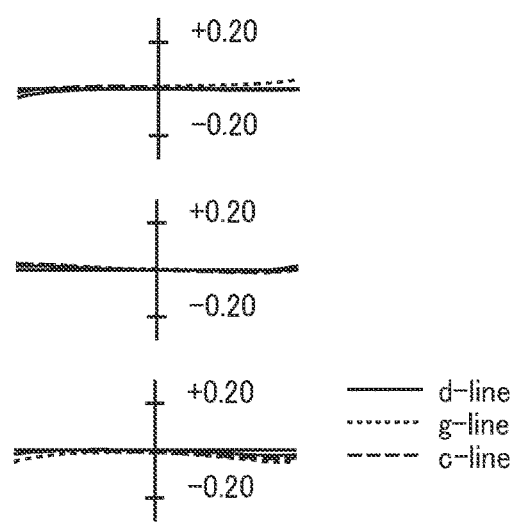
FIG. 85 is a collection of lateral aberration diagrams of the zoom lens system in the state illustrated in FIG. 61 during the drive of vibration isolation of ±0.3°.

FIG. 85 is a collection of lateral aberration diagrams of the zoom lens system in the state illustrated in FIG. 83 during the drive of vibration isolation of ±0.3°.

Tables 25, 26, 27, and 28 represent surface data, various data, zoom lens group data, and principal point position data. In Table 28, the term "P.P." stands for principal point, and the term "P.P. interval" refers to the distance between the principal points. Further, the terms "Initial" and "Final" refer to the "initial lens surface" and "final lens surface", respectively.

The zoom lens system according to Numerical Example 7 includes a first lens group G1 having positive refractive power, a second lens group G2 having negative refractive power, and a rear lens group (subsequent lens group) GR, which are arranged in that order from the object side. The subsequent lens group GR includes, in order from the object side, the third lens group G3 having positive refractive power, the fourth lens group G4 having positive refractive power, and the fifth lens G5 having negative refractive power. That is, the zoom lens system has a zoom lens configuration including the five groups of positive, negative, positive, positive, and negative refractive power.

The first lens group G1 includes a negative meniscus lens 11G with a convex surface facing the object side, a positive biconvex lens 12G, and a positive meniscus lens 13G with a convex surface facing the object side, which are arranged in that order from the object side. The negative meniscus lens 11G and the positive biconvex lens 12G are cemented to each other.

The second lens group G2 consists of a second lens group-a G2a having positive refractive power, a second lens group-b G2b having negative refractive power, and a second lens group-c G2c having negative refractive power, which are arranged in that order from the object side.

The second lens group-a G2a includes a negative meniscus lens 21G with a convex surface facing the object side and a positive biconvex lens 22G, which are arranged in that order from the object side.

The second lens group-b G2b includes a negative biconcave lens 23G, and a positive meniscus lens 24G with a convex surface facing the object side arranged in that order from the object side. The negative biconcave lens 23G and the positive meniscus lens 24G are cemented to each other.

The second lens group-c G2c includes a negative biconcave lens 25G, a negative biconcave lens 26G, and a positive biconvex lens 27G arranged in that order from the object side. The negative biconcave lens 26G and the positive biconvex lens 27G are cemented to each other.

The third lens group G3 includes a positive meniscus lens 31G with a convex surface facing the image side, a positive biconvex lens 32G, and a negative meniscus lens 33G with a convex surface facing the image side, which are arranged in that order from the object side. The positive biconvex lens 32G and the negative meniscus lens 33G are cemented to each other.

The fourth lens group G4 includes a positive biconvex lens 41G, a negative meniscus lens 42G with a convex surface facing the object side, and a positive biconvex lens 43G, which are arranged in that order from the object side. The negative meniscus lens 42G and the positive biconvex lens 43G are cemented to each other.

The fifth lens group G5 includes a fifth lens group-a G5a having positive refractive power, a fifth lens group-b G5b having negative refractive power, and a fifth lens group-c G5c having positive refractive power, which are arranged in that order from the object side.

The fifth lens group-a G5a includes a positive biconvex lens 51G, a negative biconcave lens 52G, and a positive biconvex lens 53G, which are arranged in that order from the object side. The positive biconvex lens 51G and the negative biconcave lens 52G are cemented to each other.

The fifth lens group-b G5b includes a positive biconvex lens 54G, a negative biconcave lens 55G, and a negative meniscus lens 56G with a convex surface facing the image side, which are arranged in that order from the object side.

The fifth lens group-c G5c includes a positive biconvex lens 57G, a positive meniscus lens 58G with a convex surface facing the image side, and a negative meniscus lens 59G with a convex surface facing the image side, which are arranged in that order from the object side. The positive meniscus lens 58G and the negative meniscus lens 59G are cemented to each other.

TABLE 25

Surface Data

| Surface Number | r | D | N(d) | ν(d) |
|---|---|---|---|---|
| 1 | 218.592 | 2.700 | 1.85478 | 24.8 |
| 2 | 125.729 | 10.640 | 1.49700 | 81.6 |
| 3 | −278.494 | 0.200 | | |
| 4 | 88.406 | 6.700 | 1.53775 | 74.7 |
| 5 | 254.754 | D5 | | |
| 6 | 89.588 | 2.070 | 1.73800 | 32.3 |
| 7 | 48.571 | 1.300 | | |
| 8 | 52.655 | 8.970 | 1.61800 | 63.4 |
| 9 | −312547.760 | D9 | | |
| 10 | −425.796 | 1.370 | 1.76385 | 48.5 |
| 11 | 33.583 | 3.900 | 1.84666 | 23.8 |
| 12 | 56.336 | D12 | | |
| 13 | −118.862 | 1.330 | 1.74100 | 52.7 |
| 14 | 123.460 | 4.500 | | |
| 15 | −63.716 | 1.430 | 1.72916 | 54.1 |
| 16 | 79.097 | 5.960 | 1.85478 | 24.8 |
| 17 | −159.183 | D17 | | |
| 18 Stop | INFINITY | 2.500 | | |
| 19 | −2372.949 | 4.410 | 1.90043 | 37.4 |
| 20 | −83.332 | 0.200 | | |
| 21 | 91.261 | 9.320 | 1.49700 | 81.6 |
| 22 | −47.098 | 1.630 | 2.00100 | 29.1 |
| 23 | −258.484 | D23 | | |
| 24 | 72.775 | 5.380 | 1.90043 | 37.4 |
| 25 | −1116.604 | 0.200 | | |
| 26 | 2238.885 | 1.220 | 1.91082 | 35.2 |
| 27 | 52.682 | 8.590 | 1.49700 | 81.6 |
| 28 | −88.227 | D28 | | |
| 29 | 44.376 | 7.900 | 1.49700 | 81.6 |
| 30 | −80.836 | 1.260 | 1.80440 | 39.6 |
| 31 | 54.600 | 3.546 | | |
| 32 | 85.944 | 4.300 | 1.90366 | 31.3 |
| 33 | −124.309 | 1.800 | | |
| 34 | 100.024 | 4.980 | 1.84666 | 23.8 |
| 35 | −89.303 | 0.543 | | |
| 36 | −76.657 | 1.150 | 1.72000 | 50.2 |
| 37 | 27.200 | 6.500 | | |
| 38 | −45.000 | 1.130 | 1.65160 | 58.5 |
| 39 | −88.138 | 4.223 | | |
| 40 | 84.857 | 5.070 | 1.70154 | 41.2 |
| 41 | −166.669 | 2.000 | | |
| 42 | −900.972 | 8.460 | 1.65160 | 58.5 |
| 43 | −26.886 | 1.320 | 2.00100 | 29.1 |
| 44 | −448.101 | 29.621 | | |
| 45 | INFINITY | 1.500 | 1.51680 | 64.2 |
| 46 | INFINITY | — | | |

TABLE 26

Various Data

Zoom Ratio  2.69

| | Short Focal Length End | Mid-Focal Length | Long Focal Length End |
|---|---|---|---|
| | Focused on Infinity | | |
| F-NUMBER | 2.9 | 2.9 | 2.9 |
| Focal Length | 72.08 | 100.00 | 194.01 |
| Object-Image Distance | INFINITY | INFINITY | INFINITY |
| Magnification | 0.000 | 0.000 | 0.000 |
| Half Angle of View | 16.3 | 11.7 | 6.0 |
| Image Height | 21.64 | 21.64 | 21.64 |
| Back Focus | 31.61 | 31.61 | 31.61 |
| Total Lens Length | 249.68 | 249.68 | 249.68 |
| D5 | 1.200 | 14.150 | 37.750 |
| D9 | 2.000 | 2.000 | 2.000 |
| D12 | 16.030 | 16.030 | 16.030 |
| D17 | 38.290 | 25.341 | 1.740 |

TABLE 26-continued

| | | | |
|---|---|---|---|
| D23 | 18.843 | 12.389 | 3.680 |
| D28 | 3.003 | 9.457 | 18.166 |
| | Focused on 1.2 m | | |
| F-NUMBER | 2.9 | 2.9 | 2.9 |
| Focal Length | 81.37 | 106.64 | 148.93 |
| Object-Image Distance | 1200.00 | 1200.00 | 1200.00 |
| Magnification | −0.083 | −0.113 | −0.213 |
| Half Angle of View | 13.0 | 9.2 | 4.8 |
| Image Height | 21.64 | 21.64 | 21.64 |
| Back Focus | 31.61 | 31.61 | 31.61 |
| Total Lens Length | 249.68 | 249.68 | 249.68 |
| D5 | 1.200 | 14.150 | 37.750 |
| D9 | 10.850 | 11.571 | 13.503 |
| D12 | 7.180 | 6.459 | 4.527 |
| D17 | 38.290 | 25.341 | 1.740 |
| D23 | 18.843 | 12.389 | 3.680 |
| D28 | 3.003 | 9.457 | 18.166 |

TABLE 27

Zoom Lens Group Data

| Group | Initial Surface | Focal Length |
|---|---|---|
| 1 | 1 | 146.21 |
| 2 | 6 | −37.54 |
| 3 | 19 | 102.99 |
| 4 | 24 | 89.06 |
| 5 | 29 | −113.84 |
| 2a | 6 | 203.26 |
| 2b | 9 | −69.67 |
| 2c | 13 | −60.65 |
| Vibration-Isolating | 15 | −41.25 |

TABLE 28

Principal Point Position Data

| Initial | Final | Focal Length | Front P.P. | P.P. Interval | Rear P.P. | |
|---|---|---|---|---|---|---|
| | | | Zoom Lens Group | | | |
| 1 | 5 | 146.210 | 5.484 | 7.087 | 7.670 | First Group |
| 6 | 17 | −37.540 | 26.228 | 10.012 | 12.620 | Second Group |
| 18 | 23 | 102.991 | 0.857 | 6.376 | 10.827 | Third Group |
| 24 | 28 | 89.065 | 2.539 | 5.634 | 7.216 | Fourth Group |
| 29 | 44 | −113.837 | 55.354 | 6.600 | −7.772 | Fifth Group |
| | | | Sub-lens group | | | |
| 6 | 9 | 203.260 | 2.324 | 4.279 | 5.737 | 2a Sub-lens group |
| 10 | 12 | −69.672 | 2.887 | 2.385 | −0.002 | 2b Sub-lens group |
| 13 | 17 | −60.651 | 0.240 | 3.700 | 9.280 | 2c Sub-lens group |
| 6 | 12 | −115.167 | 19.885 | 5.747 | −6.022 | 2ab Sub-lens group |
| 10 | 17 | −28.826 | 10.619 | 7.891 | 16.010 | 2bc Sub-lens group |

FIGS. 86 to 96 and Tables 29 to 32 pertain to the zoom lens system according to Numerical Example 8.

Figure 86:
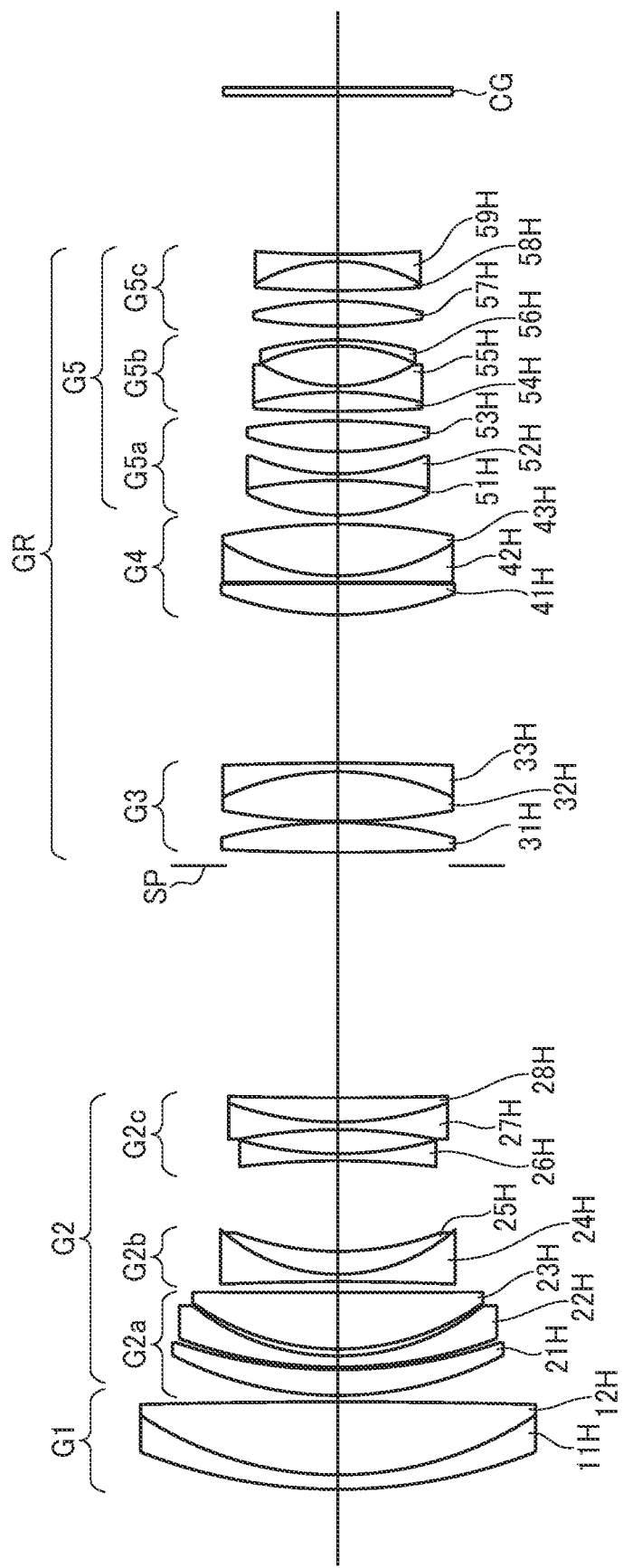
FIG. 86 is a diagram of a configuration of the zoom lens system according to Numerical Example 8 focused on infinity at the short focal length end.

FIG. 86 is an illustration of the configuration of the zoom lens system focused on infinity at the short focal length end.

Figure 87:
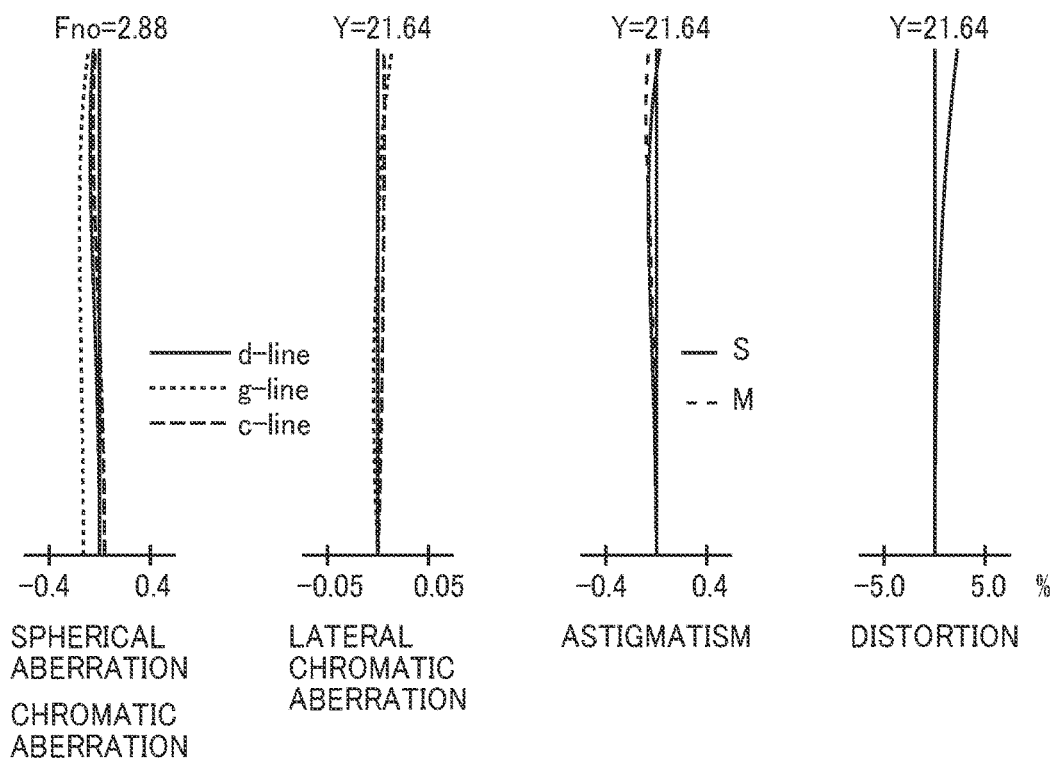
FIG. 87 is a collection of longitudinal aberration diagrams of the zoom lens system according to Numerical Example 8 focused on infinity at the short focal length end.
Figure 88:
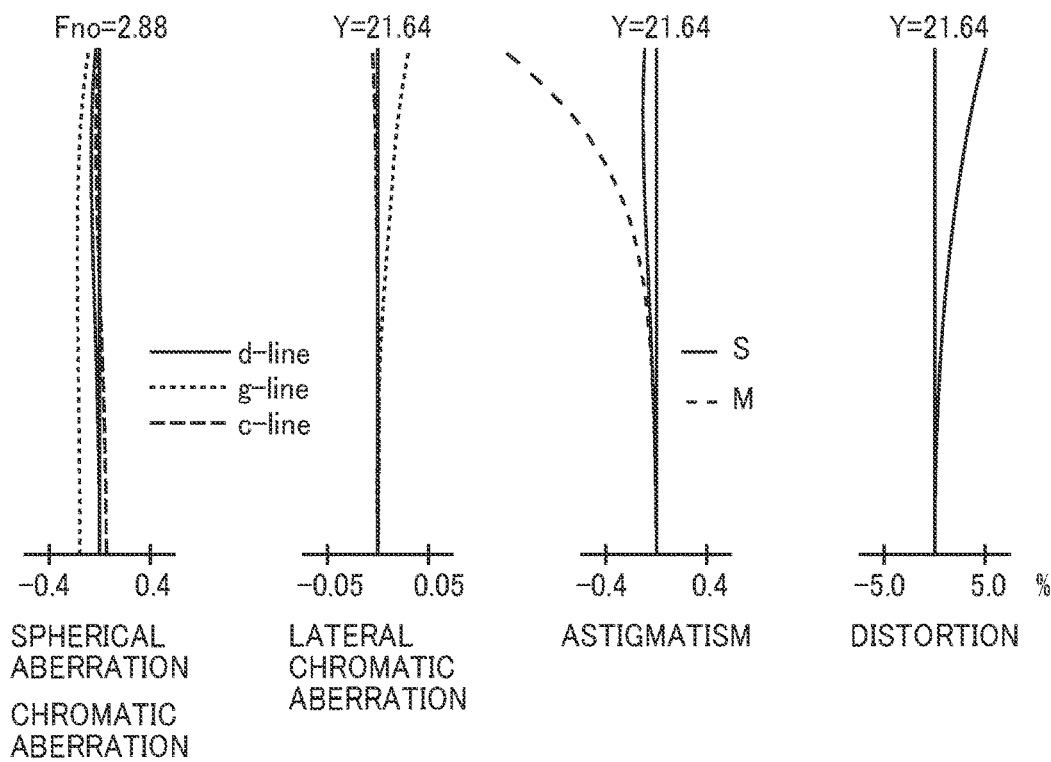
FIG. 88 is a collection of longitudinal aberration diagrams of the zoom lens system according to Numerical Example 8 focused on 1.2 m at the short focal length end.

FIGS. 87 and 88 are longitudinal aberration diagrams of the zoom lens system focused on infinity and 1.2 m at the short focal length end, respectively.

Figure 89:
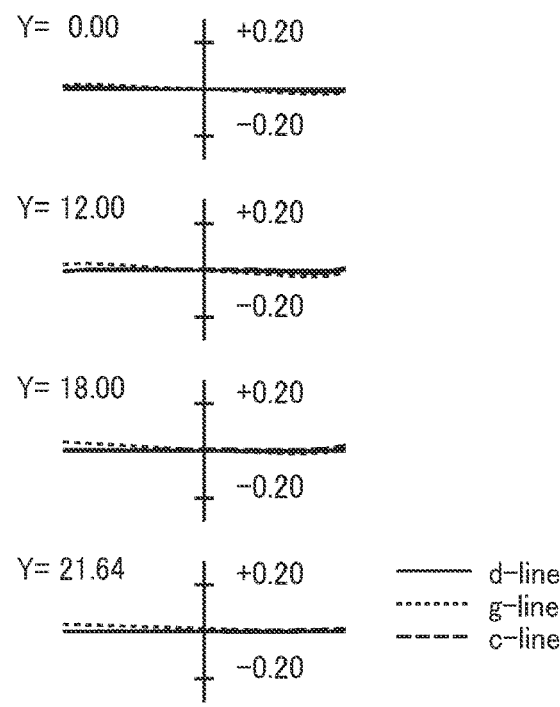
FIG. 89 is a collection of lateral aberration diagrams of the zoom lens system according to Numerical Example 8 focused on infinity at the short focal length end.
Figure 90:
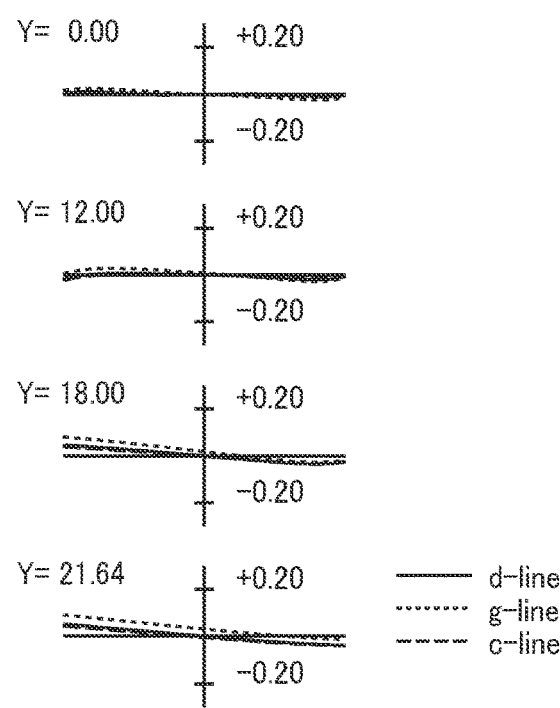
FIG. 90 is a collection of lateral aberration diagrams of the zoom lens system according to Numerical Example 8 focused on 1.2 m at the short focal length end.

FIGS. 89 and 90 are lateral aberration diagrams of the zoom lens system focused on infinity and 1.2 m at the short focal length end, respectively.

Figure 91:
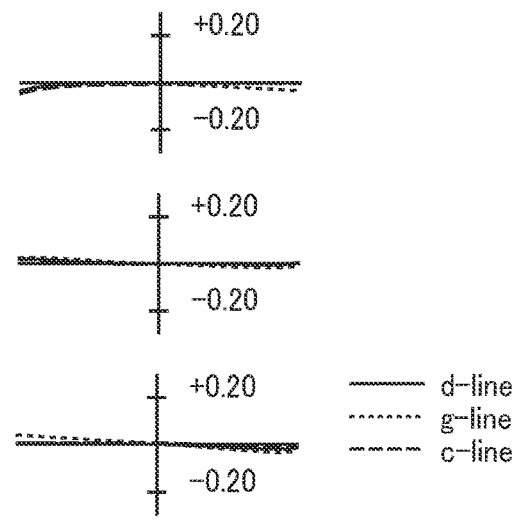
FIG. 91 is a collection of lateral aberration diagrams of the zoom lens system in the state illustrated in FIG. 89 during the drive of vibration isolation.

FIG. 91 is a collection of lateral aberration diagrams of the zoom lens system in the state of FIG. 89 during the drive of vibration isolation.

Figure 92:
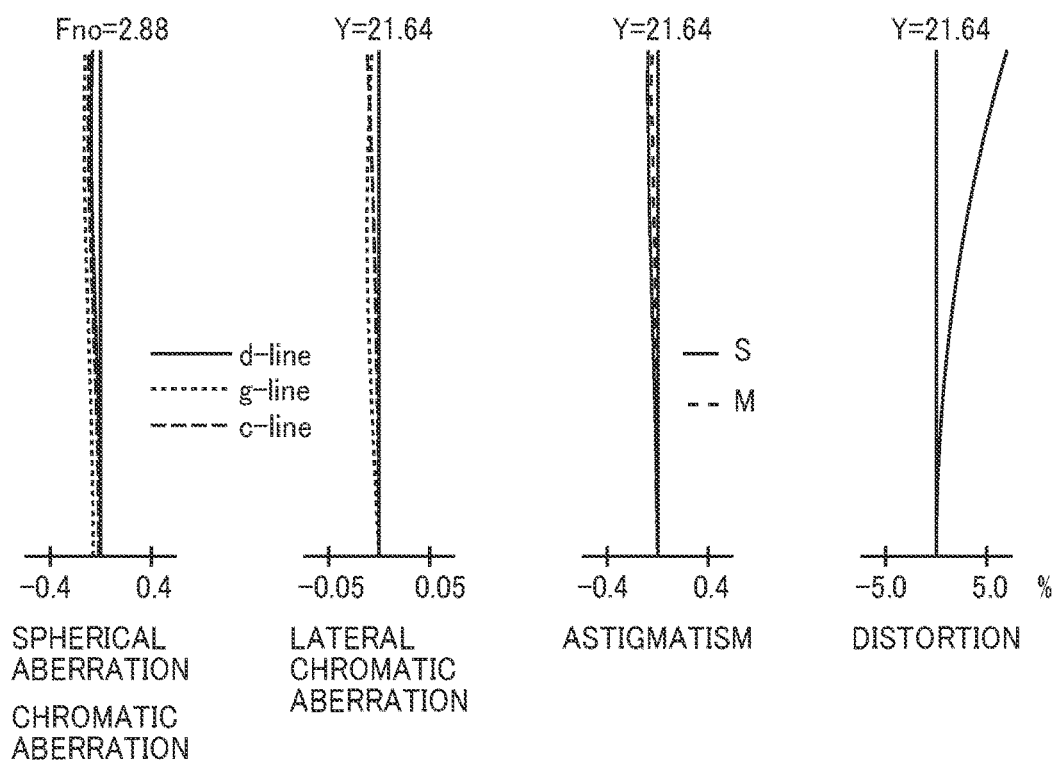
FIG. 92 is a collection of longitudinal aberration diagrams of the zoom lens system according to Numerical Example 8 focused on infinity at the long focal length end.
Figure 93:
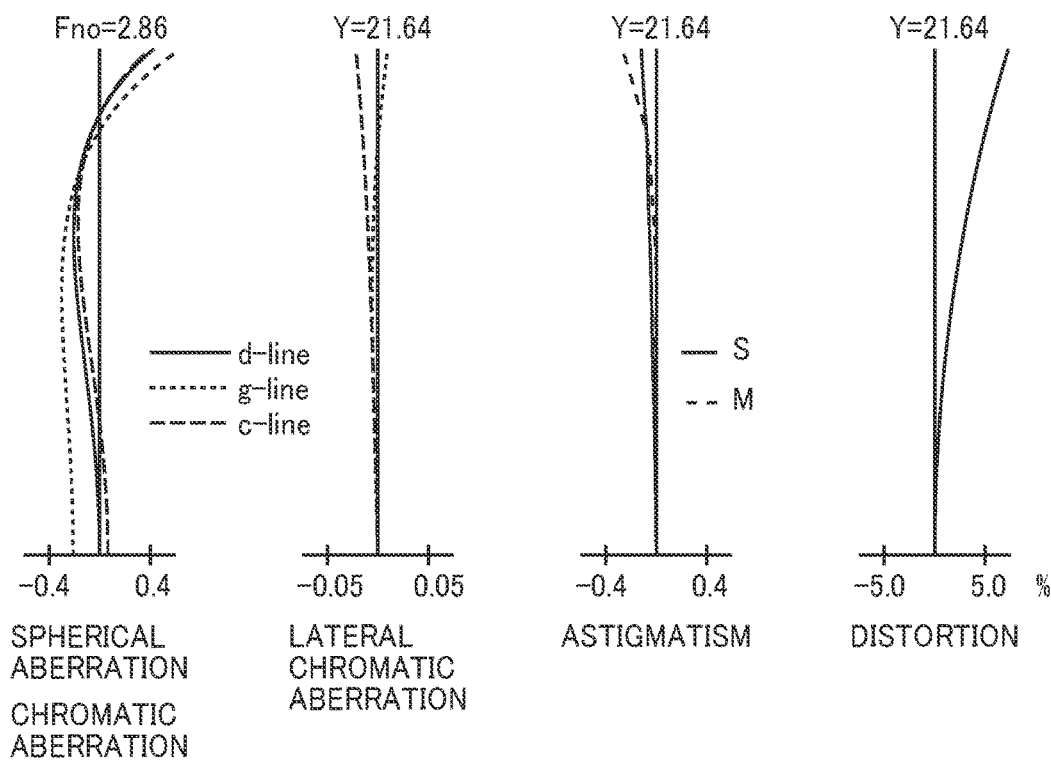
FIG. 93 is a collection of longitudinal aberration diagrams of the zoom lens system according to Numerical Example 8 focused on 1.2 m at the long focal length end.

FIGS. 92 and 93 are longitudinal aberration diagrams of the zoom lens system focused on infinity and 1.2 m at the long focal length end, respectively.

Figure 94:
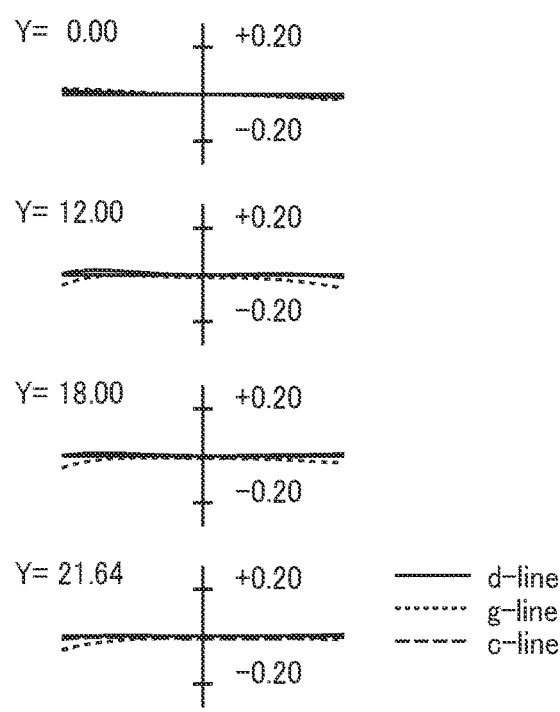
FIG. 94 is a collection of lateral aberration diagrams of the zoom lens system according to Numerical Example 8 focused on infinity at the long focal length end.
Figure 95:
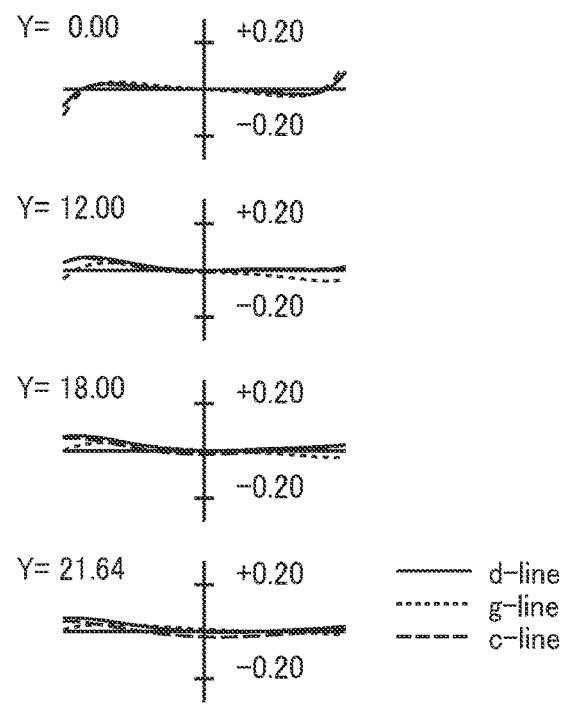
FIG. 95 is a collection of lateral aberration diagrams of the zoom lens system according to Numerical Example 8 focused on 1.2 m at the long focal length end.

FIGS. 94 and 95 are lateral aberration diagrams of the zoom lens system focused on infinity and 1.2 m at the long focal length end, respectively.

Figure 96:
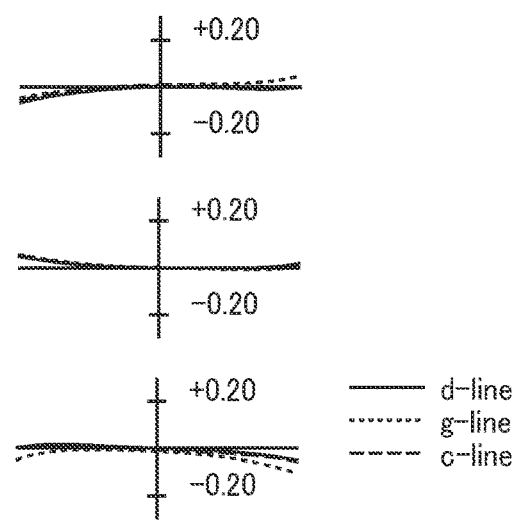
FIG. 96 is a collection of lateral aberration diagrams of the zoom lens system in the state illustrated in FIG. 94 during the drive of vibration isolation of ±0.3°.

FIG. 96 is a collection of lateral aberration diagrams of the zoom lens system in the state illustrated in FIG. 94 during the drive of vibration isolation of ±0.3°.

Tables 29, 30, 31, and 32 represent surface data, various data, zoom lens group data, and principal point position data. In Table 32, the term "P.P." stands for principal point, and the term "P.P. interval" refers to the distance between the principal points. Further, the terms "Initial" and "Final" refer to the "initial lens surface" and "final lens surface", respectively.

The zoom lens system according to Numerical Example 8 includes a first lens group G1 having positive refractive power, a second lens group G2 having negative refractive power, and a rear lens group (subsequent lens group) GR, which are arranged in that order from the object side. The subsequent lens group GR includes, in order from the object side, the third lens group G3 having positive refractive power, the fourth lens group G4 having positive refractive power, and the fifth lens G5 having negative refractive power. That is, the zoom lens system has a zoom lens configuration including the five groups of positive, negative, positive, positive, and negative refractive power.

The first lens group G1 includes a negative meniscus lens 11H with a convex surface facing the object side and a positive biconvex lens 12H, which are arranged in that order from the object side. The negative meniscus lens 11H and the positive biconvex lens 12H are cemented to each other.

The second lens group G2 consists of a second lens group-a G2a having positive refractive power, a second lens group-b G2b having negative refractive power, and a second lens group-c G2c having negative refractive power, which are arranged in that order from the object side.

The second lens group-a G2a includes a positive meniscus lens 21H with a convex surface facing the object side, a negative meniscus lens 22H with a convex surface facing the object side, and a positive meniscus lens 23H with a convex surface facing the object side, which are arranged in that order from the object side.

The second lens group-b G2b includes a negative biconcave lens 24H, and a positive meniscus lens 25H with a convex surface facing the object side arranged in that order from the object side. The negative biconcave lens 24H and the positive meniscus lens 25H are cemented to each other.

The second lens group-c G2c includes a negative biconcave lens 26H, a negative biconcave lens 27H, and a positive meniscus lens 28H with a convex surface facing the object side, which are arranged in that order from the object side. The negative biconcave lens 27H and the positive meniscus lens 28H are cemented to each other.

The third lens group G3 includes a positive biconvex lens 31H, a positive biconvex lens 32H, and a negative meniscus lens 33H having a convex surface facing the image side, which are arranged in that order from the object side. The positive biconvex lens 32H and the negative meniscus lens 33H are cemented to each other.

The fourth lens group G4 includes a positive biconvex lens 41H, a negative biconcave lens 42H, and a positive biconvex lens 43H, which are arranged in that order from the object side. The negative biconcave lens 42H and the positive biconvex lens 43H are cemented to each other.

The fifth lens group G5 includes a fifth lens group-a G5a having positive refractive power, a fifth lens group-b G5b having negative refractive power, and a fifth lens group-c G5c having positive refractive power, which are arranged in that order from the object side.

The fifth lens group-a G5a includes a positive biconvex lens 51H, a negative biconcave lens 52H, and a positive biconvex lens 53H, which are arranged in that order from the object side. The positive biconvex lens 51H and the negative biconcave lens 52H are cemented to each other.

The fifth lens group-b G5b includes a positive biconvex lens 54H, a negative biconcave lens 55H, and a negative meniscus lens 56H with a convex surface facing the image side, which are arranged in that order from the object side. The positive biconvex lens 54H and the negative biconcave lens 55H are cemented to each other.

The fifth lens group-c G5c includes a positive biconvex lens 57H, a positive biconvex lens 58H, and a negative biconcave lens 59H, which are arranged in that order from the object side. The positive biconvex lens 58H and the negative biconcave lens 59H are cemented to each other.

TABLE 29

Surface Data

| Surface Number | r | D | N(d) | ν(d) |
|---|---|---|---|---|
| 1 | 101.460 | 2.700 | 1.85883 | 30.0 |
| 2 | 66.915 | 13.710 | 1.59410 | 60.5 |
| 3 | −1371.819 | D3 | | |
| 4 | 67.496 | 4.820 | 1.48749 | 70.2 |
| 5 | 92.998 | 0.500 | | |
| 6 | 85.477 | 2.070 | 1.72047 | 34.7 |
| 7 | 44.079 | 1.300 | | |
| 8 | 47.000 | 10.660 | 1.59410 | 60.5 |
| 9 | 30296.049 | D9 | | |
| 10 | −504.435 | 1.370 | 1.77250 | 49.6 |
| 11 | 33.000 | 4.300 | 1.84666 | 23.8 |
| 12 | 54.479 | D12 | | |
| 13 | −152.165 | 1.330 | 1.90043 | 37.4 |
| 14 | 69.197 | 4.500 | | |
| 15 | −95.660 | 1.430 | 1.49700 | 81.6 |
| 16 | 61.219 | 4.560 | 2.05090 | 26.9 |
| 17 | 794.082 | D17 | | |
| 18 Stop | INFINITY | 2.500 | | |
| 19 | 450.007 | 5.610 | 1.90366 | 31.3 |
| 20 | −83.998 | 0.200 | | |
| 21 | 115.169 | 9.320 | 1.49700 | 81.6 |
| 22 | −51.093 | 1.630 | 2.00100 | 29.1 |
| 23 | −531.092 | D23 | | |
| 24 | 63.003 | 5.880 | 1.91082 | 35.2 |
| 25 | −1550.091 | 0.200 | | |
| 26 | −6787.793 | 1.220 | 1.90366 | 31.3 |
| 27 | 41.335 | 9.690 | 1.53775 | 74.7 |
| 28 | −109.863 | D28 | | |
| 29 | 38.816 | 6.500 | 1.49700 | 81.6 |
| 30 | −94.506 | 1.260 | 1.90366 | 31.3 |
| 31 | 41.448 | 4.140 | | |
| 32 | 53.883 | 5.770 | 1.90366 | 31.3 |
| 33 | −111.107 | 1.800 | | |
| 34 | 258.000 | 3.600 | 1.84666 | 23.8 |
| 35 | −65.396 | 1.150 | 1.65160 | 58.5 |
| 36 | 27.068 | 7.500 | | |
| 37 | −33.923 | 1.130 | 1.65160 | 58.5 |
| 38 | −55.833 | 2.600 | | |
| 39 | 96.283 | 4.670 | 1.75520 | 27.5 |
| 40 | −61.974 | 2.000 | | |
| 41 | 224.495 | 5.460 | 1.51633 | 64.1 |
| 42 | −30.520 | 1.320 | 2.00100 | 29.1 |
| 43 | 217.587 | 29.767 | | |
| 44 | INFINITY | 1.500 | 1.51680 | 64.2 |
| 45 | INFINITY | — | | |

TABLE 30

Various Data
Zoom Ratio 2.69

| | Short Focal Length End | Mid-Focal Length | Long Focal Length End |
|---|---|---|---|
| Focused on Infinity | | | |
| F-NUMBER | 2.9 | 2.9 | 2.9 |
| Focal Length | 72.08 | 100.00 | 194.00 |
| Object-Image Distance | INFINITY | INFINITY | INFINITY |
| Magnification | 0.000 | 0.000 | 0.000 |
| Half Angle of View | 16.4 | 11.7 | 6.0 |
| Image Height | 21.64 | 21.64 | 21.64 |
| Back Focus | 31.76 | 31.76 | 31.76 |
| Total Lens Length | 263.38 | 263.38 | 263.38 |
| D3 | 1.200 | 17.175 | 42.974 |
| D9 | 2.000 | 2.000 | 2.000 |
| D12 | 17.000 | 17.000 | 17.000 |
| D17 | 43.514 | 27.539 | 1.740 |
| D23 | 27.812 | 19.647 | 2.001 |
| D28 | 1.700 | 9.865 | 27.511 |
| Focused on 1.2 m | | | |
| F-NUMBER | 2.9 | 2.9 | 2.9 |
| Focal Length | 84.19 | 110.42 | 151.76 |
| Object-Image Distance | 1200.00 | 1200.00 | 1200.00 |
| Magnification | −0.084 | −0.115 | −0.216 |
| Half Angle of View | 12.7 | 8.9 | 4.6 |
| Image Height | 21.64 | 21.64 | 21.64 |
| Back Focus | 31.76 | 31.76 | 31.76 |
| Total Lens Length | 263.38 | 263.38 | 263.38 |
| D3 | 1.200 | 17.175 | 42.974 |
| D9 | 11.095 | 12.004 | 13.942 |
| D12 | 7.905 | 6.996 | 5.058 |
| D17 | 43.514 | 27.539 | 1.740 |
| D23 | 27.812 | 19.647 | 2.001 |
| D28 | 1.700 | 9.865 | 27.511 |

TABLE 31

Zoom Lens Group Data

| Group | Initial Surface | Focal Length |
|---|---|---|
| 1 | 1 | 201.29 |
| 2 | 4 | −44.78 |
| 3 | 19 | 101.01 |
| 4 | 24 | 91.26 |
| 5 | 29 | −140.96 |
| 2a | 6 | 146.43 |
| 2b | 9 | −67.50 |
| 2c | 13 | −62.15 |
| Vibration-Isolating | 15 | −41.25 |

TABLE 32

Principal Point Position Data

| Initial | Final | Focal Length | Front P.P. | P.P. Interval | Rear P.P. | |
|---|---|---|---|---|---|---|
| Zoom Lens Group | | | | | | |
| 1 | 3 | 201.293 | −0.276 | 6.322 | 10.364 | First Group |
| 4 | 17 | −44.781 | 39.085 | 8.003 | 8.752 | Second Group |
| 18 | 23 | 101.008 | −0.089 | 7.138 | 12.211 | Third Group |
| 24 | 28 | 91.258 | 1.619 | 6.403 | 8.968 | Fourth Group |
| 29 | 43 | −140.956 | 52.991 | 7.510 | −11.601 | Fifth Group |
| Sub-lens group | | | | | | |
| 4 | 9 | 146.432 | 1.991 | 6.285 | 11.074 | 2a Sub-lens group |
| 10 | 12 | −67.500 | 3.132 | 2.571 | −0.033 | 2b Sub-lens group |

TABLE 32-continued

Principal Point Position Data

| Initial | Final | Focal Length | Front P.P. | P.P. Interval | Rear P.P. | |
|---|---|---|---|---|---|---|
| 13 | 17 | −62.153 | −0.554 | 3.330 | 9.044 | 2c Sub-lens group |
| 4 | 12 | −157.578 | 39.824 | 4.669 | −17.473 | 2ab Sub-lens group |
| 8 | 17 | −73.194 | 49.462 | −0.404 | 1.908 | 2bc Sub-lens group |

FIGS. 100 to 110 and Tables 33 to 36 pertain to the zoom lens system according to Numerical Example 9.

Figure 100:
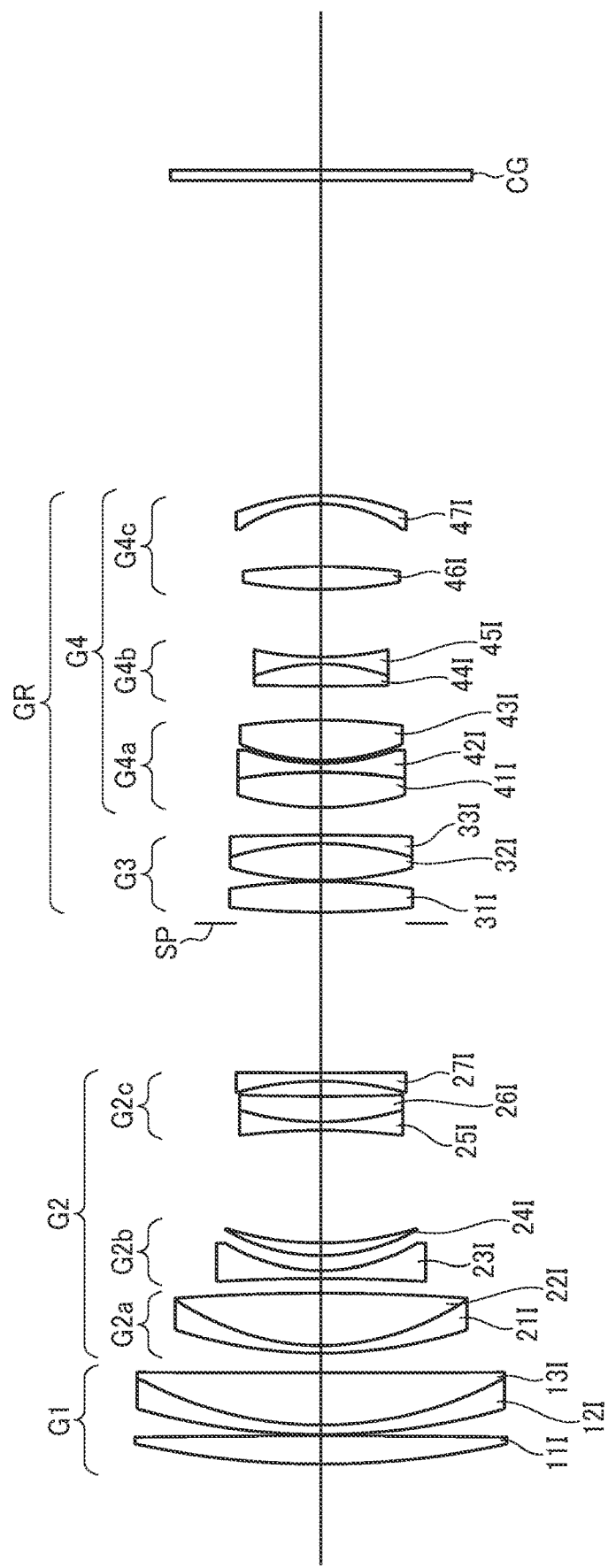
FIG. 100 is a diagram of a configuration of the zoom lens system according to Numerical Example 9 focused on infinity at the short focal length end.

FIG. 100 is an illustration of the configuration of the zoom lens system focused on infinity at the short focal length end.

Figure 101:
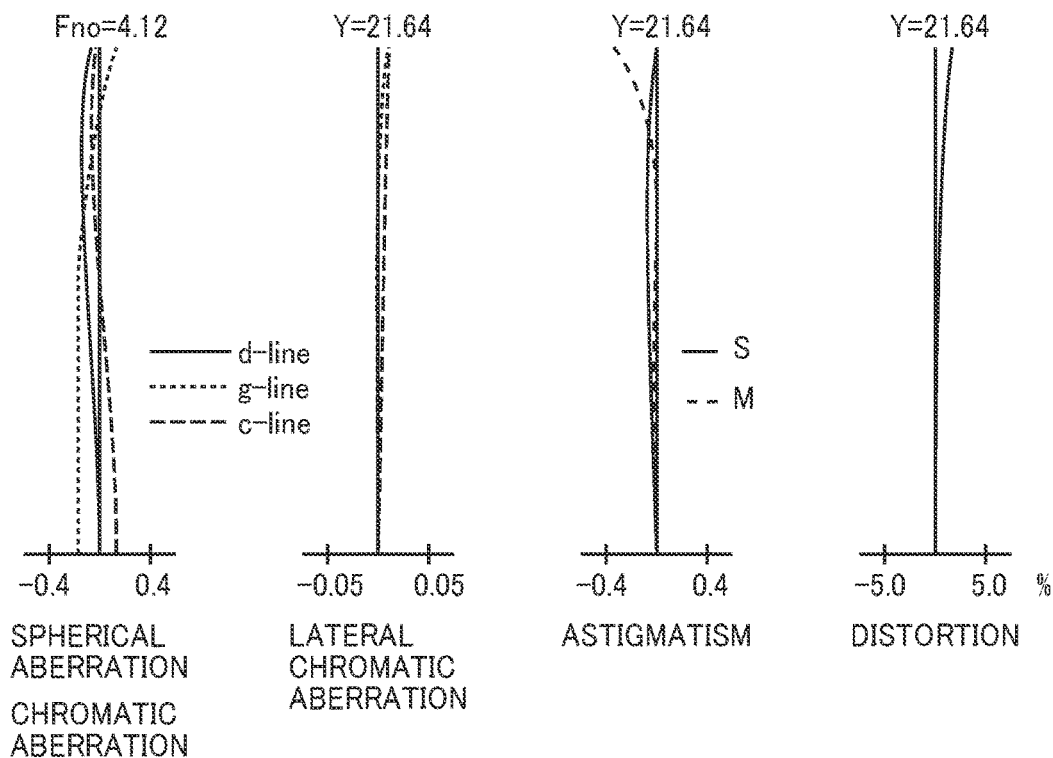
FIG. 101 is a collection of longitudinal aberration diagrams of the zoom lens system according to Numerical Example 9 focused on infinity at the short focal length end.
Figure 102:
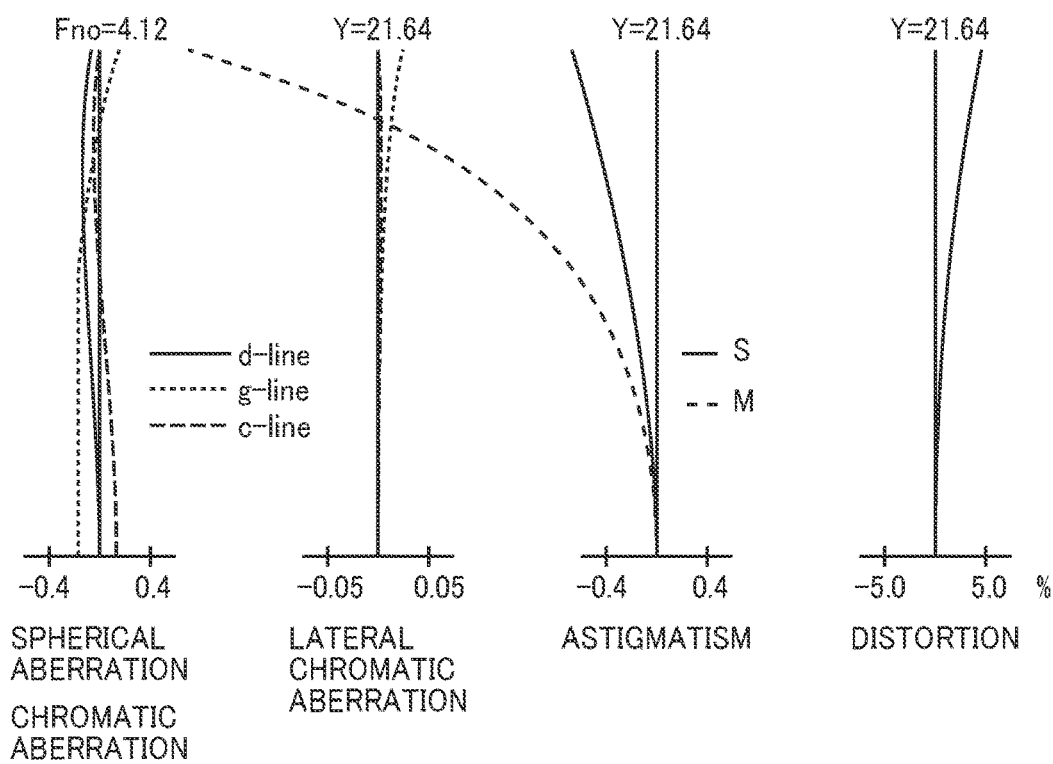
FIG. 102 is a collection of longitudinal aberration diagrams of the zoom lens system according to Numerical Example 9 focused on 1.2 m at the short focal length end.

FIGS. 101 and 102 are longitudinal aberration diagrams of the zoom lens system focused on infinity and 1.2 m at the short focal length end, respectively.

Figure 103:
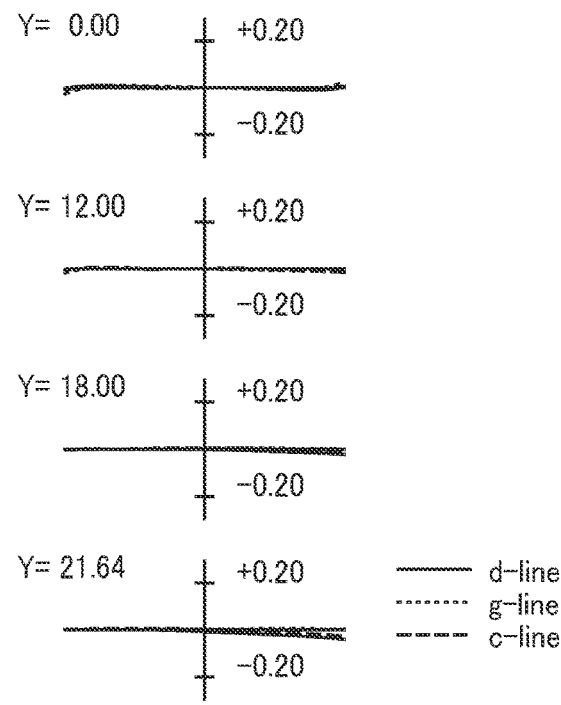
FIG. 103 is a collection of lateral aberration diagrams of the zoom lens system according to Numerical Example 9 focused on infinity at the short focal length end.
Figure 104:
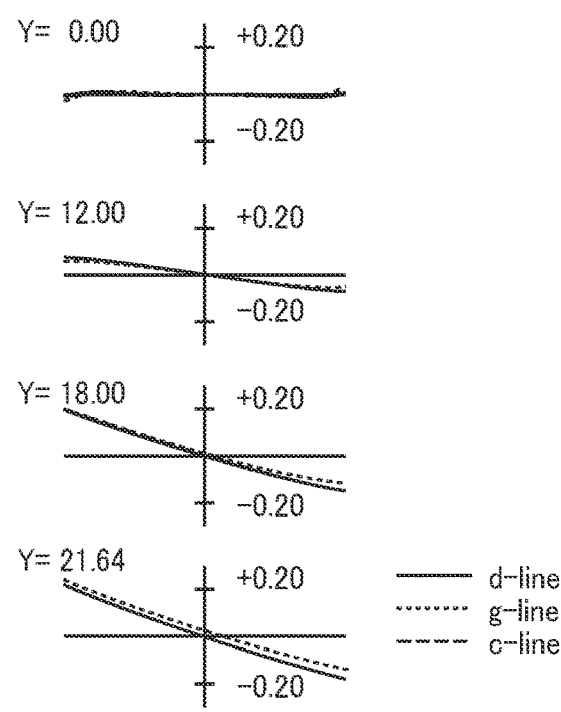
FIG. 104 is a collection of lateral aberration diagrams of the zoom lens system according to Numerical Example 9 focused on 1.2 m at the short focal length end.

FIGS. 103 and 104 are lateral aberration diagrams of the zoom lens system focused on infinity and 1.2 m at the short focal length end, respectively.

Figure 105:
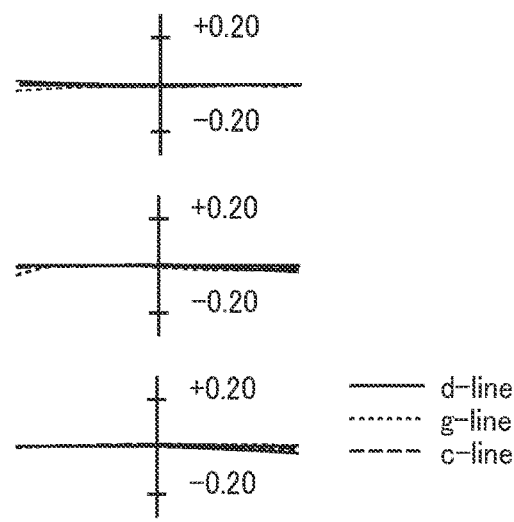
FIG. 105 is a collection of lateral aberration diagrams of the zoom lens system in the state illustrated in FIG. 103 during the drive of vibration isolation.

FIG. 105 is a collection of lateral aberration diagrams of the zoom lens system in the state of FIG. 103 during the drive of vibration isolation.

Figure 106:
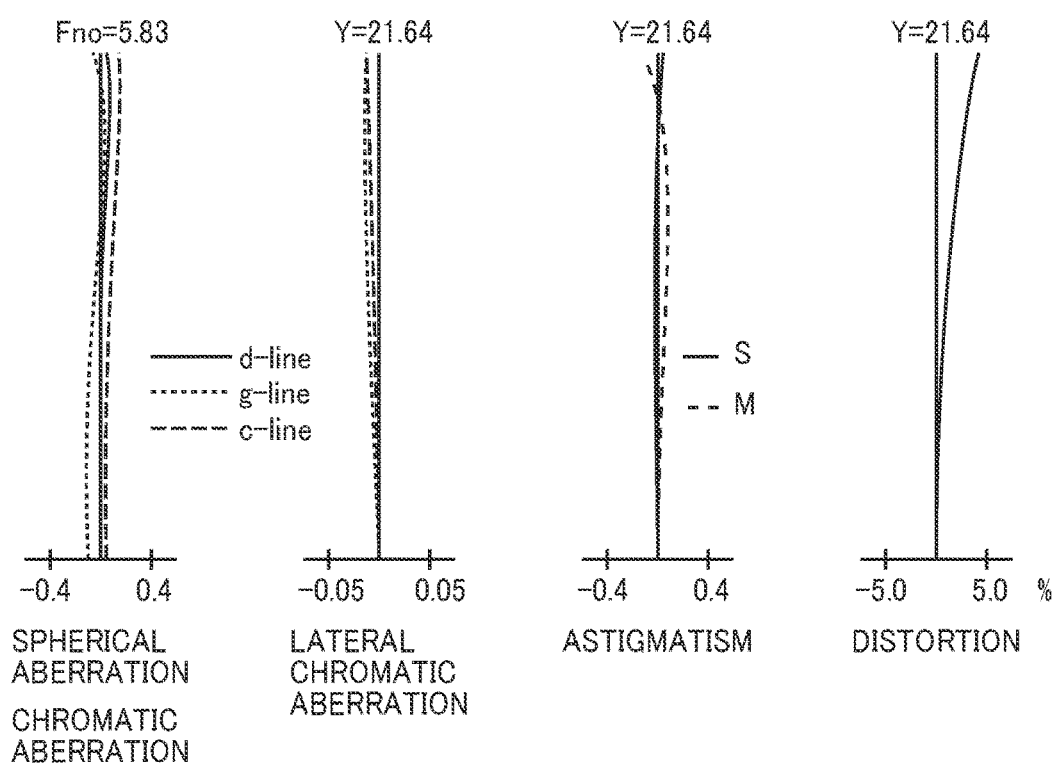
FIG. 106 is a collection of longitudinal aberration diagrams of the zoom lens system according to Numerical Example 9 focused on infinity at the long focal length end.
Figure 107:
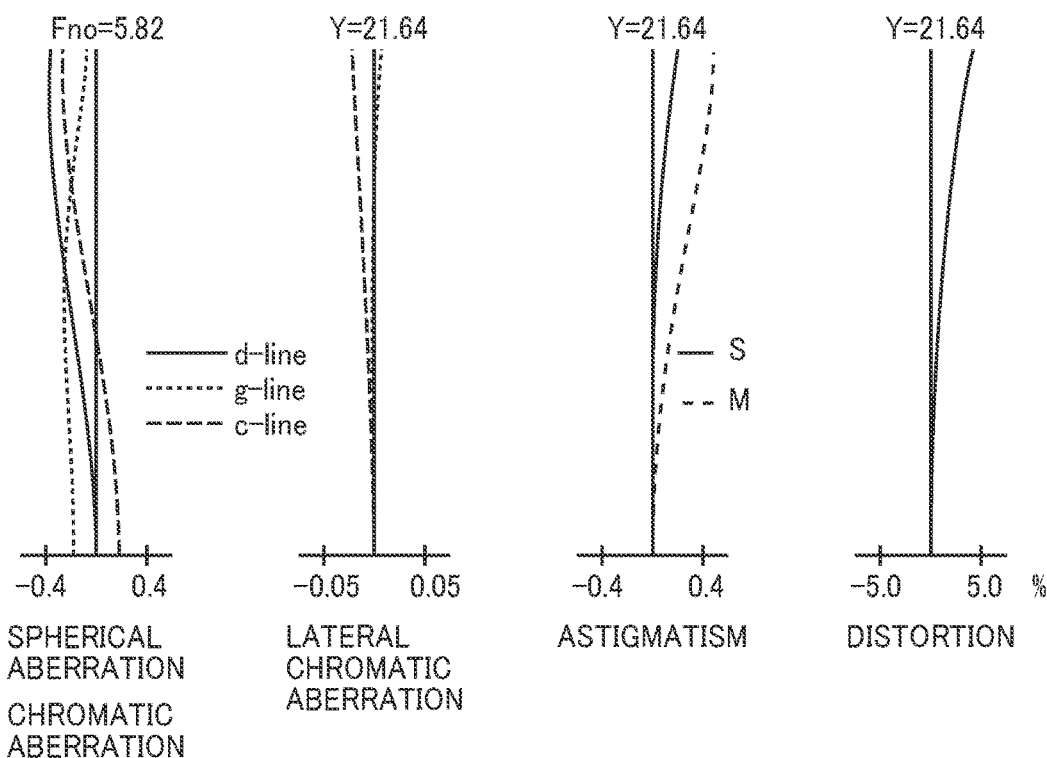
FIG. 107 is a collection of longitudinal aberration diagrams of the zoom lens system according to Numerical Example 9 focused on 1.2 m at the long focal length end.

FIGS. 106 and 107 are longitudinal aberration diagrams of the zoom lens system focused on infinity and 1.2 m at the long focal length end, respectively.

Figure 108:
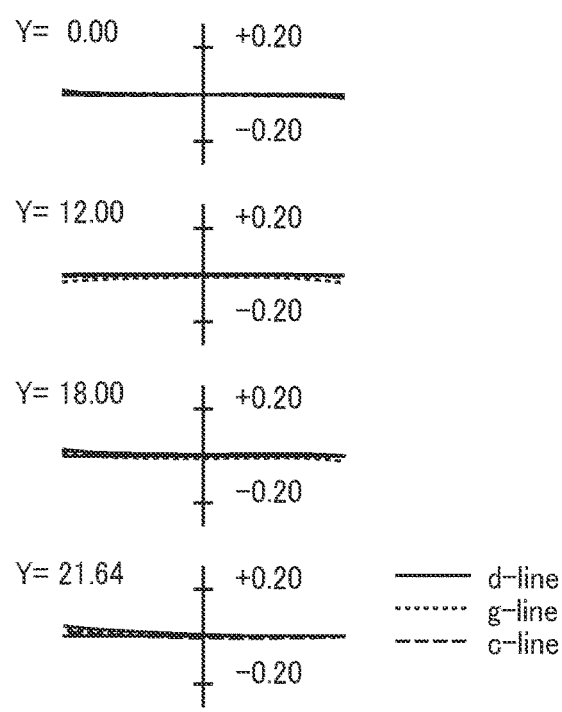
FIG. 108 is a collection of lateral aberration diagrams of the zoom lens system according to Numerical Example 9 focused on infinity at the long focal length end.
Figure 109:
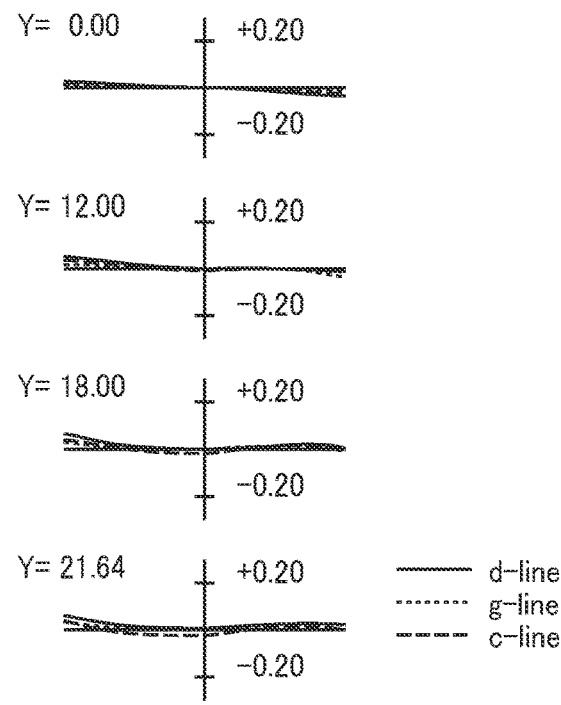
FIG. 109 is a collection of lateral aberration diagrams of the zoom lens system according to Numerical Example 9 focused on 1.2 m at the long focal length end.

FIGS. 108 and 109 are lateral aberration diagrams of the zoom lens system focused on infinity and 1.2 m at the long focal length end, respectively.

Figure 110:
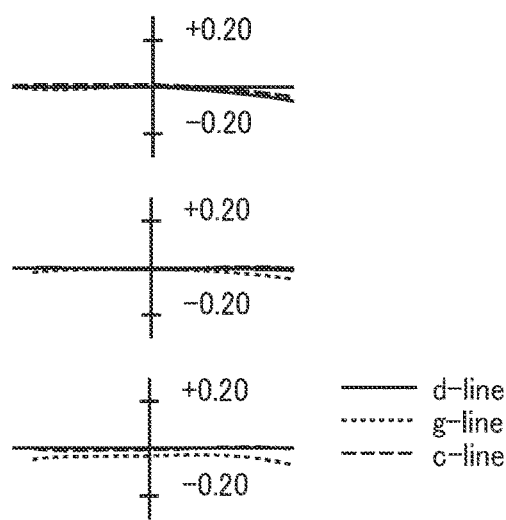
FIG. 110 is a collection of lateral aberration diagrams of the zoom lens system in the state illustrated in FIG. 108 during the drive of vibration isolation of ±0.3°.

FIG. 110 is a collection of lateral aberration diagrams of the zoom lens system in the state illustrated in FIG. 108 during the drive of vibration isolation of ±0.3°.

Tables 33, 34, 35, and 36 represent surface data, various data, zoom lens group data, and principal point position data. In Table 36, the term "P.P." stands for principal point, and the term "P.P. interval" refers to the distance between the principal points. Further, the terms "Initial" and "Final" refer to the "initial lens surface" and "final lens surface", respectively.

The zoom lens system according to Numerical Example 9 includes a first lens group G1 having positive refractive power, a second lens group G2 having negative refractive power, and a rear lens group (subsequent lens group) GR, which are arranged in that order from the object side. The subsequent lens group GR includes, in order from the object side, the third lens group G3 having negative refractive power, and the fourth lens group G4 having negative refractive power. That is, the zoom lens system has a zoom lens configuration including the five groups of positive, negative, positive, and negative refractive power.

The first lens group G1 includes a positive biconvex lens 11I, a negative meniscus lens 12I with a convex surface facing the object side, and a positive plano-convex lens 13I with a convex surface facing the object side, which are arranged in that order from the object side. The negative meniscus lens 12I and the positive planoconvex lens 13I are cemented to each other.

The second lens group G2 consists of a second lens group-a G2a having positive refractive power, a second lens group-b G2b having negative refractive power, and a second lens group-c G2c having negative refractive power, which are arranged in that order from the object side.

The second lens group-a G2a includes a negative meniscus lens 21I with a convex surface facing the object side and a positive biconvex lens 22I, which are arranged in that order from the object side. The negative meniscus lens 21H and the positive biconvex lens 22I are cemented to each other.

The second lens group-b G2b includes a negative biconcave lens 23I, and a positive meniscus lens 24I with a convex surface facing the object side arranged in that order from the object side.

The second lens group-c G2c includes a negative biconcave lens 25I, a negative biconvex lens 26I, and a negative meniscus lens 27I with a convex surface facing the image side. The negative biconcave lens 25I and the positive biconvex lens 26I are cemented to each other.

The third lens group G3 includes a positive biconvex lens 31I, a positive biconvex lens 32I, and a negative meniscus lens 33I having a convex surface facing the image side, which are arranged in that order from the object side. The positive biconvex lens 32I and the negative meniscus lens 33I are cemented to each other.

The fourth lens group G4 includes a fourth lens group-a G4a, a fourth lens group-b G4b, and a fourth lens group-c G4c, which are arranged in that order from the object side.

The fourth lens group-a G4a includes a positive biconvex lens 41I, a negative biconcave lens 42I, and a positive biconvex lens 43I, which are arranged in that order from the object side. The positive biconvex lens 41I and the negative biconcave lens 42I are cemented to each other.

The fourth lens group-b G4b includes a positive biconvex lens 44I and a negative biconcave lens 45I, which are arranged in that order from the object side. The positive biconvex lens 44I and the negative biconcave lens 45I are cemented to each other.

The fourth lens group-c C4c includes a positive biconvex lens 46I and a negative meniscus lens 47I with a convex surface facing the image side, which are arranged in that order from the object side.

TABLE 33

Surface Data

| Surface Number | r | D | N(d) | ν(d) |
|---|---|---|---|---|
| 1 | 117.757 | 4.000 | 1.48749 | 70.2 |
| 2 | −2773.131 | 0.200 | | |
| 3 | 103.049 | 1.500 | 1.74950 | 35.3 |
| 4 | 56.571 | 7.400 | 1.49700 | 81.6 |
| 5 | INFINITY | D5 | | |
| 6 | 68.207 | 1.200 | 1.90043 | 37.4 |
| 7 | 38.000 | 7.500 | 1.58313 | 59.4 |
| 8 | −280.407 | D8 | | |
| 9 | −209.874 | 1.200 | 1.77250 | 49.6 |
| 10 | 26.762 | 2.000 | | |
| 11 | 27.082 | 2.000 | 1.84666 | 23.8 |
| 12 | 45.797 | D12 | | |
| 13 | −55.344 | 1.200 | 1.75500 | 52.3 |
| 14 | 50.834 | 3.660 | 1.85478 | 24.8 |
| 15 | −300.000 | 1.820 | | |
| 16 | −43.730 | 1.200 | 1.62299 | 58.2 |
| 17 | −40130.232 | D17 | | |
| 18 Stop | INFINITY | 1.000 | | |
| 19 | 111.055 | 4.307 | 1.88300 | 40.8 |
| 20 | −80.378 | 0.200 | | |

TABLE 33-continued

Surface Data

| Surface Number | r | D | N(d) | v(d) |
|---|---|---|---|---|
| 21 | 41.051 | 5.891 | 1.48749 | 70.2 |
| 22 | −47.843 | 1.200 | 2.00100 | 29.1 |
| 23 | −418.179 | D23 | | |
| 24 | 47.946 | 5.070 | 1.59282 | 68.6 |
| 25 | −92.822 | 1.000 | 1.90366 | 31.3 |
| 26 | 37.216 | 0.300 | | |
| 27 | 32.262 | 5.943 | 1.61405 | 55.0 |
| 28 | −84.092 | 5.000 | | |
| 29 | 635.248 | 3.000 | 1.85025 | 30.0 |
| 30 | −25.936 | 1.000 | 1.80400 | 46.5 |
| 31 | 41.076 | 9.946 | | |
| 32 | 75.873 | 3.127 | 1.83481 | 42.7 |
| 33 | −194.544 | 9.066 | | |
| 34 | −21.491 | 1.200 | 1.73400 | 51.5 |
| 35 | −36.089 | D35 | | |
| 36 | INFINITY | 1.500 | 1.51633 | 64.1 |
| 37 | INFINITY | — | | |

TABLE 34

Various Data
Zoom Ratio 4.04

| | Short Focal Length End | Mid-Focal Length | Long Focal Length End |
|---|---|---|---|
| *Focused on Infinity* | | | |
| F-NUMBER | 4.1 | 5.0 | 5.8 |
| Focal Length | 72.08 | 135.00 | 291.30 |
| Object-Image Distance | INFINITY | INFINITY | INFINITY |
| Magnification | 0.000 | 0.000 | 0.000 |
| Half Angle of View | 16.5 | 8.8 | 4.1 |
| Image Height | 21.64 | 21.64 | 21.64 |
| Back Focus | 47.62 | 64.39 | 77.41 |
| Total Lens Length | 186.83 | 220.27 | 253.23 |
| D5 | 2.950 | 27.582 | 51.351 |
| D8 | 2.000 | 2.000 | 2.000 |
| D12 | 16.460 | 16.460 | 16.460 |
| D17 | 21.840 | 13.521 | 2.000 |
| D23 | 3.821 | 4.188 | 11.885 |
| D35 | 45.636 | 62.401 | 75.419 |
| *Focused on 1.2 m* | | | |
| F-NUMBER | 4.1 | 5.0 | 5.8 |
| Focal Length | 79.24 | 136.04 | 193.55 |
| Object-Image Distance | 1200.00 | 1200.00 | 1200.00 |
| Magnification | −0.078 | −0.147 | −0.317 |
| Half Angle of View | 13.5 | 7.0 | 3.1 |
| Image Height | 21.64 | 21.64 | 21.64 |
| Back Focus | 47.62 | 64.39 | 77.41 |
| Total Lens Length | 186.83 | 220.27 | 253.23 |
| D5 | 2.950 | 27.582 | 51.351 |
| D8 | 7.968 | 9.235 | 11.314 |
| D12 | 10.492 | 9.225 | 7.146 |
| D17 | 21.840 | 13.521 | 2.000 |
| D23 | 3.821 | 4.188 | 11.885 |
| D35 | 45.636 | 62.401 | 75.419 |

TABLE 35

Zoom Lens Group Data

| Group | Initial Surface | Focal Length |
|---|---|---|
| 1 | 1 | 140.18 |
| 2 | 6 | −25.29 |
| 3 | 19 | 43.16 |
| 4 | 24 | −31675.66 |
| 2a | 6 | 144.20 |
| 2b | 9 | −52.74 |
| 2c | 13 | −42.31 |
| Vibration-Isolating | 29 | −61.05 |

TABLE 36

Principal Point Position Data

| Initial | Final | Focal Length | Front P.P. | P.P. Interval | Rear P.P. | |
|---|---|---|---|---|---|---|
| *Zoom Lens Group* | | | | | | |
| 1 | 5 | 140.178 | 0.679 | 4.414 | 8.007 | First Group |
| 6 | 17 | −25.292 | 23.165 | 9.198 | 7.876 | Second Group |
| 18 | 23 | 43.165 | 1.178 | 4.737 | 6.683 | Third Group |
| 24 | 35 | −31675.664 | 8206.680 | −1673.389 | −6488.640 | Fourth Group |
| *Sub-lens group* | | | | | | |
| 6 | 8 | 144.201 | 0.857 | 3.279 | 4.564 | 2a Sub-lens group |
| 9 | 12 | −52.738 | 0.188 | 1.484 | 3.528 | 2b Sub-lens group |
| 13 | 17 | −42.308 | 2.307 | 2.794 | 2.779 | 2c Sub-lens group |
| 6 | 12 | −89.774 | 12.350 | 4.225 | −0.675 | 2ab Sub-lens group |
| 9 | 17 | −19.015 | 10.208 | 8.514 | 10.818 | 2abc Sub-lens group |

Figure 111:
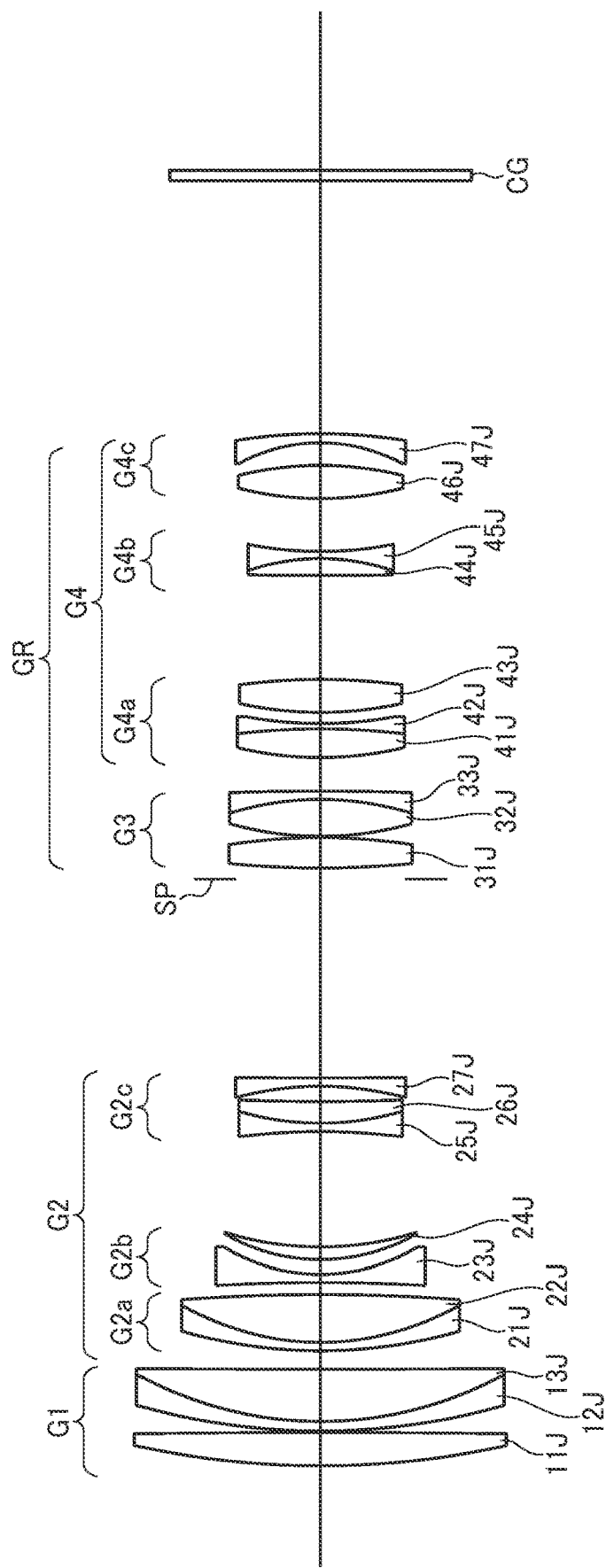
FIG. 111 is a diagram of a configuration of the zoom lens system according to Numerical Example 10 focused on infinity at the short focal length end.

FIGS. 111 to 121 and Tables 37 to 41 pertain to the zoom lens system according to Numerical Example 10. FIG. 111 is an illustration of the configuration of the zoom lens system focused on infinity at the short focal length end.

Figure 112:
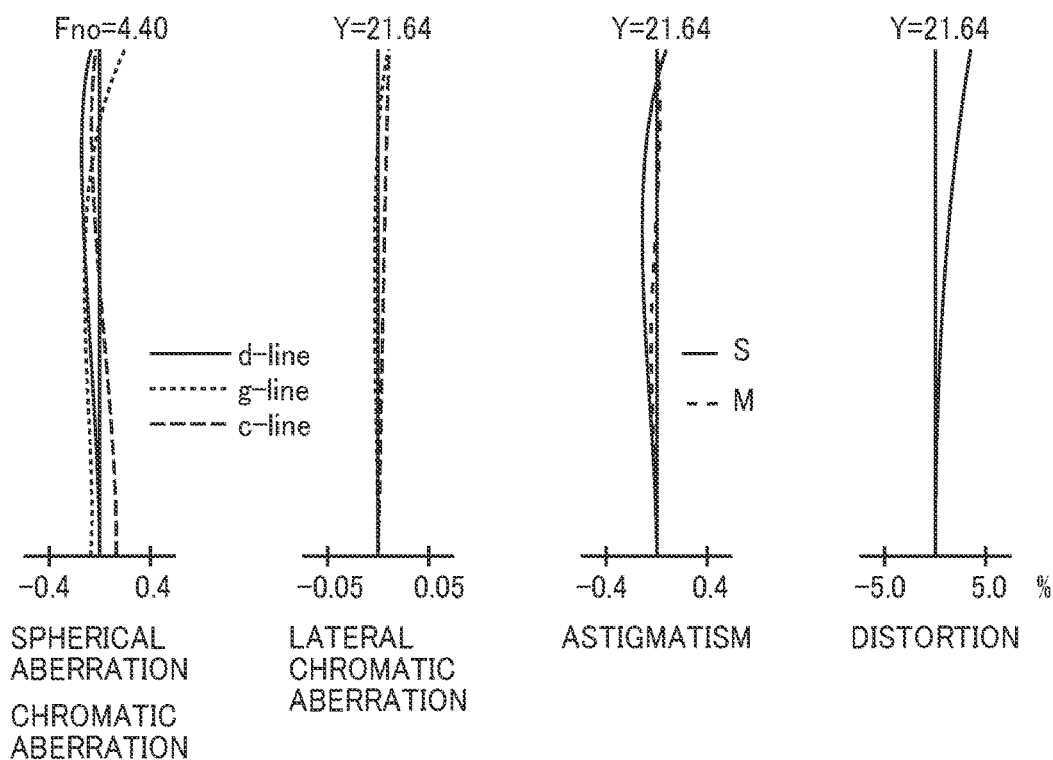
FIG. 112 is a collection of longitudinal aberration diagrams of the zoom lens system according to Numerical Example 10 focused on infinity at the short focal length end.
Figure 113:
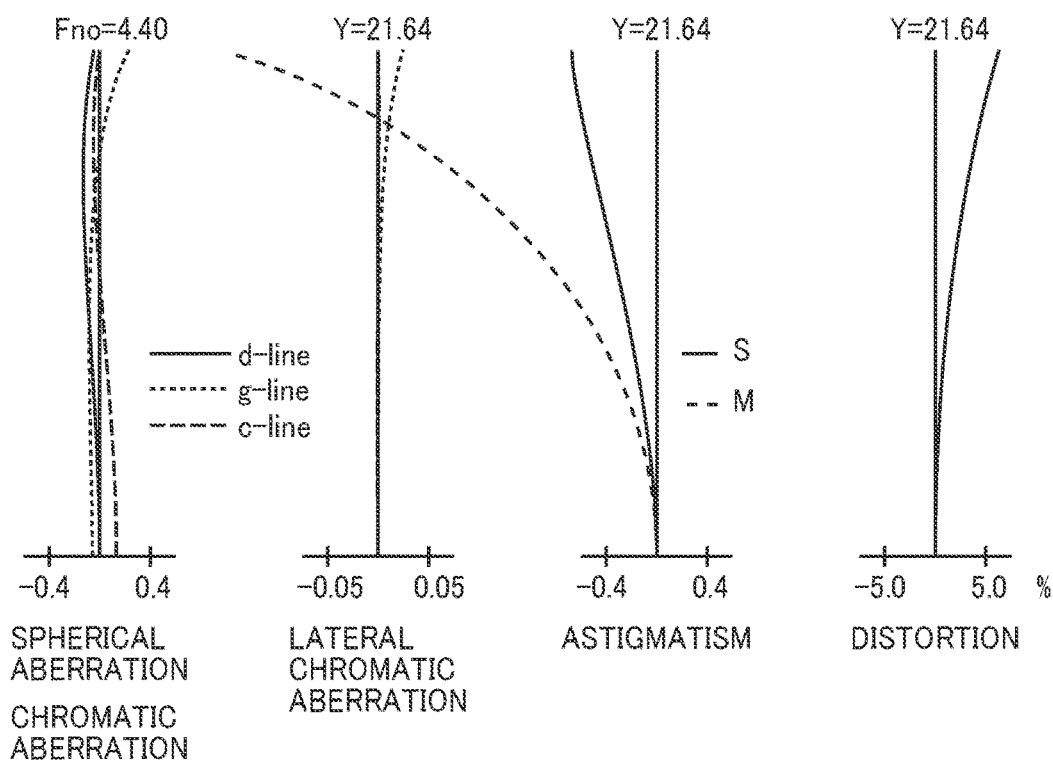
FIG. 113 is a collection of longitudinal aberration diagrams of the zoom lens system according to Numerical Example 10 focused on 1.2 m at the short focal length end.

FIGS. 112 and 113 are longitudinal aberration diagrams of the zoom lens system focused on infinity and 1.2 m at the short focal length end, respectively.

Figure 114:
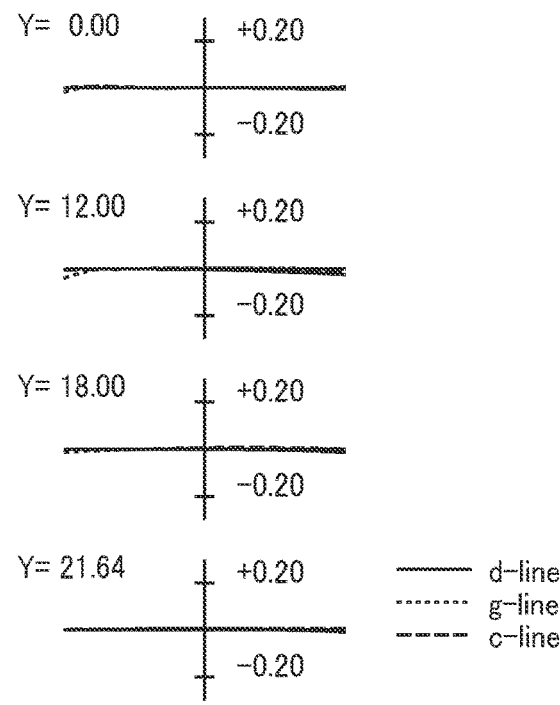
FIG. 114 is a collection of lateral aberration diagrams of the zoom lens system according to Numerical Example 10 focused on infinity at the short focal length end.
Figure 115:
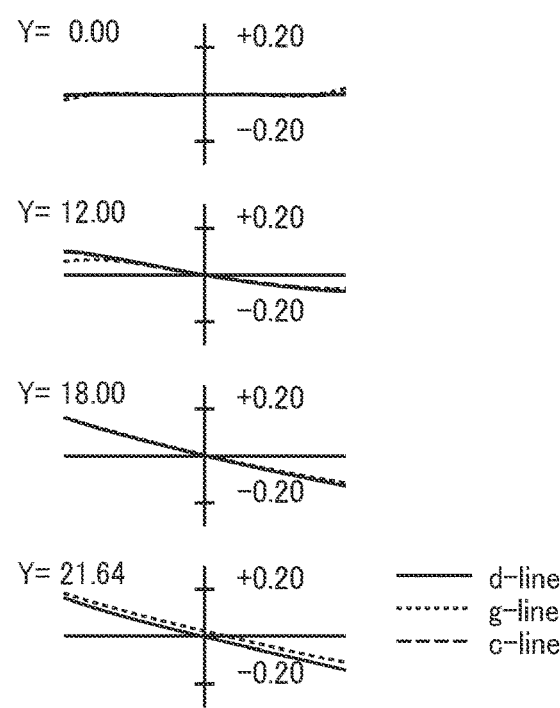
FIG. 115 is a collection of lateral aberration diagrams of the zoom lens system according to Numerical Example 10 focused on 1.2 m at the short focal length end.

FIGS. 114 and 115 are lateral aberration diagrams of the zoom lens system focused on infinity and 1.2 m at the short focal length end, respectively.

Figure 116:
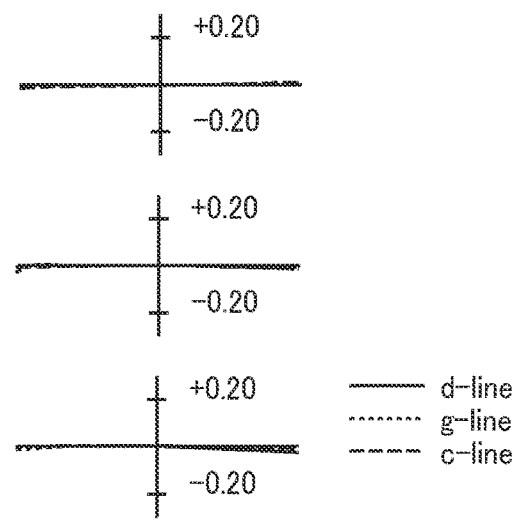
FIG. 116 is a collection of lateral aberration diagrams of the zoom lens system in the state illustrated in FIG. 114 during the drive of vibration isolation.

FIG. 116 is a collection of lateral aberration diagrams of the zoom lens system in the state of FIG. 114 during the drive of vibration isolation.

Figure 117:
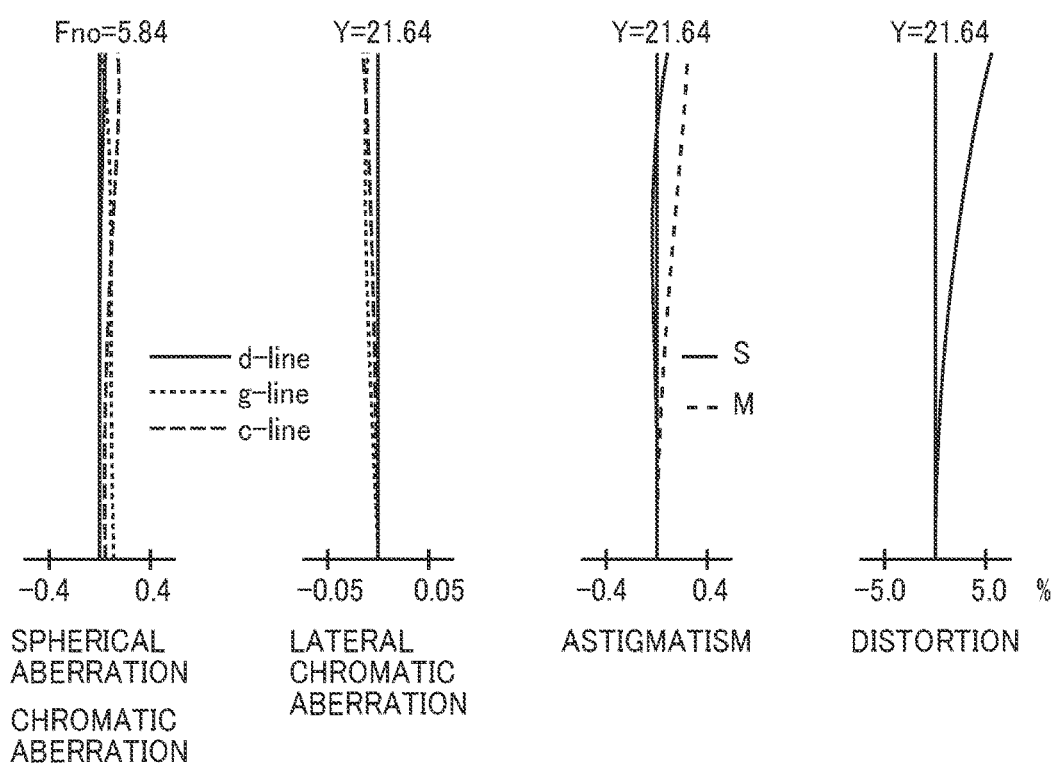
FIG. 117 is a collection of longitudinal aberration diagrams of the zoom lens system according to Numerical Example 10 focused on infinity at the long focal length end.
Figure 118:
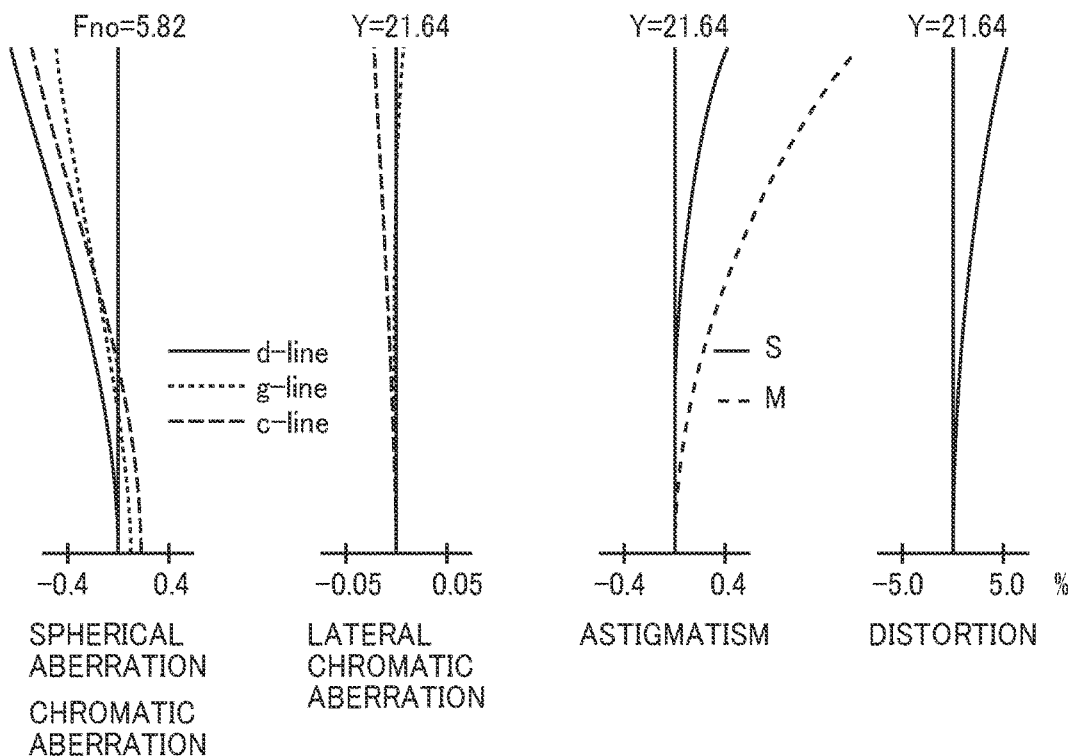
FIG. 118 is a collection of longitudinal aberration diagrams of the zoom lens system according to Numerical Example 10 focused on 1.2 m at the long focal length end.

FIGS. 117 and 118 are longitudinal aberration diagrams of the zoom lens system focused on infinity and 1.2 m at the long focal length end, respectively.

Figure 119:
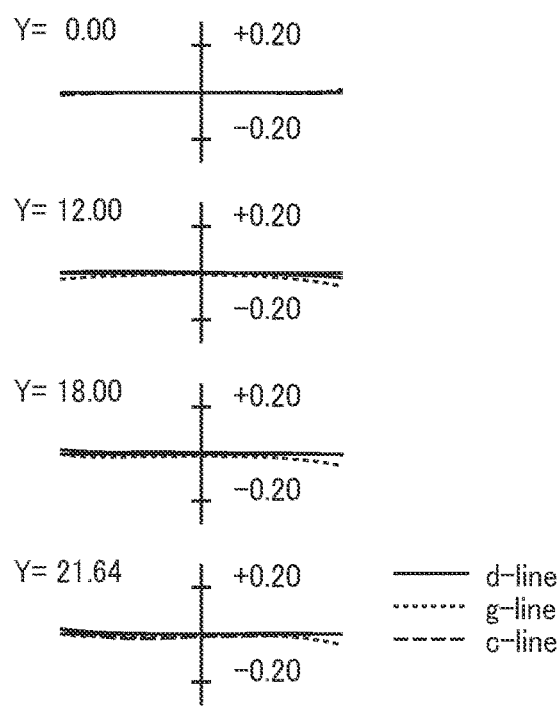
Figure 120:
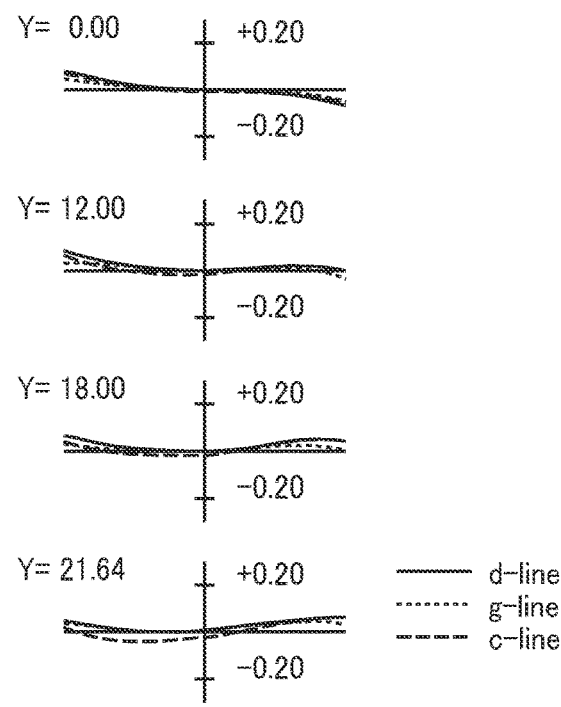

FIGS. 119 and 120 are lateral aberration diagrams of the zoom lens system focused on infinity and 1.2 m at the long focal length end, respectively.

Figure 121:
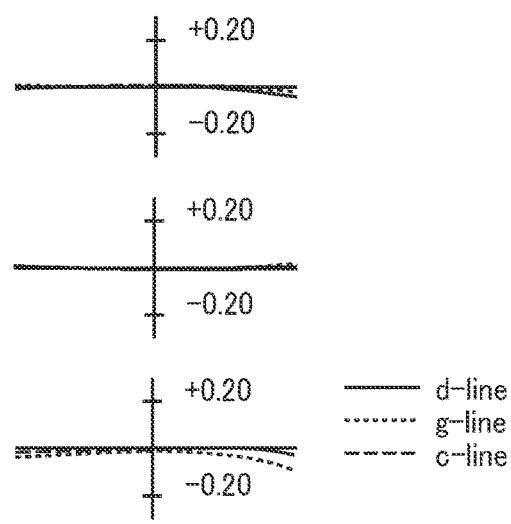

FIG. 121 is a collection of lateral aberration diagrams of the zoom lens system in the state illustrated in FIG. 119 during the drive of vibration isolation of ±0.3°.

Tables 37, 38, 39, 40, and 41 represent surface data, various data, zoom lens group data, principal point position data, and aspherical surface data. In Table 40, the term "P.P." stands for principal point, and the term "P.P. interval" refers to the distance between the principal points. Further, the terms "Initial" and "Final" refer to the "initial lens surface" and "final lens surface", respectively.

The zoom lens system according to Numerical Example 10 includes a first lens group G1 having positive refractive power, a second lens group G2 having negative refractive power, and a rear lens group (subsequent lens group) GR, which are arranged in that order from the object side. The subsequent lens group GR includes, in order from the object side, the third lens group G3 having positive refractive power, and the fourth lens group G4 having positive refractive power. That is, the zoom lens system has a zoom lens configuration including the five groups of positive, negative, positive, and positive refractive power.

The first lens group G1 includes a positive biconvex lens 11J, a negative meniscus lens 12J with a convex surface facing the object side, and a positive meniscus lens 13J with a convex surface facing the object side, which are arranged in that order from the object side. The negative meniscus lens 12J and the positive meniscus lens 13J are cemented to each other.

The second lens group G2 consists of a second lens group-a G2a having positive refractive power, a second lens group-b G2b having negative refractive power, and a second lens group-c G2c having negative refractive power, which are arranged in that order from the object side.

The second lens group-a G2a includes a negative meniscus lens 21J with a convex surface facing the object side and a positive biconvex lens 22J, which are arranged in that order from the object side. The negative meniscus lens 21J and the positive biconvex lens 22J are cemented to each other.

The second lens group-b G2b includes a negative biconcave lens 23J, and a positive meniscus lens 24J with a convex surface facing the object side arranged in that order from the object side.

The second lens group-c G2c includes a negative biconcave lens 25J, a positive meniscus lens 26J with a convex surface facing the object side, and a negative meniscus lens 27J with a convex surface facing the image side, which are arranged in that order from the object side. The negative biconcave lens 25J and the positive meniscus lens 26J are cemented to each other.

The third lens group G3 includes a positive biconvex lens 31J, a positive biconvex lens 32J, and a negative meniscus lens 33J having a convex surface facing the image side, which are arranged in that order from the object side. The positive biconvex lens 32J and the negative meniscus lens 33J are cemented to each other.

The fourth lens group G4 includes a fourth lens group-a G4a, a fourth lens group-b G4b, and a fourth lens group-c G4c, which are arranged in that order from the object side.

The fourth lens group-a G4a includes a positive biconvex lens 41J, a negative biconcave lens 42J, and a positive biconvex lens 43J, which are arranged in that order from the object side. The positive biconvex lens 41J and the negative biconcave lens 42J are cemented to each other. The positive biconvex lens 43J has an aspherical surface facing the image side.

The fourth lens group-b G4b includes a positive biconvex lens 44J and a negative biconcave lens 45J, which are arranged in that order from the object side. The positive biconvex lens 44J and the negative biconcave lens 45J are cemented to each other.

The fourth lens group-c C4c includes a positive biconvex lens 46J and a negative meniscus lens 47J with a convex surface facing the image side, which are arranged in that order from the object side.

TABLE 37

Surface Data

| Surface Number | r | D | N(d) | v(d) |
|---|---|---|---|---|
| 1 | 128.481 | 5.000 | 1.48749 | 70.2 |
| 2 | −775.463 | 0.200 | | |
| 3 | 110.744 | 1.500 | 1.68376 | 37.6 |
| 4 | 56.778 | 7.400 | 1.49700 | 81.6 |
| 5 | 644.825 | D5 | | |
| 6 | 89.500 | 1.200 | 1.89190 | 37.1 |
| 7 | 39.000 | 6.500 | 1.69680 | 55.5 |
| 8 | −368.248 | D8 | | |
| 9 | −237.670 | 1.200 | 1.77250 | 49.6 |
| 10 | 27.086 | 2.000 | | |
| 11 | 28.096 | 2.000 | 1.84666 | 23.8 |
| 12 | 46.990 | D12 | | |
| 13 | −99.422 | 1.200 | 1.61800 | 63.4 |
| 14 | 41.496 | 3.100 | 1.80000 | 29.9 |
| 15 | 483.673 | 2.320 | | |
| 16 | −46.483 | 1.200 | 1.65160 | 58.5 |
| 17 | −1336.266 | D17 | | |
| 18 Stop | INFINITY | 1.000 | | |
| 19 | 69.313 | 4.307 | 1.73400 | 51.5 |
| 20 | −98.420 | 0.200 | | |
| 21 | 58.658 | 5.891 | 1.49700 | 81.6 |
| 22 | −48.637 | 1.200 | 2.00100 | 29.1 |
| 23 | −871.247 | D23 | | |
| 24 | 49.679 | 4.100 | 1.51742 | 52.4 |
| 25 | −75.433 | 1.000 | 1.90043 | 37.4 |
| 26 | 93.084 | 1.500 | | |
| 27 | 56.247 | 4.500 | 1.58313 | 59.4 |
| 28* | −68.418 | 15.173 | | |
| 29 | 245.133 | 2.300 | 1.85478 | 24.8 |
| 30 | −40.455 | 1.000 | 1.80400 | 46.5 |
| 31 | 31.872 | 8.068 | | |
| 32 | 45.430 | 4.630 | 1.57099 | 50.8 |
| 33 | −45.816 | 3.344 | | |
| 34 | −25.003 | 1.200 | 1.88300 | 40.8 |
| 35 | −97.584 | D35 | | |
| 36 | INFINITY | 1.500 | 1.51633 | 64.1 |
| 37 | INFINITY | — | | |

*is rotation-symmetrically aspherical surface.

TABLE 38

Various Data
Zoom Ratio 4.04

| | Short Focal Length End | Mid-Focal Length | Long Focal Length End |
|---|---|---|---|
| Focused on Infinity | | | |
| F-NUMBER | 4.4 | 5.1 | 5.8 |
| Focal Length | 72.10 | 135.00 | 291.30 |
| Object-Image Distance | INFINITY | INFINITY | INFINITY |
| Magnification | 0.000 | 0.000 | 0.000 |
| Half Angle of View | 16.2 | 8.6 | 4.0 |
| Image Height | 21.64 | 21.64 | 21.64 |
| Back Focus | 38.87 | 49.31 | 59.39 |
| Total Lens Length | 188.38 | 219.10 | 244.19 |
| D5 | 2.950 | 33.664 | 58.758 |
| D8 | 2.000 | 2.000 | 2.000 |
| D12 | 16.460 | 16.460 | 16.460 |
| D17 | 29.047 | 18.583 | 2.000 |
| D23 | 4.818 | 4.845 | 11.346 |
| D35 | 36.884 | 47.322 | 57.404 |
| Focused on 1.2 m | | | |
| F-NUMBER | 4.4 | 5.1 | 5.8 |
| Focal Length | 79.58 | 133.02 | 172.39 |
| Object-Image Distance | 1200.00 | 1200.00 | 1200.00 |
| Magnification | −0.079 | −0.148 | −0.315 |
| Half Angle of View | 13.1 | 6.8 | 3.1 |
| Image Height | 21.64 | 21.64 | 21.64 |
| Back Focus | 38.87 | 49.31 | 59.39 |
| Total Lens Length | 188.38 | 219.10 | 244.19 |
| D5 | 2.950 | 33.664 | 58.758 |
| D8 | 8.833 | 10.328 | 12.488 |
| D12 | 9.627 | 8.132 | 5.972 |
| D17 | 29.047 | 18.583 | 2.000 |
| D23 | 4.818 | 4.845 | 11.346 |
| D35 | 36.884 | 47.322 | 57.404 |

TABLE 39

Zoom Lens Group Data

| Group | Initial Surface | Focal Length |
|---|---|---|
| 1 | 1 | 152.30 |
| 2 | 6 | −30.84 |
| 3 | 19 | 55.35 |
| 4 | 24 | 974.84 |
| 2a | 6 | 146.23 |
| 2b | 9 | −52.87 |
| 2c | 13 | −58.09 |
| Vibration-Isolating | 29 | −49.23 |

TABLE 40

Principal Point Position Data

| Initial | Final | Focal Length | Front P.P. | P.P. Interval | Rear P.P. | |
|---|---|---|---|---|---|---|
| Zoom Lens Group | | | | | | |
| 1 | 5 | 152.300 | 0.356 | 4.753 | 8.991 | First Group |
| 6 | 17 | −30.838 | 21.434 | 9.076 | 8.670 | Second Group |
| 18 | 23 | 55.352 | 0.030 | 4.668 | 7.899 | Third Group |
| 24 | 35 | 974.841 | −515.576 | 198.711 | 363.680 | Fourth Group |
| Sub-lens group | | | | | | |
| 6 | 8 | 146.234 | 0.775 | 3.203 | 3.722 | 2a Sub-lens group |
| 9 | 12 | −52.873 | 0.248 | 1.485 | 3.466 | 2b Sub-lens group |
| 13 | 17 | −58.092 | 3.782 | 2.372 | 1.665 | 2c Sub-lens group |
| 6 | 12 | −88.474 | 10.765 | 4.281 | −0.146 | 2ab Sub-lens group |
| 9 | 17 | −22.807 | 9.556 | 8.032 | 11.892 | 2bc Sub-lens group |

TABLE 41

Aspherical Data

NO. 28 K = 0.000 A4 = 0.2088E−05 A6 = −0.1121E−08
A8 = 0.0000E+00 A10 = 0.0000E+00 A12 = 0.0000E+00

FIGS. 122 to 136 and Tables 42 to 45 pertain to the zoom lens system according to Numerical Example 11.

Figure 122:
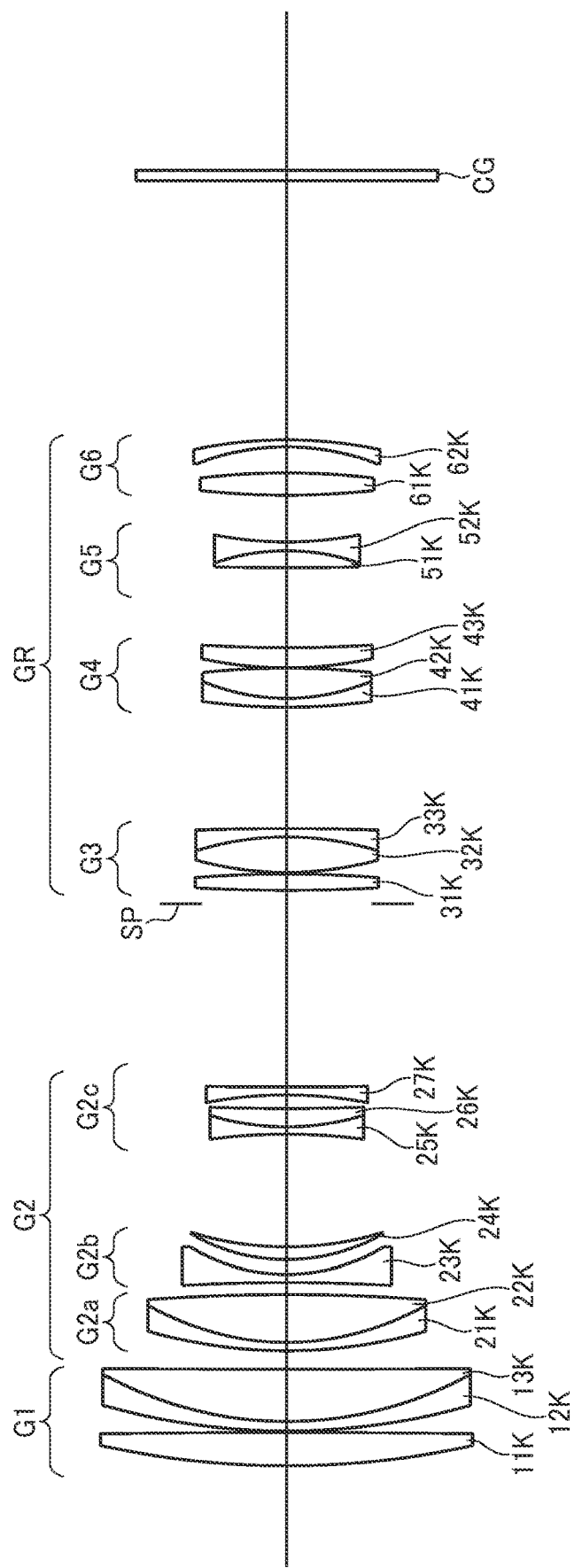

FIG. 122 is an illustration of the configuration of the zoom lens system focused on infinity at the short focal length end.

Figure 123:
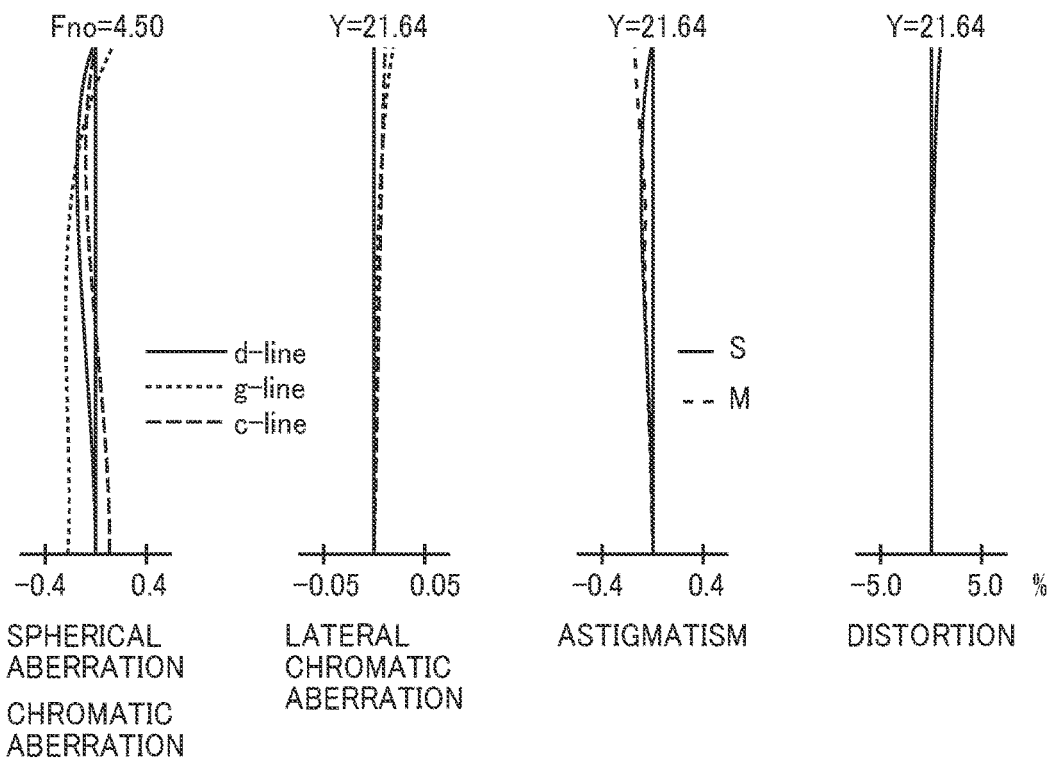
Figure 124:
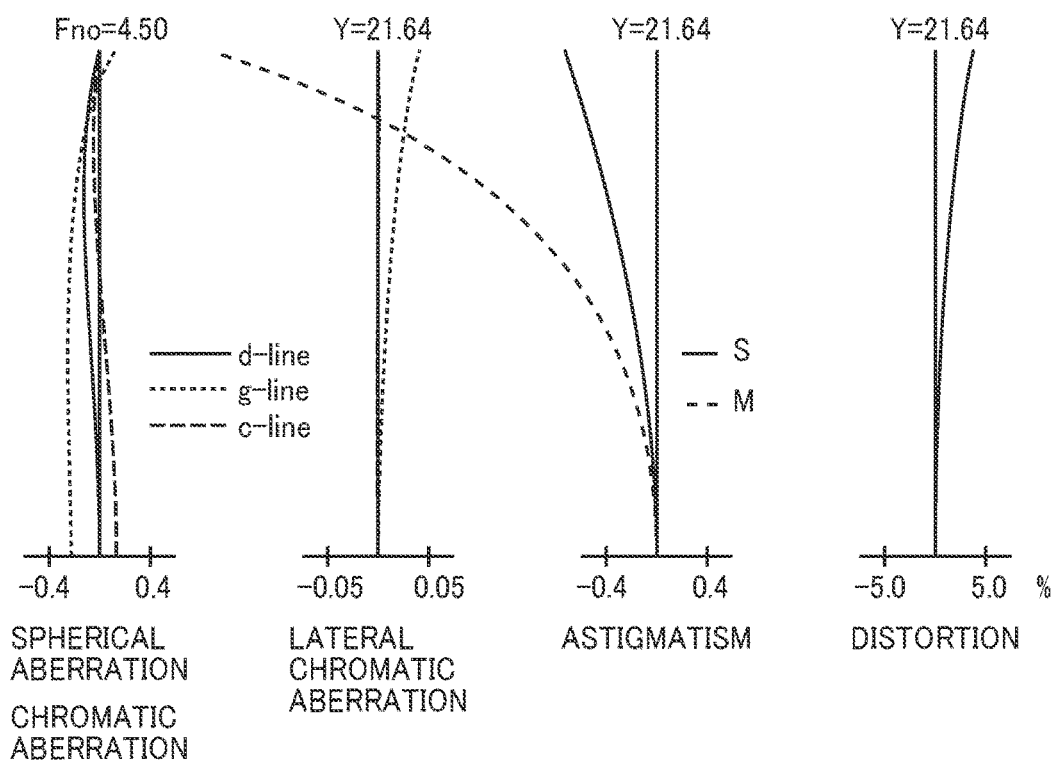
Figure 125:
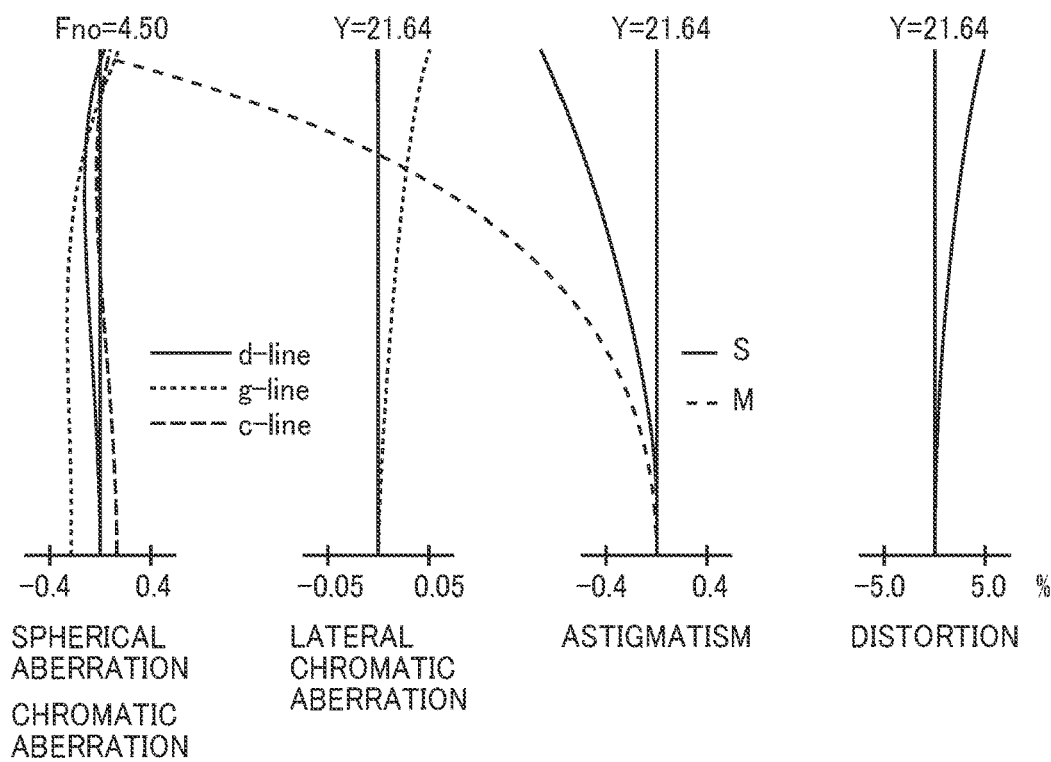

FIGS. 123, 124, and 125 are longitudinal aberration diagrams of the zoom lens system focused on infinity, 1.2 m, and 0.9 m at the short focal length end, respectively.

Figure 126:
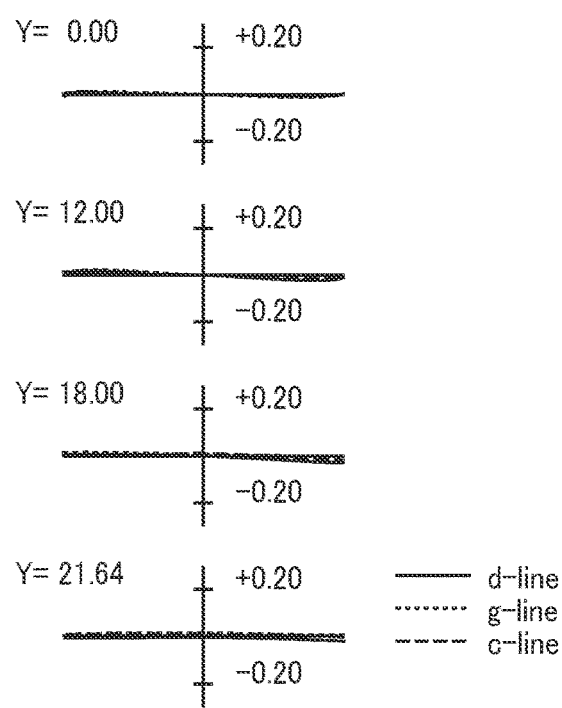
Figure 127:
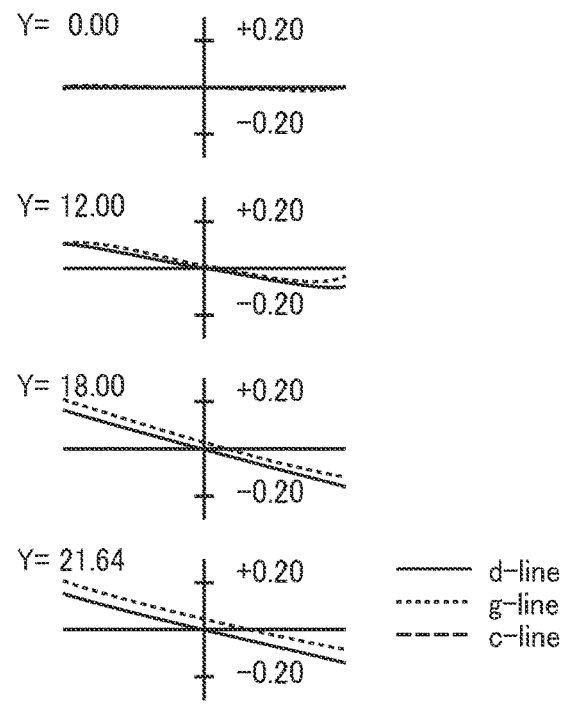
Figure 128:
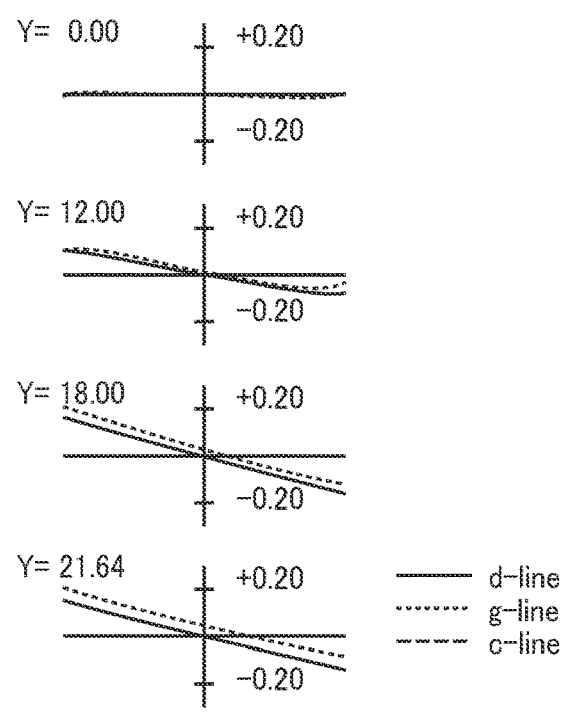

FIGS. 126, 127, and 128 are lateral aberration diagrams of the zoom lens system focused on infinity, 1.2 m, and 0.9 m at the short focal length end, respectively.

Figure 129:
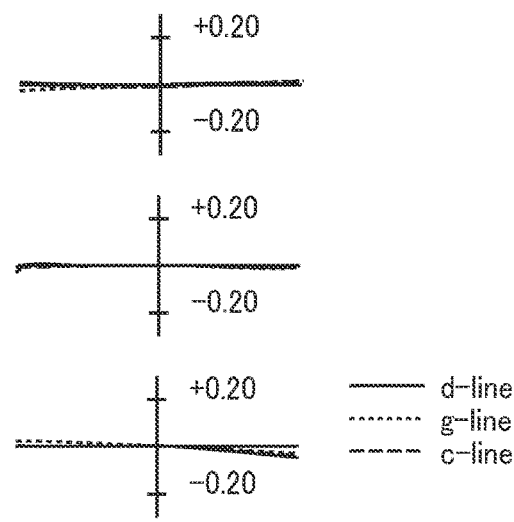

FIG. 129 is a collection of lateral aberration diagrams of the zoom lens system in the state of FIG. 126 during the drive of vibration isolation.

Figure 130:
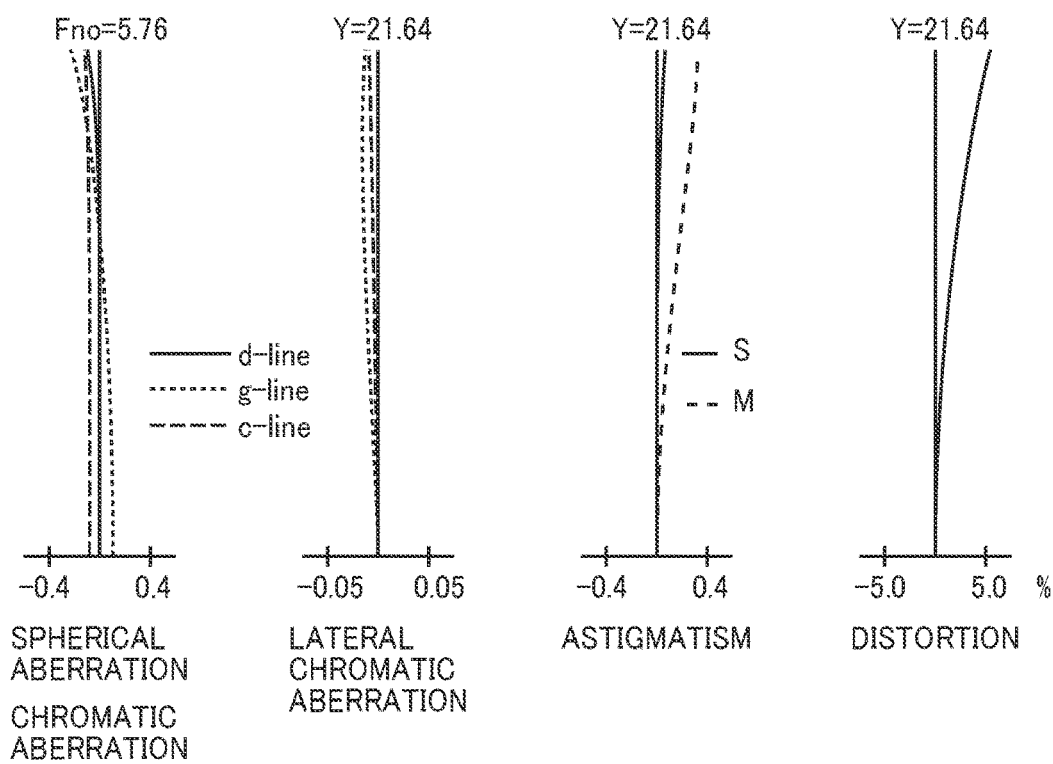

FIGS. 130, 131, and 132 are longitudinal aberration diagrams of the zoom lens system focused on infinity, 1.2 m, and 0.9 m at the long focal length end, respectively.

FIGS. 133, 134, and 135 are lateral aberration diagrams of the zoom lens system focused on infinity, 1.2 m, and 0.9 m at the long focal length end, respectively.

FIG. 136 is a collection of lateral aberration diagrams of the zoom lens system in the state illustrated in FIG. 133 during the drive of vibration isolation of ±0.6° (during the vibration isolation drive of two vibration-isolating lens groups: a first vibration-isolating lens group and a second vibration-isolating lens group).

Tables 42, 43, 44, and 45 represent surface data, various data, zoom lens group data, and principal point position data. In Table 45, the term "P.P." stands for principal point, and the term "P.P. interval" refers to the distance between the principal points. Further, the terms "Initial" and "Final" refer to the "initial lens surface" and "final lens surface", respectively.

The zoom lens system according to Numerical Example 11 includes a first lens group G1 having positive refractive power, a second lens group G2 having negative refractive power, and a rear lens group (subsequent lens group) GR, which are arranged in that order from the object side. The subsequent lens group GR includes, in order from the object side, the third lens group G3 having positive refractive power, the fourth lens group G4 having positive refractive power, the fifth lens G5 having negative refractive power, and the sixth lens group G6 having positive refractive power. That is, the zoom lens system has a zoom lens configuration including the five groups of positive, negative, positive, positive, negative, and positive refractive power.

The first lens group G1 includes a positive plano-convex lens 11K with a convex surface facing the object side, a negative meniscus lens 12K with a convex surface facing the object side, and a positive meniscus lens 13K with a convex surface facing the object side, which are arranged in that order from the object side. The negative meniscus lens 12K and the positive meniscus lens 13K are cemented to each other.

The second lens group G2 consists of a second lens group-a G2a having positive refractive power, a second lens group-b G2b having negative refractive power, and a second lens group-c G2c having negative refractive power, which are arranged in that order from the object side. As described above, the second lens group-c G2c serves as the vibration-isolating lens group (see FIG. 99).

The second lens group-a G2a includes a negative meniscus lens 21K with a convex surface facing the object side and a positive biconvex lens 22K, which are arranged in that order from the object side. The negative meniscus lens 21K and the positive biconvex lens 22K are cemented to each other.

The second lens group-b G2b includes a negative biconcave lens 23K, and a positive meniscus lens 24K with a convex surface facing the object side arranged in that order from the object side.

The second lens group-c G2c includes a negative biconcave lens 25K, a positive meniscus lens 26K with a convex surface facing the object side, and a negative meniscus lens 27K with a convex surface facing the image side, which are arranged in that order from the object side. The negative biconcave lens 25K and the positive meniscus lens 26K are cemented to each other.

The third lens group G3 includes a positive biconvex lens 31K, a positive biconvex lens 32K, and a negative meniscus lens 33K having a convex surface facing the image side, which are arranged in that order from the object side. The positive biconvex lens 32K and the negative meniscus lens 33K are cemented to each other.

The fourth lens group G4 includes a negative meniscus lens 41K with a convex surface facing the object side, a positive biconvex lens 42K, and a positive meniscus lens 43K with a convex surface facing the object side, which are arranged in that order from the object side. The negative meniscus lens 41K and the positive biconvex positive lens 42K are cemented to each other.

The fifth lens group G5 includes a positive meniscus lens 52K with a convex surface facing the image side and a negative biconcave lens 52, which are arranged in that order from the object side. The positive meniscus lens 51K and the negative biconcave lens 52 are cemented to each other. As described above, the fifth lens group G5 serves as the vibration-isolating lens group (see FIG. 99).

The sixth lens group G6 includes a positive biconvex lens 61K and a negative meniscus lens 62K with a convex surface facing the image side, which are arranged in that order from the object side.

TABLE 42

Surface Data

| Surface Number | r | D | N(d) | v(d) |
|---|---|---|---|---|
| 1 | 96.809 | 4.900 | 1.51823 | 59.0 |
| 2 | INFINITY | 0.200 | | |
| 3 | 120.285 | 1.950 | 1.65412 | 39.7 |
| 4 | 52.000 | 7.500 | 1.43875 | 95.0 |
| 5 | 654.604 | D5 | | |
| 6 | 67.375 | 1.380 | 1.89190 | 37.1 |
| 7 | 33.851 | 7.000 | 1.69680 | 55.5 |
| 8 | −497.901 | D8 | | |
| 9 | −200.377 | 1.000 | 1.80400 | 46.5 |
| 10 | 26.188 | 1.400 | | |
| 11 | 26.808 | 2.400 | 1.84666 | 23.8 |
| 12 | 50.000 | D12 | | |
| 13 | −97.764 | 1.000 | 1.72916 | 54.1 |
| 14 | 38.712 | 2.900 | 1.85478 | 24.8 |
| 15 | 207.147 | 2.000 | | |
| 16 | −60.093 | 1.000 | 1.77250 | 49.6 |
| 17 | −36895.611 | D17 | | |
| 18 Stop | INFINITY | 2.000 | | |
| 19 | 96.048 | 2.430 | 1.80400 | 46.5 |
| 20 | −128.585 | 0.200 | | |
| 21 | 47.142 | 5.170 | 1.53775 | 74.7 |
| 22 | −58.053 | 1.200 | 2.00100 | 29.1 |
| 23 | −309.281 | D23 | | |
| 24 | 79.885 | 1.200 | 2.00100 | 29.1 |
| 25 | 30.245 | 4.400 | 1.49700 | 81.6 |
| 26 | −96.418 | 0.200 | | |
| 27 | 47.399 | 3.000 | 1.83481 | 42.7 |
| 28 | 154.412 | D28 | | |
| 29 | −183.762 | 2.500 | 1.85478 | 24.8 |
| 30 | −27.067 | 1.000 | 1.80400 | 46.5 |
| 31 | 37.271 | D31 | | |
| 32 | 145.885 | 3.400 | 1.80518 | 25.4 |
| 33 | −108.356 | 3.871 | | |
| 34 | −37.830 | 1.200 | 1.98613 | 16.5 |
| 35 | −52.287 | D35 | | |
| 36 | INFINITY | 1.500 | 1.51633 | 64.1 |
| 37 | INFINITY | — | | |

TABLE 43

Various Data
Zoom Ratio 4.04

| | Short Focal Length End | Mid-Focal Length | Long Focal Length End |
|---|---|---|---|
| | Focused on Infinity | | |
| F-NUMBER | 4.5 | 5.2 | 5.8 |
| Focal Length | 72.08 | 135.00 | 291.30 |
| Object-Image Distance | INFINITY | INFINITY | INFINITY |
| Magnification | 0.000 | 0.000 | 0.000 |
| Half Angle of View | 16.6 | 8.7 | 4.0 |
| Image Height | 21.64 | 21.64 | 21.64 |
| Back Focus | 40.62 | 53.74 | 60.62 |
| Total Lens Length | 193.29 | 221.83 | 254.83 |
| D5 | 2.950 | 31.491 | 64.491 |
| D8 | 2.000 | 2.000 | 2.000 |
| D12 | 16.460 | 16.460 | 16.460 |
| D17 | 27.294 | 14.657 | 2.000 |
| D23 | 18.502 | 18.026 | 23.794 |
| D28 | 12.000 | 15.039 | 13.714 |
| D31 | 7.062 | 4.023 | 5.348 |
| D35 | 38.634 | 51.746 | 58.635 |
| | Focused on 1.2 m | | |
| F-NUMBER | 4.9 | 5.2 | 5.7 |
| Focal Length | 79.15 | 134.18 | 187.15 |
| Object-Image Distance | 1200.00 | 1200.00 | 1200.00 |
| Magnification | −0.077 | −0.146 | −0.309 |
| Half Angle of View | 13.2 | 7.1 | 3.2 |
| Image Height | 21.64 | 21.64 | 21.64 |
| Back Focus | 40.62 | 53.74 | 60.62 |
| Total Lens Length | 193.29 | 221.83 | 254.83 |
| D5 | 2.950 | 31.491 | 64.491 |
| D8 | 7.355 | 8.756 | 11.558 |
| D12 | 11.105 | 9.704 | 6.902 |
| D17 | 27.294 | 14.657 | 2.000 |
| D23 | 18.502 | 18.026 | 23.794 |
| D28 | 12.000 | 15.039 | 13.714 |
| D31 | 7.062 | 4.023 | 5.348 |
| D35 | 38.634 | 51.746 | 58.635 |
| | Focused on 0.9 m | | |
| F-NUMBER | 4.5 | 5.2 | 5.7 |
| Focal Length | 82.31 | 132.20 | 158.11 |
| Object-Image Distance | 900.00 | 900.00 | 900.00 |
| Magnification | −0.114 | −0.215 | −0.453 |
| Half Angle of View | 12.6 | 6.4 | 2.9 |
| Image Height | 21.64 | 21.64 | 21.64 |
| Back Focus | 40.62 | 53.74 | 60.62 |
| Total Lens Length | 193.29 | 221.83 | 254.83 |
| D5 | 2.950 | 31.491 | 64.491 |
| D8 | 9.851 | 11.987 | 16.240 |
| D12 | 8.609 | 6.473 | 2.220 |
| D17 | 27.294 | 14.657 | 2.000 |

TABLE 43-continued

Various Data
Zoom Ratio 4.04

|  | Short Focal Length End | Mid-Focal Length | Long Focal Length End |
|---|---|---|---|
| D23 | 18.502 | 18.026 | 23.794 |
| D28 | 12.000 | 15.039 | 13.714 |
| D31 | 7.062 | 4.023 | 5.348 |
| D35 | 38.634 | 51.746 | 58.635 |

TABLE 44

Zoom Lens Group Data

| Group | Initial Surface | Focal Length |
|---|---|---|
| 1 | 1 | 165.24 |
| 2 | 6 | −29.44 |
| 3 | 19 | 46.52 |
| 4 | 24 | 73.58 |
| 5 (Vibration-Isolating2) | 29 | −40.81 |
| 6 | 32 | 160.47 |
| 2a | 6 | 112.71 |
| 2b | 9 | −51.49 |
| 2c (Vibration-Isolating1) | 13 | −46.38 |

TABLE 45

Principal Point Position Data

Zoom Lens Group

| Initial | Final | Focal Length | Front P.P. | P.P. Interval | Rear P.P. | |
|---|---|---|---|---|---|---|
| 1 | 5 | 165.242 | −1.143 | 4.826 | 10.867 | First Group |
| 6 | 17 | −29.440 | 24.671 | 7.825 | 6.044 | Second Group |
| 18 | 23 | 46.517 | 2.240 | 3.546 | 5.214 | Third Group |
| 24 | 28 | 73.581 | 3.399 | 3.429 | 1.971 | Fourth Group |
| 29 | 31 | −40.810 | 1.570 | 1.611 | 0.318 | Fifth Group |
| 32 | 35 | 160.466 | −2.273 | 2.206 | 8.538 | Sixth Group |

Sub-lens group

| Initial | Final | Focal Length | Front P.P. | Distance bet P. P. | Rear P.P. | |
|---|---|---|---|---|---|---|
| 6 | 8 | 112.709 | 0.295 | 3.496 | 4.590 | 2a Sub-lens group |
| 9 | 12 | −51.488 | 0.466 | 1.606 | 2.728 | 2b Sub-lens group |
| 13 | 17 | −46.384 | 2.794 | 2.260 | 1.846 | 2c Sub-lens group |
| 6 | 12 | −107.136 | 14.976 | 4.183 | −3.978 | 2ab Sub-lens group |
| 9 | 17 | −19.926 | 9.909 | 7.898 | 10.353 | 2bc Sub-lens group |

FIG. 137 is an illustration of the external appearance of a lens barrel LX (the imaging device) according to an embodiment of the present disclosure. The lens barrel LX is configured as, for example, a zoom interchangeable lens of a single-lens reflex camera. The lens barrel LX includes a fixed lens barrel 10, and a lens mount 100 is fixed to a rear surface of the fixed lens barrel 10. On the peripheral surface of the fixed lens barrel 10, a zoom ring 11 is fitted in a front area in the direction of the optical axis, and a focus ring 12 is fitted in a rear area. Rubber rings ZG and FG are fixed to each peripheral surface of the zoom ring 11 and the focus ring 12, which increases the texture during the operation.

The lens barrel LX is detachable from and attachable to a camera body with the lens mount 100 on the fixed lens barrel 10. Further, rotating the zoom ring 11 enables zooming from the long focus (telephoto) side to the short focus (wide) side. By operating the zoom ring 11 further to the short focal length side while pressing the retractable button B provided on the peripheral surface, the retracted state in which the length of the lens barrel LX is minimized can be set. Focusing is automatically performed by a built-in motor, but manual focusing by rotating the focus ring 12 is also possible.

Inside the fixed lens barrel 10, an outer linear-motion cylinder 13 and an inner linear-motion cylinder are coaxially arranged with a gap in the cylinder radial direction are provided. The rear end portions of the linear-motion cylinders are combined as a single unit, and by engaging a cam groove on the zoom ring 11 with a linear groom in the direction of the optical axis on the fixed lens barrel 10, the linear-motion cylinders linearly moves together as a single unit within the fixed lens barrel 10, with the rotation of the zoom ring 11.

A helicoid cylinder having a helicoid groove formed on the outer peripheral surface is fitted around the outer peripheral surface of the inner linear-motion cylinder. The helicoid cylinder moves in the cylinder axial direction together with the inner linear-motion cylinder. Further, the helicoid cylinder cooperates with the zoom ring 11 such that the helicoid cylinder rotates around the cylinder axis on the peripheral surface of the inner linear-motion cylinder, with the rotation of the zoom ring 11. A front linear-motion cylinder 16 is fitted between the helicoid cylinder and the outer linear-motion cylinder 13 in the radial direction. The front linear-motion cylinder 16 is fitted into a helicoid groove of the helicoid cylinder, and is movable in the direction of the optical axis with the rotation of the helicoid cylinder. A lens L1 is supported by the front end of the front linear-motion cylinder 16.

The lens L1 in FIG. 137 is, for example, the lens (11A, 11B, 11C, 11D, 11E, 11F, 11G, 11H, 11I, 11J, 11K) closest to the object side in the first lens group G1 of the zoom lens system according to the present embodiments. Further, the lens barrel LX is provided with a component (for example, an ON-OFF switch for the vibration-isolation drive) for exhibiting and assisting the function of the zoom lens system of the present embodiments.

Table 46 represents the amount of movement of the vibration-isolating lens group during the drive of the vibration isolation of)(±0.3°) in Numerical Examples 1 to 11. The unit of the amount of movement is mm.

TABLE 46

|  | Short Focal Length End | Mid-Focal Length | Long Focal Length End |
|---|---|---|---|
| Example 1 | ±0.246 | ±0.457 | ±0.973 |
| Example 2 | ±0.264 | ±0.494 | ±1.078 |
| Example 3 | ±0.239 | ±0.448 | ±0.964 |
| Example 4 | ±0.272 | ±0.359 | ±0.561 |
| Example 5 | ±0.344 | ±0.444 | ±0.730 |
| Example 6 | ±0.254 | ±0.353 | ±0.685 |
| Example 7 | ±0.299 | ±0.415 | ±0.804 |
| Example 8 | ±0.291 | ±0.404 | ±0.784 |
| Example 9 | ±0.322 | ±0.481 | ±0.896 |
| Example 10 | ±0.327 | ±0.509 | ±0.944 |
| Example 11 | | | |
| G2C | ±0.285 | ±0.372 | ±0.571 |
| G5 | ±0.292 | ±0.454 | ±0.874 |

Table 47 presents values for respective conditional expressions of the Numerical Examples 1 to 11.

TABLE 47

|  | Example 1 | Example 2 | Example 3 | Example 4 |
|---|---|---|---|---|
| Conditional Expression (1) | 0.751 | 0.779 | 0.638 | 0.434 |
| Conditional Expression (2) | 0.452 | 0.388 | 0.452 | 0.371 |
| Conditional Expression (3) | 0.501 | 0.599 | 0.512 | 0.422 |
| Conditional Expression (4) | 0.399 | 0.506 | 0.368 | 0.309 |
| Conditional Expression (5) | 0.588 | 0.527 | 0.622 | 0.632 |
| Conditional Expression (6) | 0.298 | 0.280 | 0.354 | 0.409 |
| Conditional Expression (7) | 3.812 | 5.450 | 2.596 | 2.375 |
| Conditional Expression (8) | 1.684 | 1.522 | 1.455 | 1.287 |
| Conditional Expression (9) | 12.398 | 16.828 | 7.676 | 6.351 |
| Conditional Expression (10) | 0.489 | 0.827 | 1.156 | 2.163 |
| Conditional Expression (11) | 1.591 | 2.772 | 9.063 | 1.495 |
| Conditional Expression (12) | 58.5 | 60.5 | 58.5 | 59.0 |
| Conditional Expression (13) | 1.004 | 0.274 | 1.812 | 1.606 |
| Conditional Expression (14) | 1.342 | 1.386 | 1.441 | 1.435 |
| Conditional Expression (15) | 58.5 | 58.5 | 58.5 | 52.3 |
| Conditional Expression (16) | 0.476 | 0.413 | 0.451 | 0.407 |
| Conditional Expression (17) | 33.1 | 31.0 | 33.1 | 28.5 |
| Conditional Expression (18) | 0.141 | 0.208 | 0.135 | 0.063 |
| Conditional Expression (19) | −8.203 | −8.233 | −8.336 | −9.409 |
| Conditional Expression (20) | 1.568 | 1.415 | 1.572 | 2.719 |
| Conditional Expression (21) | 1.153 | 0.979 | 1.144 | 1.287 |
| Conditional Expression (22) | 1.503 | 1.532 | 1.540 | 1.312 |
| Conditional Expression (23) | 0.304 | 0.293 | 0.358 | 0.389 |
| Conditional Expression (24) | 0.448 | 0.422 | 0.533 | 0.496 |
| Conditional Expression (25) | 0.900 | 0.849 | 1.071 | 0.997 |
| Conditional Expression (26) | 2.126 | 1.971 | 2.305 | 1.966 |
| Conditional Expression (27) | 0.909 | 0.975 | 0.856 | 0.871 |
| Conditional Expression (28) | 3.309 | 2.127 | 2.587 | 1.737 |

|  | Example 5 | Example 6 | Example 7 | Example 8 |
|---|---|---|---|---|
| Conditional Expression (1) | 0.485 | 0.453 | 0.427 | 0.380 |
| Conditional Expression (2) | 0.349 | 0.330 | 0.328 | 0.304 |
| Conditional Expression (3) | 0.486 | 0.567 | 0.555 | 0.558 |
| Conditional Expression (4) | 0.413 | 0.247 | 0.274 | 0.270 |
| Conditional Expression (5) | 0.622 | 0.482 | 0.537 | 0.700 |
| Conditional Expression (6) | 0.386 | 0.306 | 0.407 | 0.713 |
| Conditional Expression (7) | 2.161 | 4.286 | 2.917 | 2.169 |
| Conditional Expression (8) | 1.603 | 1.156 | 1.149 | 1.086 |
| Conditional Expression (9) | 6.701 | 10.477 | 7.051 | 5.098 |
| Conditional Expression (10) | 1.787 | 0.776 | 1.001 | 0.996 |
| Conditional Expression (11) | 2.264 | 1.820 | 1537.675 | 206.895 |
| Conditional Expression (12) | 60.5 | 63.9 | 63.4 | 70.2 |
| Conditional Expression (13) | 1.823 | 0.557 | 0.723 | 0.881 |
| Conditional Expression (14) | 1.307 | 1.163 | 1.305 | 1.242 |
| Conditional Expression (15) | 52.3 | 47.4 | 48.5 | 49.6 |
| Conditional Expression (16) | 0.453 | 0.447 | 0.447 | 0.442 |
| Conditional Expression (17) | 28.5 | 24.6 | 24.7 | 25.8 |
| Conditional Expression (18) | 0.018 | 0.009 | 0.010 | 0.017 |
| Conditional Expression (19) | −9.398 | −3.346 | −3.724 | −3.611 |
| Conditional Expression (20) | 2.090 | 1.482 | 1.263 | 1.298 |
| Conditional Expression (21) | 1.060 | 1.715 | 1.689 | 1.735 |
| Conditional Expression (22) | 1.318 | 1.000 | 1.354 | 1.629 |
| Conditional Expression (23) | 0.364 | 0.512 | 0.521 | 0.621 |
| Conditional Expression (24) | 0.493 | 0.655 | 0.754 | 1.038 |
| Conditional Expression (25) | 0.991 | 1.075 | 1.236 | 1.702 |
| Conditional Expression (26) | 2.115 | 1.013 | 0.974 | 0.933 |
| Conditional Expression (27) | 0.811 | 1.051 | 0.974 | 0.933 |
| Conditional Expression (28) | 1.898 | 1.183 | 1.590 | 1.239 |

|  | Example 9 | Example 10 | Example 11 |
|---|---|---|---|
| Conditional Expression (1) | 0.651 | 0.534 | 0.559 |
| Conditional Expression (2) | 0.409 | 0.420 | 0.427 |
| Conditional Expression (3) | 0.569 | 0.521 | 0.520 |
| Conditional Expression (4) | 0.448 | 0.352 | 0.396 |
| Conditional Expression (5) | 0.576 | 0.547 | 0.640 |
| Conditional Expression (6) | 0.307 | 0.275 | 0.389 |
| Conditional Expression (7) | 2.734 | 2.766 | 2.189 |
| Conditional Expression (8) | 1.247 | 0.910 | 1.110 |
| Conditional Expression (9) | 7.584 | 6.412 | 5.656 |
| Conditional Expression (10) | 1.643 | 1.642 | 1.313 |
| Conditional Expression (11) | 1.945 | 2.518 | 4.418 |
| Conditional Expression (12) | 59.370 | 55.530 | 55.530 |
| Conditional Expression (13) | 0.674 | 0.536 | 0.690 |
| Conditional Expression (14) | 1.558 | 1.493 | 1.665 |
| Conditional Expression (15) | 49.600 | 49.600 | 46.530 |
| Conditional Expression (16) | 0.411 | 0.399 | 0.441 |
| Conditional Expression (17) | 25.820 | 25.820 | 22.750 |
| Conditional Expression (18) | 0.155 | 0.220 | 0.119 |
| Conditional Expression (19) | −10.188 | −8.975 | −9.721 |
| Conditional Expression (20) | 702 | 1.616 | 2.673(G2cReference) 1.742(G5Reference) |
| Conditional Expression (21) | 0.864 | 1.074 | 1.110(G2cReference) 1.262(G5Reference) |
| Conditional Expression (22) | 1.618 | 1.481 | 1.488 |
| Conditional Expression (23) | 0.351 | 0.428 | 0.408 |
| Conditional Expression (24) | 0.481 | 0.523 | 0.567 |
| Conditional Expression (25) | 0.967 | 1.051 | 1.140 |
| Conditional Expression (26) | 1.914 | 1.810 | 2.090 |
| Conditional Expression (27) | 0.784 | 0.877 | 0.859 |
| Conditional Expression (28) | 1.489 | 1.905 | 1.348 |

As found from Table 47, Numerical Examples 1 to 11 satisfy Conditional Expressions (1) to (28). As is clear from the longitudinal aberration diagrams and lateral aberration diagrams, various aberrations are relatively properly corrected. Irrespective of fewer lenses constituting the focusing lens, the fluctuations in aberration with a change in shooting distance at both the short focal length end and the long focal length end can be reduced or eliminated, and can also be successfully corrected during the vibration isolation drive.

Even if a lens or a lens group having no substantial power is added to the zoom lens system of the present embodiments, such a configuration may fall within the range of the present invention.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:
1. A zoom lens system comprising:
a first lens group having positive refractive power;
a second lens group having negative refractive power, the second lens group consisting of a second lens group-a having positive refractive power, a second lens group-b having negative refractive power, and a second lens group-c having negative refractive power arranged in that order from the object side; and
a subsequent lens group,
the first lens group, the second lens group, and the subsequent lens group being disposed in that order from the object side,
a distance between the first lens group and the second lens group increasing and a distance between the second lens group and the subsequent lens group decreasing during a change in magnification from a short focal length end to a long focal length end,
during a change in focus from infinity to a short distance, the second lens group-b being movable to the image side, and a distance between the second lens group-a and the second lens group-b and a distance between the second lens group-b and the second lens group-c being changeable, wherein:

$$(1-M\_2bt2) \cdot M\_2bRt2 < -3.0$$

where
- M_2bt denotes lateral magnification of the second lens group-b when the zoom lens system is focused on infinity at the long focal length end, and
- M_2bRt denotes a combined lateral magnification of all of lens groups disposed on the image side relative to the second lens group-b when the zoom lens system is focused on infinity at the long focal length end.

2. The zoom lens system according to claim 1,
wherein when a second lens group-ab denotes a combined optical system of the second lens group-a and the second lens group-b, and a second lens group-bc denotes a combined optical system of the second lens group-b and the second lens group-c, at least one of conditional expressions (1), (2), (3), (4), (5), and (6) below are satisfied:

$$0.3 < D2bc/(-f2) < 1.0 \qquad (1)$$

$$0.3 < D2bc/D2 < 1.0 \qquad (2)$$

$$0.3 < H2\_2bc/(-f2bc) \qquad (3)$$

$$0.2 < HH\_2bc/(-f2bc) \qquad (4)$$

$$0 < H1\_2/D2 < 0.9 \qquad (5)$$

$$0 < H1\_2ab/D2 < 1.0 \qquad (6)$$

where
- D2bc denotes a distance between the second lens group-b and the second lens group-c when the zoom lens system is focused on infinity,
- f2 denotes the focal length of the second lens group,
- D2 denotes thickness of the second lens group along the optical axis,
- H2_2bc denotes distance between a surface closest to the image side within the second lens group-bc to a rear principal point of the second lens group-bc along the optical axis,
- f2bc denotes focal length of the second lens group-bc when the zoom lens system is focused on infinity,
- HH_2bc denotes distance between principal points, which are a front principal point and the rear principal point, of the second lens group-bc along the optical axis,
- H1_2 denotes distance from a surface closest to the object side within the second lens group to a front principal point of the second lens group along the optical axis, and
- H1_2ab denotes the distance between the surface closest to the object side within the second lens group-ab and a front principal point of the second lens group-ab along the optical axis.

3. The zoom lens system according to claim 1,
wherein conditional expression (7) below is satisfied:

$$1.5 < f2a/(-f2b) < 6.5 \qquad (7)$$

where
- f2a denotes focal length of the second lens group-a, and
- f2b denotes focal length of the second lens group-b.

4. The zoom lens system according to claim 1,
wherein conditional expression (8) below is satisfied:

$$0.5 < f2b/f2c < 2.5 \qquad (8)$$

where
- f2b denotes focal length of the second lens group-b, and
- f2c denotes focal length of the second lens group-c.

5. The zoom lens system according to claim 1,
wherein when a second lens group-bc denotes a combined optical system of the second lens group-b and the second lens group-c, conditional expression (9) below is satisfied:

$$4 < f2a/(-f2bc) < 20 \qquad (9)$$

where
- f2a denotes focal length of the second lens group-a; and
- f2bc denotes focal length of the second lens group-bc when the zoom lens system is focused on infinity.

6. The zoom lens system according to claim 1,
wherein conditional expression (10) below is satisfied:

$$0.4 < (R2\_2a - R1\_2a)/(R2\_2a + R1\_2a) < 3.0 \qquad (10)$$

where
- R1_2a denotes paraxial radius of curvature of the surface closest to the object side within the second lens group-a, and
- R2_2a denotes paraxial radius of curvature of the surface closest to the image side within the second lens group-a.

7. The zoom lens system according to claim 1,
wherein conditional expression (11) below is satisfied:

$$0.40 < |R2\_2a|/f2a \qquad (11)$$

where
- R2_2a denotes paraxial radius of curvature of a surface closest to the image side within the second lens group-a, and
- f2a denotes focal length of the second lens group-a.

8. The zoom lens system according to claim 1,
wherein the second lens group-a includes one or more positive lenses, and conditional expression (12) below is satisfied:

$$45 < 2ap\,MAX\_vd \qquad (12)$$

where
- 2apMAX_vd denotes greatest Abbe number among Abbe numbers of the positive lenses in the second lens group-a.

9. The zoom lens system according to claim 1,
wherein the second lens group-a includes one or more negative lenses, and conditional expression (13) below is satisfied:

$$0.2 < (-f2an\text{MAX})/f2a \qquad (13)$$

where
- f2anMAX denotes focal length of a negative lens having the largest refractive power among the negative lenses in the second lens group-a, and
- f2a denotes focal length of the second lens group-a.

10. The zoom lens system according to claim 1,
wherein conditional expression (14) below is satisfied:

$$0.4 < (R1\_2b - R2\_2b)/(R1\_2b + R2\_2b) < 2.5 \qquad (14)$$

where
- R1_2b denotes paraxial radius of curvature of a surface closest to the object side of the second lens group-b, and
- R2_2b denotes paraxial radius of curvature of the surface closest to the image side within the second lens group-b.

11. The zoom lens system according to claim 1,
wherein the second lens group-b includes a negative lens disposed closest to the object side, and conditional expression (15) below is satisfied:

$$30 < 2bn\_vd \quad (15)$$

where
2bn_vd denotes Abbe number of the negative lens disposed closest to the object side within the second lens group-b.

12. The zoom lens system according to claim 1,
wherein the second lens group-b consists of one negative lens and one positive lens arranged in that order from the object side.

13. The zoom lens system according to claim 12,
wherein conditional expression (16) below is satisfied:

$$0.1 < (-f2bn)/f2bp < 0.7 \quad (16)$$

where
f2bn denotes the focal length of the negative lens of the second lens group-b, and
f2bp denotes the focal length of the positive lens of the second lens group-b.

14. The zoom lens system according to claim 12
wherein conditional expression (17) below is satisfied:

$$20 < 2bn\_vd - 2bp\_vd \quad (17)$$

where
2bn_vd denotes Abbe number of the negative lens of the second lens group-b, and
2bp_vd denotes Abbe number of the positive lens of the second lens group-b.

15. The zoom lens system according to claim 1,
wherein conditional expression (17) below is satisfied:

$$|fW/|f1-2bW| < 0.5 \quad (18)$$

where
fW denotes focal length of the zoom lens system as a whole when the zoom lens system is focused on infinity at the short focal length end, and
f1-2bW denotes combined focal length of the first lens group, the second lens group-a, and the second lens group-b when the zoom lens system is focused on infinity at the short focal length end.

16. A lens barrel comprising a zoom lens system according to claim 1.

17. An imaging device comprising a zoom lens system according to claim 1.

18. A zoom lens system comprising:
a first lens group having positive refractive power;
a second lens group having negative refractive power, the second lens group consisting of a second lens group-a having positive refractive power, a second lens group-b having negative refractive power, and a second lens group-c having negative refractive power arranged in that order from the object side; and
a subsequent lens group,
the first lens group, the second lens group, and the subsequent lens group being disposed in that order from the object side,
a distance between the first lens group and the second lens group increasing and a distance between the second lens group and the subsequent lens group decreasing during a change in magnification from a short focal length end to a long focal length end,
during a change in focus from infinity to a short distance, the second lens group-b being movable to the image side, and a distance between the second lens group-a and the second lens group-b and a distance between the second lens group-b and the second lens group-c being changeable,
wherein the second lens group-c includes at least two negative lenses and at least one positive lens.

19. A zoom lens system comprising:
a first lens group having positive refractive power;
a second lens group having negative refractive power, the second lens group consisting of a second lens group-a having positive refractive power, a second lens group-b having negative refractive power, and a second lens group-c having negative refractive power arranged in that order from the object side; and
a subsequent lens group,
the first lens group, the second lens group, and the subsequent lens group being disposed in that order from the object side,
a distance between the first lens group and the second lens group increasing and a distance between the second lens group and the subsequent lens group decreasing during a change in magnification from a short focal length end to a long focal length end,
during a change in focus from infinity to a short distance, the second lens group-b being movable to the image side, and a distance between the second lens group-a and the second lens group-b and a distance between the second lens group-b and the second lens group-c being changeable,
wherein the second lens group-a includes at least one negative lens.

* * * * *